United States Patent
Beshai

(10) Patent No.: US 7,856,010 B2
(45) Date of Patent: Dec. 21, 2010

(54) CIRCULATING SWITCH

(75) Inventor: Maged E. Beshai, Stittsville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1500 days.

(21) Appl. No.: 11/185,542

(22) Filed: Jul. 21, 2005

(65) Prior Publication Data

US 2005/0249201 A1   Nov. 10, 2005

Related U.S. Application Data

(63) Continuation of application No. 10/780,557, filed on Feb. 19, 2004, now Pat. No. 7,567,556.

(60) Provisional application No. 60/448,639, filed on Feb. 20, 2003.

(51) Int. Cl.
*H04L 12/50* (2006.01)

(52) U.S. Cl. .................. 370/369; 370/360; 370/370; 370/372; 370/380

(58) Field of Classification Search .......... 370/369, 370/360, 370, 372
See application file for complete search history.

(56) References Cited

U.S. PATENT DOCUMENTS

| | | | | |
|---|---|---|---|---|
| 5,703,879 A | * | 12/1997 | Proctor et al. | 370/398 |
| 6,014,690 A | * | 1/2000 | VanDoren et al. | 709/215 |
| 6,175,870 B1 | * | 1/2001 | Gawlick et al. | 709/227 |
| 6,307,852 B1 | * | 10/2001 | Fisher et al. | 370/352 |
| 6,351,466 B1 | * | 2/2002 | Prabhakar et al. | 370/413 |
| 6,463,062 B1 | * | 10/2002 | Buyukkoc et al. | 370/395.1 |
| 6,732,354 B2 | * | 5/2004 | Ebeling et al. | 717/119 |
| 7,430,164 B2 | * | 9/2008 | Bare | 370/217 |

FOREIGN PATENT DOCUMENTS

| | | | |
|---|---|---|---|
| EP | 1026856 | * | 1/2000 |
| EP | 1026856 | * | 9/2000 |

OTHER PUBLICATIONS

Andrew Chung Cheung Lee, USPTO Office Communication dated Mar. 17, 2008 in relation to U.S. Appl. No. 10/780,557, filed Feb. 19, 2004 (16 pages).
Andrew Chung Cheung Lee, USPTO Office Communication dated Nov. 28, 2008 in relation to U.S. Appl. No. 10/780,557, filed Feb. 19, 2004 (14 pages).
Andrew Chung Cheung Lee, USPTO Office Communication dated Mar. 19, 2009 in relation to U.S. Appl. No. 10/780,557, filed Feb. 19, 2004 (6 pages).

* cited by examiner

*Primary Examiner*—Dang T Ton
*Assistant Examiner*—Pamit Kaur

(57) ABSTRACT

A circulating switch comprises switch modules of moderate capacities interconnected by a passive rotator. Data is sent from a one switch module to another switch module either directly, traversing the rotator once, or indirectly through at least one intermediate switch module where the rotator is traversed twice. A higher capacity extended circulating switch is constructed from higher-capacity switch modules, implemented as common memory switches and having multiple ports, interconnected through a multiplicity of rotators preferably arranged in complementary groups of rotators of opposite rotation directions. A polyphase circulating switch having a low switching delay is derived from a multi-rotator circulating switch by providing programmable rotators having adjustable relative rotator-cycle phases. A low delay high-capacity switch may also be constructed from prior-art medium-capacity rotator space switches with mutually phase-shifted rotation cycles.

20 Claims, 80 Drawing Sheets

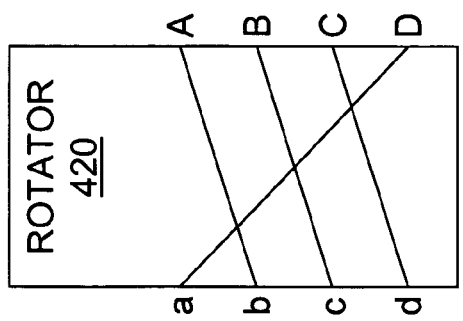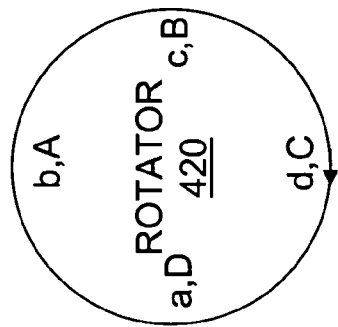
PHASE-3 558  *FIG. 5*
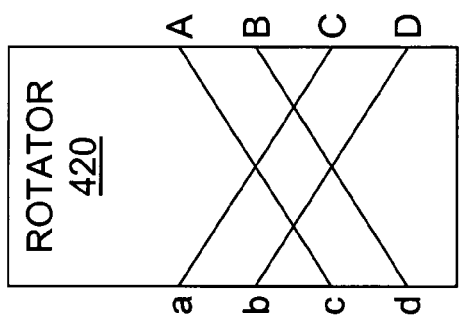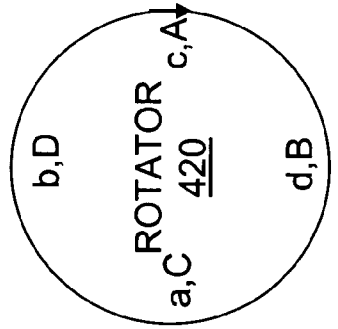
PHASE-2 556
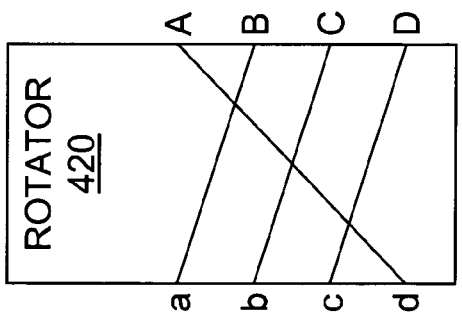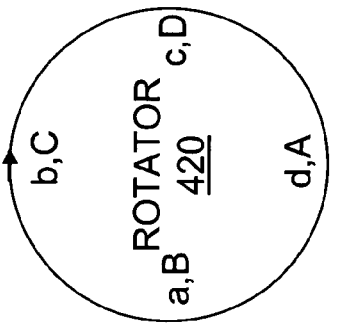
PHASE-1 554
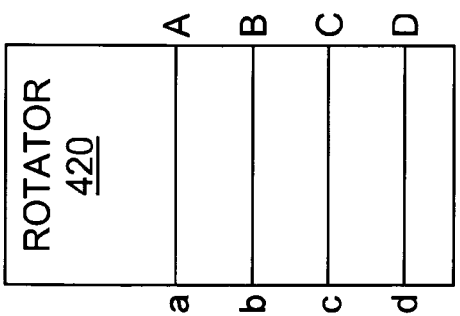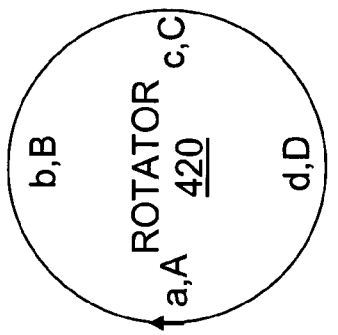
PHASE-0 552

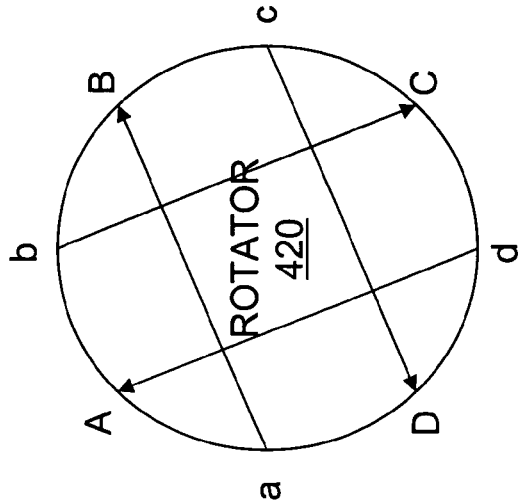
PHASE-1
554
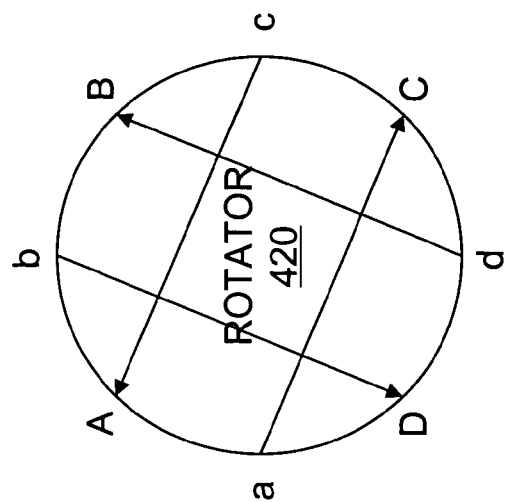
PHASE-2
556
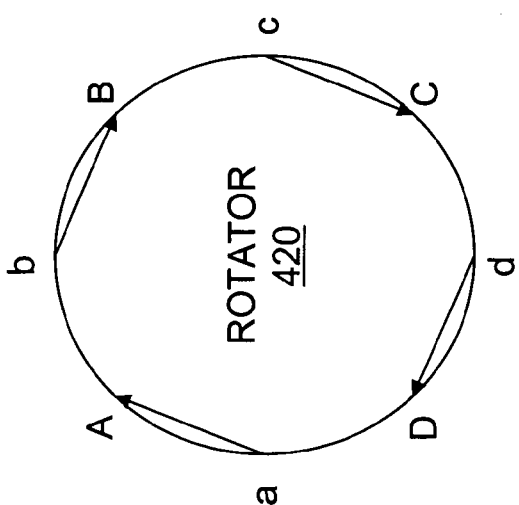
PHASE-0
552
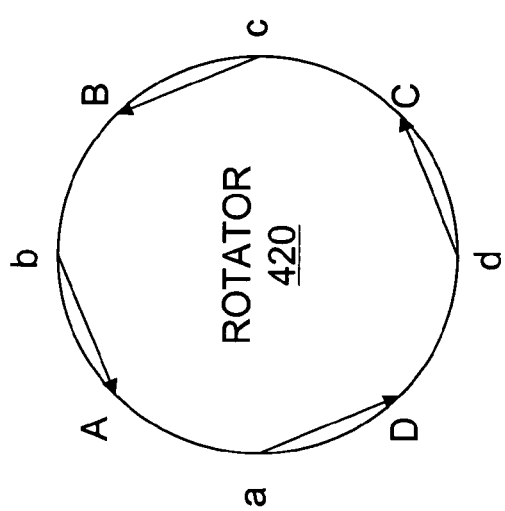
PHASE-3
558
FIG. 6

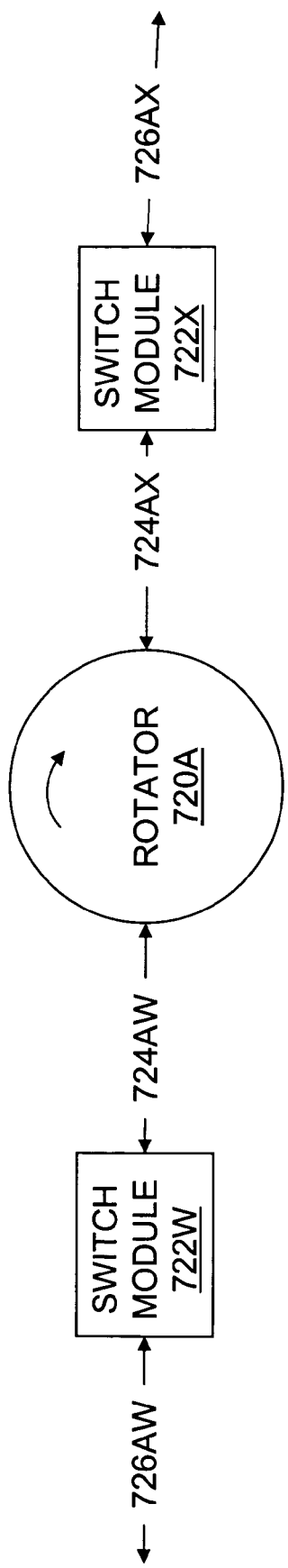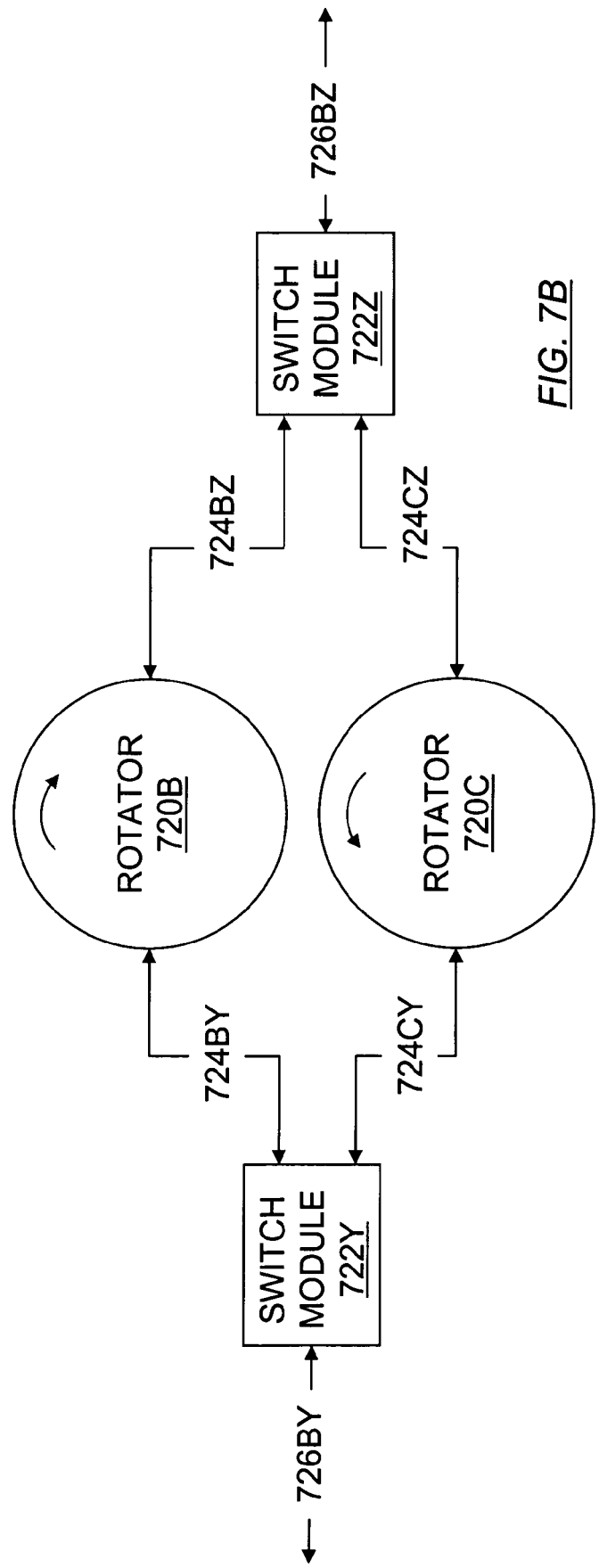
FIG. 7A
FIG. 7B

FIG. 30

INTERMEDIATE SWITCH MODULE

| | 0 | 1 | 2 | 3 | 4 | 5 | 6 | 7 | | | | | |
|---|---|---|---|---|---|---|---|---|---|---|---|---|---|
| Data Segment Receipt Phase (First rotator) | 6 | 7 | 0 | 1 | 2 | 3 | 4 | 5 | | | | | 3210F |
| Data Segment Transmission Phase (First rotator) | 5 | 4 | 3 | 2 | 1 | 0 | 7 | 6 | | | | | 3212F |
| Data Segment Receipt Phase (Second rotator) | 2 | 1 | 0 | 7 | 6 | 5 | 4 | 3 | | | | | 3210S |
| Data Segment Transmission Phase (Second rotator) | 3 | 4 | 5 | 6 | 7 | 0 | 1 | 2 | | | | | 3212S |
| Transit Delay (First rotator then Second rotator) | 5 | 5 | X | 5 | 5 | X | 5 | 5 | | | | | 3214FS |
| Transit Delay (Second rotator then First rotator) | 3 | 3 | X | 3 | 3 | X | 3 | 3 | | | | | 3214SF |

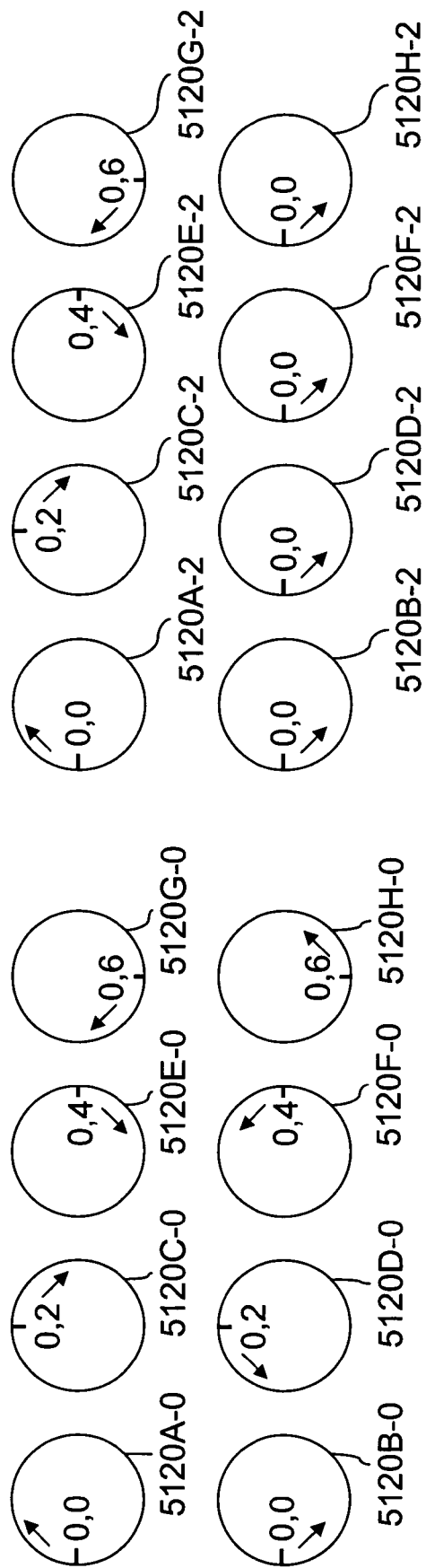
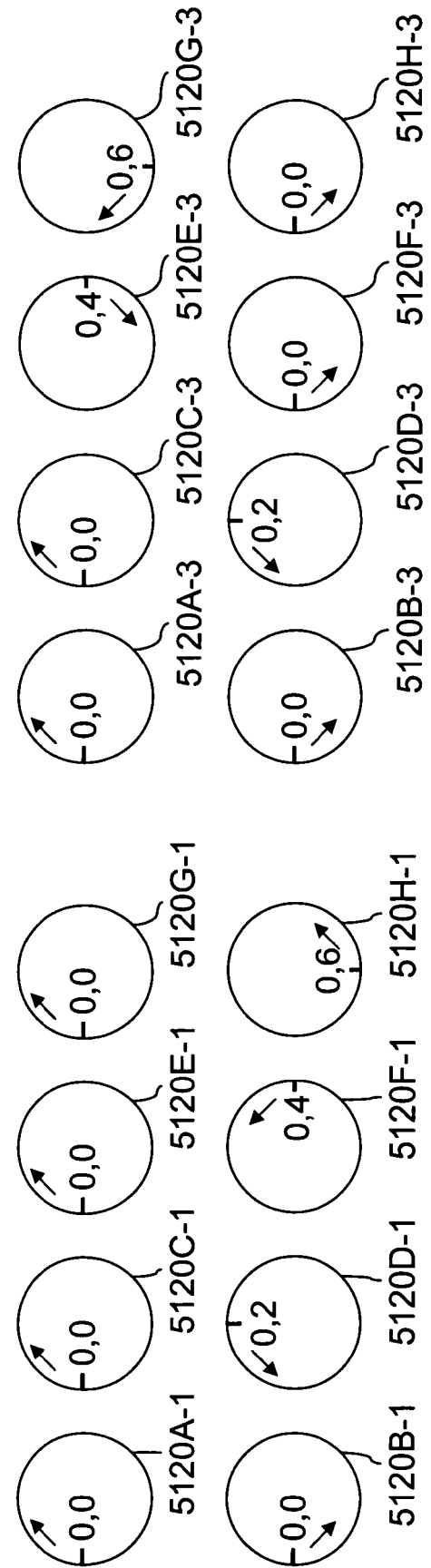

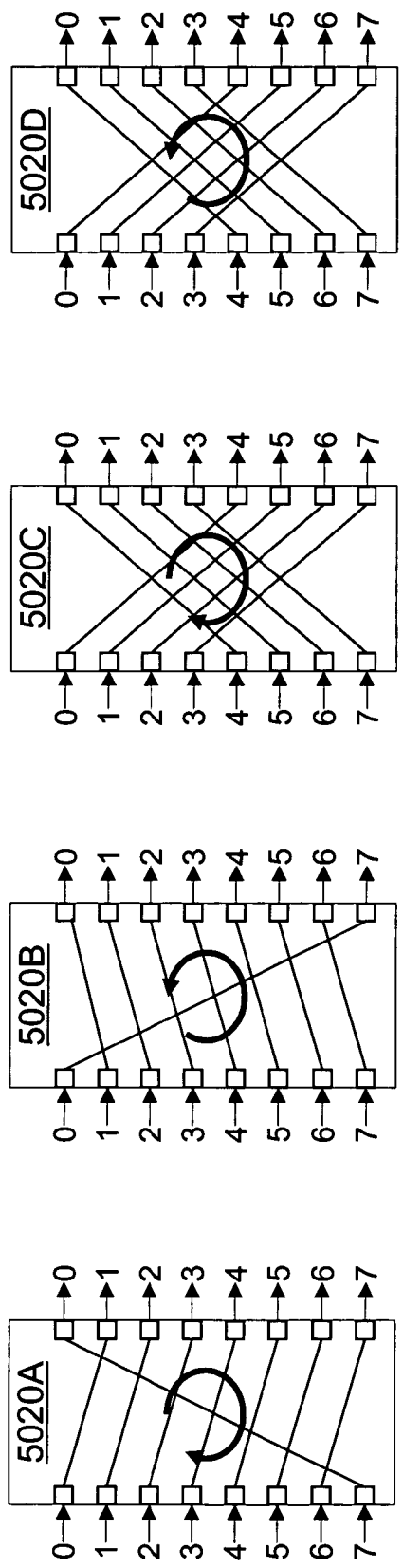
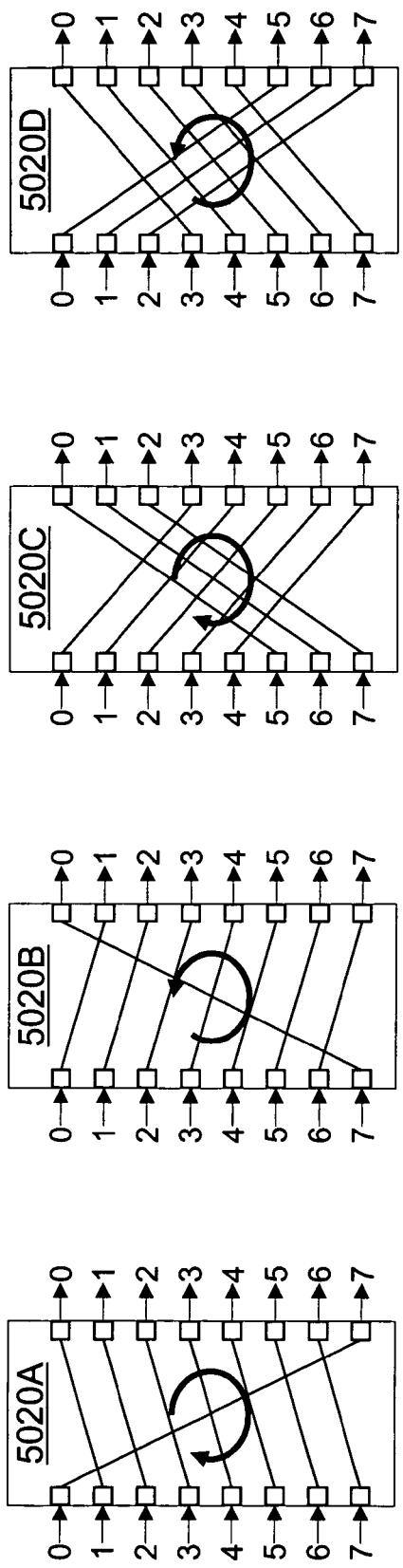
FIG. 53A
FIG. 53B

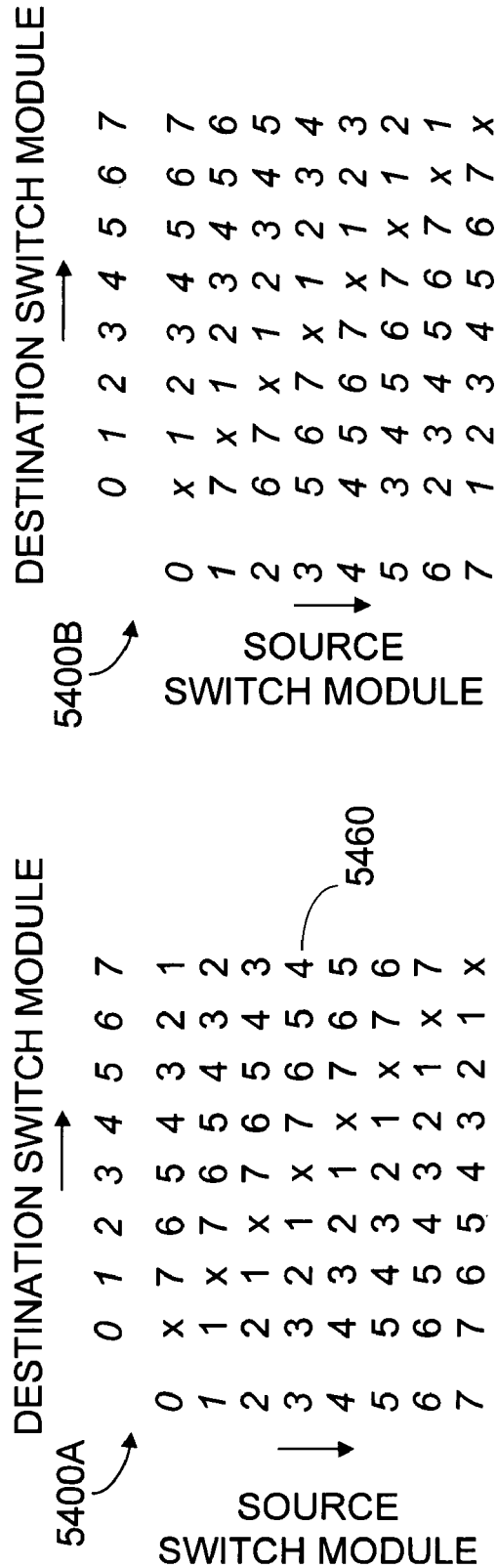
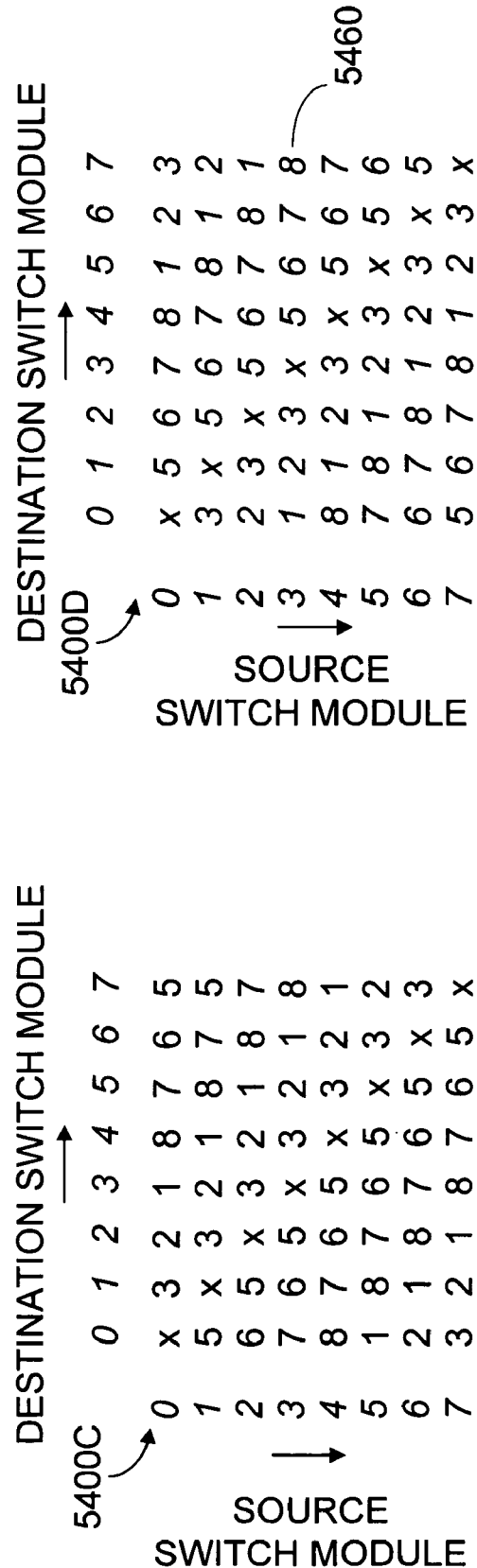
FIG. 54

FIG. 68

| From\To | 0 | 1 | 2 | 3 | 4 | 5 | 6 | 7 |
|---|---|---|---|---|---|---|---|---|
| 0 | x | 0 0 | 0 0 | 0 0 | 1 1 | 0 0 | 0 0 | 1 1 |
| 1 | 1 0 | x | 0 0 | 0 0 | 0 0 | 0 0 | 0 0 | 0 0 |
| 2 | 0 0 | 1 1 | x | 0 1 | 0 0 | 1 0 | (1 1) | (1 1) |
| 3 | 0 0 | 0 0 | 0 0 | x | 0 1 | 0 0 | 0 0 | 0 0 |
| 4 | 0 0 | 0 0 | 1 1 | 0 1 | x | 1 0 | 0 0 | 0 0 |
| 5 | 0 0 | (1 1) | (1 0) | 0 0 | 0 0 | x | 1 0 | 1 1 |
| 6 | 0 0 | 1 1 | 1 1 | 0 0 | 0 0 | 0 0 | x | 1 1 |
| 7 | 0 0 | 1 0 | 0 1 | 1 1 | 0 1 | 1 0 | 0 1 | x |

DIRECT PATHS

To switch module / From switch module 6800, 6823, 6824

CIRCULATING SWITCH

CROSS REFERENCE TO RELATED APPLICATIONS

This application is Continuation of U.S. patent application Ser. No. 10/780,557 filed on Feb. 19, 2004 now U.S. Pat. 7,567,556, which claims the benefit of U.S. Provisional application No. 60/448,639 filed on Feb. 20, 2003.

FIELD OF THE INVENTION

The present invention relates to multi-service switches and, more particularly, to the architecture and control of a switch that employs a temporal cyclic rotator.

BACKGROUND

The switching fabric of a switching node can be a common memory switching fabric, a conventional space switch, or a rotating-access switch. A common memory switch has limited scalability and may be used only if it is determined that the capacity limit of the switch is appropriate for a given network. A conventional space switch with input buffers provides better scalability and has been extensively studied in the prior art. The scalability of a conventional space switch is determined by two factors. The first factor, and the more severe of the two, is a difficulty of scheduling, which is traditionally based on arbitration among input ports vying for the same output port. The second factor is the quadratic fabric-complexity of the space switch where structural complexity increases with the square of the number of ports.

Rotating-access switches are described in U.S. Pat. No. 5,168,492, issued on Dec. 1, 1992 to Beshai et al. and U.S. Pat. No. 5,745,486, issued on Apr. 28, 1998, to Beshai et al. An extension to handle variable-size packets is described in Applicant's U.S. patent application Ser. No. 09/244,824, filed on Feb. 4, 1999, and titled "Rate-Controlled Multi-Class High-Capacity Packet Switch".

A rotating-access switch comprises an array of input ports each having an input memory, an array of output ports, a bank of transit memory devices, an input rotator and an output rotator. The input rotator cyclically connects each ingress port to each transit memory and the output rotator cyclically connects each transit memory to each output-port. Each transit memory is logically divided into a number of segments; one segment associated with each output port. The switch operates by cyclically storing data for a deterministic period of time in the transit memory devices. The input ports write data from their input buffers to segments in the transit memory. During each cycle of the output rotator, the output ports read data segments from corresponding memory segments of the shared transit memory devices.

The rotating-access switch is believed to provide significant structural, control and scalability advantages over a conventional space switch. In particular, a rotating-access switch greatly simplifies multi-cast communication in a large-scale node and may scale from a capacity of a fraction of a terabit per second to several hundred terabits per second.

The capability and efficiency of a switching network are determined primarily by its switches and, because of this pivotal role of the switches, switch design continues to attract significant attention.

SUMMARY

It is desired to provide a switch having structural simplicity while extending the dimension and capacity, and at least maintaining the same control advantages, of the current rotating-access switch.

The basic switch of the invention comprises switch modules interconnected by a rotator assembly that includes at least one rotator and a master controller. Data to be switched is preferably organized into data frames, where each data frame includes a plurality of data segments, and a connection between a data traffic source and a data traffic sink may require a transfer between switch modules of a number of data segments or a number of entire data frames.

The memory in each switch module may be logically divided into three sections. A first section contains data segments derived from data packets received from subtending data traffic sources. A second section contains data partitions, where one partition is dedicated to each other'switch module. The third section contains data segments received from other switch modules through the rotator for delivery to subtending data traffic sinks. The memory of the switch module may be dynamically shared by the three sections. Each switch module has a circulating direct access to each other switch module through the rotator assembly. A simple exchange of data segments enables switching of data segments or frames of data segments, from any switch module to any other switch module.

According to an aspect of the present invention, there is provided a circulating switch including a plurality of switch modules and a temporal cyclical rotator having a plurality of inlets and a plurality of outlets, where each inlet of the plurality of inlets is communicatively connected to each switch module of the plurality of switch modules and each outlet of the plurality of outlets is communicatively connected to each switch module of the plurality of switch modules and where the temporal cyclical rotator is operable to cyclically connect each switch module of the plurality of switch modules to each other switch module of the plurality of switch modules by cyclically connecting individual inlets among the plurality of inlets to individual outlets among the plurality of outlets.

According to another aspect of the present invention, there is provided a circulating switch including a plurality of switch modules and an array of temporal cyclical rotators, where each temporal cyclical rotator of the array has a plurality of inlets and a plurality of outlets, where the plurality of inlets and the plurality of outlets are communicatively connected to the plurality of switch modules and where the each temporal cyclical rotator is operable to cyclically connect each switch module of the plurality of switch modules to each other switch module of the plurality of switch modules by cyclically connecting individual inlets among the plurality of inlets to individual outlets among the plurality of outlets.

According to a further aspect of the present invention, there is provided a method of switching including cyclically connecting each switch module belonging to a plurality of switch modules to each other switch module of the plurality of switch modules such that, in a given time slot, each switch module is connected to a subset of the plurality of switch modules.

According to a still further aspect of the present invention, there is provided a method of adding a new switch module to a circulating switch having a plurality of switch modules that exchange data segments through an array of temporal cyclical rotators. The method includes scheduling an exchange of the data segments through the temporal cyclical rotators while excluding from consideration a selected one of the temporal cyclical rotators, extending a rotation configuration of a selected one of the temporal cyclical rotators of the array, connecting an input port and an output port of the new switch module to the selected one of the temporal cyclical rotators and repeating the scheduling, extending and connecting using another selected one of the temporal cyclical rotators.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention:

FIG. 5 illustrates alternate representations of the rotator of FIG. 4 in different rotator phases;

FIG. 6 illustrates a cyclic-connectivity pattern of the rotator of FIG. 4;

FIG. 7A illustrates the use of a single rotator to connect two switch modules in accordance with an embodiment of the present invention;

FIG. 7B illustrates the use of two rotators to connect two switch modules in accordance with an embodiment of the present invention;

FIG. 30 illustrates switching delays for all directed switch module pairs in a circulating switch having eight switch modules and a single rotator;

FIG. 32 illustrates a table for determining switching delay associated with the transmission of data from a first switch module to a second switch module using an intermediate switch module in accordance with an embodiment of the present invention;

FIG. 51A illustrates a first rotation pattern of a polyphase circulating switch having eight rotators, in accordance with an embodiment of the present invention;

FIG. 51B illustrates a second rotation pattern of a polyphase circulating switch having eight rotators, in accordance with an embodiment of the present invention;

FIG. 51C illustrates a third rotation pattern of a polyphase circulating switch having eight rotators, in accordance with an embodiment of the present invention;

FIG. 51D illustrates a fourth rotation pattern of a polyphase circulating switch having eight rotators, in accordance with an embodiment of the present invention;

FIG. 53A illustrates a set of connectivity patterns for a first rotation phase for the four rotators of a polyphase circulating switch as illustrated FIG. 50 where each rotator excludes self-connection of dual ports;

FIG. 53B illustrates a set of connectivity patterns for a second rotation phase for the four rotators of a polyphase circulating switch as illustrated FIG. 50 where each rotator excludes self-connection of dual ports;

FIG. 54 illustrates switching-delay matrices corresponding to the polyphase circulating switch of FIG. 50;

FIG. 68 illustrates a scheduling matrix for use in a single-rotator circulating switch of the type illustrated in FIGS. 4 and 9, according to an embodiment of the invention;

DETAILED DESCRIPTION

Figure 1:
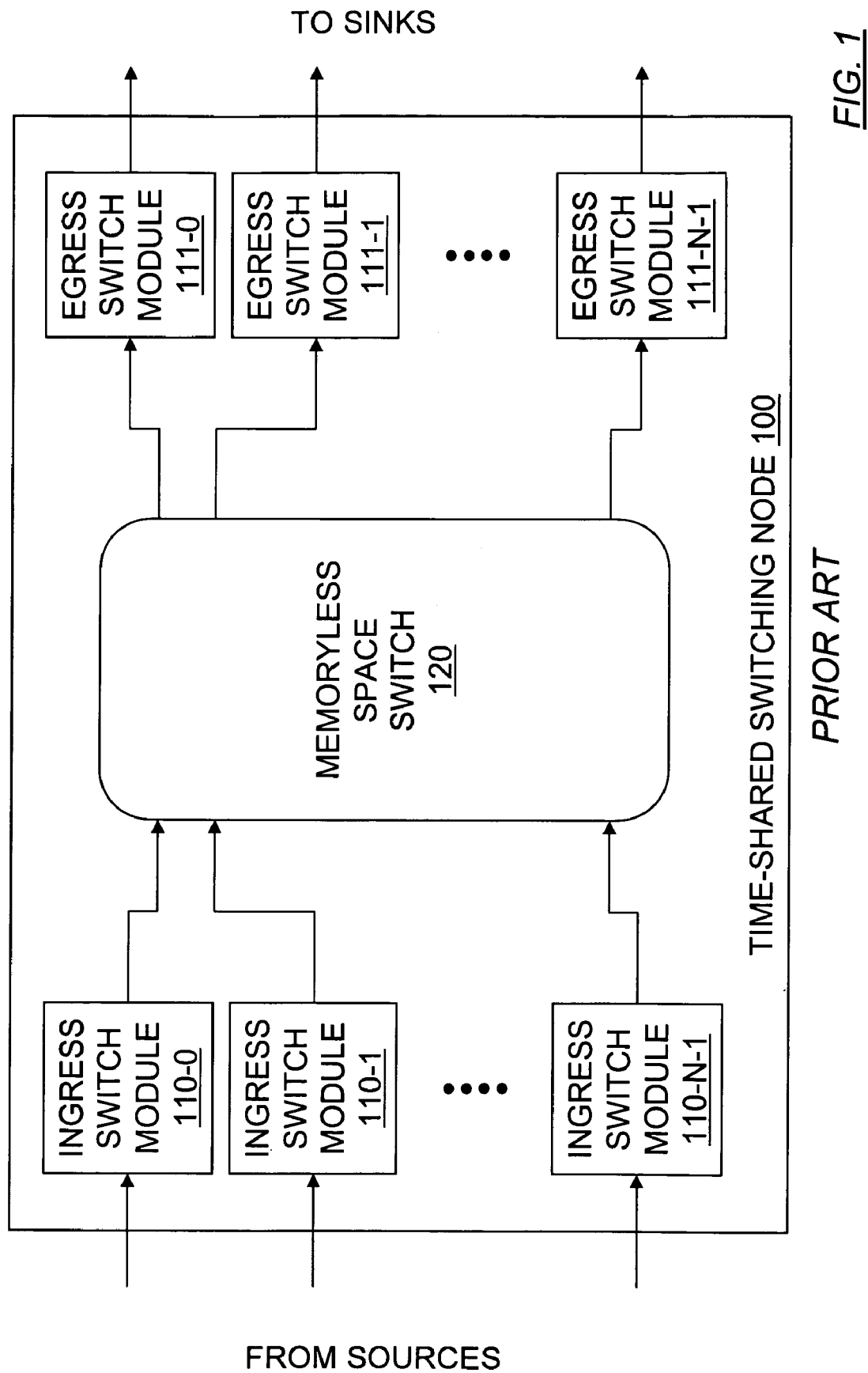
FIG. 1 illustrates a conventional time-shared switching node.

Some of the frequently used terms are defined below:

Rotator: A passive device, also called a temporal rotary connector or temporal cyclical rotator, which cyclically establishes one-to-one connections between a plurality of inlets and a plurality of outlets. A rotator may be electronic-based or photonic-based.

Clockwise rotator: A rotator having inlet ports numbered 0 to (N−1) and output ports numbered 0 to (N−1) and cyclically connecting each inlet port to outlet ports in an ascending cyclic sequential order, modulo N.

Counterclockwise rotator: A rotator having inlet ports numbered 0 to (N−1) and output ports numbered 0 to (N−1) and cyclically connecting each inlet port to outlet ports in a descending cyclic sequential order, modulo N.

Complementary rotator-pair: A clockwise rotator and a counterclockwise rotator, each having N inlet ports and N outlet ports interconnecting N switch modules, form a complementary-rotator pair if one of the two rotators cyclically connects each switch module to other switch modules in a first cyclic sequential order, modulo N, while the other rotator cyclically connects each switch module to other switch modules in the reverse cyclic sequential order.

Connection: A designated path from a source switch module to a sink switch module of a switch comprising a plurality of switch modules each operating as a source switch module and a sink switch module.

Flow-rate allocation: The capacity, usually expressed in bits per second, allocated to a connection to support a specified flow rate.

Direct connection: A connection from a source switch module to a sink switch module that does not traverse an intermediate switch module is a direct connection. In a single-rotator circulating switch, a direct connection traverses the single rotator once. In a multiple-rotator circulating switch, a direct connection traverses only one of the rotators.

Indirect connection: A connection from a source switch module to a sink switch module through an intermediate switch module is an indirect connection. In a single-rotator circulating switch, an indirect connection traverses the single rotator twice. In a multiple-rotator circulating switch, an indirect connection may traverse any two rotators of opposite rotation direction.

Direct path: A path used for a direct connection is called a direct path.

Indirect path: A path used for an indirect connection is called an indirect path.

Forward rotator: The first rotator traversed by an indirect connection, which may be a clockwise rotator or a counterclockwise rotator is called a forward rotator.

Terminating rotator: The second rotator traversed by an indirect connection, which maybe a counterclockwise rotator or a clockwise rotator, is called a terminating rotator.

Inward link: A link from a rotator to a switch module is referenced as an inward link.

Outward link: A link from a switch module to a rotator is referenced as an outward link.

Inner and Outer ports: In a switch module, a port receiving data from subtending traffic sources is an ingress port; a port transmitting data to subtending traffic sinks is an egress port. A port transmitting data to a rotator is an outbound port and a port receiving data through a rotator is an inbound port. Ingress and egress ports are outer ports while inbound and outbound ports are inner ports.

Rotation phase: A period of time during which a rotator maintains a particular inlet-outlet connectivity.

Rotation cycle: A period of time during which a rotator completes a predetermined inlet-outlet connectivity pattern. A rotation cycle includes an integer number of rotation phases.

Time slot: The duration of a rotation phase, which may be used as a reference time duration.

Time frame: A time frame comprises a number of time slots equal to the number of phases in a rotation cycle.

Data segment: A unit into which a stream of data may be divided.

Data frame: A predetermined number of data segments.

Directed switch module pair: A source switch module (an origin switch module) and a sink switch module (a destination switch module) form a directed switch-module pair where data flows from the source switch module to the sink switch module.

Switching delay: The delay between receipt of a data segment at a switch module and the transmission of the same data segment by the switch module is called a switching delay.

Time Locking: It is a technique for time coordination using time-counters to enable time alignment of signals received at connecting nodes. A first node is time-locked to a second node if a signal transmitted at an instant of time indicated by a time-counter at the first node arrives at the second node at the same instant of time as indicated by an identical time counter at the second node. When a first node is time-locked to a second node along a given path, the given path is said to be time-locked. The path may include multiple wavelength channels in which case, due to dispersion, each of the channels may be time locked separately.

Timing Circuit: A timing circuit comprises a time counter, means for transmitting a reading of the time counter, means for receiving an indication of time offset, and means for resetting the time counter accordingly to the received time offset. The time offset is determined by a master timing circuit.

Wavelength router: A wavelength router is an optical device, well-known to a person skilled in the art, which has a set of WDM input ports and a set of WDM output ports, and which connects wavelength channels received at an input port to corresponding output ports. The connection pattern is static; typically based on a spatial cyclic mapping of input wavelengths to output port numbers.

Conventional Bufferless Space Switch

A conventional time-shared switch 100, illustrated in FIG. 1, comprises a plurality of ingress switch modules 110-0, 110-1, . . . , 110-N-1 (Collectively or individually 110), a plurality of egress switch modules 111-0, 111-1, . . . , 111-N-1 (collectively or individually 111) and a memory less space switch 120. Each ingress switch module 110 is associated with at least one inlet channel to the space switch 120 and each egress switch module 111 is associated with at least one outlet channel from the space switch 120. The memory less space switch 120 provides instantaneous connection from ingress to egress. The space switch 120 is typically contention-free, in the sense that any free inlet channel can connect to any free outlet channel. The ingress switch modules 110 and the egress switch modules 111 are often paired into integrated switch modules. Although the space switch 120 itself is contention-free, the entire time-shared switch 100 may block a connection request from an ingress switch module 110 to an egress switch module 111 due to possible misalignment of free inlet and outlet channels. Misalignment occurs in a single-stage space switch where there is a single time-shared route from a given input to a specified output over all designated time intervals. In any case, the misalignment arises due to the random nature of selecting a route in response to a connection request.

Latent Space Switch

A memoryless space switch requires contention resolution among inlet ports simultaneously contending for a common outlet port. Simultaneous contention can be avoided using a scheme of temporal disengagement where an inlet port need only examine a current status of a single outlet port. Temporal disengagement requires data buffering. A latent space switch, called a rotator space switch, using rotators and a bank of transit memory devices is described in the aforementioned U.S. Pat. No. 5,168,492. The rotator space switch has a constant deterministic transit delay that is specific to each pair of inlet and outlet ports.

Rotating-access Switch

The time-shared space switch has been widely implemented in telecommunications networks. However, despite its apparent simplicity, the time-shared space switch has a difficult scheduling problem and fabric scalability limitations. The scheduling problem, arising from a requirement of extensive computations and fast contention arbitration, together with the switching-fabric scalability limitation, were avoided in the design of a rotating-access switch described in U.S. Pat. Nos. 5,168,492 and 5,745,486 issued to Beshai et al. The scheduling problem is resolved by way of a temporally disengaged input-output data transfer, allowing concurrent scheduling processes at each ingress switch module. The fabric limitation is solved by the replacement of the memoryless space switch with two rotators and the use of a bank of memory devices to hold data segments for a deterministic period of time that is specific to each input-output pair. A rotator, being a deterministic connection device, scales easily to very high capacities. For example a rotator of dimension 32,768×32,768 can be constructed using three arrays of 32×32 rotator units, each array having 1024 rotator units.

Figure 2:
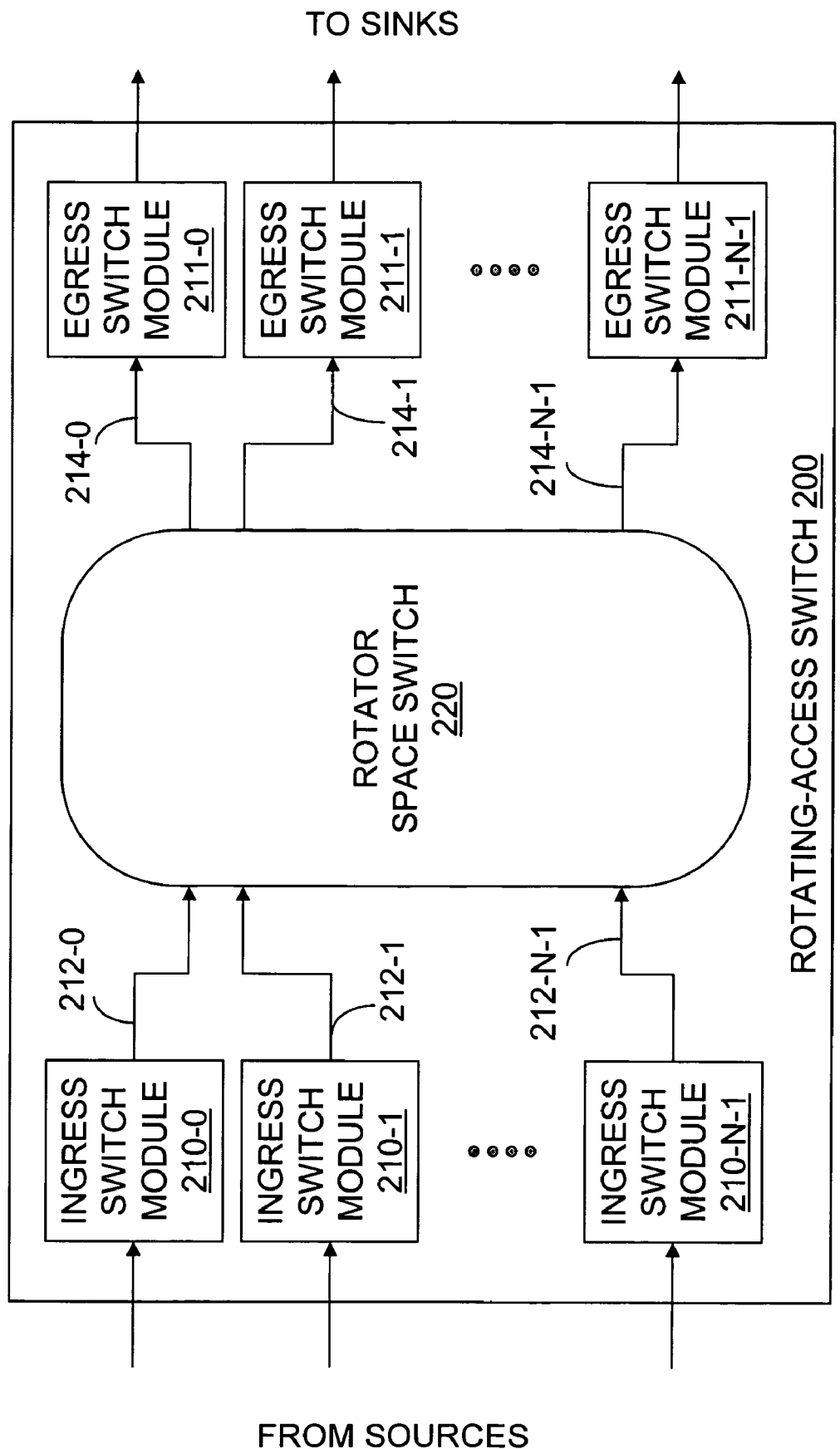
FIG. 2 illustrates a prior-art rotating-access switch based on a rotator space switch.

The structure of a prior-art rotating-access switch 200 is depicted in FIG. 2. A plurality of ingress switch modules 210-0, 210-1, ..., 210-N-1 (collectively or individually 210) connect to a plurality of egress switch modules 211-0, 2111-1, ..., 211-N-1 (collectively or individually 211) through a rotator space switch 220. More particularly, the ingress switch modules 210 connect to the rotator space switch 220 over input channels 212-0, 212-1, ..., 212-N-1 (collectively or individually 212) and the rotator space switch 220 connects to the egress switch modules 211 over output channels 214-0, 214-1, ..., 214-N-1 (collectively or individually 214).

Figure 3:
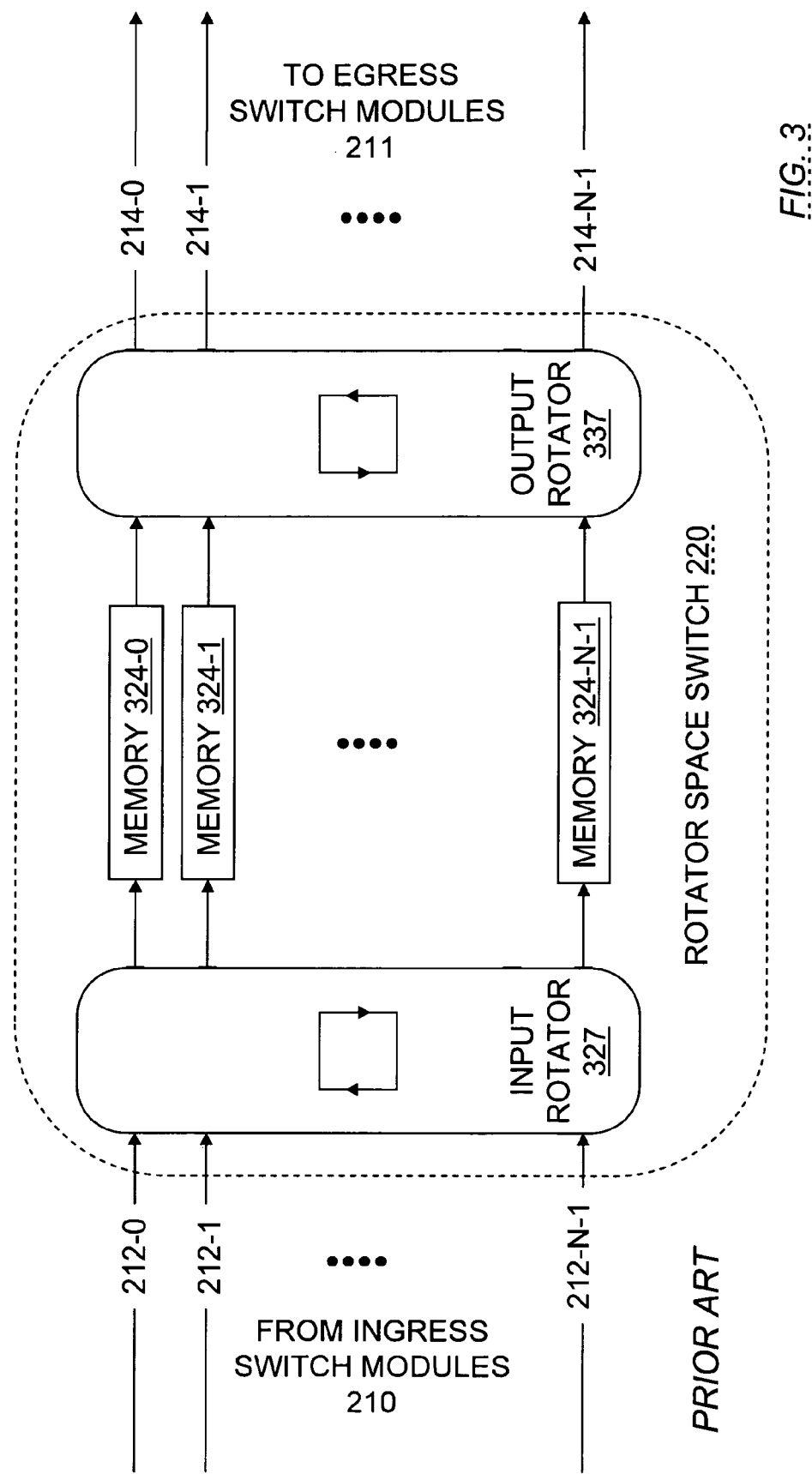
FIG. 3 illustrates the rotator space switch element of the rotating-access switch of FIG. 2 in greater detail.

The rotator space switch 220 is further illustrated in FIG. 3. The rotator space switch 220 comprises an input rotator 327, receiving on the input channels 212, an output rotator 337, transmitting on output channels 214 and a bank of transit memories 324-0, 324-1, ..., 324-N-1 (collectively or individually 324) between the input rotator 327 and the output rotator 337.

Each rotator 327, 337 is a passive device cyclically connecting a plurality of inlet ports to a plurality of outlet ports and may be electronic-based or photonic-based. The connectivity pattern of a rotator's inlets to outlets is maintained during a "rotation phase". A rotator repeats a sequence of inlet-outlet connectivity patters during each rotation cycle, where a rotation cycle includes an integer number of rotation phases.

The rotating-access switch 200 can scale to capacities of the order of 200 Terabits per second in a single fabric. A deterministic switching delay (transit delay) depends on the relative positions of the inlet and outlet and the highest switching delay almost equals the duration of the rotation cycle. If the rotation cycle has 16,384 rotation phases, and with a rotation phase duration of 0.1 microseconds, for example, the rotation cycle would be about 1.64 milliseconds and the worstcase deterministic switching delay would be 1.64 milliseconds. The capacity of such a switch, where the capacity of each inlet is 10 Gb/s (gigabits per second), is about 164 Terabits per second. If the switch has 1,024 inlet channels and 1,024 outlet channels, the capacity would be about 10 Terabits per second and the worst case switching delay with a rotation phase of 0.1 microseconds would be 102.4 microseconds. It is desirable, however, to keep the worst case switching delay at a low value, below 50 microseconds for example, regardless of the switch capacity. It is also desirable to structure the switch so that the capacity of the switch can be increased in steps without disturbing existing connections. It is further desirable to provide high reliability without the need to duplicate an entire space switch. The switch of the present invention, hereinafter called a circulating switch, achieves these objectives while further simplifying the switch architecture.

Circulating Switch

Figure 4:
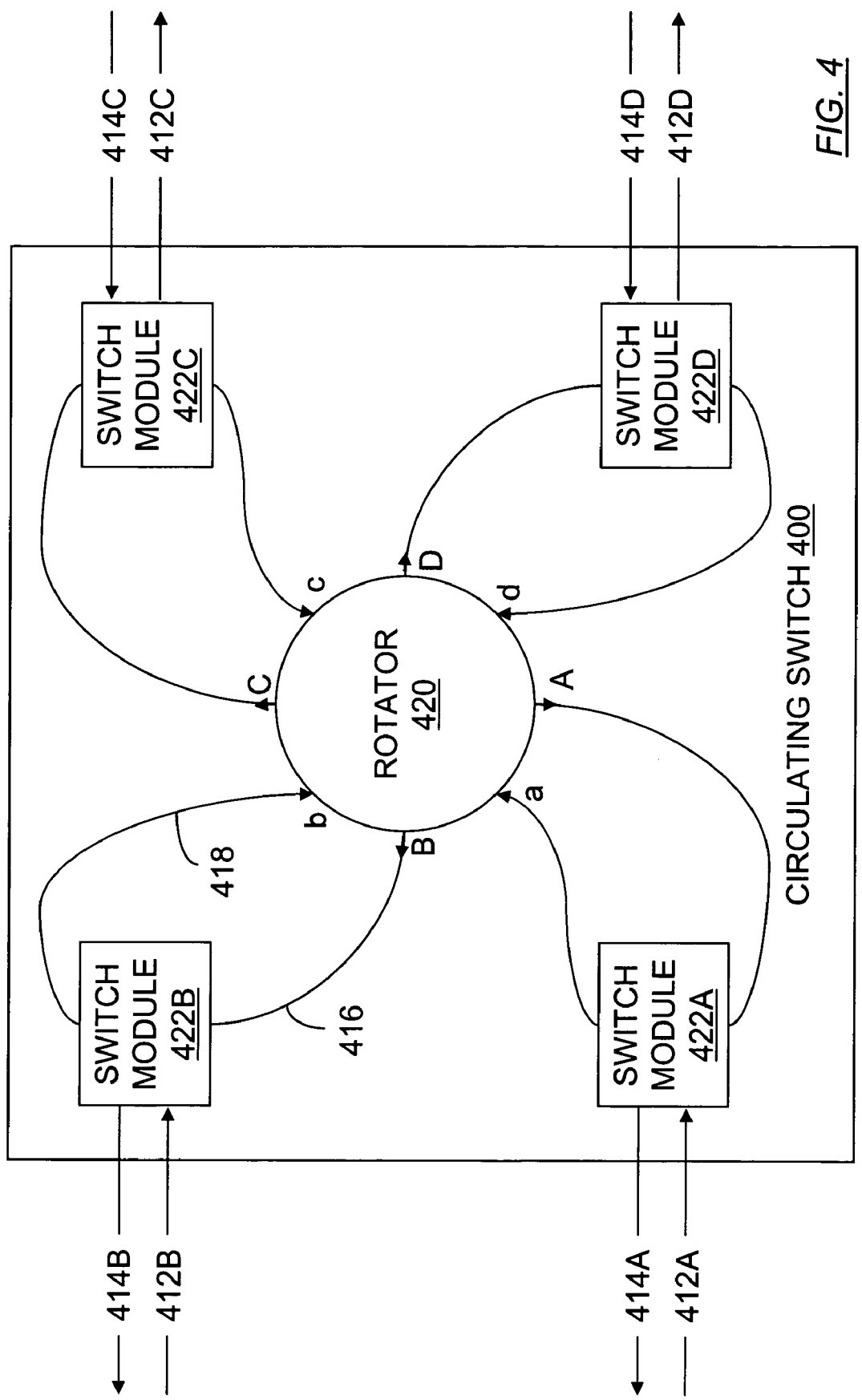
FIG. 4 illustrates the architecture of a circulating switch using a single rotator and four switch modules in accordance with an embodiment of the present invention.

FIG. 4 illustrates a circulating switch 400 having plurality of switch modules including a first switch module 422A, a second switch module 422B, a third switch module 422C and a fourth switch module 422D (collectively or individually 422). Each switch module 422 incorporates an ingress switch module and an egress switch module (not shown). The switch modules 422 are interconnected by a rotator 420. The inlets of the rotator 420 are labeled a, b, c, and d and the outlets are labeled A, B, C, and D.

Each switch module 422 is electronic-based and receives data from data traffic sources through an ingress link 412, delivers data to subtending data traffic sinks through an egress link 414, and connects to the rotator 420 through an inbound channel 416 and an outbound channel 418. The rotator 420 may be either electronic or photonic. A photonic rotator requires Electrical-to-Optical (O-E) and Optical-to-Electrical interfaces (not illustrated). The rotator 420 is a passive memoryless device that provides cyclic interconnection from inlet to outlet, according to a predefined inlet-outlet connectivity pattern over a predefined rotation cycle. Although FIG. 4 illustrates only four switch modules 422, it is understood that the number of switch modules 422 is physically limited by the number of dual ports on the rotator 420 (a dual port comprising an inlet port and an outlet port) and operationally limited by the transit delay which increases with the number of switch modules 422 as will be described below.

An electronic rotator can be constructed to have a relatively large number of dual rotator ports, 16,364 for example. However, delay constraints would limit the number of dual ports to a number of the order of 2,048. As described above, an electronic rotator can scale to very-high capacities. However, the need for a high-capacity rotator to construct a high-capacity switch is eliminated in the circulating switch that will be described hereinafter with reference to FIGS. 36 to 39.

In operation, a particular switch module 422 receives data streams from subtending data traffic sources and organizes the received data streams into data segments. In one rotation phase of the rotation cycle associated with the rotator 420, one or more data segments destined for data traffic sinks associated with a given switch module 422 are transmitted, by the particular switch module 422, directly through the rotator 420 to the given switch module 422.

Rotation Cycle

The rotator 420 may have inlets and outlets interconnected cyclically as depicted in FIG. 5. For this example, the rotator 420 is shown, as in FIG. 4, to have four inlets, labeled a, b, c, d, and four outlets, labeled A, B, C, D. FIG. 5 illustrates two graphical representations, a rectangular representation and a circular representation, of the rotator 420 through four rotation phases: a phase-0 552; a phase-1 554; a phase-2 556; and a phase-3 558. The four rotation phases 552, 554, 556, 558 comprise a rotation cycle.

Thus, the rectangular representation directly illustrates the inlet-outlet connectivity of a rotator through the four rotation phases. In phase-0 552, it is clear from the rectangular representation that each inlet connects to a correspondingly labeled outlet. The circular representation illustrates the inlet-outlet connectivity using inlet-outlet notations. In a circular representation of the rotator 420, a connection from an inlet x to an outlet y may be represented by the notation (x, y) instead of the line from an inlet to an outlet in the rectangular representation. For example, the notation (c, C) indicates that inlet c connects to outlet C while the notation (c, B) indicates that inlet c is connected to outlet B. The circular notation may simplify the circulating switch illustration.

FIG. 6 illustrates a further representation of the phases of the rotation cycle of the four rotation phases illustrated in FIG. 5, in one of many possible cyclic connectivity patterns for the rotator 420 of FIG. 4. The connectivity pattern repeats every rotation cycle of four rotation phases.

Single Rotator vs. Complementary Rotator-Pair

In its simplest form, the switch module 422 is a simple time switch having one dual outer port (a dual port comprising an input port and an output port) connecting to data sources and data sinks and one faster dual inner port, or two dual inner ports each of the same speed as that of the dual outer port, connecting to the single rotator 420. Time switches are well known in the art, their function is simply to receive data segments during arbitrary time slots and to transmit the data segments according to a predefined schedule or according to the availability of a path from the time switch to a desired destination. A typical time switch contemplated herein comprises a data memory and an addressing memory (not illustrated). The data memory holds data segments formed from a plurality of data streams, where each data stream of the plurality of data streams may be identified by a destination and a selected path to the destination. The data segments of each data stream are linked in the data memory and the addressing memory contains pointers to the head and end data segments of each data stream in the data memory as will be described with reference to FIG. 43 and FIG. 46.

FIG. 7A illustrates the connectivity of a first switch module 722W to a single rotator 720A over a first dual inbound/outbound channel 724AW and the connectivity of a second switch module. 722X to the single rotator 720A over a second dual inbound/outbound channel 724AX. Each inlet of the single rotator 720A is arranged to receive data at a rate that is double the ingress rate of any of the inlets at the switch modules 722W, 722X. A first dual ingress/egress link 726AW connects the first switch module 722W to data traffic sources and sinks. Similarly, a second dual ingress/egress link 726AX connects the second switch module 722X to data traffic sources and sinks.

Figure 78:
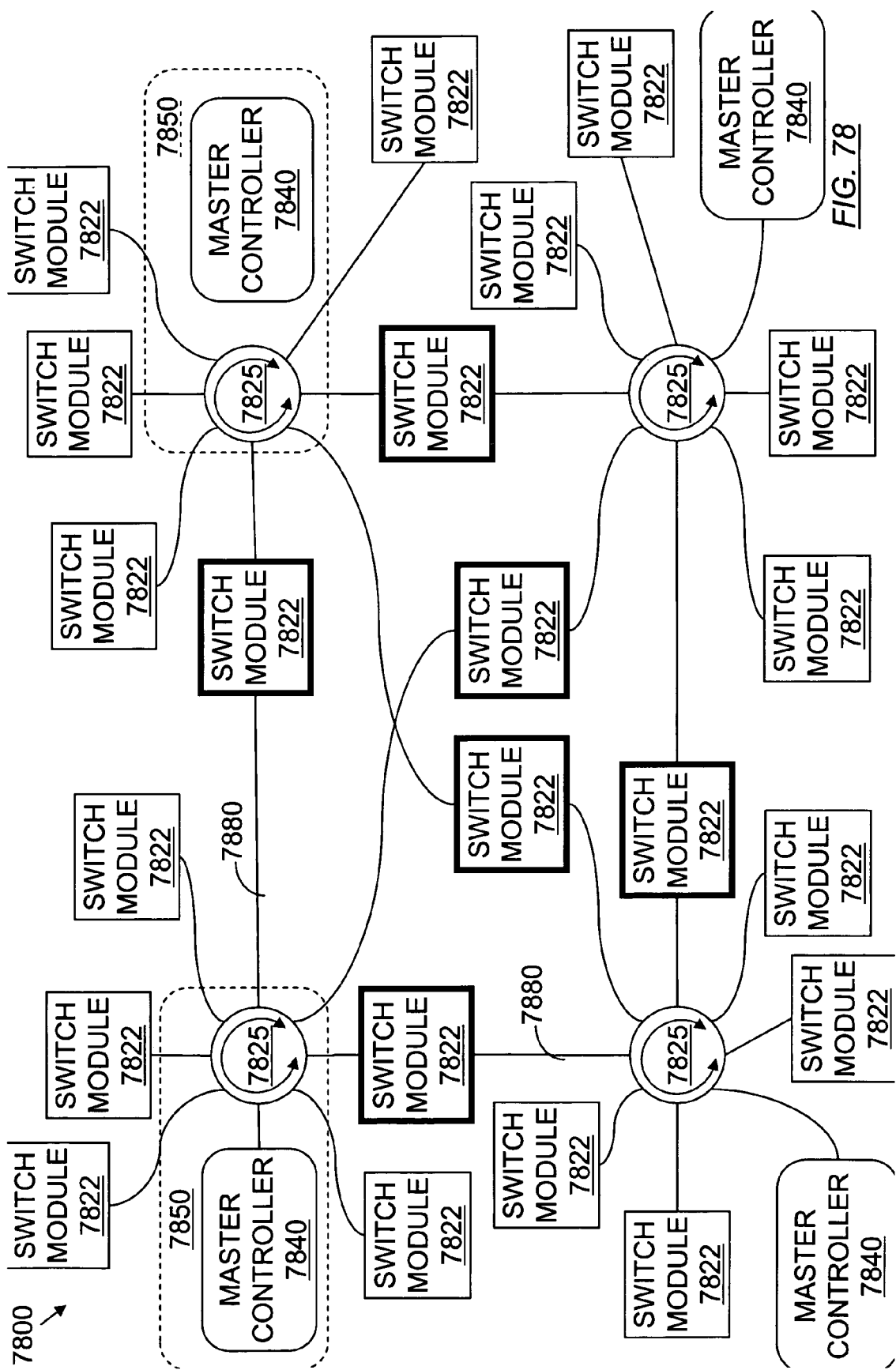
FIG. 78 illustrates a network of interconnected constellations in accordance with an embodiment of the present invention.

FIG. 78 illustrates the connectivity of a third switch module 722Y to two rotators 720S, 720C over dual inbound/outbound channels 724BY, 724CY. Additionally, the figure illustrates the connectivity of a fourth switch module 722Z to the two rotators 720B, 720C over dual inbound/outbound channels 724BZ and 724CZ. A dual ingress/egress link 726BY connects the fourth switch module 722Z to data traffic sources and sinks.

The rotators 720A, 720B, 720C, of FIGS. 7A and 7B maybe arranged to have the same rotation cycle and the same number of rotation phases. Rotators 720B and 720C preferably rotate in opposite directions as will be described hereinafter.

A circulating switch based on the type of connectivity illustrated in FIG. 7A or FIG. 7B can be shown to scale to a capacity that is well over 10 terabits per second. For example, using a 2,048-port rotator, with each dual port operating at 10 Gb/s, a 20 Terabit per second switch can be realized.

To attain much higher capacities, each switch module may be replaced with a conventional medium-capacity common memory switch and a plurality of rotators can be used independently to interconnect the common memory switches in an extended circulating-switch configuration as will be described hereinafter. Using common memory switches each having 24 dual ports each operating at a rate of 10 Gb/s in each direction, for example, and eight independent rotators each operating at 20 Gb/s or 16 rotators each operating at 10 Gb/s, a capacity of the order of 160 terabits per second can be realized while maintaining a low transfer delay.

Complementary Rotators

Figure 8:
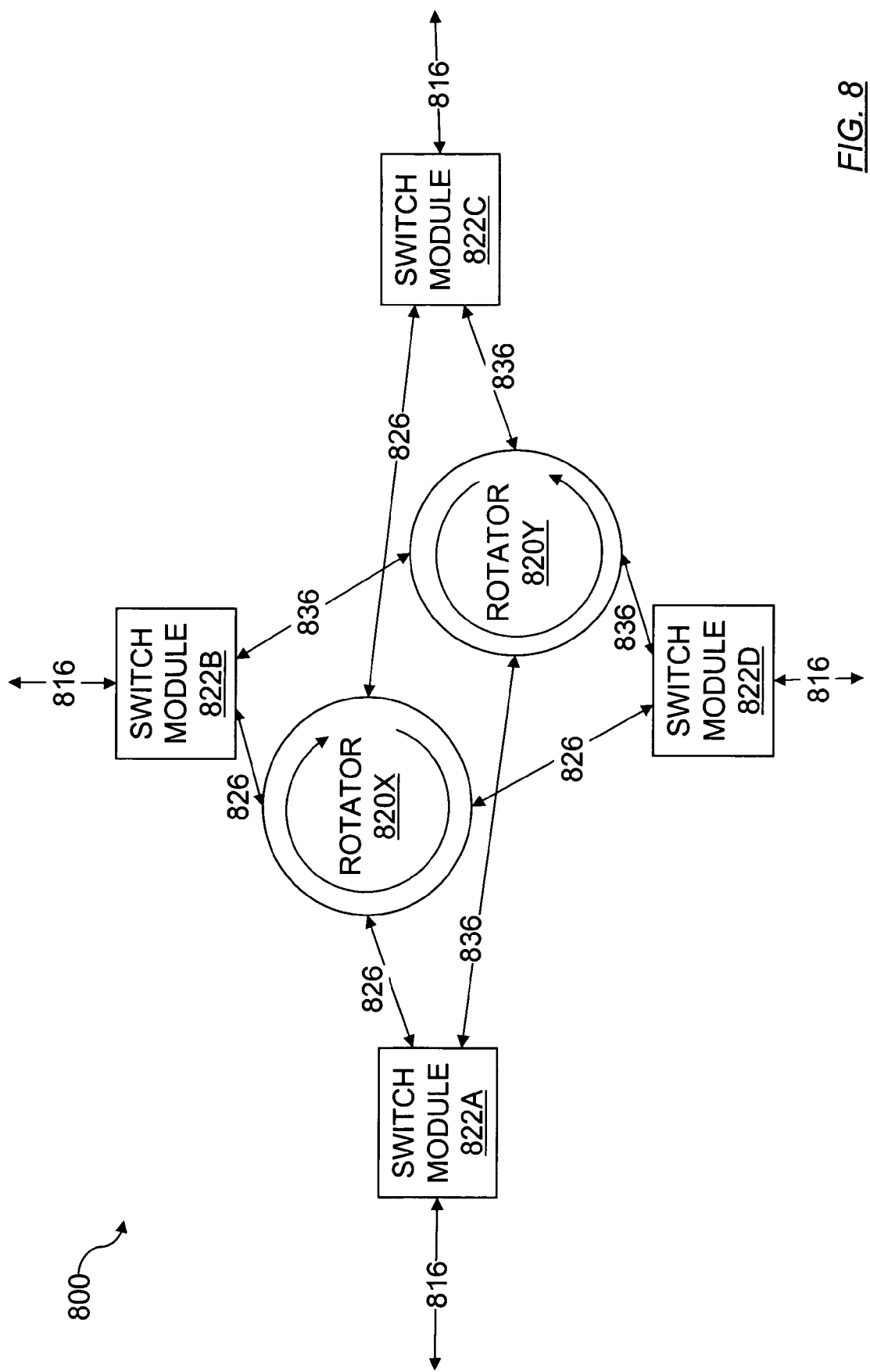
FIG. 8 illustrates a circulating switch having two complementary rotators in accordance with an embodiment of the present invention.

FIG. 8 illustrates an extended circulating switch 800, similar to the circulating switch illustrated in FIG. 7B, including a first rotator 820X and a second rotator 820Y. Advantageously, the second rotator 820Y may be arranged to have a direction of rotation (i.e., a direction of stepping through a rotation cycle) opposite to the direction of rotation of the first rotator 820X. In such a case, the second rotator 820Y is described as being "complementary" to the first rotator 820X, and vice versa. Where the first rotator 820X is called a clockwise rotator 820X, the second complementary) rotator 820Y may be called the counterclockwise rotator 820Y. The extended circulating switch 800 includes a first switch module 822A, a second switch module 822B, a third switch module 822C and a fourth switch module 822D (collectively or individually 822).

The channels to a switch module 822 from subtending data sources and to subtending data sinks from the switch module 822 are represented as combined into an external dual channel 816. The inbound channel from the clockwise rotator 820X to the switch module 822 and outbound channel from the switch module 822 to clockwise rotator 820X are represented as combined into a first internal dual channel 826. Likewise, the inbound channel from the counterclockwise rotator 820Y to the switch module 822 and the outbound channel from the switch module 822 to the clockwise rotator 820Y are represented as combined into a second internal dual channel 836.

In a common memory device (not shown) provided in each switch module 822, there may be a transfer section corresponding to each of the two rotators 820X, 820Y as will be described with reference to FIG. 40. Data received at the first switch module 822A for transfer to the second switch module 822B through the first rotator 820X may be written to a corresponding first transit section in the common memory of the first switch module 822A. Likewise, data to be transferred through the second rotator 820Y may be written in a corresponding second transit section in the common memory of the first switch module 822A. However, data read out from the first transit section may be transferred through the second rotator 820Y, and vice versa. It can be shown that the connection of the first switch module 822A to the second switch module 822B through an intermediate switch module (say, the third switch module 822C) and traversing the complementary rotators 820X, 820Y results in a desirable fixed delay that is specific to each directed switch module pair (a source switch module and a destination switch module) independent of the intermediate switch module. The fixed delay is further described with reference to FIGS. 32 to 34.

Consider a circulating switch comprising n switch modules interconnected by at beast two n×n rotators each following a rotation cycle of n phases. A connection from an origin switch module, x, to a destination switch module, y, may be completed through an intermediate switch module, m, where $0 \leq x < n$, $0 \leq y < n$ and $0 \leq m < n$. The rotators include at least one clockwise rotator and one counterclockwise rotator. Consider four cases: case (A) where the connection is completed exclusively through clockwise rotators, case (B) where the connection is completed exclusively through counterclockwise rotators, case (C) where the connection is completed through a clockwise rotator then a counterclockwise rotator, and case (D) where the connection is completed through a counterclockwise rotator then a clockwise rotator. The notations $[P]_n$ and $/Q/_n$ will be used in determining the switching delay across a circulating switch:

$[P]_n = P$ if $P \geq 0$ and $[P]_n = (n+P)$ if $P < 0$, $/Q/_n = Q-1$, if $Q > 0$ and $/Q/_n = (n+Q-1)$, if $Q < 0$.

For example, $[6]_8=6$, $[-6]_8=2$, $/6/_8=5$ and $/-6/_8=1$. Note that Q cannot equal zero. With self connection, where each switch module connects to itself through the rotators during a rotation phase, a rotation cycle comprises n rotation phases each occupying a time-slot of a predetermined value.

Case (A): Clockwise Rotators

Origin switch module x transmits to intermediate switch module m at phase $[m-x]_n$. Intermediate switch module m transmits to destination switch module y at phase $[y-m]_n$. The switching delay, $\Delta_1$, in the intermediate switch module m is:

$$\Delta_1 = [[y-m]_n - [m-x]_n]_n$$

Case (B): Counterclockwise Rotators

Origin switch module x transmits to intermediate switch module m at phase $[x-m]_n$. Intermediate switch module m transmits to destination switch module y at phase $[m-y]_n$. The switching delay, $\Delta_2$, in the intermediate switch module m is:

$$\Delta_2 = [[m-y]_n - [x-m]_n]_n$$

Case (C): Clockwise-Counterclockwise Rotators

Origin switch module x transmits to intermediate switch module m at phase $[m-x]_n$ through a clockwise rotator. Intermediate switch module m transmits to destination switch module y at phase $[m-y]_n$ through a counterclockwise rotator. The switching delay, $\Delta_3$, in the intermediate switch module m is:

$$\Delta_3 = [[m-y]_n - [m-x]_n]_n = [x-y]_n$$

Case (D): Counterclockwise-Clockwise Rotators

Origin switch module x transmits to intermediate switch module m at phase $[x-m]_n$ through a counterclockwise rotator. Intermediate switch module m transmits to destination switch module y at phase $[y-m]_n$ through a clockwise rotator. The switching delay, $\Delta_4$, in the intermediate switch module m is:

$$\Delta_4 = [[y-m]_n - [x-m]_n]_n = [y-x]_n$$

Rotation Cycle with Self-Connection

Consider an example wherein n=8, x=5 and y=2. Each entry in Table 1 indicates a delay time, i.e., the interval of time during which a data segment is held in intermediate switch module m before delivery to destination switch module y. This delay is also referenced as a "transit delay", or "switching delay". Each entry marked "x" corresponds to an intermediate switch module that is either the source switch module or the sink switch module for the connection, and hence is not used for an indirect connection.

As indicated in Table 1, the transit delay $\Delta_1$ and $\Delta_2$ depend on the intermediate switch module used to complete the connection while the transit delays $\Delta_3$ and $\Delta_4$ are independent of the intermediate switch module.

Rotation Cycle without Self-Connection

Rotation cycles described hereinbefore have typically had a number of rotation phases equal to the number of switch modules in the circulating switch. One of the rotation phases, where each switch module connects to itself, may be considered an idle rotation phase. The relative idle time may be significant when the number of switch modules is small; eight, for example. To avoid waste, each switch module should connect only to other switch modules. Instead of letting switch module 2, for example, connect to all switch modules {2, 3, 4, 5, 6, 7, 0, 1} during an eight-phase rotation cycle, the rotator may be configured to connect switch module 2 to switch modules 3, 4, 5, 6, 7, 0 and 1 in a seven-phase rotation cycle in the clock-wise direction and to switch modules 1, 0, 7, 6, 5, 4 and 3 in a seven-phase rotation cycle in the counterclockwise direction.

When self-connection is excluded, the four-cases discussed above would be modified as follows:

Case (A): Clockwise Rotator

Origin switch module x transmits to intermediate switch module m at phase $/m-x/_n$. Intermediate switch module m transmits to destination switch module y at phase $/y-m/_n$. The switching delay, $\Delta_1$, in intermediate switch module m is:

$$\Delta_1 = [/y-m/_n - /m-x/_n]_{n-1}$$

Case (B): Counterclockwise Rotator

Origin switch module x transmits to intermediate switch module m at phase $/x-m/_n$. Intermediate switch module m transmits to destination switch module y at phase $/m-y/_n$. The switching delay, $\Delta_2$, in intermediate switch module m is:

$$\Delta_2 = [/m-y/_n - /x-m/_n]_{n-1}$$

Case (C): Clockwise-Counterclockwise Rotators

Origin switch module x transmits to intermediate switch module m at phase $/m-x/_n$ through a clockwise rotator. Intermediate switch module m transmits to destination switch module y at phase $/m-y/_n$ through a counterclockwise rotator. The switching delay, $\Delta_3$, in intermediate switch module m is:

$$\Delta_3 = [/m-y/_n - /m-x/_n]_{n-1}$$

Case (D): Counterclockwise-Clockwise Rotators

Origin switch module x transmits to intermediate switch modute m at phase $/x-m/_n$. Clockwise intermediate switch module m transmits to destination switch module y at phase $/y-m/_n$. The switching delay, $\Delta_4$, in intermediate switch module m is:

$$\Delta_4 = [/y-m/_n - /x-m/_n]_{n-1}$$

Consider an example wherein n=8, x=5, and y=2. Each entry in the Table 2 indicates a delay time, i.e., the interval of

TABLE 1

Delays For n = 8, x = 5 and y = 2, Eight Rotation Phases.

| | m = 0 | m = 1 | m = 2 | m = 3 | m = 4 | m = 5 | m = 6 | m = 7 |
|---|---|---|---|---|---|---|---|---|
| $\Delta_1$ | 7 | 5 | x | 1 | 7 | x | 3 | 1 |
| $\Delta_2$ | 1 | 3 | x | 7 | 1 | x | 5 | 7 |
| $\Delta_3$ | 3 | 3 | x | 3 | 3 | x | 3 | 3 |
| $\Delta_4$ | 5 | 5 | x | 5 | 5 | x | 5 | 5 | time during which a data segment is held in intermediate switch module m before delivery to the destination switch module y.

As indicated in Table 2, each of the transit delays $\Delta_1$ and $\Delta_2$ varies significantly according to the intermediate switch module of the indirect connection. The transit delay $\Delta_3$ corresponding to different intermediate switch modules may differ by one time slot. However, data segments are received in the proper temporal order. Likewise, the transit delay $\Delta_4$ may differ by one time slot for different values of m. The difference of one time slot occurs because of elimination of the self-connection phase of the rotation cycle.

TABLE 2

Delays for n = 8, x = 5 and y = 2, Seven Rotation Phases.

|  | m = 0 | m = 1 | m = 2 | m = 3 | m = 4 | m = 5 | m = 6 | m = 7 |
|---|---|---|---|---|---|---|---|---|
| $\Delta_1$ | 6 | 4 | x | 1 | 6 | x | 3 | 1 |
| $\Delta_2$ | 1 | 3 | x | 6 | 1 | x | 4 | 6 |
| $\Delta_3$ | 3 | 3 | x | 2 | 2 | x | 3 | 3 |
| $\Delta_4$ | 4 | 4 | x | 5 | 5 | x | 4 | 4 |

There are two distinct differences between the circulating switch 800 (FIG. 8) and the prior-art rotating-access switch 200 (FIG. 2). Firstly, in the circulating switch 800, there are two direct path per rotation cycle from each switch module to each other switch module. A source switch module 822 may transmit two data segments to a sink switch module 822 directly one through rotator 820X and the other through rotator 820Y. The use of direct paths reduces the occupancy of internal channel 826 and 836. In the rotating-access switch 200, an ingress switch module 210 transmits data segments to an egress switch module 211 through rotator 327, a transit memory 324, and rotator 337 (FIG. 3). Secondly, in circulating switch 800 having N>2 switch modules, a source switch module 822 has two sets of indirect paths to a sink switch module 822, one set includes paths each of which traverses rotator 820X to any of (N−2) intermediate switch modules 822 then traverses rotator 820Y to the sink switch module 822 and the other set includes paths each of which traverses rotator 820Y to any of (N−2) intermediate switch modules 822 then traverses rotator 820X to the sink switch module 822. The indirect paths of the two sets may have different associated delays. In the rotating-access switch 200, there are N paths from each ingress switch module 210 to each egress switch module 211 through the N transit memory devices 324 (FIG. 3).

Switch Control

Figure 9:
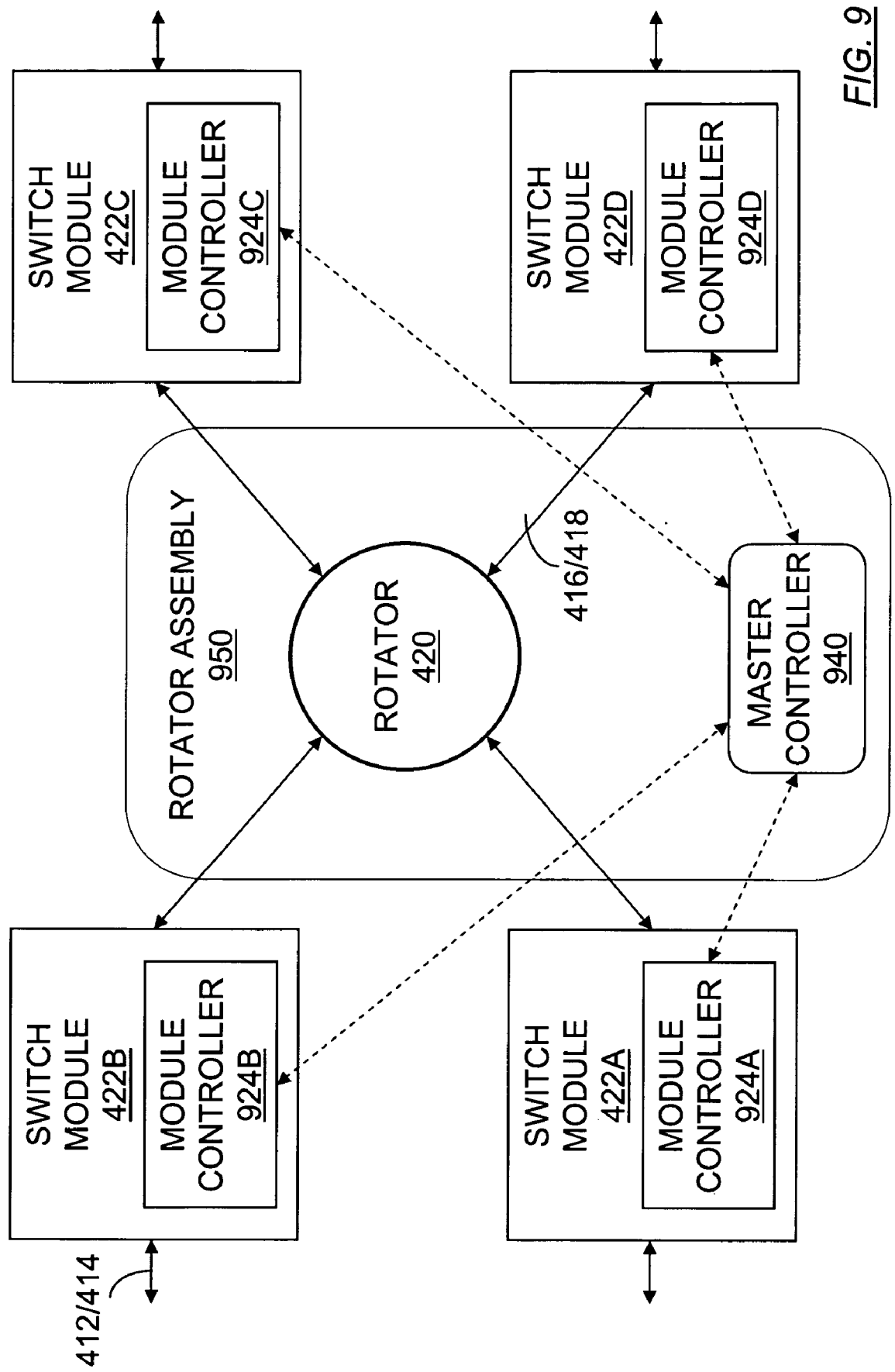
FIG. 9 illustrates control elements for the circulating switch of FIG. 4 including module controllers and a master controller having a dual path to each module controller in accordance with an embodiment of the present invention.

FIG. 9 illustrates control elements in the circulating switch 400 of FIG. 4. The illustration is simplified through the use of, for each switch module 422, a single bi-directional link to represent the ingress link 412 and the egress link 414 and a single bi-directional link to represent the inbound channel 416 and the outbound channel 418. The simplification also facilitates the later illustration of an extension of the single rotator structure to a multiple-rotator structure. FIG. 9 illustrates that each switch module 422A, 422B, 422C, 422D has a corresponding module controller 924A, 924B, 924C, 924D (collectively or individually 924). Control paths from each module controller 924 to a master controller 940 are also illustrated. Each module controller 924 may be operable to send connection requests to the master controller 940. The master controller 940 may consequently be configured to (a) determine the acceptance, or otherwise, of each connection request, (b) determine a schedule based on accepted connection requests and (c) transmit the schedule, or a portion thereof, to the module controllers 924.

Figure 10:
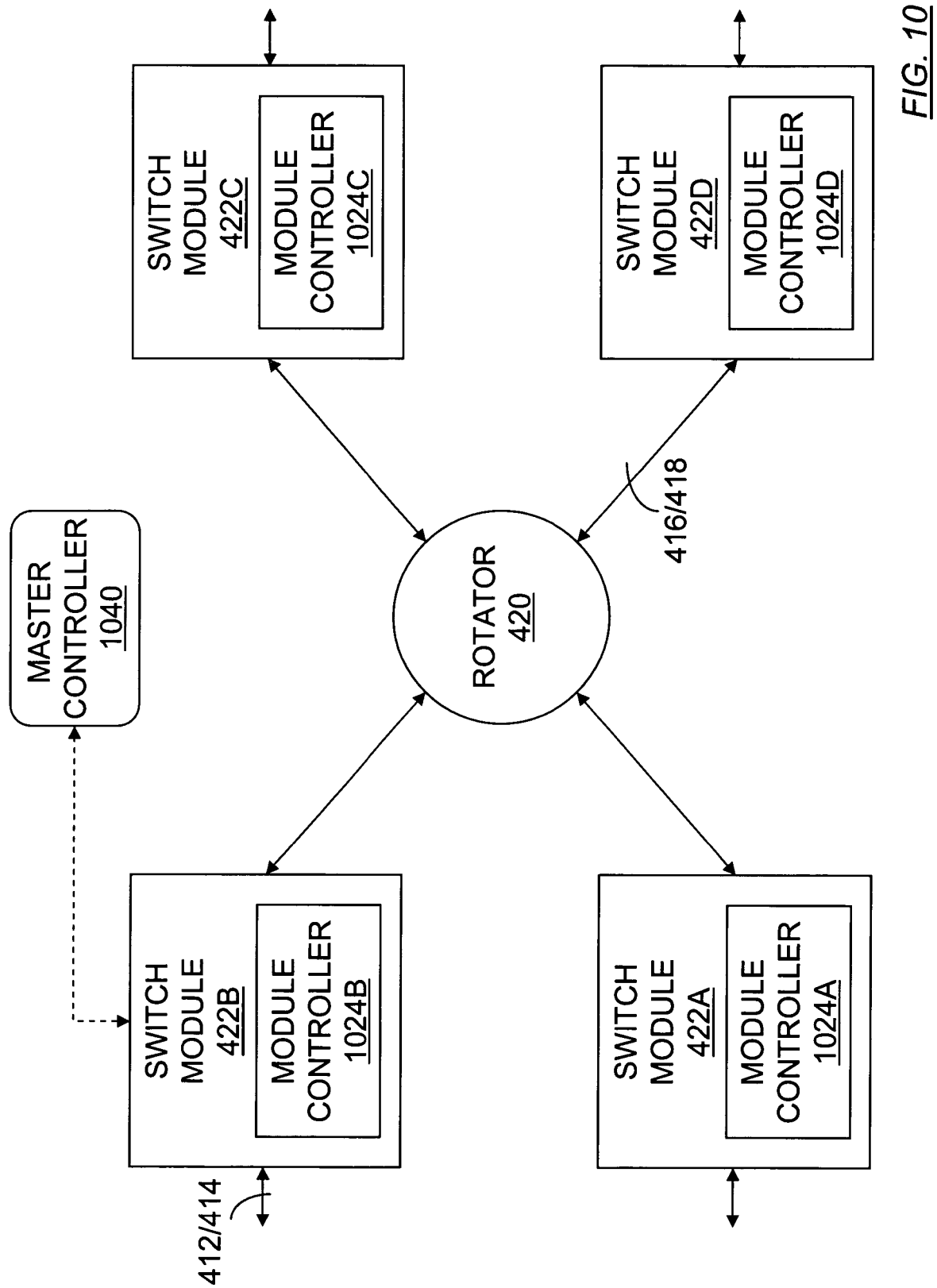
FIG. 10 illustrates the circulating switch of FIG. 4 including the control elements of FIG. 9 wherein the master controller subtends to one of the switch modules in accordance with an embodiment of the present invention.

FIG. 10 illustrates control elements in the form of module controllers 1024A, 1024B, 1024C, 1024D (collectively or individually 1024) and a master controller 1040, corresponding to the module controllers 924 and the master controller 940 of FIG. 9, in the circulating switch 400 of FIG. 4 with the master controller 1040 subtending to the second switch module 422B. This arrangement may be advantageous when the circulating switch includes a large number of switch modules.

Figure 11:
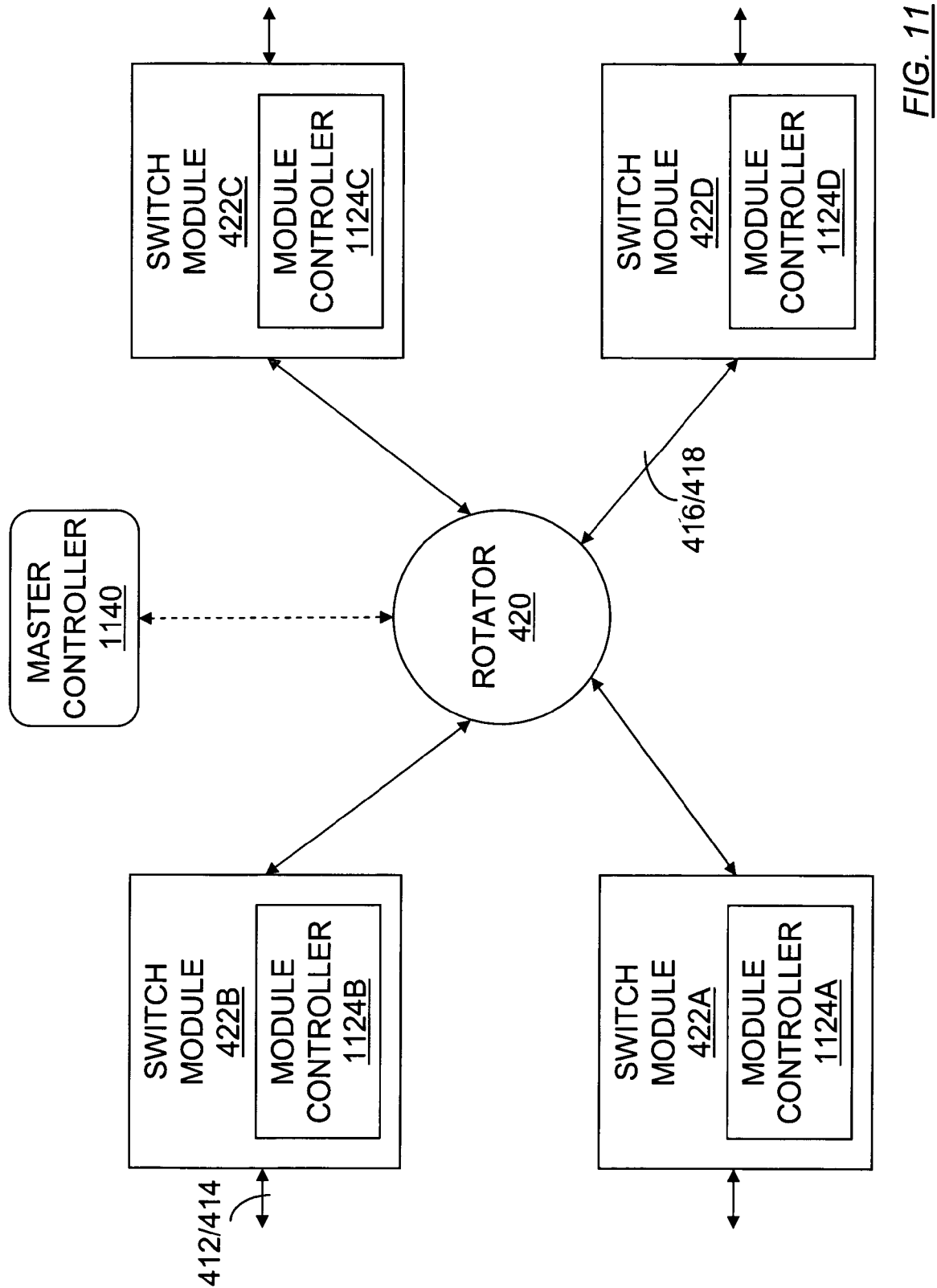
FIG. 11 illustrates the circulating switch of FIG. 4 including the control elements of FIG. 9 wherein the master controller connects directly to a rotator dual port in accordance with an embodiment of the present invention.

FIG. 11 illustrates control elements in the form of module controllers 1124A, 1124B, 1124C, 1124D (collectively or individually 1124) and a master controller 1140, corresponding to the module controllers 924 and the master controller 940 of FIG. 9, in the circulating switch 400 of FIG. 4 with the master controller 1140 connecting directly to a dual port of the rotator 420. Each switch module 422 can directly access the master controller 1140 during at least one time slot per rotation cycle. Thus, direct connection of the master controller 1140 to the rotator 420 requires that each switch module 422 spends at least one rotation phase (one time slot) per rotation cycle to access the master controller 1140. When the rotation cycle includes a small number of phases, eight for example, the control overhead may be significant with one time slot out of eight time slots used to convey control signals. The arrangement of FIG. 11 is therefore suitable for a circulating switch having a large number of switch modules.

Data-Memory Organization

Figure 12:
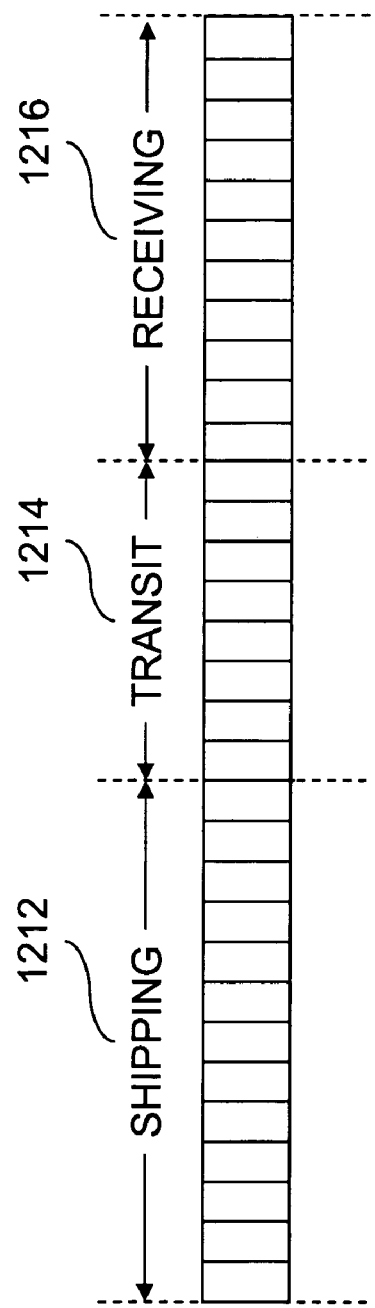
FIG. 12 illustrates an organization of a data memory used in each of the switch modules of FIG. 4 in accordance with an embodiment of the present invention.

To facilitate switching in the circulating switch 400 of FIG. 4, a data memory 1200 of a given switch module 422, illustrated in FIG. 12, is preferably partitioned logically into three sections, respectively labeled "shipping" 1212, "transit" 1214 and "receiving" 1216. The shipping section 1212 contains data segments formed by a packet handler (not illustrated) that receives packets from data traffic sources. The data segments in the shipping section 1212 of the given switch module 422 may be transferred across the rotator 420 to either the transit section or the receiving section of a data memory at another switch module 422. The transit section 114 of the data memory 1200 contains data segments to be transferred to a receiving section of another switch module 422 through the rotator 420. The receiving section 1216 contains data segments directed to data traffic sinks. The data segments in the shipping section 1212 are preferably sorted according to destination switch modules 422.

To facilitate the process of scheduling the transfer of the data segments across the rotator 420, the transit section 1214 is slotted into a number of memory slots (also called transit divisions) at least equal to the number of switch modules 422 minus one, with each memory slot corresponding to one of the switch modules 422 to which the switch module at which the data memory 1200 is based can connect. Each memory slot can hold a predefined number of data segments. The data in the receiving section 1216 may be arranged in a single queue, or maybe sorted according to some criterion such as the origin switch module, service priority, or some other data stream identifier.

Rotation Cycle

Figure 13:
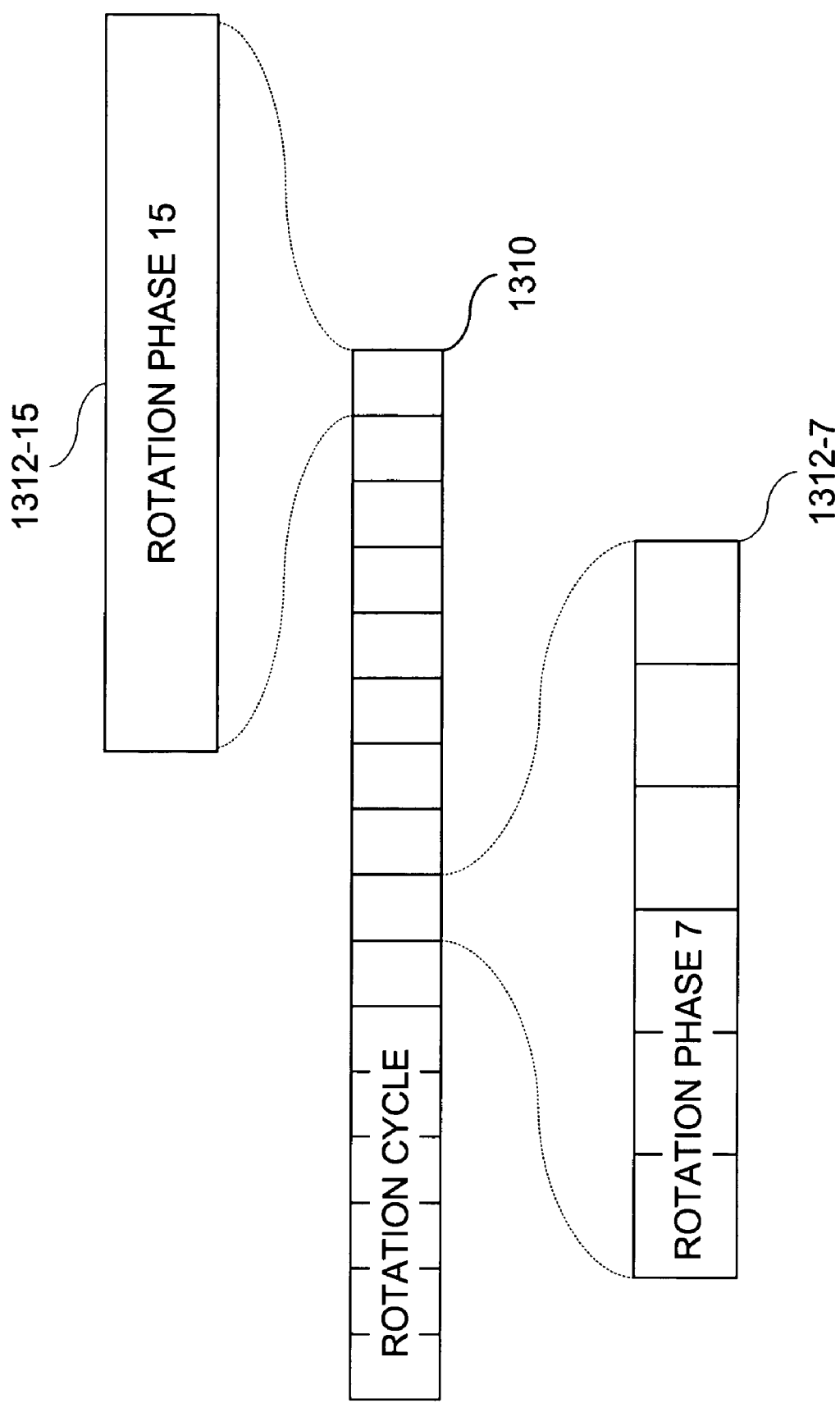
FIG. 13 illustrates a rotation cycle comprising several rotation phases.
Figure 20:
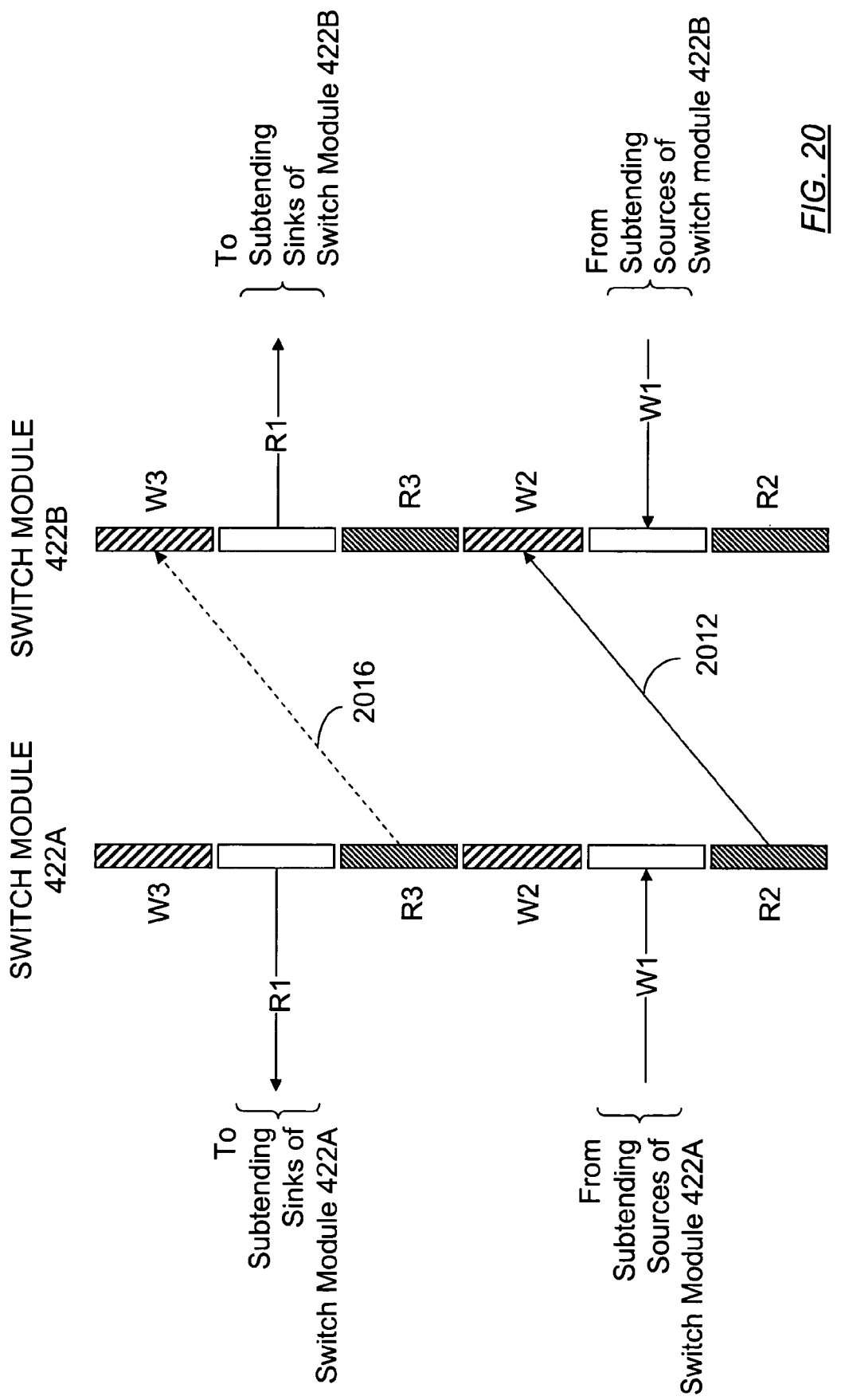
FIG. 20 illustrates switching intervals within a rotation phase for a circulating switch using the single rotator of FIG. 4 according to an embodiment of the present invention.
Figure 21:
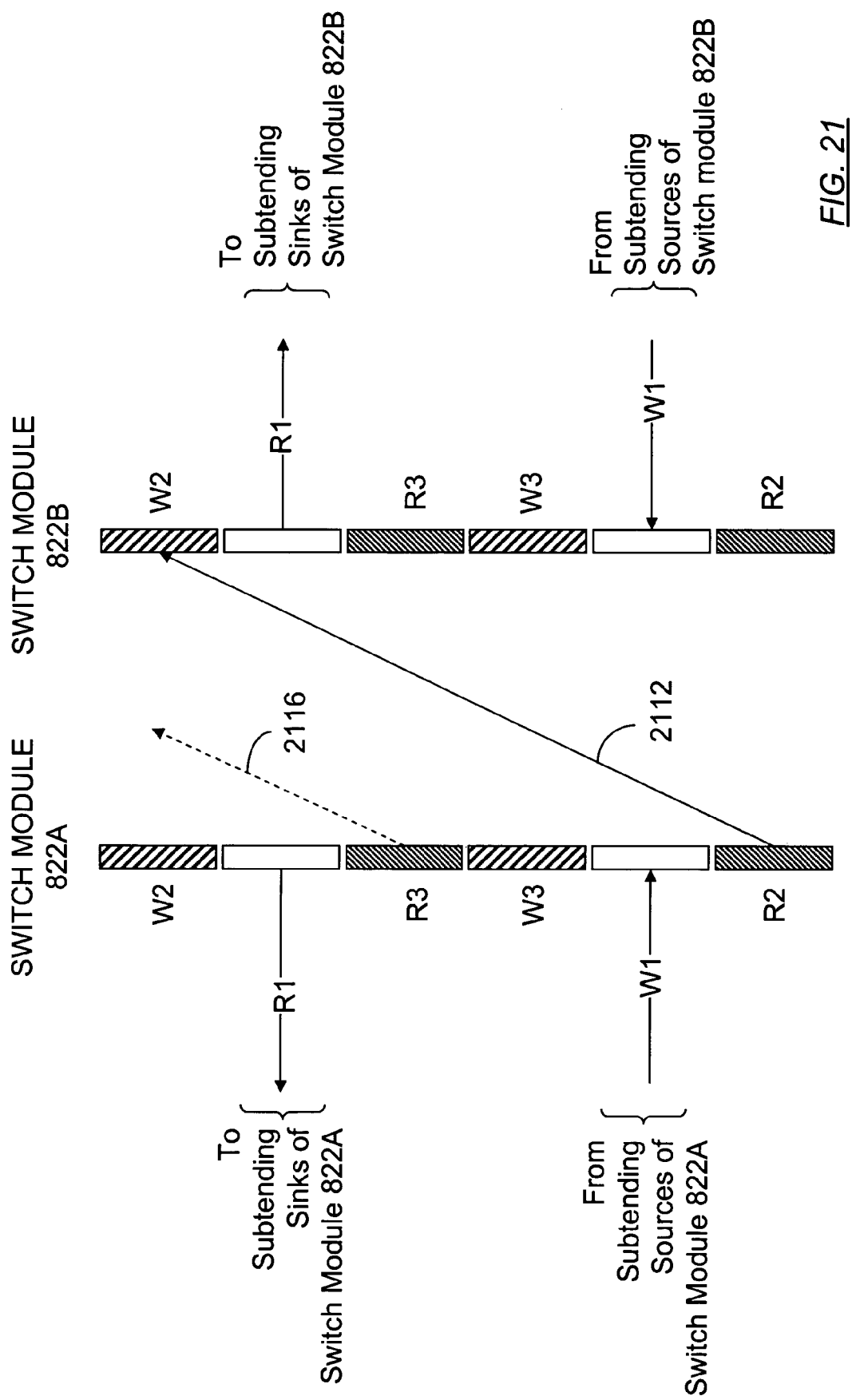
FIG. 21 illustrates switching intervals within a rotation phase for a circulating switch using the rotators of FIG. 8 according to an embodiment of the present invention.

FIG. 13 illustrates a rotation cycle 1310 having 16 rotation phases. The rotation phases may, for instance, be referenced by indices ranging from 0 to 15. As will become clear hereinafter, each rotation phase may comprise six memory-access intervals in the circulating switch configuration using a single rotator or a pair of complementary rotators. During three of the six access intervals, a given switch module 422 receives data from another switch module 422 and during the other three memory-access intervals the given switch module transmits data to another switch module. Two rotation phases 1312-7 and 1312-15 are illustrated. It may be arranged that one rotation phase per rotation cycle be dedicated for use by a master controller (see the master controller 1140 of FIG. 11). During the second rotation phase 1312-15, the master controller may be arranged to receive connection requests from switch modules 422 and to transmit a schedule, or a portion thereof, to the switch modules 422. Each of the other rotation phases within the rotation cycle 1310 may be divided into read-write (memory-access) intervals as illustrated in FIG. 20 and FIG. 21.

Data Transfer in a Single-Rotator Circulating Switch

Figure 14:
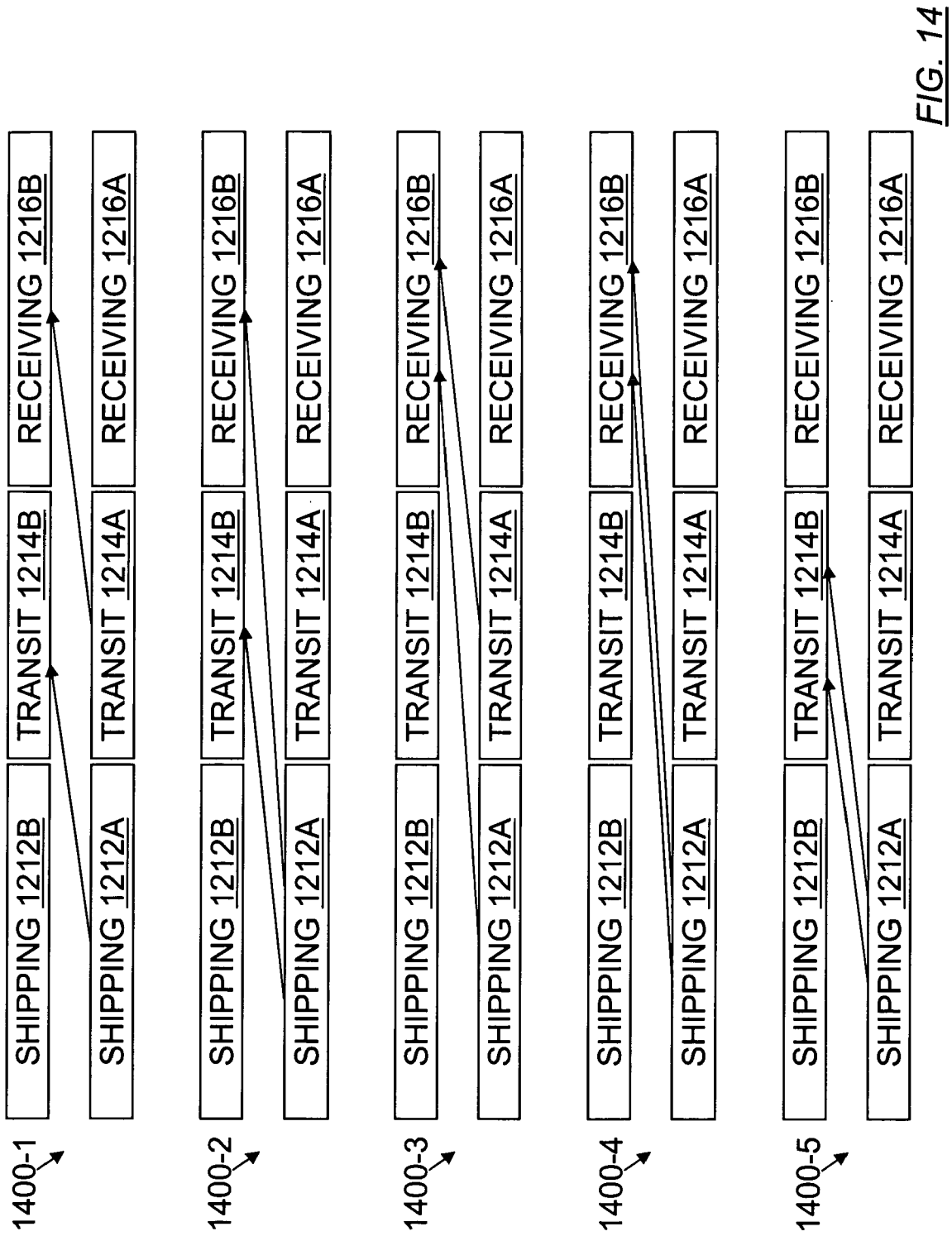
FIG. 14 illustrates options for transferring data from one switch module of FIG. 4 to another in accordance with an embodiment of the present invention.

FIG. 14 illustrates the transfer of data segments from a data memory 1200A of the first switch module 422A of FIG. 4 to a data memory 1200B of the second switch module 422B through a circulating switch such as the circulating switch 400 exemplified in FIG. 4.

During a rotation phase, each switch module 422 may transmit at most two data segments to another switch module. During any rotation phase, the two data segments may be:

(1400-1) a data segment waiting in the transit section 1214A of the data memory of the first switch module 422A and destined to the second switch module 422B and a data segment in the shipping section 1212A of the data memory 1200A of the first switch module 422A and destined to a third switch module such as switch module 422C; the former data segment may be written in the receiving section 1216B of the data memory of the second switch module 422B and the latter data segment may be written in the transit section 1214B of the data memory of the second switch module 422B;

(1400-2) a data segment in the shipping section 1212A of the data memory 1200A of the first switch module 422A and destined to the third switch module 422C and another data segment in the shipping section 1212A of the data memory of the first switch module 422A and destined to the second switch module 422B; the former data segment may be written in the transit section 1214B of the data memory of the second switch module 422B and the latter data segment may be written in the receiving section 1216B of the data memory of the second switch module 422B;

(1400-3) a data segment waiting in the transit section 1214A of the data memory of the first switch module 422A and destined to the second switch module 422B and a data segment in the shipping section 1212A of the data memory of the first switch module 422A and also destined to the second switch module 422B; both may be written in the receiving section 1216B of the data memory of the second switch module 422B;

(1400-4) two data segments waiting in the shipping section 1212A of the data memory of the first switch module 422A and destined to the second switch module 422B and the transit section 1214A of the data memory has no data segments destined to the second switch module 422B; both data segments may be written in the receiving section 1216B of the data memory of the second switch module 422B; or (1400-5) two data segments waiting in the shipping section 1212A of the data memory of the first switch module 422A and destined to different switch modules excluding the second switch module 422B (say, the third switch module 422C and the fourth switch module 422D); both data segments may be written in the transit section 1214B of the data memory of the second switch module 422B.

Data Transfer in a Complementary-Rotator-Pair Circulating Switch

Figure 15:
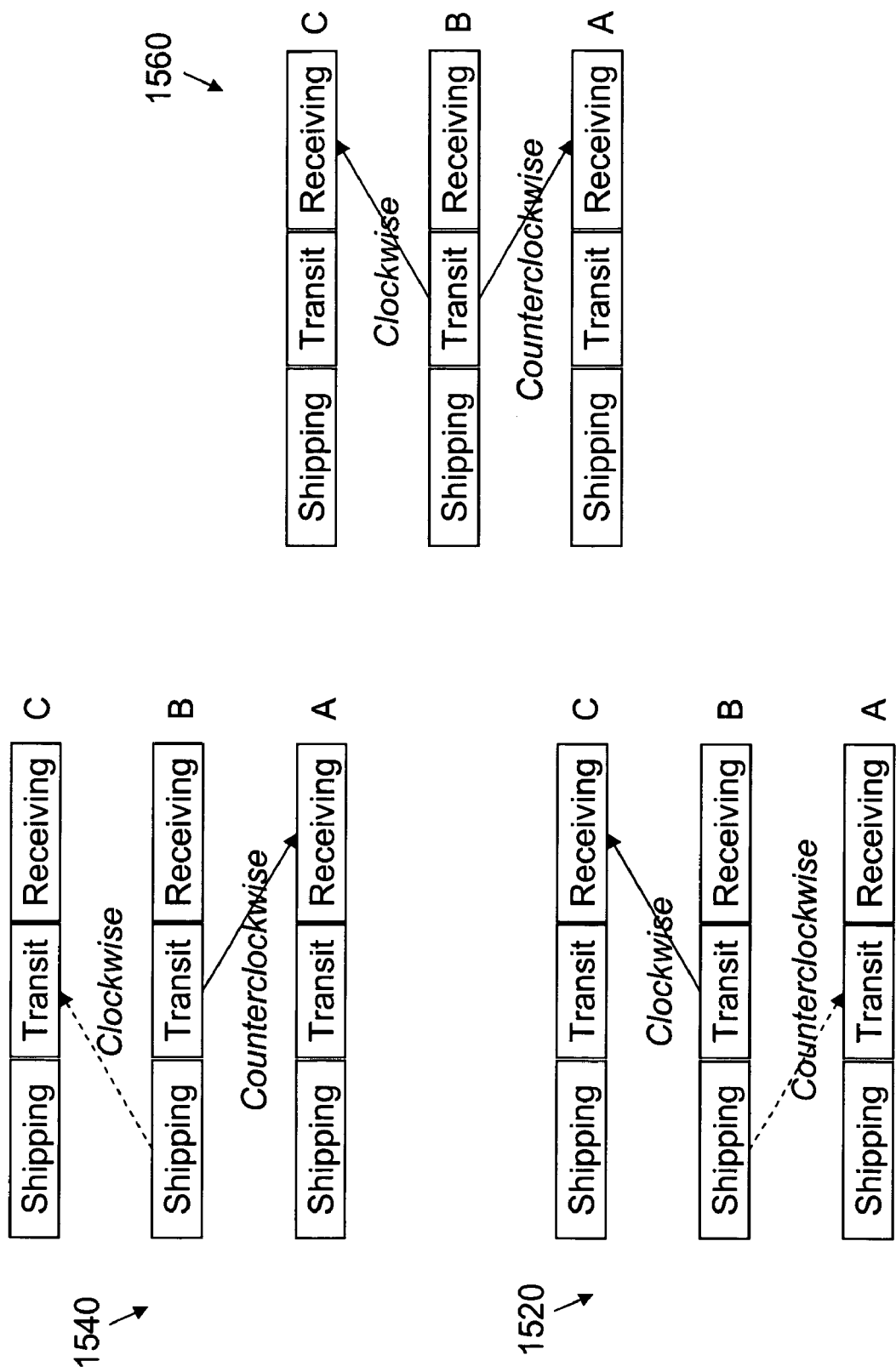
FIG. 15 illustrates options for transferring data from one switch module of FIG. 8 to another in accordance with an embodiment of the present invention.
Figure 16:
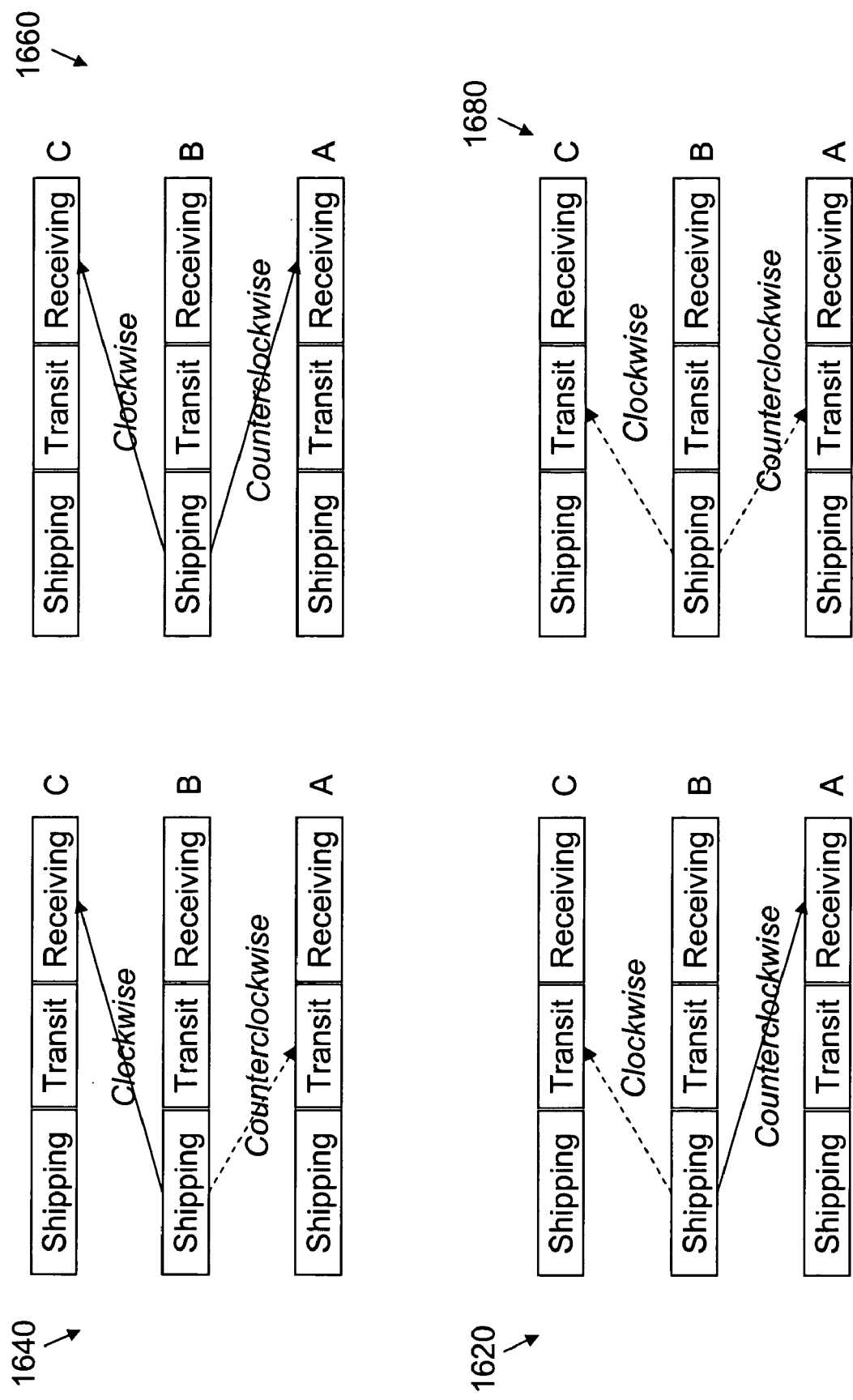
FIG. 16 illustrates further options for transferring data from one switch module of FIG. 8 to another in accordance with an embodiment of the present invention.

FIG. 15 and FIG. 16 illustrate possible data transfer patterns from a switch module to other switch modules in a circulating switch using a complementary rotator pair such as the one exemplified in FIG. 8. Consider a switch module 822 labeled B connecting, during a given rotation phase, to a switch module 822 labeled C through a clockwise rotator and connecting to a switch module 822 labeled A through a counterclockwise rotator. Seven connection patterns 1520, 1540, 1560, 1620, 1640, 1660, and 1680 are illustrated in FIGS. 15 and 16 and are determined by traffic conditions and a scheduling process:

In pattern 1520, switch module B may send a data segment from its transit section through the clockwise rotator to be stored in the receiving section of switch module C. Switch module B may also send a data segment from its shipping section through the counterclockwise rotator to be stored in the transit section of switch module A.

In pattern 1540, switch module B may send a data segment from its shipping section through the clockwise rotator to be stored in the transit section of switch module C. Switch module B may also send a data segment from its transit section through the counterclockwise rotator to be stored in the receiving section of switch module A.

In pattern 1560, switch module B may send a data segment from its transit section through the clockwise rotator to be stored in the receiving section of switch module C. Switch module B may also send a data segment from its transit section through the counterclockwise rotator to be stored in the receiving section of switch module A.

In pattern 1620, switch module B may send two data segments from its shipping section, one through the clockwise rotator to be stored in the transit section of switch module C and one through the counterclockwise rotator to be stored in the receiving section of switch module A.

In pattern 1640, switch module B may send two data segment from its shipping section, one through the clockwise rotator to be stored in the receiving section of switch module C and one through the counterclockwise rotator to be stored in the transit section of switch module A.

In pattern 1660, switch module B may send two data segments from its shipping section, one through the clockwise rotator to be stored in the receiving section of switch module C and one through the counterclockwise rotator to be stored in the receiving section of switch module A.

In pattern 1680, switch module B may send two data segments from its shipping section, one through the clockwise rotator to be stored in the transit section of switch module C and one through the counterclockwise rotator to be stored in the transit section of switch module A.

Patterns 1520, 1540, 1560 and 1680 would be predominant under unbalanced spatial distribution of traffic where a high proportion of data segments require indirect connections through intermediate switch modules. Pattern 1660 would be predominant under balanced spatial distribution of traffic where a high proportion of data segments may be sent over direct connections.

Direct and Indirect Paths

Figure 17:
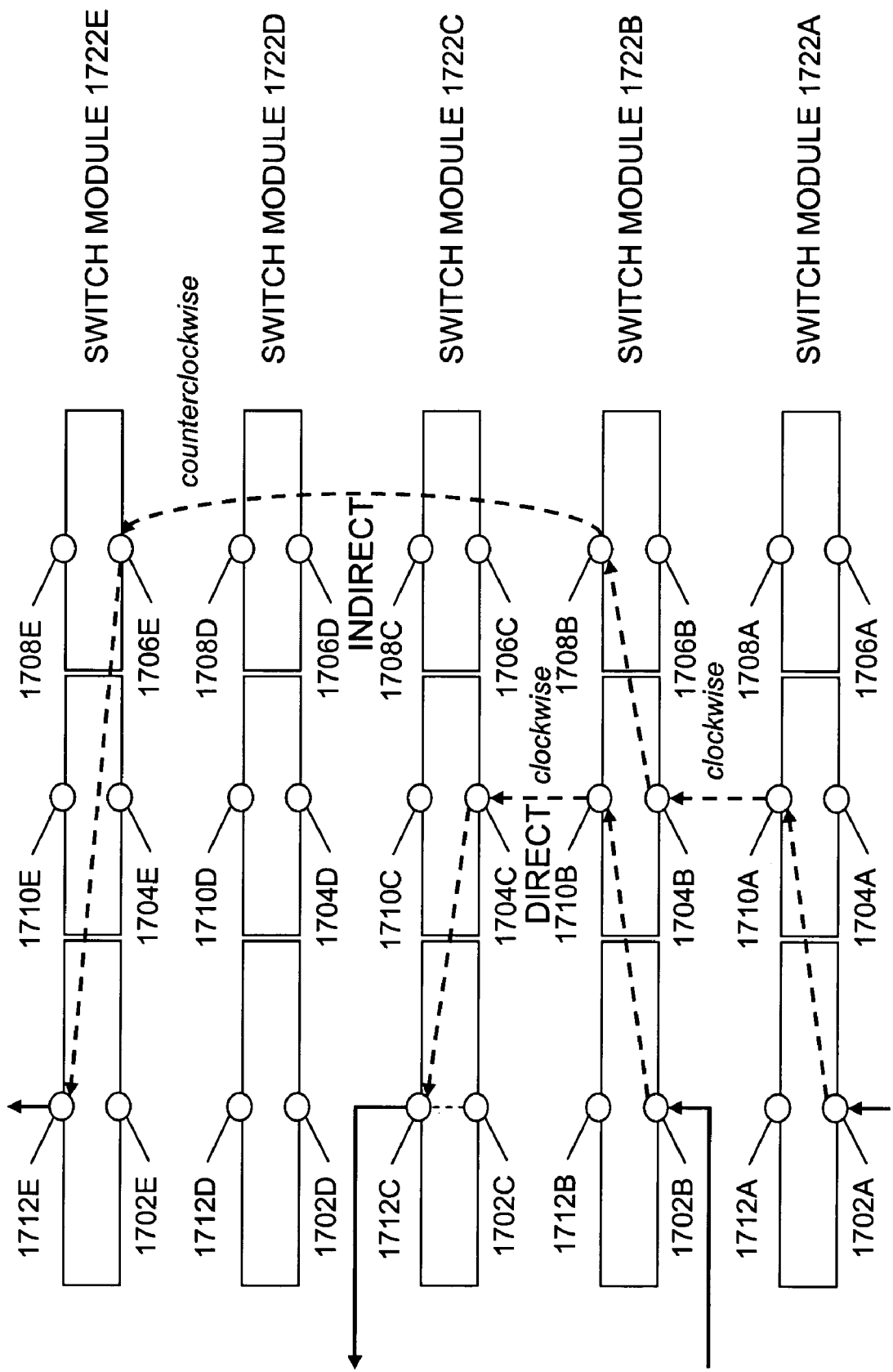
FIG. 17 illustrates a direct connection and an indirect connection through a clockwise forward rotator of a complementary pair of rotators in accordance with an embodiment of the present invention.

FIG. 17 illustrates a set of five switch modules (individually or collectively 1722) including a first switch module 1722A, a second switch module 1722B, a third switch module 1722C, a fourth switch module 1722D and a fifth switch module 1722E as part of a circulating switch of the type illustrated in FIG. 8. The first switch module 1722A includes an ingress port 1702A, a first inbound port 1704A, a second inbound port 1706A, a first outbound port 1710A, a second outbound port 1708A and an egress port 1712A. Each of the remaining switch modules includes correspondingly labeled ports.

The set of five switch modules 1722 of FIG. 17 are used to illustrate a direct connection through a clockwise rotator (not shown) from the second switch module 1722B to the third switch module 1722C and an indirect connection from the first switch module 1722A to the fifth switch module 1722E.

Data segments for the direct connection are received at the ingress port 1702B of the second switch module 1722B and transmitted to the third switch module 1722C through the first outbound port 1710B. At the third switch module 1722C, the data segments are received at the first inbound port 1704C and transmitted to the designated data sink through the egress port 1712C.

The indirect connection is routed through the clockwise rotator to the second switch module 1722B and through a counterclockwise rotator, not shown) from the second switch module 1722B to the fifth switch module 1722E. In particular, data segments for the indirect connection are received at the ingress port 1702A of the first switch module 1722A and transmitted to the second switch module 1722B through the first outbound port 1710A. At the second switch module 1722B, the data segments are received at the first inbound port 1704B and transmitted to the fifth switch module 1722E through the second outbound port 1708B. At the fifth switch module 1722E, the data segments are received at the second inbound port 1706E and transmitted to the designated data sink through the egress port 1712E.

Figure 18:
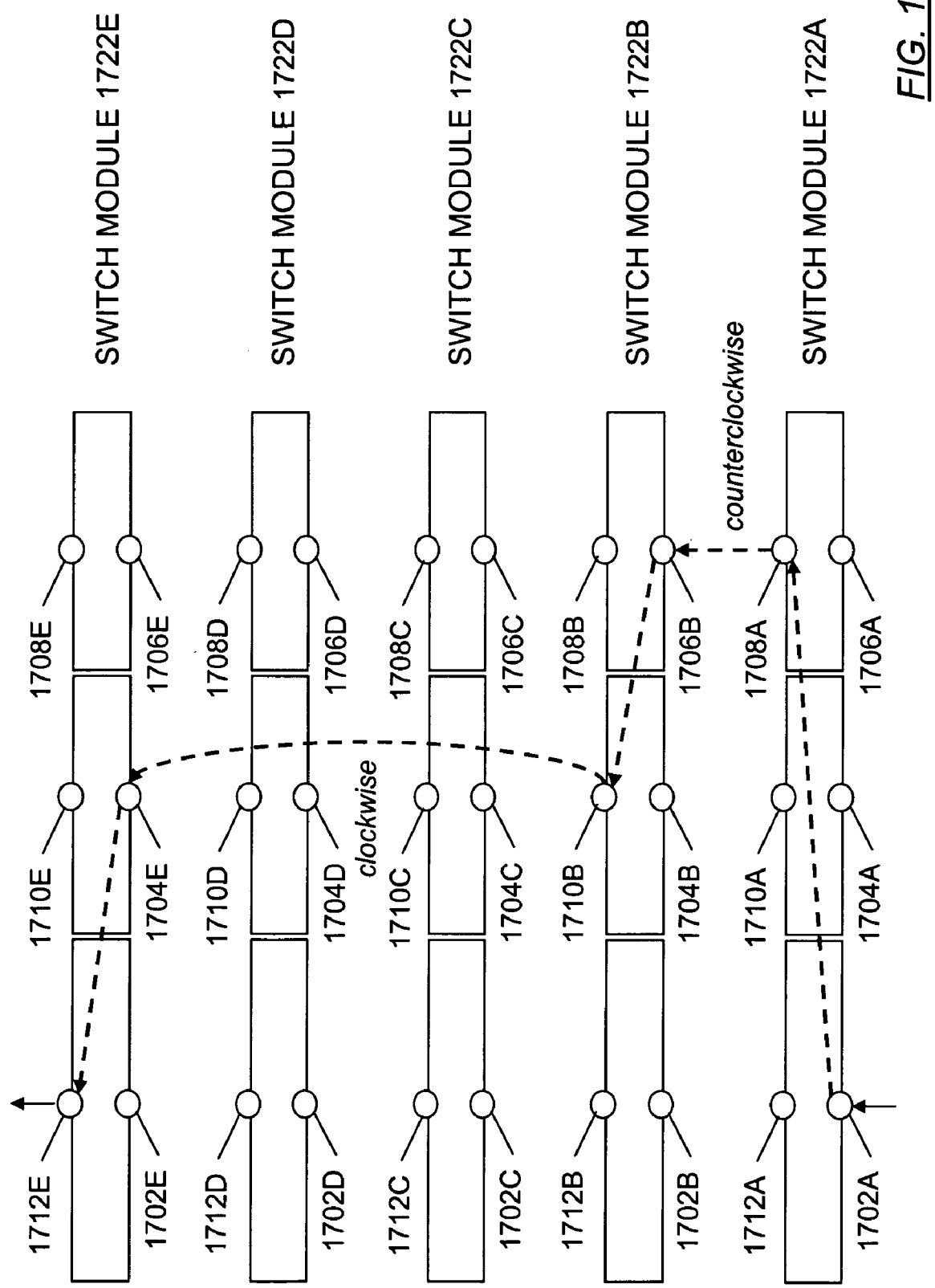
FIG. 18 illustrates an indirect connection through a counterclockwise forward rotator of a complementary pair of rotators in accordance with an embodiment of the present invention.

The set of five switch modules 1722 of FIG. 17 are used again in FIG. 18 to illustrate an indirect connection from the first switch module 1722A to the fifth switch module 1722E.

The indirect connection is routed through the counterclockwise rotator to the second switch module 1722B and through the clockwise rotator from the second switch module 1722B to the fifth switch module 1722E. In particular, data segments for the connection of FIG. 18 are received at the ingress port 1702A of the first switch module 1722A and transmitted to the second switch module 1722B through the second outbound port 1708A. At the second switch module 1722B, the data segments are received at the second inbound port 1706B and transmitted to the fifth switch module 1722E through the first outbound port 1710B. At the fifth switch module 1722E, the data segments are received at the first inbound port 1704E and transmitted to the designated data sink through the egress port 1712E.

Data segments may be transmitted from a source switch module to a sink switch module over direct paths, indirect paths, or a combination of direct and indirect paths. Data segments transmitted over direct paths are delivered to the receiving section of the sink switch module in proper temporal order. Data segments transmitted over indirect paths traversing a rotator pair of opposite rotation directions are also delivered in proper order. If the data segments associated with the same flow are transmitted in two streams, a first stream transmitted over direct paths and a second stream over indirect paths, the two streams can be merged at the sink switch module.

Switch Module

Figure 19:
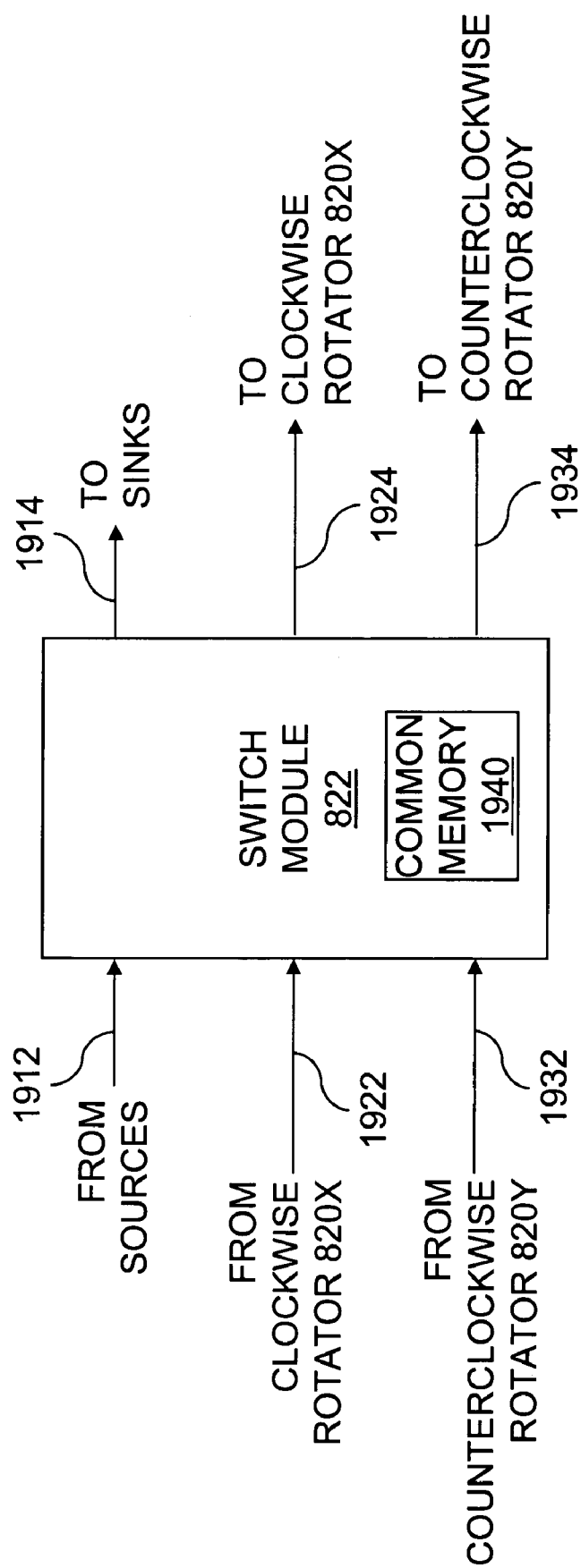
FIG. 19 illustrates an exemplary switch module for use in the circulating switch of FIG. 8 in accordance with embodiments of the present invention

FIG. 19 illustrates the switch module 822 for use in the circulating switch 800 of FIG. 8. The switch module 822 of FIG. 19 connects to three input channels, namely an ingress channel 1912, a first inbound channel 1922 and a second inbound channel 1932, and three output channels, namely an egress channel 1914, a first outbound channel 1924 and a second outbound channel 1934. The ingress channel 1912 carries data from subtending data sources (not illustrated). The egress channel 1914 carries data to subtending data sinks (not illustrated). The first inbound channel 1922 carries data from the first rotator 820X (FIG. 8) and the first outbound channel 1924 carries data to the first rotator 820X. The second inbound channel 1932 carries data from the second rotator 820Y and the second outbound channel 1934 carries data to the second rotator 820Y. The switch module 8221 includes a switch fabric that is a shared common memory 1940 accessed sequentially by the input channels 1912, 1922 and 1932 and output channels 1914, 1924 and 1934. During a rotation phase, a data segment from each of the three input channels 1912, 1922 and 1932 may be sequentially written in the common memory 1940 and up to three data segments may be read sequentially from the common memory 1940 and transmitted over the three output channels 1914, 1924, and 1934.

The ingress channel 1912 and the egress channel 1914 correspond to the dual channel 816 of FIG. 8, the first inbound channel 1922 and the first outbound channel 1924 correspond to the first internal dual channel 826 of FIG. 8, and the second inbound channel 1932 and the second outbound channel 1934 correspond to the second internal dual channel 836 of FIG. 8.

The switch module of FIG. 19 may be adapted for use in the single-rotator circulating switch 400 of FIG. 4. The two outbound channels 1924 and 1934 from a switch module 422 may be multiplexed at an interface with a respective inlet port of rotator 420 and the signal received at each outlet port of the rotator 420 maybe demultiplexed onto respective inbound channels 1922 and 1932 leading to a respective switch module 422.

Rotation Phase

FIG. 20 illustrates the timing of data transmission during a rotation phase from the first switch module 422A to the second switch module 422B (FIG. 4) through the single rotator 420, and generally from any switch module to any other switch module in a single-rotator circulating switch such as switch 400 of FIG. 4.

As indicated in FIG. 20, a rotation phase may be divided into six intervals (six time slices) labeled W1, W2, W3, R1, R2 and R3. During the interval W1, data may be received from subtending data traffic sources and written in the shipping 'section of the data memory of the first switch module 422A. During the interval R1, data may be read from the receiving section of the data memory of the first switch module 422A and transmitted to data traffic sinks subtending to the first switch module 422A. During the intervals W2 and W3, data may be received from a connecting switch module and written in the receiving section or the transit section of the data memory of the first switch module 422A. During the interval R2, data may be read from the shipping section of the first switch module 422A and transmitted (see 2012) to the transit section or the receiving section of the data memory of the second switch module 422B through the single rotator 420. During the interval R3, data may be read from the transit section (or the shipping section if the transit section is empty) of the data memory of the first switch module 422A and transmitted (see 2016) to the receiving section of the data memory of the second switch module 422B through the single rotator 420.

Each switch module 422 may receive data at 30 Gb/s and transmit data at 30 Gb/s. Thus, during each of the six intervals of a rotation phase, data is written or read at the rate of 30 Gb/s. The switch module may receive data at a rate of 10 Gb/s from subtending data sources and data at a rate of 20 Gb/s from another switch module through a single rotator or two rotators. The switch module may transmit data at a rate of 10 Gb/s to subtending data sinks and data at a rate of 20 Gb/s to another switch module through a single rotator or two rotators. Data may be transferred through the single rotator 420 only during the intervals labeled R2 and R3. The single rotator 420 transfers data instantaneously and the time coordination is realized by holding the data in a register (not illustrated). As indicated in FIG. 20, the data read from switch module 422A may be written in the memory of switch 422B after a short delay not exceeding the duration of a rotation-phase. Thus, the data read from the switch module 422 may be held in the register (not illustrated) and transferred at the rate of 20 Gb/s through the rotator. The order of the intervals within a rotation cycle is selected as R2, W1, W2, R3, R1 and W3 for time coordination with the data registers. As illustrated in FIG. 20, the time from the start of interval R2 to the end of interval W2 is half a rotation phase. Likewise, the time from the start of interval R3 to the end of interval W3 is half a rotation phase. Other sequential orders of the intervals W1, W2, W3, R1, R2 and R3 may be devised.

FIG. 21 illustrates the timing of data transmission from the first switch module 822A to the second switch module 822B through the two rotators 820X and 820Y.

In the circulating switch 800 of FIG. 8 having two rotators 820X, 820Y, the rotation phase is also divided into six intervals (six time slices) labeled similarly as W1, W2, W3, R1, R2 and R3. The order of the intervals is selected as R2, W1, W3, R3, R1, and W2 to facilitate time coordination. As illustrated in FIG. 21, the time from the start of interval R2 in one rotation phase to the end of interval W2 in the rotation phase, is a complete rotation phase. Likewise, the time from the start of interval R3 to the end of interval W3 in a subsequent rotation phase is also one complete rotation phase. Data may be held in a register at an inlet of each of the two rotators 820X, 820Y to facilitate the time coordination.

During each rotation phase, the two rotators 822X and 822Y may provide two paths from each switch module 822 to two other switch modules. However, during one of the rotation phases, the two paths may lead to the same switch module. During the interval R2, data may be read from the shipping section of the first switch module 822A and transmitted (see 2112) along one of the two paths to the transit section or the receiving section of the data memory of the second switch module 822B. During the interval R3, data may be read from the transit section (or the shipping section if the transit section is empty) of the data memory of the first switch module 822A and transmitted (see 2116) through the other path to the receiving section of the data memory of another switch module, switch module 822C or switch module 822D. One of the two paths may traverse the clockwise rotator 8200X and the other traverses the counterclockwise rotator 820Y and, as mentioned above, the two paths may lead to one other switch module, i.e., the two data segments transferred along paths 2112 and 2118 may be written in two different switch modules or in one switch module.

Switching Steps in Prior-Art Rotating-Access Switch

Figure 22:
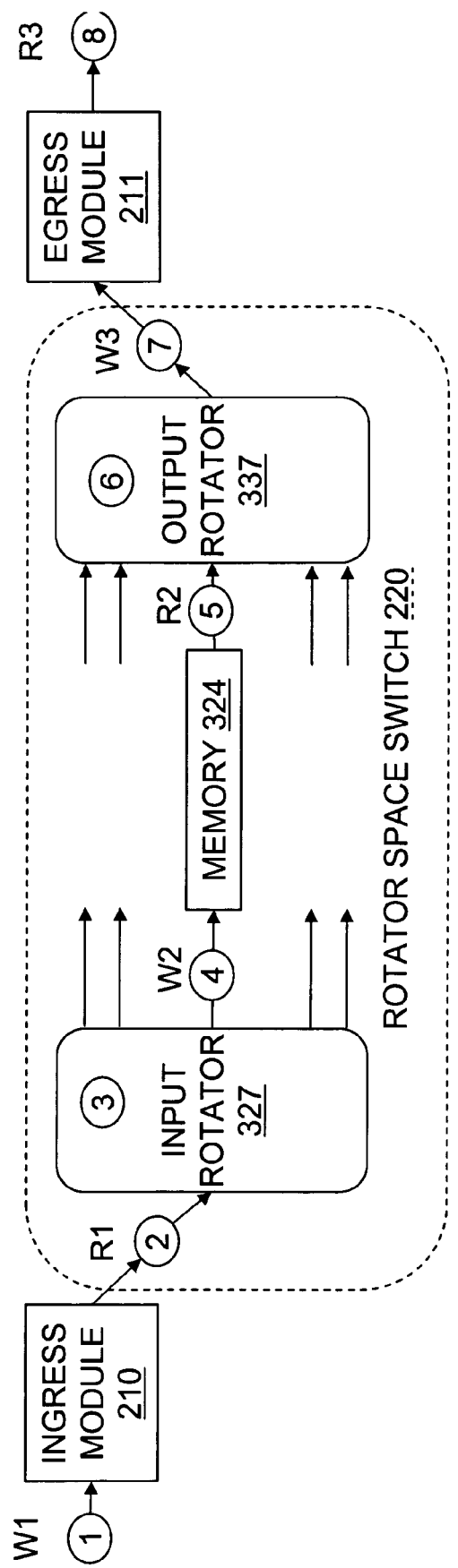
FIG. 22 illustrates steps of switching a data segment across the prior-art rotating-access switch of FIG. 2.

FIG. 22 illustrates eight of the main steps that take place in transferring a data segment across the prior-art rotator space switch 220 of FIG. 3. FIG. 22 indicates the connectivity of an ingress module 210 to an egress module 211 during a rotation phase of the rotation cycle. The steps, numbered 1 to 8, are circled in FIG. 22. In step 1, a data segment is written in a data memory associated with the ingress module 210. In step 2, the data segment is read from the data memory. In step 3, the data segment read in step 2 traverses the input rotator 327. In step 4, the data segment is written in a transit memory 324 at a location corresponding to the destination switch module of the data segment. In step 5, the data segment is read from the transit memory 324 from a location corresponding to the egress module 211. In step 6, the data segment traverses the output rotator 337 and is written, in step 7, in a data memory associated with the egress module 211. In step 8, the data segment is read out from the data memory of the egress module 211 to be delivered to a corresponding data traffic sink.

Switching Steps in a Circulating Switch

Figure 23:
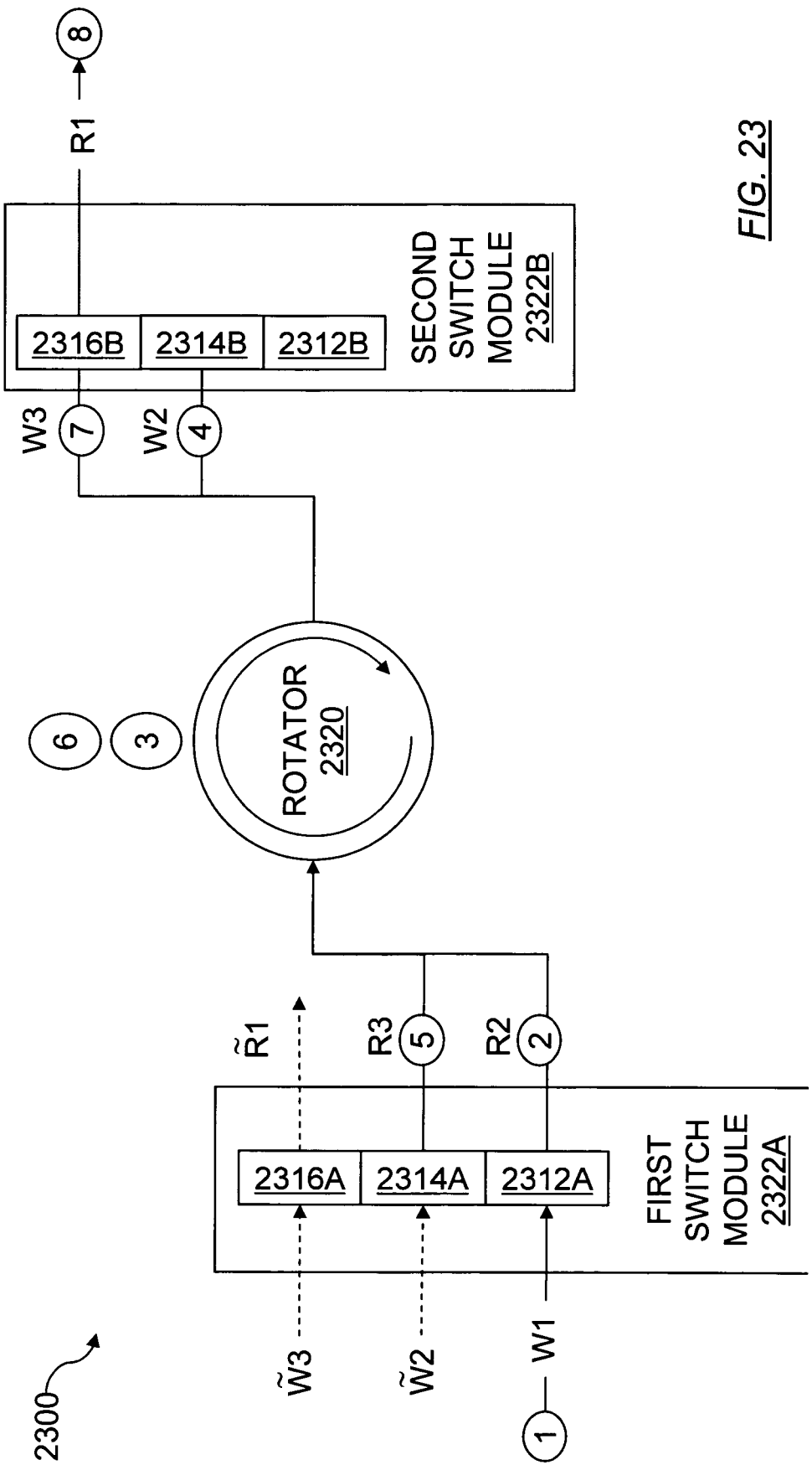
FIG. 23 illustrates steps of switching a data segment across the circulating switch of the type illustrated in FIG. 4 in accordance with an embodiment of the present invention.

A circulating switch 2300 is illustrated in FIG. 23 comprising components familiar from the circulating switch 400 of FIG. 4 and the data memory 1200 of FIG. 12. In particular, the circulating switch 2300 includes a first switch module 2322A and a second switch module 2322B interconnected by a rotator 2320. The first switch module 2322A includes a data memory having a shipping section 2312A, a transit section 2314A and a receiving section 2316A. The second switch module 23226 includes a data memory having a shipping section 23128, a transit section 23148 and a receiving section 23168.

Steps 1 to 8 described above in relation to the prior-art rotating-access switch 220 may also be considered to take place in relation to the circulating switch 2300 in FIG. 23. The steps illustrated in FIG. 23 take place during a rotation phase in which the first switch module 2322A connects to the second switch module 2322B. Instep 1, a data segment received from a packet handler (not illustrated) is written in the shipping section 2312A of the data memory of the first switch module 2322A. In step 2, the data segment from the shipping section 2312A is read out. The data segment traverses the rotator 2320 in step 3 and, in step 4, the data segment is written in the transit section 2314B of the data memory of the second switch module 2322B at an address corresponding to the intended destination switch module. In step 5, a data segment is read from the transit section 2314A of the data memory of the first switch module 2322A. The data segment traverses the rotator 2320 in step 6 and is then written in the receiving section 2316B of the data memory of the second switch module 2322B in step 7. In step 8, the data segment is read out of the receiving section 2316B of the data memory of the second switch module 2322B to be delivered to a data traffic sink. Data transfer in steps 3 and 6 occur during different intervals of the rotation phase of interest.

It is important to note that steps 1 to 4 in FIG. 23 may relate to a direct connection from switch module 2322A to switch module 2322B. Likewise, steps 5, 6, 7, and 8 may relate to another direct connection from switch module 2322A to switch module 2322B. Such direct connections have no parallel in the rotating-access switch of FIG. 2. Steps 1 to 4 may also relate to the first part of an indirect connection from switch module 2322A to a switch module 2322X (not illustrated) through switch module 2322B while steps 5 to 8 may relate to a second part of another indirect connection originating from a switch module 2322Y (not illustrated) and destined to switch module 2322B through switch module 2322A. Several combinations of the two sets of four steps 1 to 4 and 5 to 8 may be formed.

Figure 24:
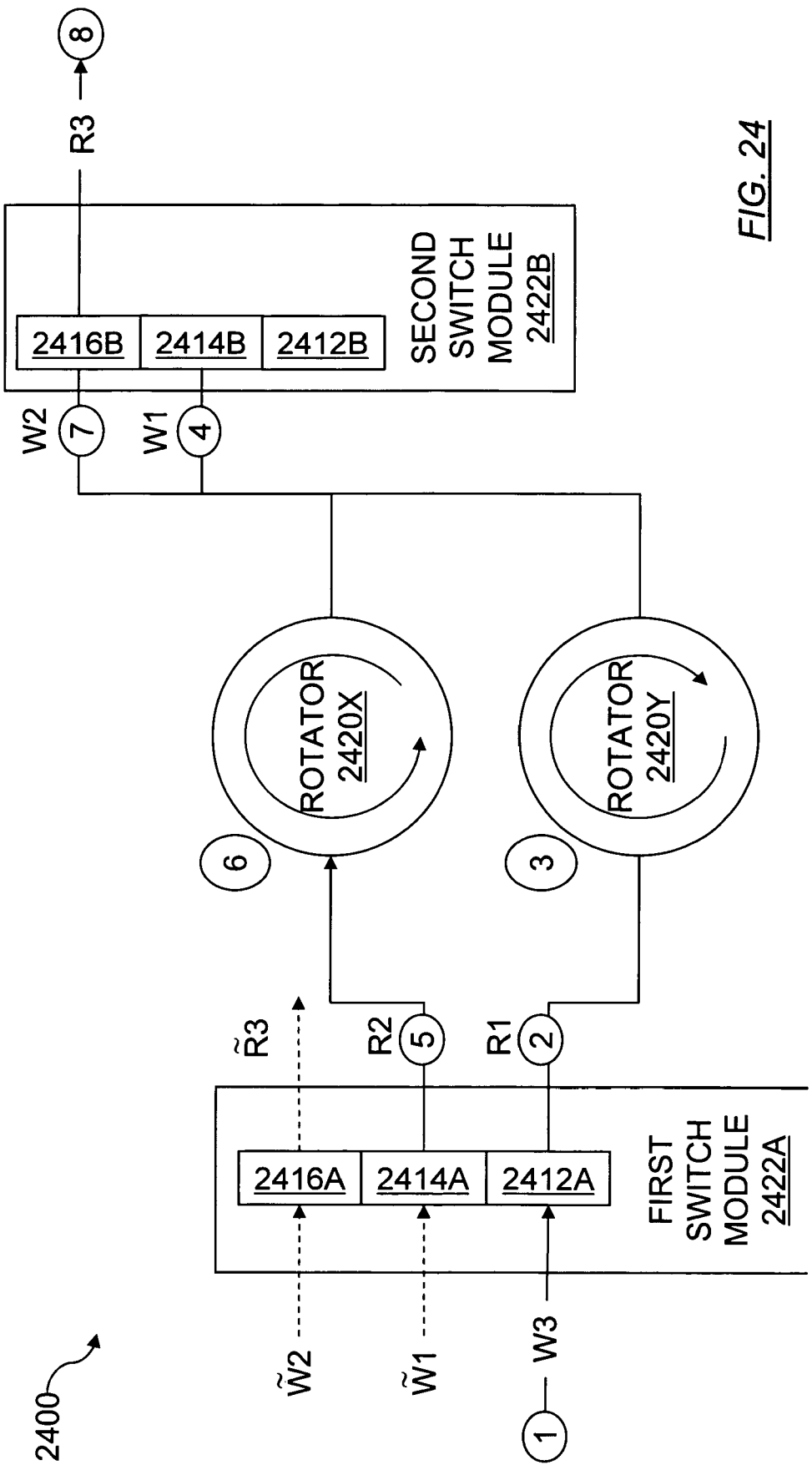
FIG. 24 illustrates steps of switching a data segment across the circulating switch of the type illustrated in FIG. 8 in accordance with an embodiment of the present invention.

A circulating switch 2400 is illustrated in FIG. 24 comprising components familiar from the circulating switch 800 of FIG. 8 and the data memory 1200 of FIG. 12. In particular, the circulating switch 2400 includes a first switch module 2422A and a second switch module 2422B interconnected by a first rotator 2420X and a second rotator 2420Y. The switch module 2422A includes a data memory having a shipping section 2412A, a transit section 2414A and a receiving section 2416A. The second switch module 2422B includes a data memory having a shipping section 2412B, a transit section 2414B and a receiving section 2416B.

The eight steps illustrated in FIG. 24 take place during two rotation phases in which the first switch module 2422A connects to the second switch module 2422B. Steps 1 to 4 take place during one of the two rotation phases and steps 5 to 8 take place during the other rotation phase. In step 1, a data segment received from a packet handler (not illustrated) is written in the shipping section 2412A of the data memory of the first switch module 2422A. In step 2, the data segment from the shipping section 2412A is read out. The data segment traverses the first rotator 2420X in step 3 and, in step 4, the data segment is written in the transit section 2414B of the data memory of the second switch module 2422B at an address corresponding to the intended destination switch module. In step 5, a data segment is read from the transit section 2414A of the data memory of the first switch module 2422A. The data segment traverses the second rotator 2420Y in step 6 and is then written in the receiving section 2416B of the data memory of the second switch module 2422B in step 7. In step 8, the data segment is read out of the receiving section 2416B of the data memory of the second switch module 2422B to be delivered to a data traffic sink.

As in the case of the single-rotator of FIG. 23, steps 1 to 4 may relate to a direct connection from switch module 2412A to switch module 2422B, and similarly for steps 5 to 8. Steps 1 to 4 may also relate to a first part of a connection from switch module 2422A to a switch module 2422X (not illustrated) through switch module 2422B and steps 5 to 8 may relate to the second part of an indirect connection from a switch module 2422Y (not illustrated) to switch module 2422B through switch module 2422A.

Rotation Phase Timing

Figure 25:
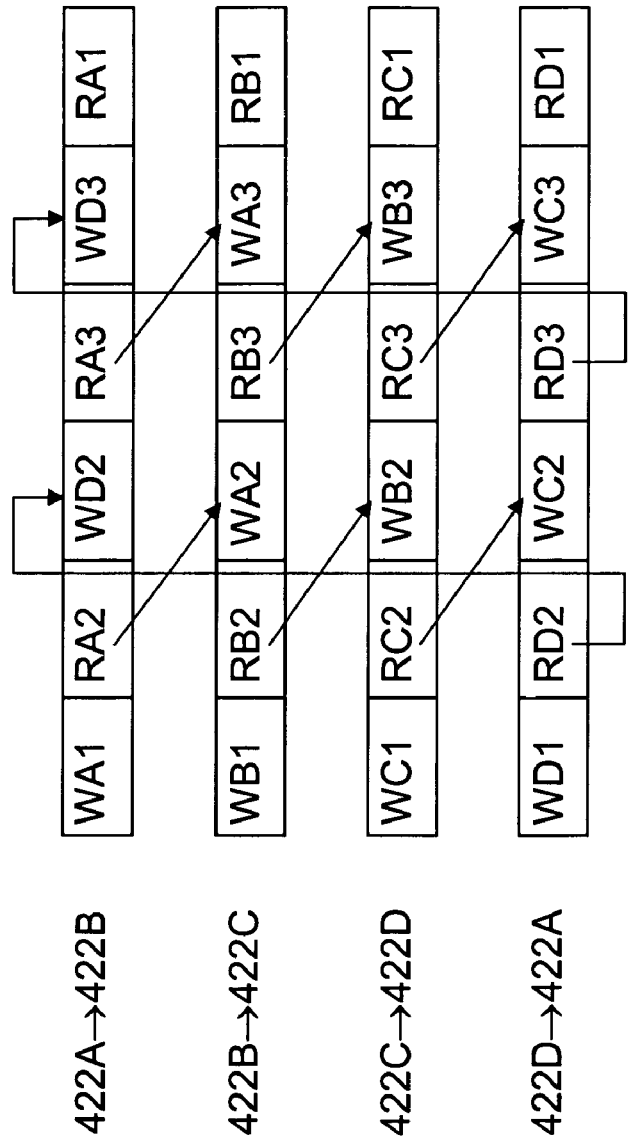
FIG. 25 illustrates a timing plan of the main steps of data segment transfer for the circulating switch of FIG. 4 in accordance with an embodiment of the present invention.

FIG. 25 is a timing diagram 2500 relating the write and read operations that take place during rotation phase-1 554 (FIG. 5) in the circulating switch 400 of FIG. 4. The timing diagram 2500 includes indications of the first switch module 422A, the second switch module 422B, the third switch module 422C and the fourth switch module 422D. A rotation phase is divided into three write intervals denoted W1, W2 and W3 and three read intervals denoted R1, R2 and R3. An intervening character added to the notation denoting intervals, such as WA1 instead of W1, relates to the association of an interval with a switch module 422 identified by the same character. For example, during the interval marked WD2 in rotation phase-1 554, the fourth switch module 422D transmits X writes) data to the first switch module 422A. During each phase, a first switch module 422 may receive one data segment from subtending data traffic sources, deliver one data segment to a subtending data traffic sink, transmit two data segments to another switch module 422 and receive two data segments from a further switch module 422.

The arrows in FIG. 25 indicate timing of transmission and receiving. For example, the third switch module 422C transmits to the fourth switch module 422D during the second and fourth intervals of the rotation phase and receives two data segments from the second switch module 422B during the third and fifth intervals.

Figure 26:
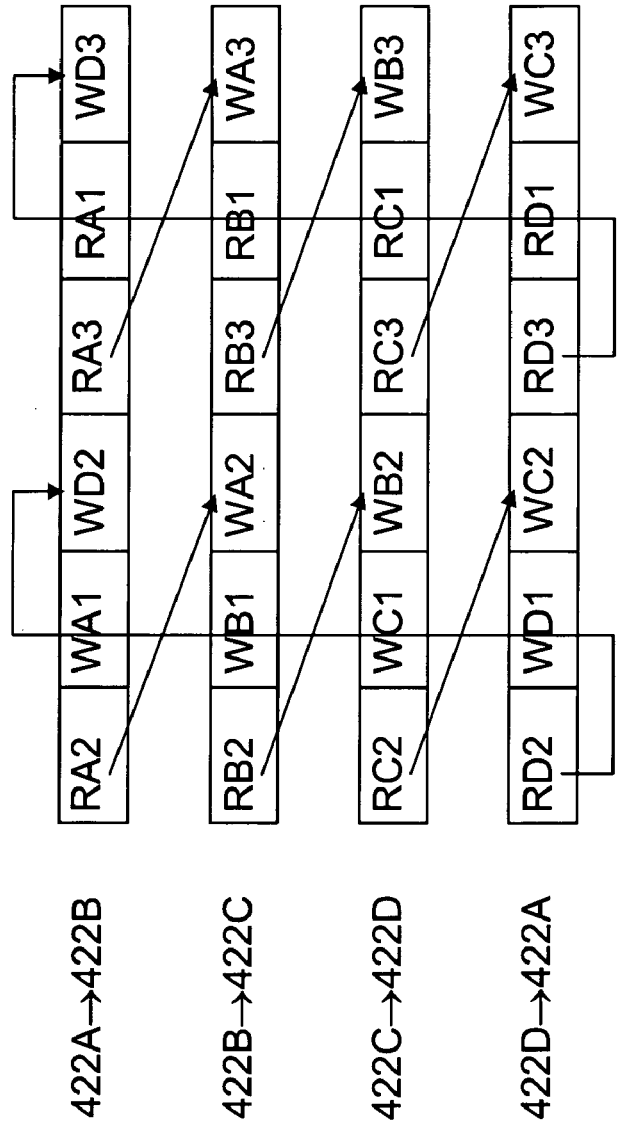
FIG. 26 illustrates another timing plan, as an alternative to the timing plan of FIG. 25, for the circulating switch of FIG. 4 in accordance with an embodiment of the present invention.

FIG. 26 illustrates a timing diagram 2600, as an alternative to the timing diagram 2500 of FIG. 25, wherein the write and read intervals have been rearranged to equalize the intervals between successive operations of the rotator 420 of FIG. 4.

Cyclic Connectivity

Figure 27:
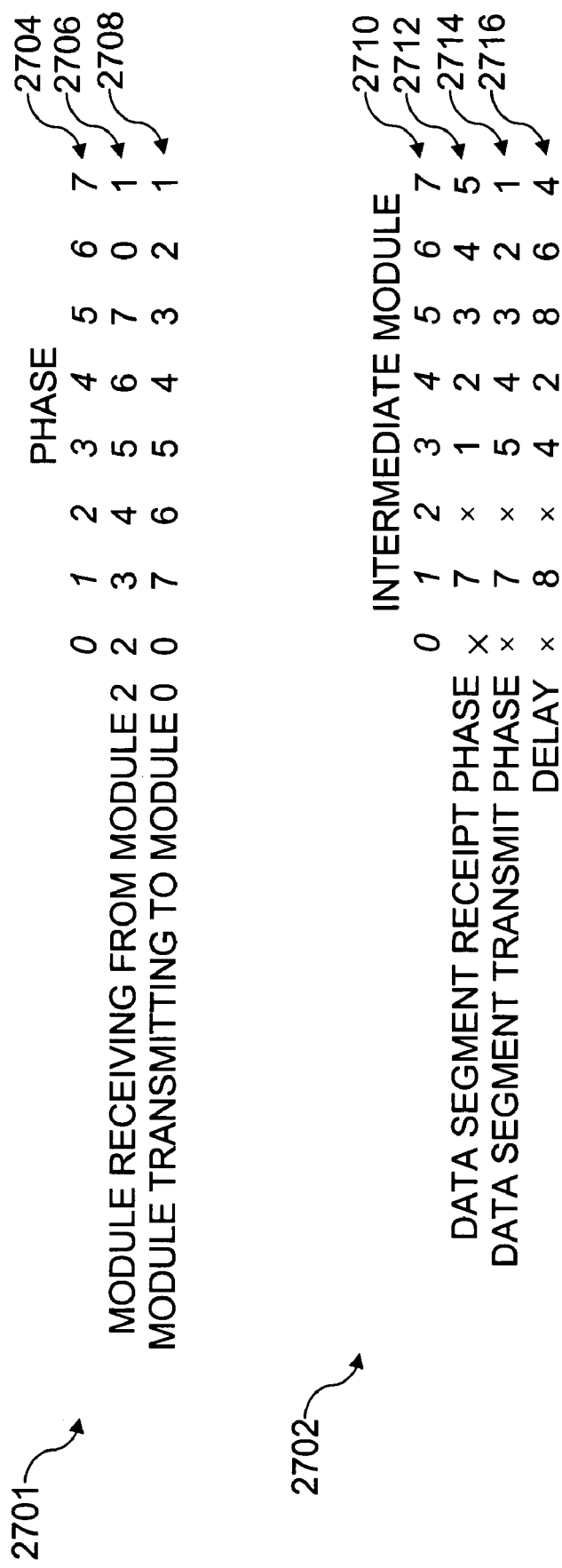
FIG. 27 illustrates tables related to determining delays in an exemplary circulating switch, in accordance with an embodiment of the present invention.

Tables illustrated in FIG. 27 relate to an exemplary circulating switch of eight switch modules, numbered 0 to 7, and a single rotator interconnecting the switch modules. The rotator operates as discussed hereinbefore with rotation cycle having eight rotation phases numbered 0 to 7. In a first table 2701, a first row 2704 indicates eight phases labeled as phase 0 to phase 7. In a second row 2706 the switch module to which switch module 2 may transmit data segments is identified for each of the eight phases. In a third row 2708 of the first table 2701, the switch module from which switch module 0 may receive data segments is identified for each of the eight phases.

The information supplied in the first table 2701 may be utilized in construct a second table 2702. The second table is constructed to determine a delay to associate with the transmission of data from the shipping section (see FIG. 12) of switch module 2 to the receiving section of switch module 0 through the transit section of each of the switch modules in the exemplary circulating switch. A first row 2710 identifies the eight switch modules labeled as switch module 0 to switch module 7. A second row 2712 of the second table 2702 identifies the rotation phase during which each switch module in row 2710 may receive data from switch module 2. In a third row 2714 of the second table 2702, the rotation phase during which each switch module identified in row 2710 may transmit data to switch module 0 is identified. A fourth row 2716 of the second table 2702 indicates, for each switch module identified in row 2710, the systematic transit delay, expressed as the number of rotation phases separating the phase during which a data segment is written by originating switch module 2 in the transit section of an intermediate switch module, other than the originating switch module 2 and the receiving switch module 0, and the phase during which the intermediate switch module transmits the data segment to the receiving switch module 0 where it is written in the receiving section of receiving switch module 0. During rotation phase 7, a data segment may be transmitted from the source switch module 2 to intermediate switch module 1 and the same data segment may be transmitted from intermediate switch module 1 to sink switch module 0. Depending on the organization of a rotation phase, as illustrated in FIG. 20, and other considerations, the data segment may be held in the transit section of switch module 1 for a complete rotation cycle, i.e., the transit delay may be 8 rotation phases. The transit delay at switch module 5 may also be 8 rotation phases as illustrated in Table 2702. The columns in the second table 2702 corresponding to the source switch module "2" and the sink switch module "0" do not relate to indirect connections and the respective entries in rows 2714 and 2716 are marked "x".

For example, switch module 3 may connect to switch module 2 through the rotator and receive data destined for switch module 0 in rotation phase 1. Four rotation phases later, in rotation phase 5, switch module 3 may connect to switch module 0 through the rotator and transmit data to switch module 0. From this information, it can be determined that the delay associated with sending data from switch module 2 to switch module 0 through intermediate switch module 3 is four rotation phases. This delay is noted in the third row 2716 of the second table 2702.

Notably the delay ranges from six rotation phases where, for example, switch module 6 is used as an intermediate switch module to zero where, for example, switch module 5 is used as an intermediate switch module.

Cyclic Connectivity Matrices

Figure 28:
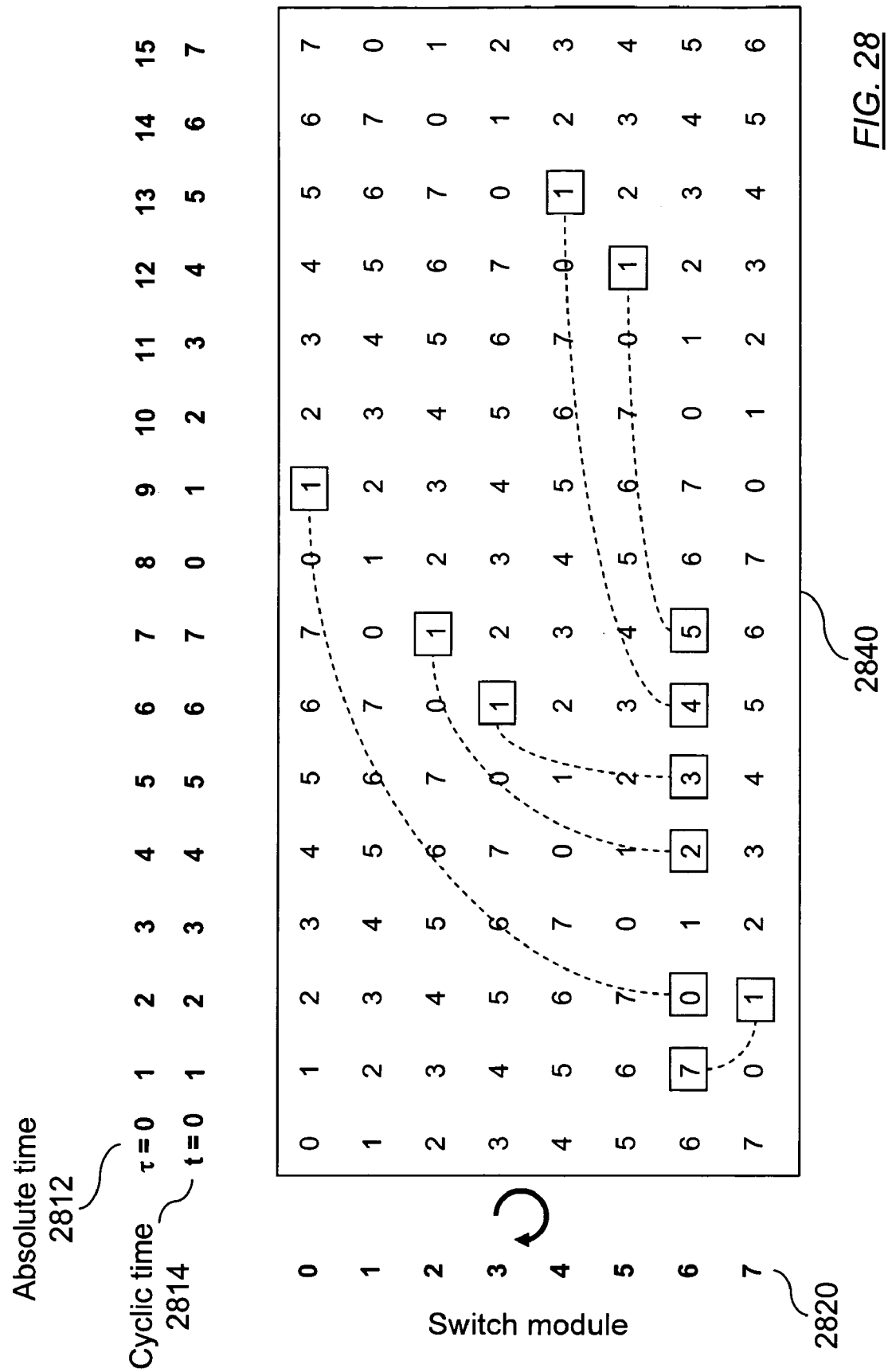
FIG. 28 illustrates the switching delay of indirect connections from one switch module to another through different intermediate switch modules in an exemplary eight-switch-module circulating switch having the single-rotator configuration illustrated in FIG. 4 when the rotation cycle includes switch module self-connection through the rotator.

FIG. 28 illustrates cyclic connectivity matrix 2840 for a circulating switch of the type of the circulating switch 400 of FIG. 4 that includes eight switch modules interconnected by a single rotator. A cyclic-time row 2814 indicates a cyclic time t, $0 \leq t < T$, over two rotation cycles of eight phases each (T=8). An absolute-time row 2812 indicates the absolute time τ. The rotation cycle has eight phases (T=8) including a self-connection phase where a switch module connects to itself through the rotator during one of the eight phases. A module-identity column 2820 identifies switch modules as 0 to 7, each cyclically connecting, during a cyclic time slot t (rotation phase t), to a switch module identified in the connectivity matrix 2840. Indirect connections from switch module 6 to switch module 1 through intermediate switch modules 7, 0, 2, 3, 4 and 5 are illustrated. An indirect connection through switch module 7 comprises a connection from switch module 6 to switch module 7 during t=1 and a connection from switch module 7 to switch module 1 during time slot t=2. The switching delay is therefore equal to one time slot. Another indirect connection may be realized through intermediate switch module 0 and comprises a forward connection from switch module 6 to switch module 0 during cyclic-time slot t=2 (absolute time T=2) and a terminating connection from switch module 0 to switch module 1 during cyclic time slot t=1 (absolute time τ=9) resulting in a switching delay of 7. A further indirect connection may be effected through intermediate switch module 5 where a forward connection from switch module 6 to switch module 5 takes place at cyclic time t=7 (absolute time τ=7) and a terminating connection from switch module 5 to switch module 1 takes place during cyclical time slot t=5 (absolute time τ=12) resulting in a switching delay of 5 time slots.

With the switching delay being dependent on the intermediate switch module, consecutive data segments from source switch module 6 may not arrive at sink switch module 1 in the same sequential order in which they were transmitted. The switching-delay variation, however, is systematic and can be offset at the sink switch module based on the identities of the source switch module and the intermediate switch module. Alternatively a simple approach of associating cyclic numbers with data segments may be used, as will be described hereinafter with reference to FIG. 45.

Figure 29:
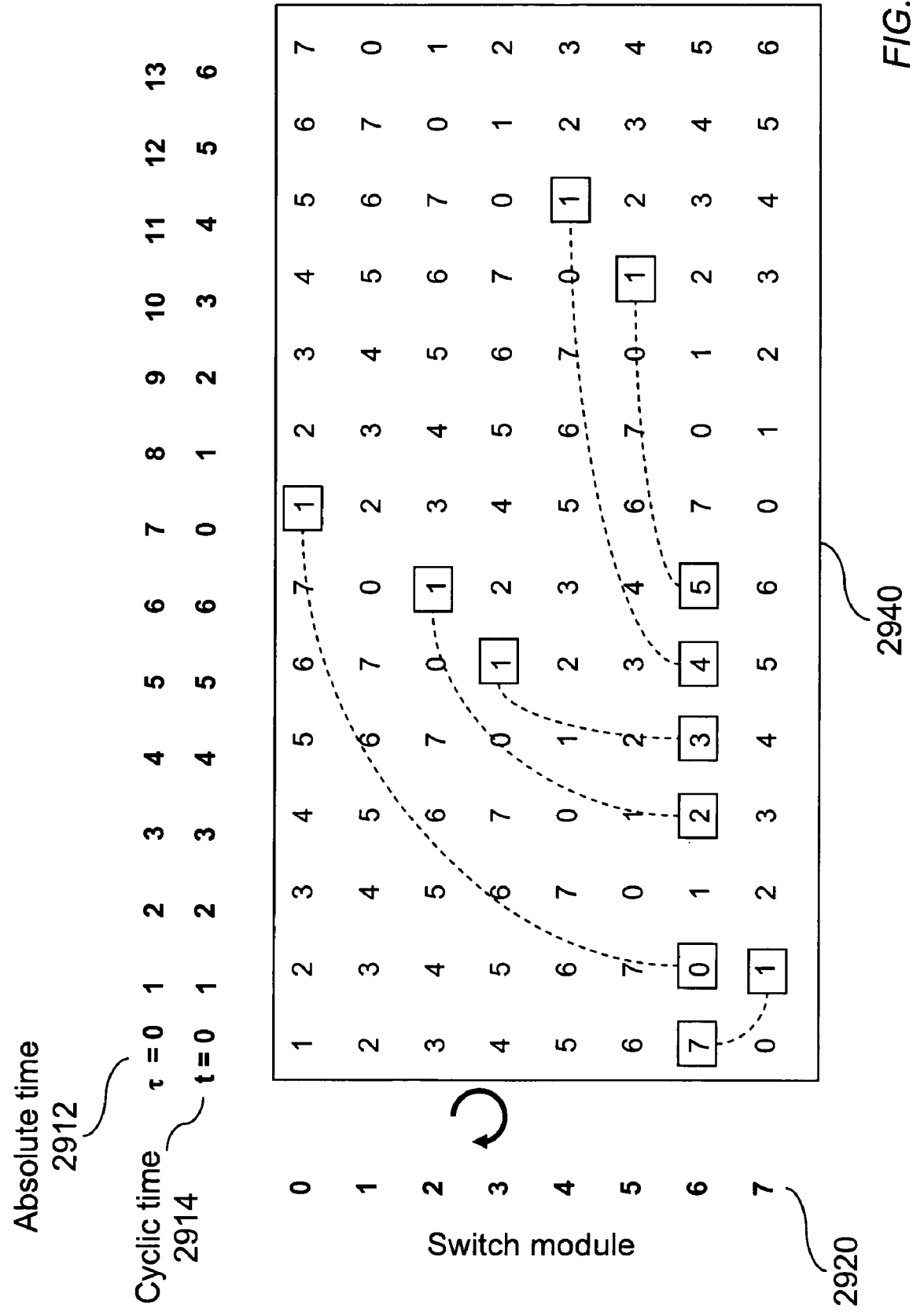
FIG. 29 illustrates the switching delay of indirect connections from one switch module to another through different intermediate switch modules in an exemplary eight-switch-module circulating switch having the single-rotator configuration illustrated in FIG. 4 when the rotation cycles exclude switch module self-connection through the rotator.

FIG. 29 illustrates a cyclic-connectivity matrix 2940 for the circulating switch considered in FIG. 28 when the self-connection phase is eliminated, i.e., with a rotation cycle of seven phases (T=7). A cyclic-time row 2914 indicates a cyclic time t, $0 \leq t < T$, over two rotation cycles of seven phases each (T=7). An absolute time row 2912 indicates the absolute time a. A module-identity column 2920 identifies switch modules as 0 to 7, each cyclically connecting, during a cyclic time slot t, to a switch module identified in the connectivity matrix 2940. Indirect connections from switch module 6 to switch module 1 through intermediate switch modules 7, 0, 2, 3, 4, and 5 are illustrated and the switching delay is also dependent on the intermediate switch module.

Figure 30:
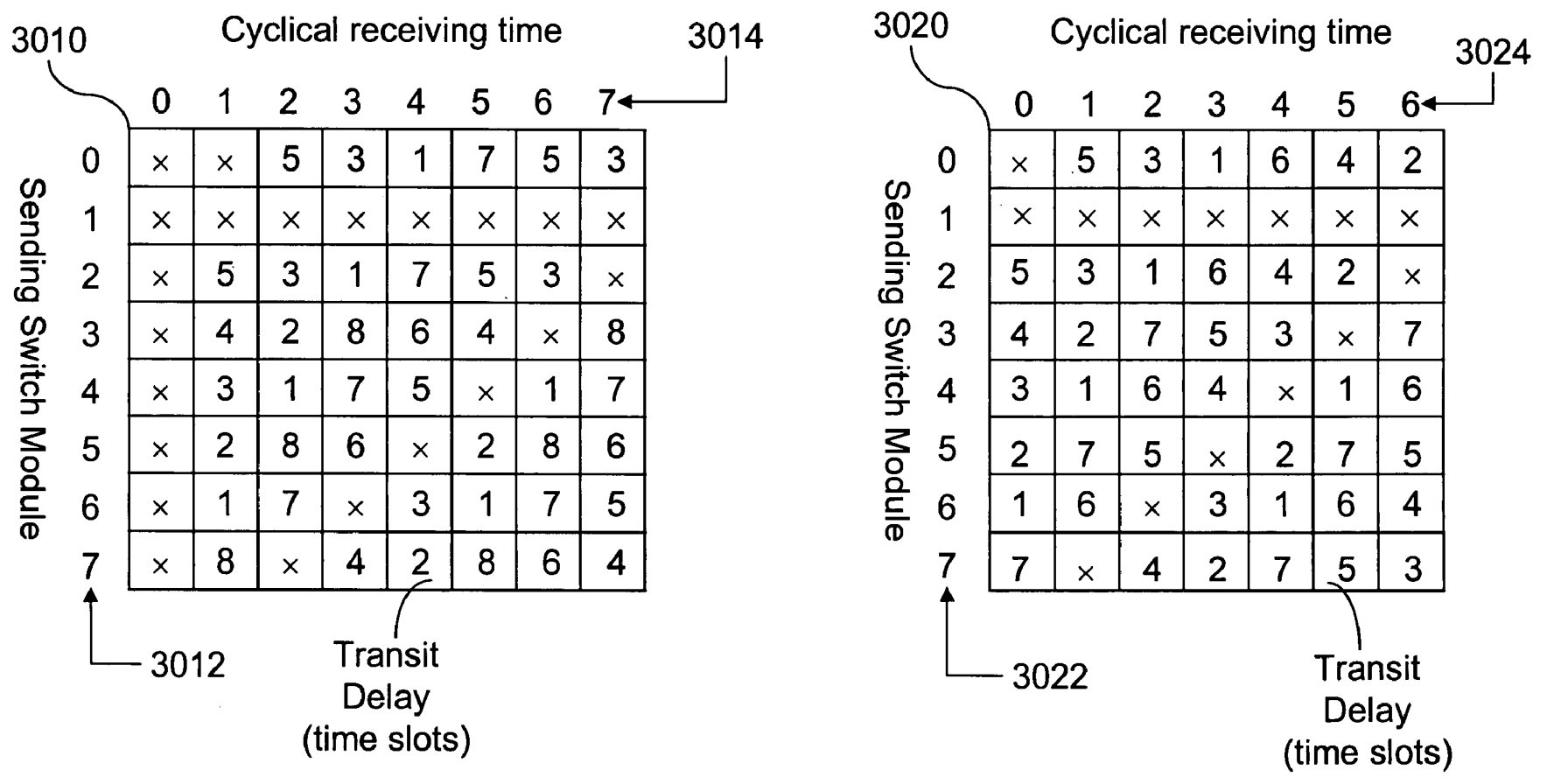

FIG. 30 illustrates the transit delay in a circulating switch, of the type of the circulating switch 400 of FIG. 4, using a single rotator and having eight switch modules. The switch modules are identified by the indices 0 to 7 for clarity of the figure. The transit delay experienced by a data segment transmitted from each source switch module to a sink switch module identified by index 1 are indicated in a first matrix 3010, for the case where the rotator cycle includes a self-connection rotation phase and in a second matrix 3020 for the case where the rotation cycle excludes self-connection. Indices of the source switch modules are indicated in a column 3012 associated with the first matrix 3010 and in a column 3022 associated with the second matrix 3020. The cyclical time at which the data segment under consideration is transmitted from the source switch module is indicated in a row 3014 associated with the first matrix 3010 and in a row 3024 associated with the second matrix 3020.

As indicated, the transit delay varies according to the time at which the data segment is transmitted from the source switch module, i.e., according to the intermediate switch module selected to complete an indirect connection to the sink switch module of index 1. The transit delays indicated in the matrices 3010, 3020 are determined directly from the connectivity matrices of FIG. 28 and FIG. 29, respectively. It is noted that the rotation cycle includes eight rotation phases in the case of self-connection and seven-phases otherwise. It is also noted that when a source switch module connects to an intermediate switch module in the same rotation phase (same time slot) during which the intermediate switch module connects to the sink switch module, the transit delay is determined as equal to the duration of the entire rotation cycle. For example, FIG. 28 indicates that source switch module 7 connects to intermediate switch module 0 during rotation phase 1 (t=1) and switch module 0 connects to sink switch module 1 during the same rotation phase (t=1). The transit delay is then eight time slots not zero. Likewise, FIG. 29 indicates that source switch module 7 connects to intermediate switch module 0 during rotation phase 0 (t=0) and switch module 0 connects to sink switch module 1 during the same rotation phase (t=0). The transit delay through switch module 0 is then seven time slots.

Figure 31:
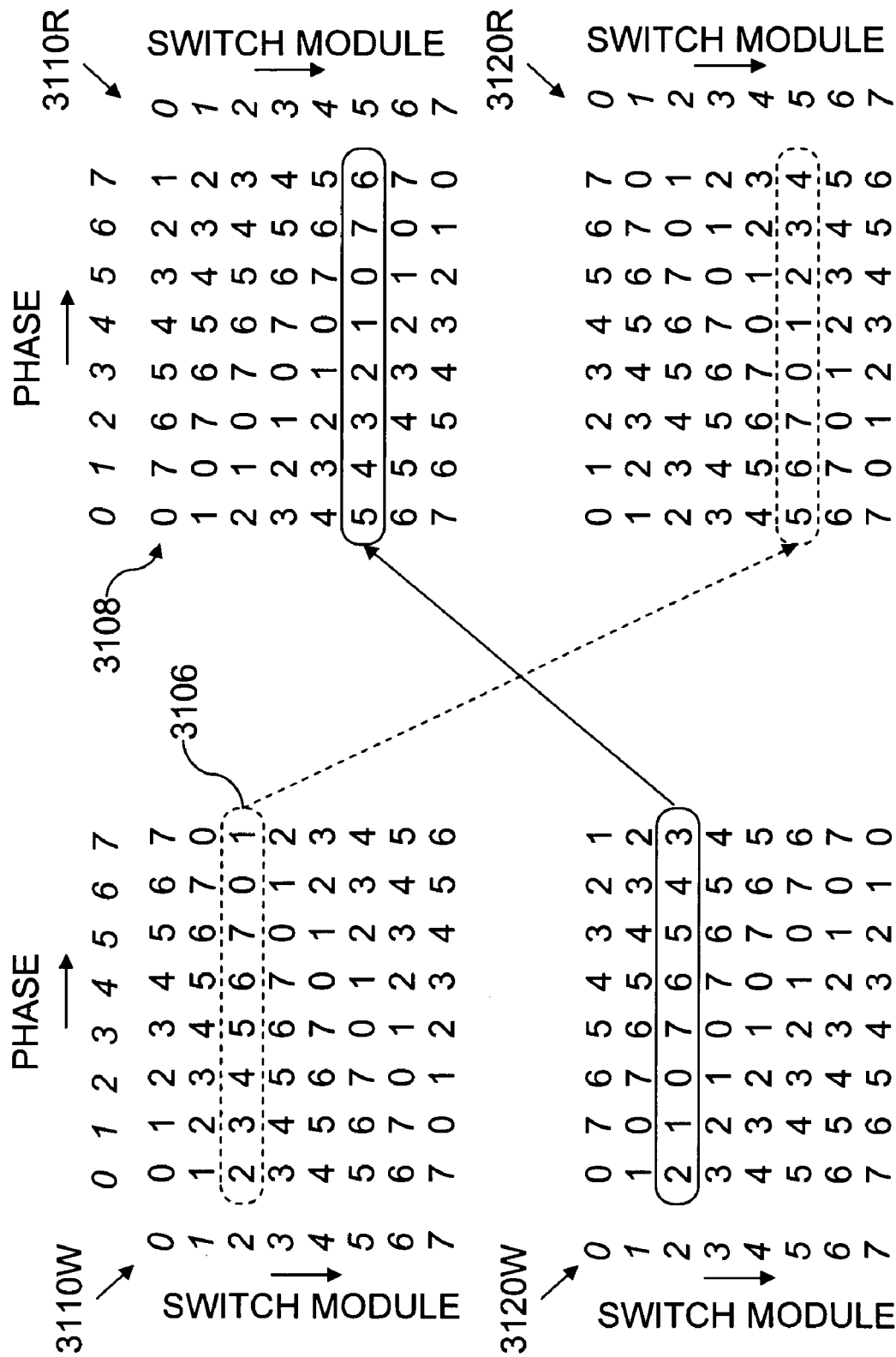
FIG. 31 illustrates timing aspects of switching connections made through two complementary rotators in a circulating switch of the type illustrated in FIG. 8 in accordance with an embodiment of the present invention.

FIG. 31 illustrates timing aspects of switching connections made through two complementary rotators in a circulating switch of the type illustrated in FIG. 8 having eight switch modules connected by eight rotators (i.e., four complementary pairs of rotators). A first write matrix 3110W, corresponding to a first (clockwise) rotator, is illustrated as having a number of rows equal to the number of switch modules and a number of columns equal to a number (8) of rotation phases per rotation cycle. An entry in the first write matrix 3110W in row X and column P represents a switch module accessed for a write operation by switch module X during rotation phase P through the first rotator. Note the correspondence between a third row 3106 of the first write matrix 3110W to row 2706 of the first table 2701 of FIG. 27.

Similarly, a second write matrix 3120W corresponds to a second counterclockwise rotator (complementary to the first rotator). An entry in the second write matrix 3120W in row X and column P represents a switch module accessed for a write operation by switch module X during rotation phase P through the second rotator.

A first read matrix 3110R is derived from the first write matrix 3110W. For instance, from the first write matrix 3110W, it may be determined that switch module 2 may write to switch module 5 in rotation phase 3 of the first rotator.

Correspondingly, from the first read matrix 3110R, it may be determined that switch module 5 may read from switch module 2 in rotation phase 3 of the first rotator.

An entry in the first read matrix 3110R in row X and column P represents a switch module accessing switch module X for a write operation during rotation phase P through the first rotator. Note the correspondence between a first row 3108 of the first read matrix 3110R to row 2708 of the first table 2701 of FIG. 27. Similarly, a second read matrix 3120R is derived from the second write matrix 3120W. An entry in the second read matrix 3120R in row X and column P represents a switch module accessing switch module X for a write operation during rotation phase P through the second rotator.

The second table 2702 of FIG. 27 was used hereinbefore to determine a delay associated with the transmission of data from a first switch module to a second switch module using each of the switch modules, in an exemplary circulating switch, as an intermediate switch module. Notably, the same rotator is used for both transmission to the intermediate switch module and reception from the intermediate switch module. A delay determination table 3202, illustrated in FIG. 32, may also be used to determine a delay associated with the transmission of data from a first switch module to a second switch module using each of the switch modules in an exemplary circulating switch as an intermediate switch module. However, the delay determination table 3202 of FIG. 32 differs from the second table 2702 of FIG. 27 in that a first rotator is used for transmission to the intermediate switch module and a second, complementary, rotator is used for reception from the intermediate switch module.

In a first row 3210F of the delay determination table 3202, the rotation phase during which each switch module may receive data from switch module 2 through the first rotator is identified. In a second row 3212F of the delay determination table 3202, the rotation phase during which each switch module may transmit data through the first rotator to switch module 5 is identified in a third row 3210S of the delay determination table 3202, the rotation phase during which each switch module may receive data from switch module 2 through the second rotator is identified. In a fourth row 3212S of the delay determination table 3202, the rotation phase during which each switch module may transmit data through the second rotator to switch module 5 is identified.

In a fifth row 3214FS of the delay determination table 3202, a difference is identified between the receipt phase related to the first rotator and the transmit phase related to the second rotator. Notably, the delays (differences) associated in the fifth row 3214FS with each of the switch modules are equal. In a sixth row 3214SF of the delay determination table 3202, a difference is identified between the receipt phase related to the second rotator and the transmit phase related to the first rotator. Notably, the delays associated in the sixth row 3214SF with each of the switch modules are also equal, and less that the mutually equal delays in the fifth row 3214FS. Source switch module 2 and sink switch module 5 are nit intermediate switch modules; their corresponding entries in rows 3214FS and 3214SF are marked as "X".

For example, acting as an intermediate, switch module 3 may connect to switch module 2 through the first rotator and receive data destined for switch module 5 in rotation phase 1. Five rotation phases later, in rotation phase 6, switch module 3 may connect to switch module 5 through the second rotator and transmit data to switch module 5. From this information, it can be determined that the delay associated with sending data from switch module 2 to switch module 5 through intermediate switch module 3 using the first rotator and then the second rotator is five rotation phases. This delay is noted in the fifth row 3214FS of the delay determination table 3202.

Alternatively, acting as an intermediate, switch module 3 may connect to switch module 2 through the second rotator and receive data destined for switch module 5 in rotation phase 7. Three rotation phases later, in rotation phase 2, switch module 3 may connect to switch module 5 through the first rotator and transmit data to switch module 5. From this information, it can be determined that the delay associated with sending data from switch module 2 to switch module 5 through intermediate switch module 3 using the second rotator and then the first rotator is three rotation phases. This delay is noted in the sixth row 3214SF of the delay determination table 3202.

Clearly, by transmitting data to an intermediate switch module through one rotator and receiving data from the intermediate switch module though the complementary rotator, one can rely on a predictable delay and can select an order of switching operations to minimize the predictable delay. As will be discussed hereinafter, multiple rotators may be configured, each with rotation-phase timing offset from one another, to provide a predictable, low delay no matter the switch module directional pair and no matter the intermediate switch module.

Delay Illustration

Figure 33:
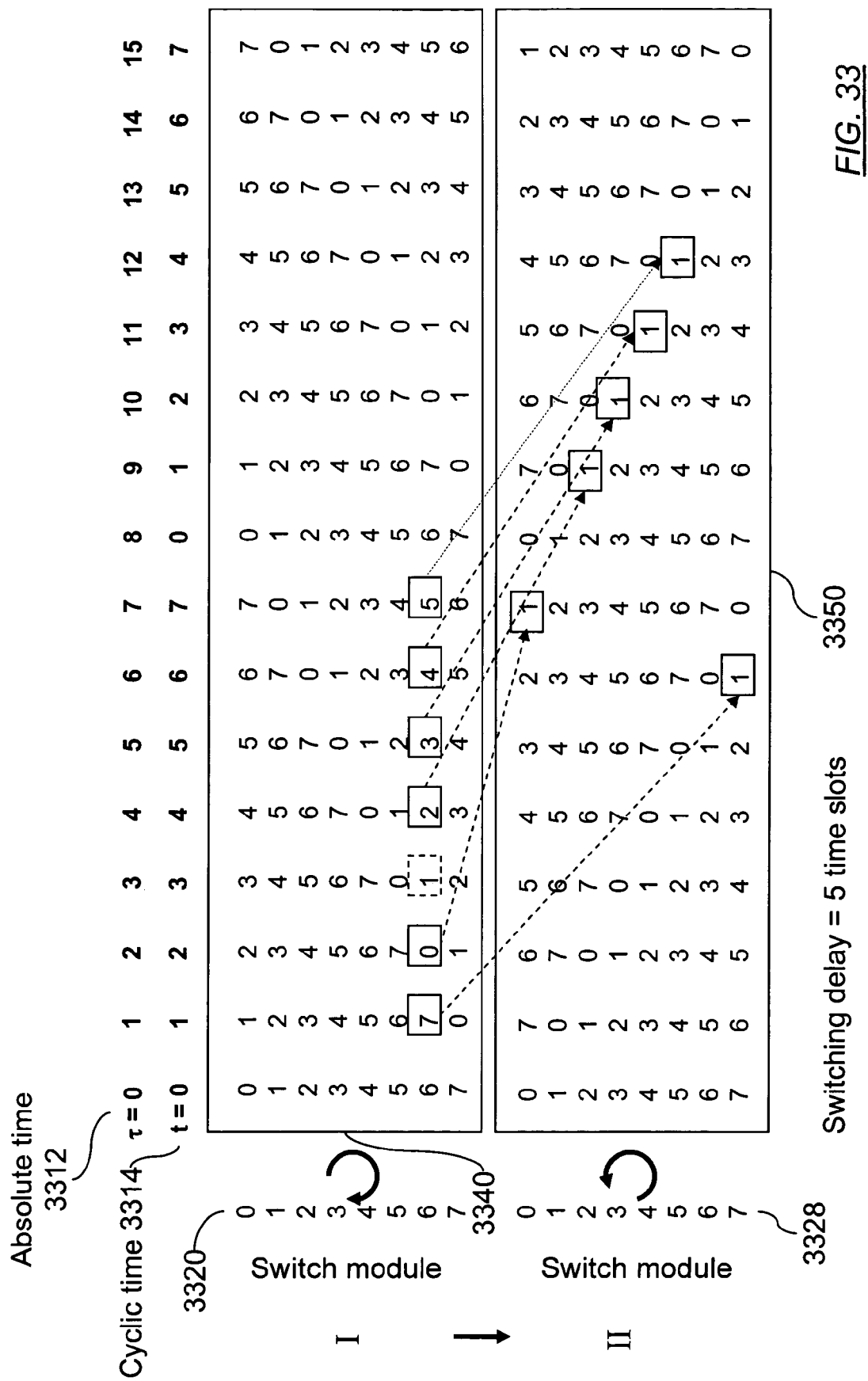
FIG. 33 illustrates the switching delay of indirect connections from one switch module to another through different intermediate switch modules in an exemplary eight-switch-module circulating switch having the complementary-rotators configuration illustrated in FIG. 8 when the rotation cycles include switch module self-connection through the rotators and the forward rotator is the clockwise rotator.

FIG. 33 illustrates a first connectivity matrix 3340 and a second connectivity matrix 3350 for a circulating switch of the type illustrated in FIG. 8 and comprising eight switch modules interconnected by a clockwise rotator and a counterclockwise rotator. The rotation cycle has eight rotation phases including a self-connection phase. A cyclic-time row 3314 indicates the cyclic time t, $0 \leq t < 8$, over two rotation cycles and an absolute time row 3312 indicates the absolute time τ. A first module-identity column 3320 references the eight switch modules as 0 to 7 for the clockwise rotator. Likewise, a second module-identity column 3328 references the eight switch modules as 0 to 7 for the counterclockwise rotator. A switch module listed in the first module-identity column 3320 connects to a switch module identified in the first connectivity matrix 3340 during successive time slots through the clockwise rotator. A switch module listed in the second module-identity column 3328 connects to a switch module identified in the second connectivity matrix 3350 during successive time slots through the counterclockwise rotator. Indirect connections from source switch module 6 to sink switch module 1 through intermediate switch modules 7, 0, 2, 3, 4, and 5 are illustrated. Each indirect connection is directed from the source switch module 6 to the intermediate switch module through the clockwise rotator and from the intermediate switch module to the sink switch module 1 through the counterclockwise rotator. The switching delay transit delay) along each of the indirect paths equals five time slots.

Figure 34:
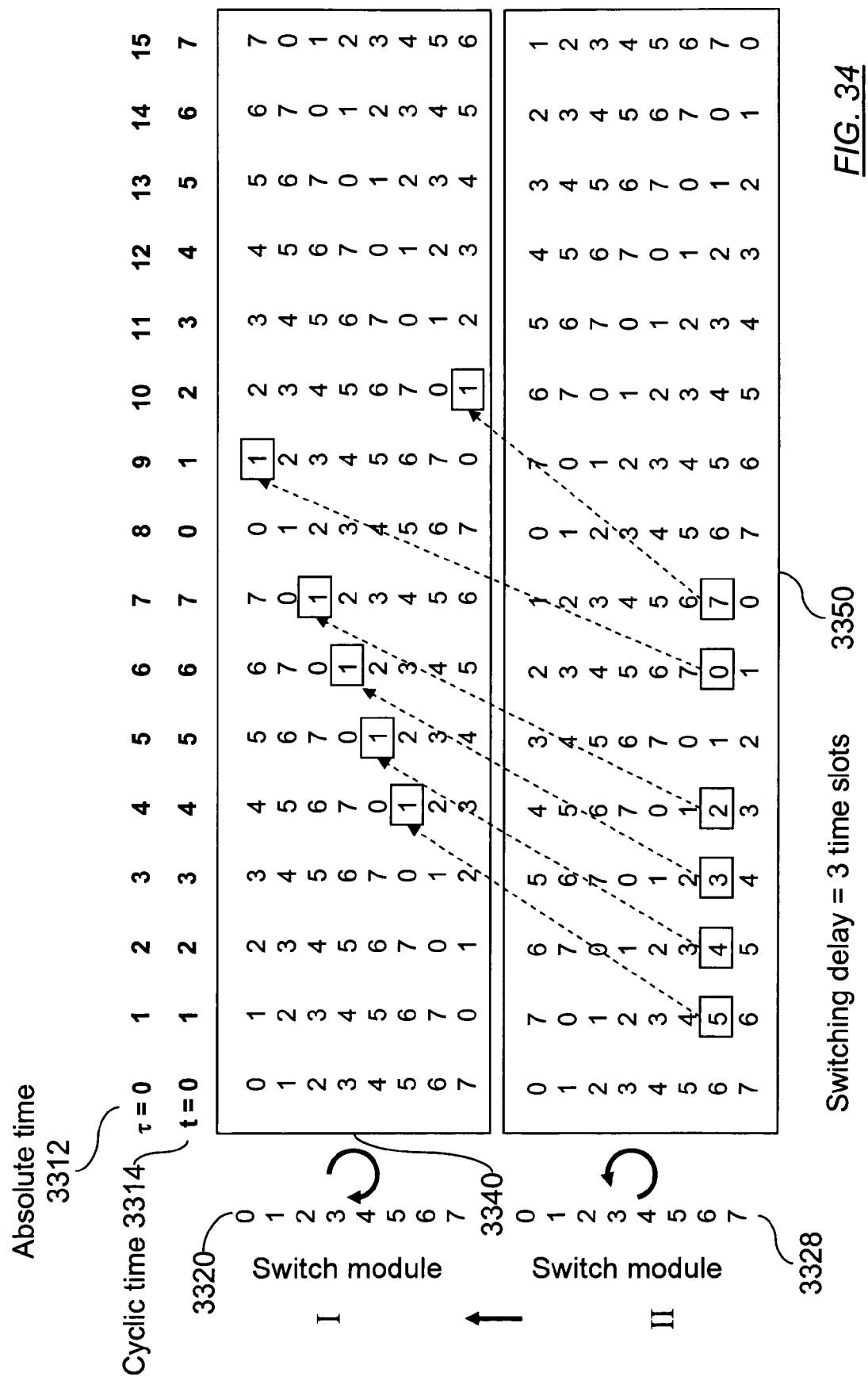
FIG. 34 illustrates the switching delay of indirect connections from one switch module to another through different intermediate switch modules in an exemplary eight-switch-module circulating switch having the complementary-rotators configuration illustrated in FIG. 8 when the rotation cycles include switch module self-connection through the rotators and the forward rotator is the counterclockwise rotator.

FIG. 34 illustrates the first connectivity matrix 3340 and the second connectivity matrix 3350 for the same circulating switch considered in FIG. 33 but with the indirect connections from source switch module 6 to sink switch module 1 using the counterclockwise rotator in the forward direction and the clockwise rotator in the terminating direction. The switching delay (transit delay) for each of the indirect connections equals three time slots.

High-Capacity Multi-Port Switch Module

Figure 35:
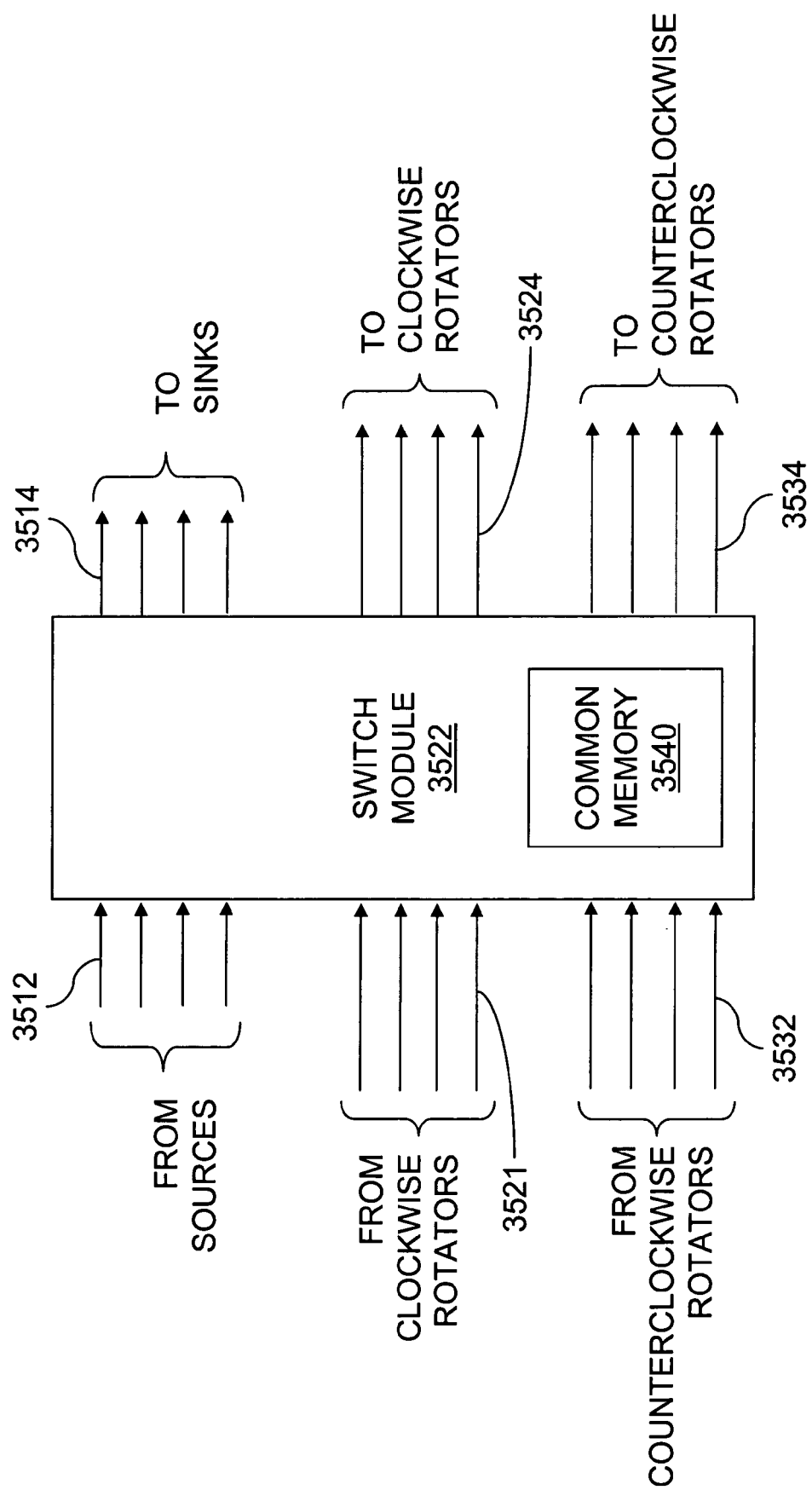
FIG. 35 illustrates a switch module having multiple ingress ports, multiple egress ports, multiple inbound ports and multiple outbound ports for use in an extended circulating switch.

The capacity of a circulating switch 400 (FIG. 4) or 800 (FIG. 8) may be extended using multiple rotators. This requires extending the capacities of the switch modules (422, 822). FIG. 35 illustrates an exemplary switch module 3522 having four ingress channels 3512 from data sources, four egress channels 3514 to data sinks, four first inbound channels 3521 from an array of four clockwise rotators, four second inbound channels 3532 from an array of four counterclockwise rotators, four first outbound channels 3524 to the array of clockwise rotators and four second outbound channels 3534 to the array of counterclockwise rotators. The switch module 3522 is preferably structured in common memory architecture to facilitate connection setup, that is, the switch module 3522 includes a common memory 3540. A common memory switch module having multiple input channels and multiple output channels, each channel having a capacity of the order of 10 Gb/s, may be shown to be realizable. In a common memory switch module, the input ports and the output ports sequentially access the common memory, each having an exclusive access (to write or read) during a designated time interval. Thus, the switch may be shown to be blocking-free and scheduling may be shown to be greatly simplified.

The capacity of a common memory switch is determined by the memory width (number of bits per word) and the memory access time. The sum of the number of input ports and number of output ports of a common memory switch module, where each input port or output port accesses the common memory during a designated interval of time of the same duration, is determined by the common-memory-switch cycle which is equivalent to one rotation phase of the circulating switch. The rotation cycle of the circulating switch includes a number of rotation phases at least equal to the number of switch modules. It is preferable to keep the duration of a rotation cycle below a predefined limit in order to reduce the maximum switching delay, which essentially equals the rotation-cycle duration. This, in turn, may impose an upper bound on the duration of a rotation phase. For example, with 256 switch modules, the rotation cycle includes at least 256 rotation phases. If a rotation phase takes place in a time slot of one microsecond, the maximum switching delay becomes approximately 256 microseconds. If the memory access time is selected to be 64 nanoseconds (write+read), the maximum number of dual ports of the switch module would be 16 (one microsecond divided by 64 nanoseconds).

Outer-Inner Expansion

With a balanced spatial distribution of traffic, where the flow rate from each switch module to each other switch module is almost the same, the proportion of data segments routed through an indirect connection traversing an intermediate switch module would be relative small; 0.2 for example. With a wide variation of the spatial distribution of traffic, a large proportion, 0.8 for example, of data segments may be routed through indirect connections. The use of indirect connections requires that an internal capacity expansion be provided where the inner capacity of each switch module exceeds its outer capacity. An internal expansion is also needed to offset the effect of occupancy-state mismatch of a time slot during which a source switch module connects to an intermediate switch module through a rotator, and the time slot during which the intermediate switch module connects to the sink switch module through a rotator.

With each inner port and each outer port having the same capacity in bits per second), the internal expansion is the ratio of the number of inner ports to the number of outer ports. In the switch module 3522 of FIG. 35, there are four ingress ports, eight inbound ports, four egress ports and eight outbound ports. The expansion ratio is then 2:1. An expansion ratio of 2 results in high performance under diverse spatial traffic distributions. However, a smaller expansion ratio, of 1.6 for example may be sufficient. For example, switch module 3500 may have five ingress ports, five egress ports, eight inbound ports, and eight outbound ports, resulting in an expansion ratio of 1.6. The eight inbound ports and eight outbound ports may connect to eight rotators.

Extended Circulating Switch

Figure 36:
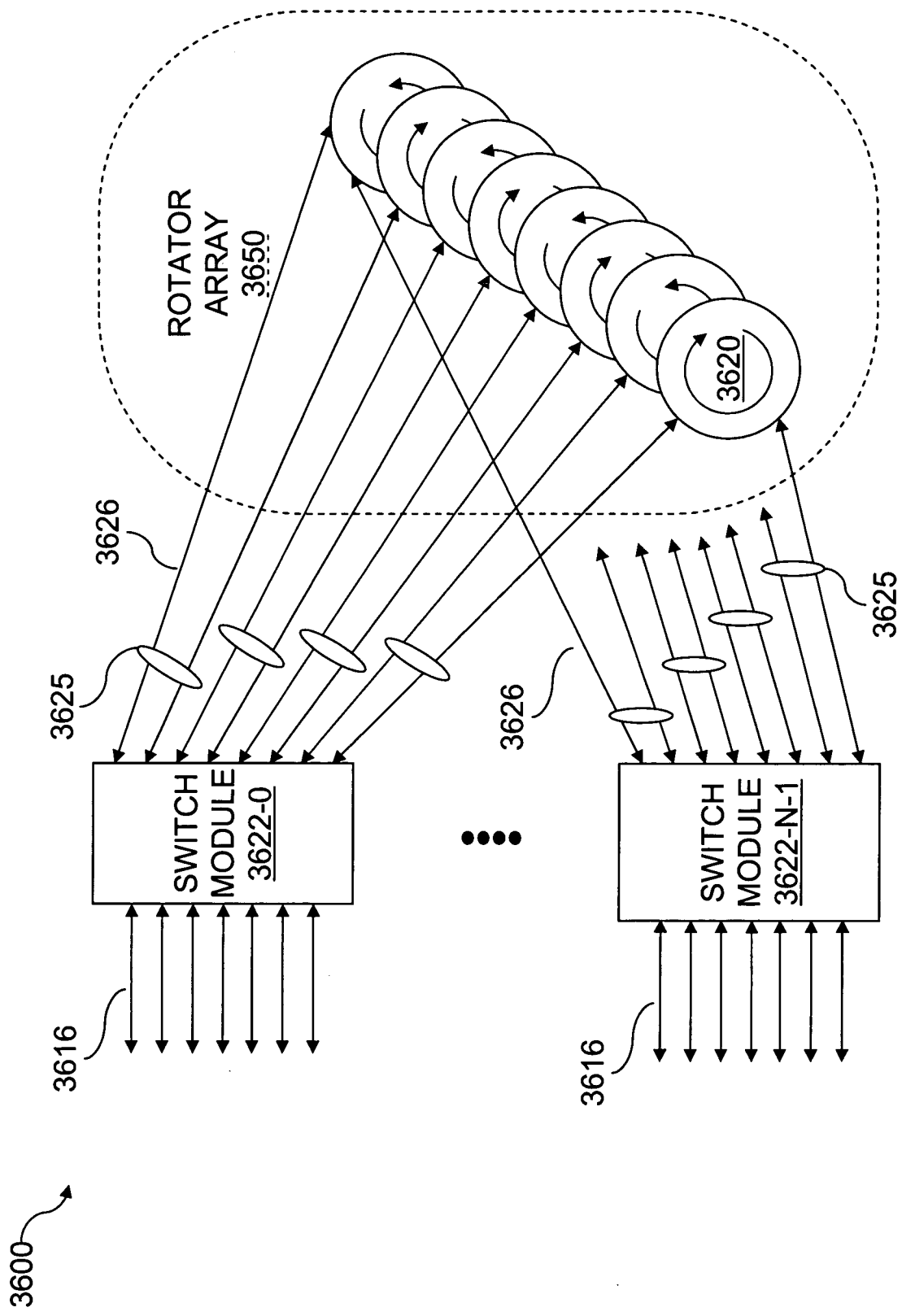
FIG. 36 illustrates an extended circulating switch having a plurality of switch modules and a plurality of rotators wherein the rotators are arranged in complementary pairs in accordance with an embodiment of the present invention.

FIG. 36 illustrates an extended circulating switch 3600 derived from the circulating switch 800 of FIG. 8 with the complementary pair of rotators 820X, 820Y replaced by an array of complementary pairs of rotators 3620 and the four switch modules 822 replaced by a number N of higher capacity, multi-port, common memory switch modules 3622-0, . . . , 3622-(N−1), referenced collectively or individually as 3622. The rotators 3620 are organized in a rotator array 3650.

Notably, a set of external dual channels 3616 connects the switch modules 3622 to data traffic sources and sinks and a set of internal dual channels 3626 connect the switch modules 3622 to the rotators 3620. The set of internal dual channels 3626 may be organized into channel pairs 3625, where one internal dual channel 3626 of a channel pair 3625 connects to a clockwise rotator of a complementary pair of rotators 3620 and the other internal dual channel 3626 of the channel pair 3625 connects to a counterclockwise rotator of the complementary pair of rotators 3620.

At each switch module 3622, during each rotation phase, there is one memory access interval for each ingress port for receiving data from subtending data traffic sources and there is one memory access interval for each outbound port for transmitting data through one of the rotators 3620. Likewise, there is one memory access interval for each egress port for transmitting data to subtending traffic sinks and there is one memory access interval for each inbound port for receiving data through one of the rotators 3620. A conventional common memory switch makes use of a wide memory through a data bus. In particular, at least two peripheral devices have interleaved access to the data bus, which is permanently connected to a data memory having at least the same width as the data bus.

The extended circulating switch 3600 of FIG. 36 may include 1,024 multiport, common memory switch modules 3622. Where, for example, each of the switch modules 3622 of FIG. 36 has an access capacity of 70 Gb/s, the entire extended circulating switch 3600 of FIG. 36 may have a total access capacity of 70 Tb/s using 1,024×1,024 rotators 3620.

The use of complementary pairs of rotators results in a constant switching delay for each directed switch module pair. That is, the delay from a first switch module 3622 to a second switch module 3622 through any intermediate switch module is the same for a given complementary pair of rotators 3620. The use of a complementary pair of rotators 3620 provides an opportunity to a given switch module 3622 to select a path from two paths having different switching delays.

Figure 37:
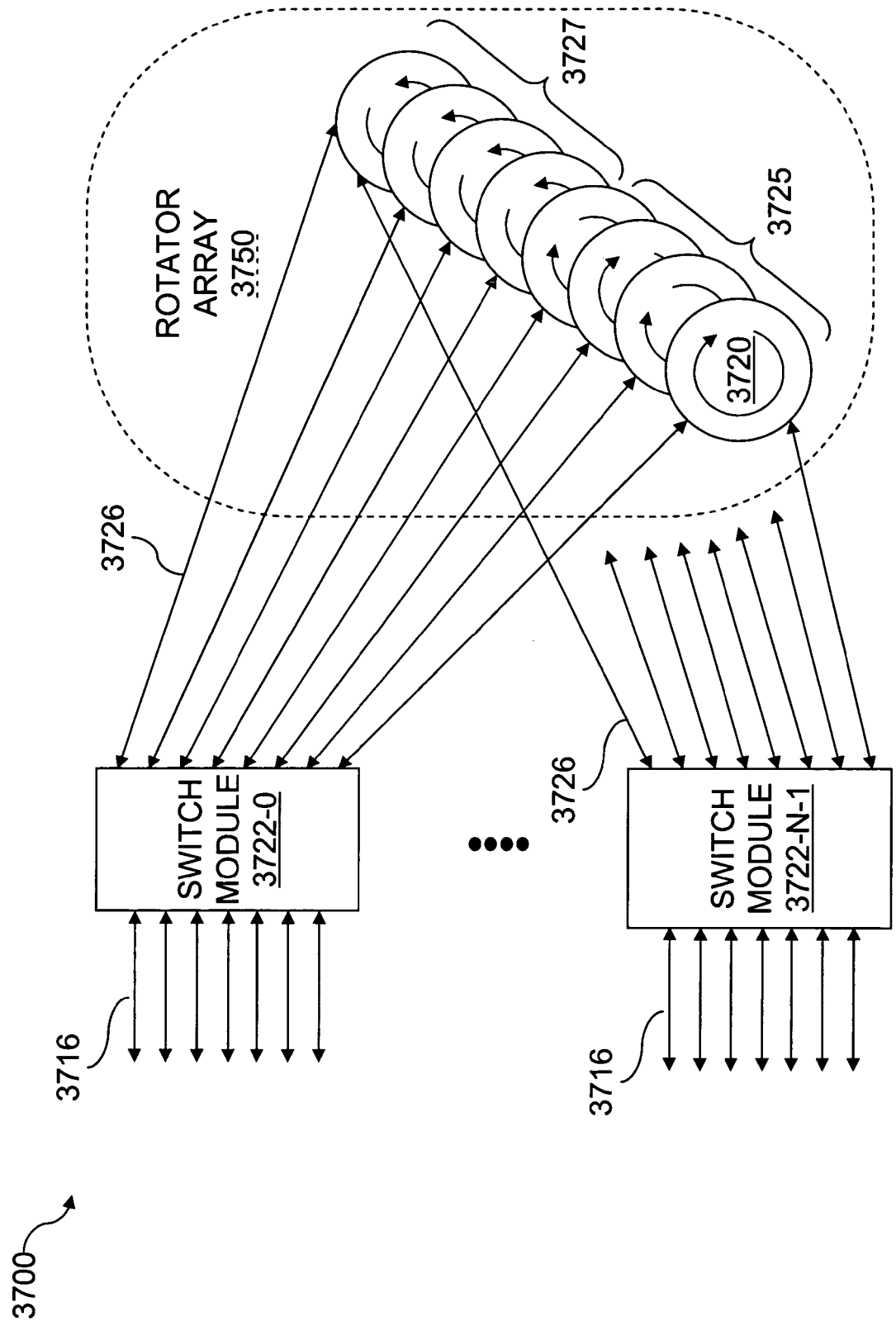
FIG. 37 illustrates an extended circulating switch having a plurality of switch modules and a plurality of rotators wherein the rotators are arranged two groups, one group including clockwise rotators and the other group including counterclockwise rotators, in accordance with an embodiment of the present invention.

FIG. 37 illustrates an extended circulating switch 3700 similar to that of FIG. 36. The extended circulating switch 3700 of FIG. 37 includes common memory switch modules 3722-0, . . . , 3722-(N−1) referenced collectively or individually as 3722. The switch modules 3722 are interconnected through a rotator array 3750 which includes a number, M>1, of rotators 3720. The main difference between the extended circulating switch 3600 of FIG. 36 and the extended circulating switch 3700 of FIG. 37 is that the rotators 3620 in FIG. 36 are arranged in complementary pairs wherein each clockwise rotator 3620 is associated with a counterclockwise rotator 3620 while the rotators 3720 in FIG. 37 are arranged in two complementary groups. A first group 3725 includes a first number of clockwise rotators 3720 and a second group 3727 includes a second number of counterclockwise rotators which may not equal the first number. An indirect connection may be routed through any rotator in the first group 3725 and any rotator in the second group 3727. Thus, the forward rotator 3720 may belong to the first group 3725, in which case the terminating rotator belongs to the second group 3727, and vice versa. A direct connection may use a rotator 3720 belonging to either of the two groups 3725, 3727. The direct connections may, for example, always use a rotator belonging to the first group and, consequently, the number of rotators 3720 in the first group would be selected to exceed the number of rotators 3720 of in the second group.

Controls of an Extended Circulating Switch

Figure 38:
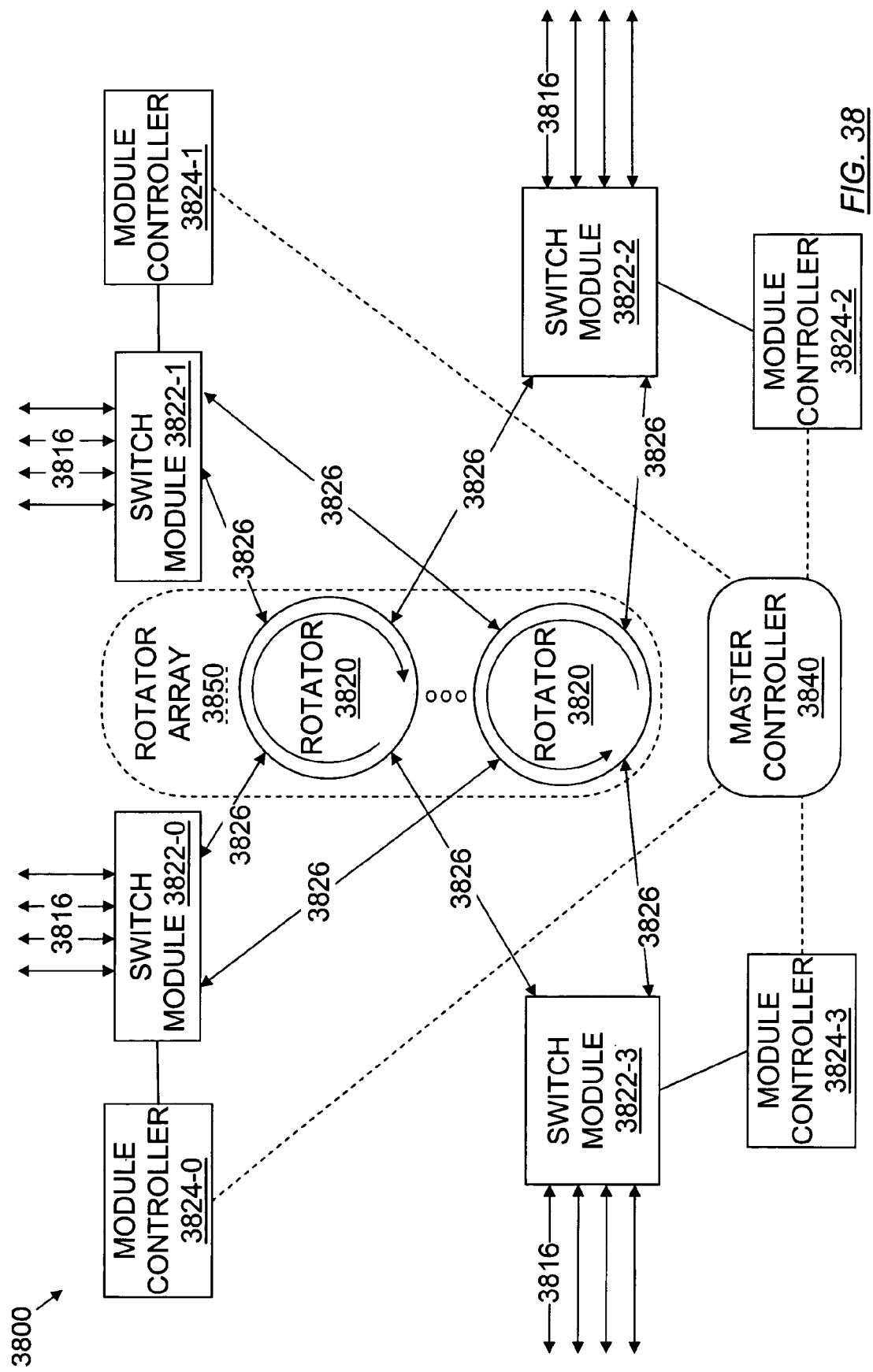
FIG. 38 is an illustration of the circulating switch of the type illustrated in FIG. 36 or FIG. 37 further including a switch module controller associated with each switch module and a master controller interfacing with each switch module controller, in accordance with an embodiment of the present invention.

FIG. 38 is an alternate representation, further illustrating control units, of an extended circulating switch of the type illustrated in FIG. 36 and FIG. 37. FIG. 38 illustrates an extended circulating switch 3800 having multiple rotators 3820 arranged in complementary groups within a rotator array 3850. The extended circulating switch 3800 of FIG. 38 also includes four common memory switch modules 3822-0, 3822-1, 3822-2, 3822-3 (collectively or individually 3822). The common memory switch modules 3822 connect to data traffic sources and sinks via a set of external dual channels 3816 and to the rotators 3820 via a set of internal dual channels 3826. Additionally, FIG. 38 illustrates that each switch module 3822-0, 3822-1, 3822-2, 3822-3 has a corresponding module controller 3824-0, 3824-1, 3824-2, 3824-3 (collectively or individually 3824). Control paths from each module controller 3824 to a master controller 3840 are also illustrated. The master controller 3840 serves to coordinate the data exchange among the switch modules 3822.

Figure 39:
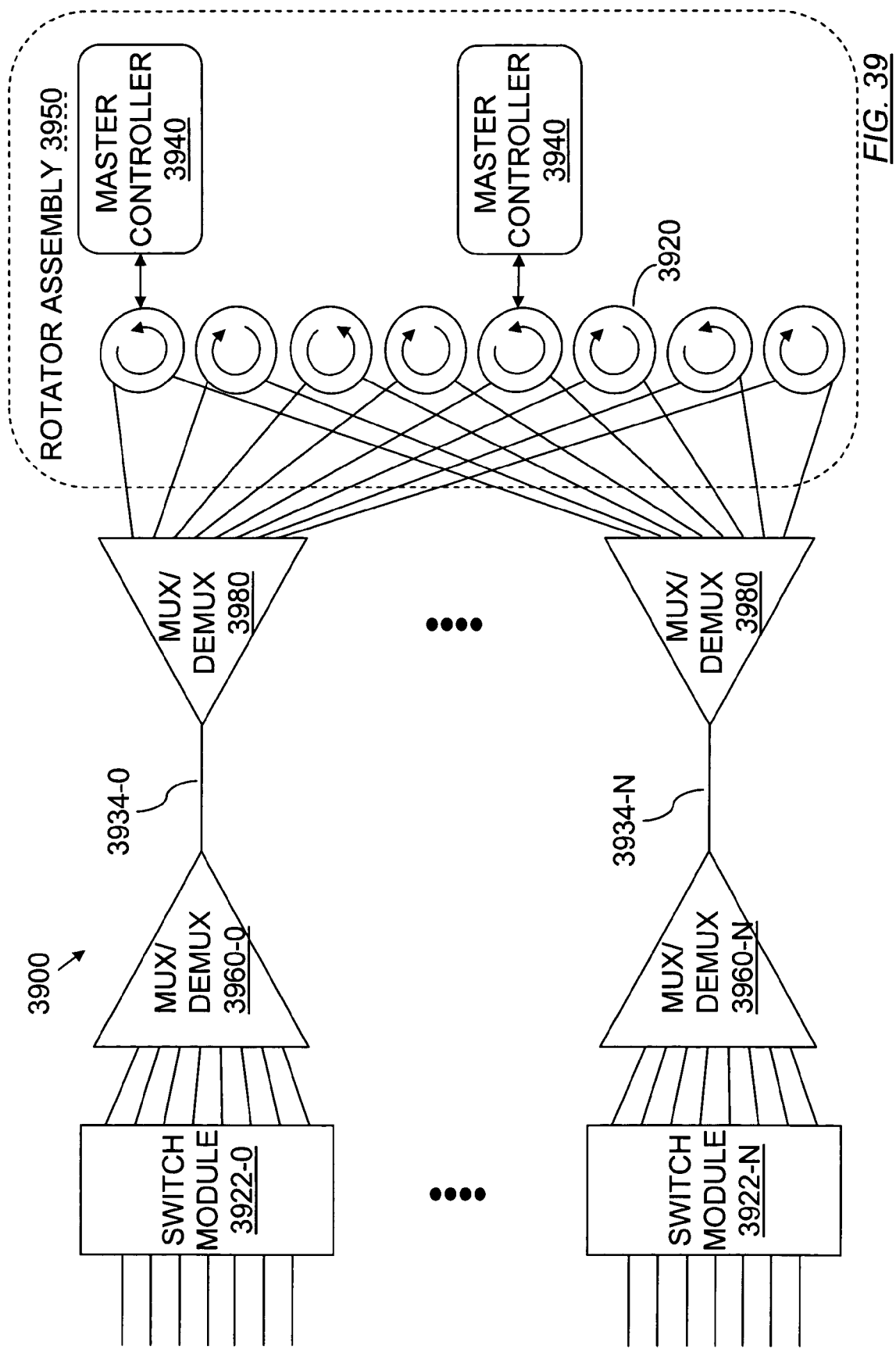
FIG. 39 illustrates a further extended circulating switch where an array of rotators is arranged in complementary pair of rotators and each switch module has a wavelength-division-multiplexed link to the array of rotators in accordance with an embodiment of the present invention.

FIG. 39 illustrates a further extended circulating switch 3900 where an array of rotators 3920 is arranged within a rotator assembly 3950 in complementary pairs of rotators or in two groups of rotators of opposite rotating directions. Connecting to the rotator assembly 3950 are a set of switch modules 3922-0, . . . , 3922-N (individually or collectively 3922). The electrical signal outgoing from each inner port of each switch module 3922 may be used to modulate an optical carrier of a specified wavelength resulting in a wavelength channel. Each switch module 3922 may be associated with one of an equal number of local combined multiplexer/demultiplexers 3960-0, . . . , 3960-N (individually or collectively 3960) and, at the rotator assembly 3950, with an assembly-based combined multiplexer/demultiplexers 3980-0, . . . , 3980-N (individually or collectively 3980). Each local combined multiplexer/demultiplexer 3960 and corresponding assembly-based combined multiplexer/demultiplexers 3980 may be connected by a corresponding one of a set of optical links 3934-0, . . . , 3934-N (individually or collectively 3934).

Signals from wavelength channels from a given switch module 3922-0 may be multiplexed in the corresponding local combined multiplexer/demultiplexers 3960-0 into a single wavelength-division-multiplexed optical signal transmitted on the corresponding optical link 3934-0 to the rotator assembly 3950.

At the rotator assembly 3950, the corresponding assembly-based combined multiplexer/demultiplexer 3980 separates the wavelength-division-multiplexed optical signal into individual wavelength channels and each of the individual wavelength channels is connected to one of the rotators 3920. Rotators 3920 may be photonic rotators.

Each assembly-based combined multiplexer/demultiplexer 3980 may also act to combine wavelength channels from the outlets of the rotators 3920 into a wavelength-multiplexed optical signal to be transmitted over the corresponding optical link 3934 to the corresponding local combined multiplexer/demultiplexer 3960. As indicated in FIG. 39, at least one master controller 3940 is associated with the rotator assembly 3950.

The switch modules 3922 may be collected with the rotator assembly 3950 and, hence, the difference in propagation delays along links 3934 from the switch modules 3922 to the rotator assembly 3950 may be negligible in comparison with the duration of a rotation phase. If the switch modules are not collocated with the rotator assembly 3950, but within a moderate proximity, the lengths of the links 3934 may be artificially equalized.

Memory Organization in a Multi-Port Switch Module

Figure 40:
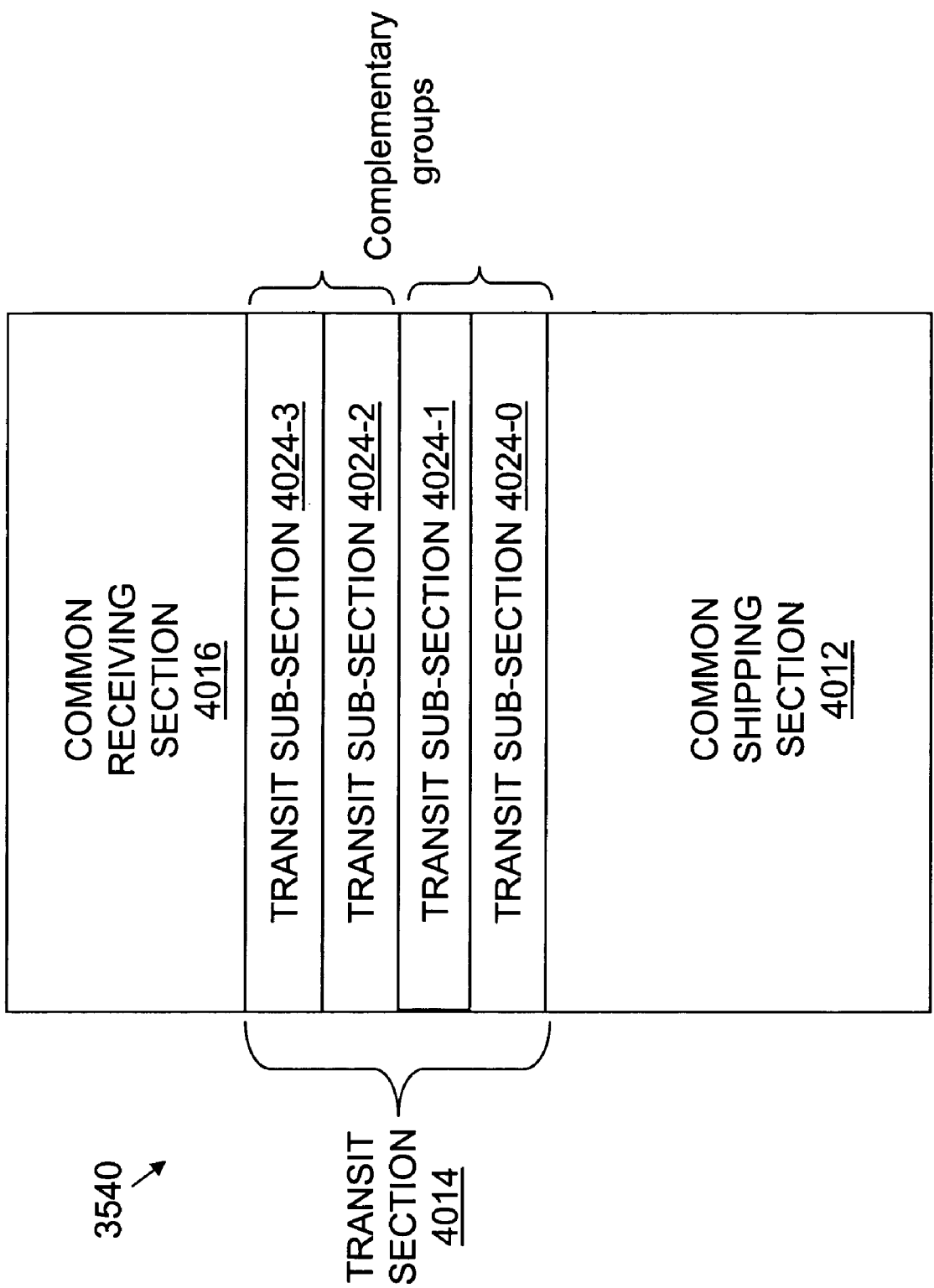
FIG. 40 illustrates an organization of a common memory used in the switch module of FIG. 35 where the transit sections are divided into two complementary groups, in accordance with an embodiment of the present invention.

FIG. 40 illustrates an organization of the common memory 3540 of the switch module 3522 of FIG. 35, which may be used in an extended circulating switch of the type illustrated in FIG. 36, FIG. 37, FIG. 38, or FIG. 39. In particular, the extended circulating switch of which the switch module containing the common memory 3540 is a part has four rotators. The common memory 3540 is logically divided into a common shipping section 4012, which contains data segments received from all ingress ports, a transit section 4014 and a common receiving section 4016 containing data segments received from all inbound ports. The transit section 4014 is illustrated as being subdivided into sub-sections 4024-0 to 4024-3 each corresponding to one of the rotators. During each rotation phase, a switch module transfers data segments to connecting switch modules. The common memory organization of FIG. 40 is analogous to that of FIG. 12.

Transposed Write-Read Operations

Figure 41B:
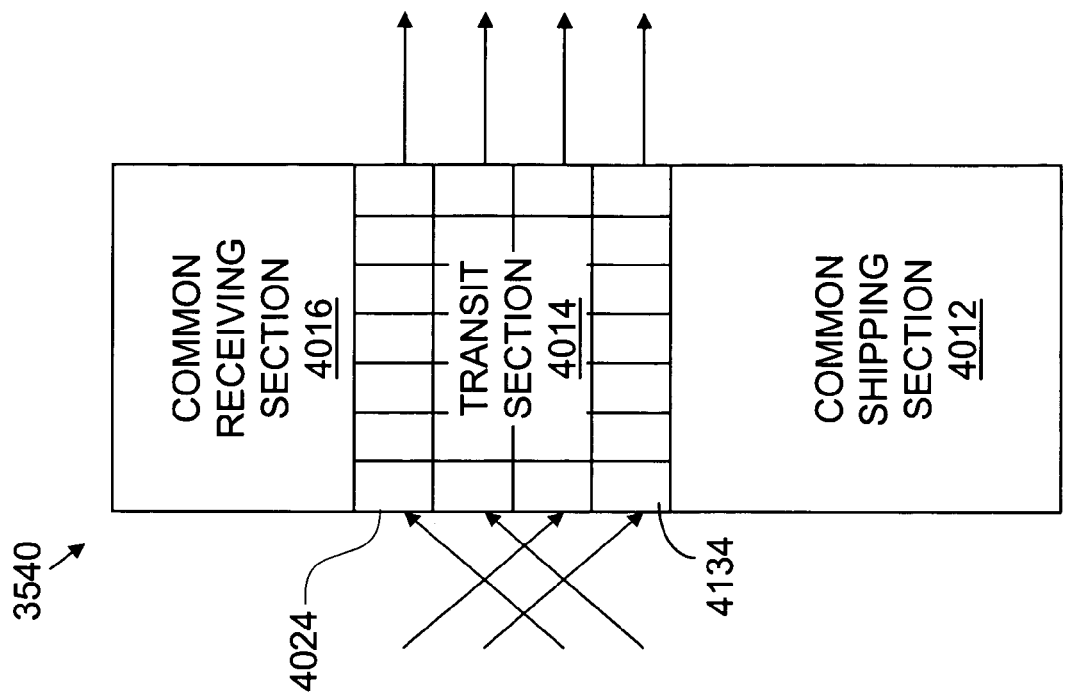
FIG. 41B illustrates transposed write-access of the common memory used in the switch module of FIG. 35 where the transit sections are arranged in complementary groups, in accordance with an embodiment of the present invention.
Figure 41A:
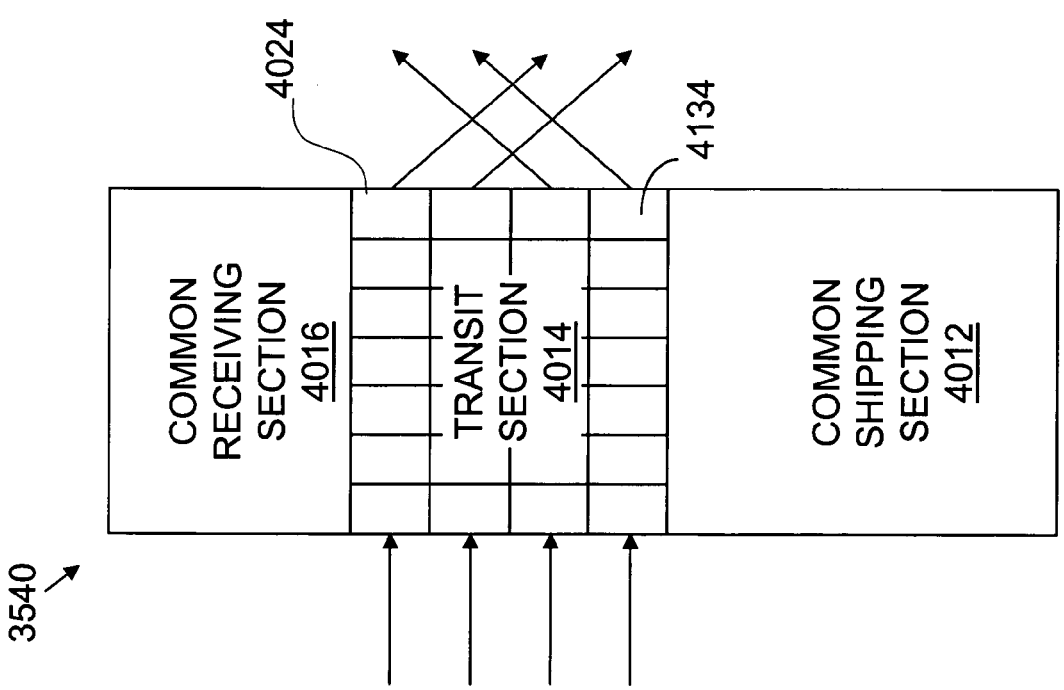
FIG. 41A illustrates transposed read-access of the common memory used in the switch module of FIG. 35 where the transit sections are arranged in complementary groups, in accordance with an embodiment of the present invention.

FIG. 41A illustrates a reading transposition wherein data segments written in two sub-sections 4024 of the transit section 4014 of the common memory 3540 in a nominal order by a complementary pair of rotators are transferred to a switch module in a transposed order. Alternatively, data segments may be written in the two sub-sections 4024 of the transit section 4014 by a complementary pair of rotators in a transposed order and transferred to a switch module in the nominal order, as depicted in FIG. 41B. Each subsection 4024 is further divided into transit divisions (memory slots) 4134, each transit division corresponding to a destination switch module.

As discussed hereinbefore, the switch module 3522 of FIG. 35 may comprise input ports, output ports and the common memory 3540 shared by the input and output ports. Each input port has an exclusive write access to the common memory 3540 during a designated interval in each rotation phase and each output port has an exclusive read access to the common memory 3540 during a respective designated interval within a rotation phase.

Rotation Phase Organization in a Multi-Port Switch Module

Figure 42:
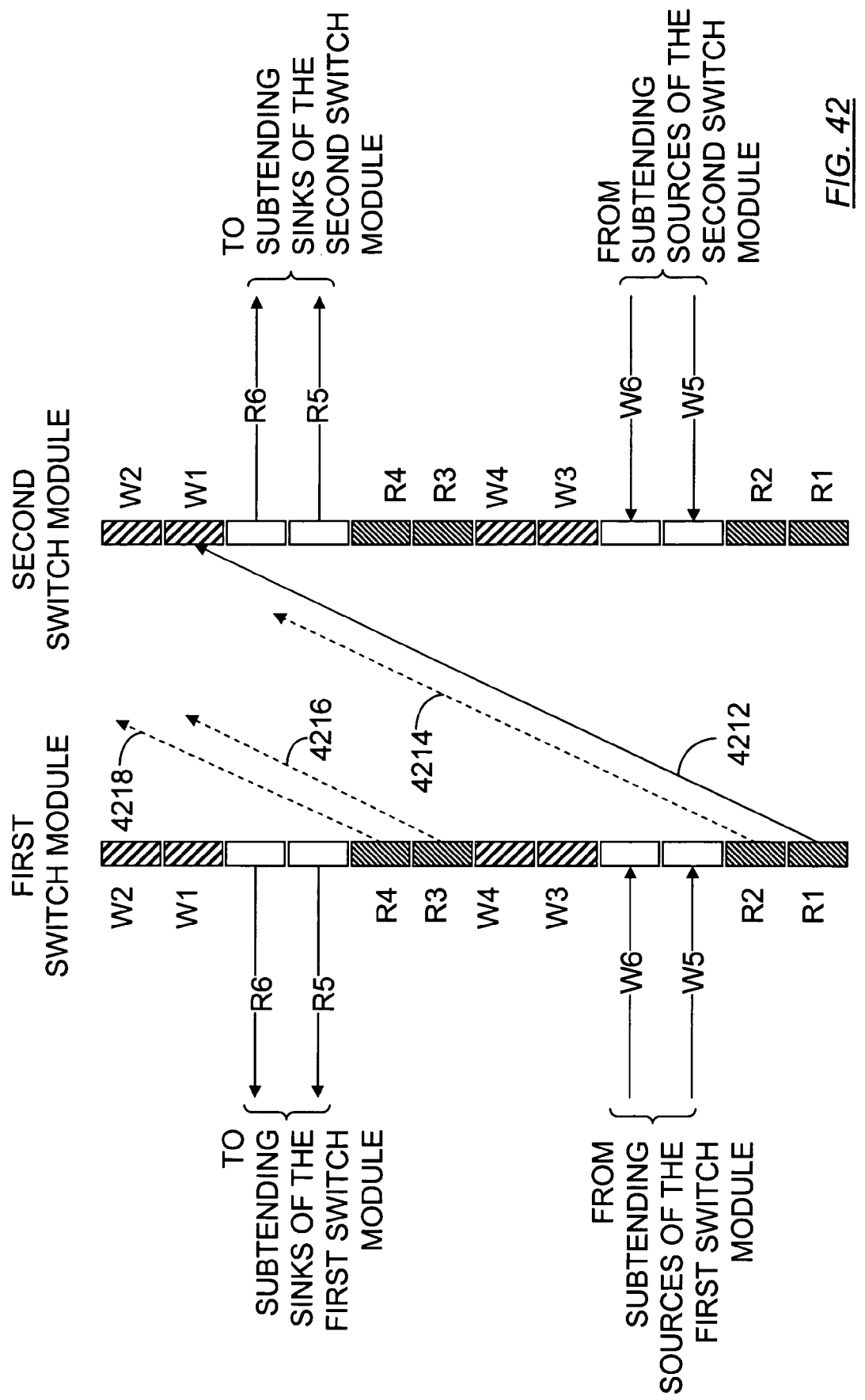
FIG. 42 illustrates the division of a rotation phase into switching intervals each designated to an input port or an output port of a switch module of FIG. 35, in accordance with an embodiment of the present invention.

FIG. 42 illustrates the division of a rotation phase into intervals, each interval dedicated to an input port or an output port for a switch module of the type illustrated in FIG. 35, having two ingress ports for receiving data from subtending data sources, two egress ports for transmitting data to subtending data sinks, four outbound ports for transmitting data across rotators, and four inbound ports for receiving data through rotators. Notably, the switch module may have an odd number of outbound ports or inbound ports and may connect to an odd number of rotators. For example, if five rotators are used, three of the rotators may be clockwise rotators with two counterclockwise rotators, or vice versa.

With three clockwise rotators and two counterclockwise rotators, direct connections are preferably made through a clockwise rotator. Likewise, with three counterclockwise rotators and two clockwise rotators, direct connections are preferably made through a counterclockwise rotator.

Thus, a rotation phase may be divided into 12 intervals (12 time slices), preferably of equal duration, with each interval at least equal to the duration of a data segment. Where the circulating switch of which the switch module of interest is a part has eight switch modules, the eight switch modules may be time aligned during each rotation phase. Using identical division of the rotation phase, the common memories of the eight switch modules would be operated in a read mode simultaneously or in a write mode simultaneously. The rotators are memoryless and, therefore, data registers would be needed for alignment.

FIG. 42 illustrates the timing of data transmission in a connection from an outbound port of a first switch module to an inbound port of a second switch module, where each of the switch modules has a structure of the type of the switch module illustrated in FIG. 35.

As indicated in FIG. 42, a rotation phase may be divided into 12 intervals labeled W1, W2, W3, W4, W5, W6, R1, R2, R3, R4, R5 and R6. During the intervals W5 and W6, data may be received from subtending data traffic sources and written in the shipping section of the data memory of the first switch module. During the intervals R5 and R6, data may be read from the receiving section of the data memory of the first switch module and transmitted to data traffic sinks subtending to the first switch module. During the intervals W1, W2, W3 and W4, data may be received from a connecting switch module and written in the receiving section or transit section of the data memory of the first switch module. During the interval R1, data may be read from the shipping section of the first switch module and transmitted (see 4212) to the transit section or the receiving section of the data memory of the second switch module through one of the rotators. During the interval R2, data may be read from the shipping section of the first switch module and transmitted (see 4214) to the transit section or the receiving section of the data memory of a third switch module through another one of the rotators. During the interval R3, data may be read from the transit section (or the shipping section if the corresponding memory slot in the transit section is empty) of the data memory of the first switch module and transmitted (see 4216) to the receiving section of the data memory of a fourth switch module through the one of the rotators. During the interval R4, data may be read from the transit section (or the shipping section if the corresponding memory slot in the transit section is empty) of the data memory of the first switch module and transmitted (see 4218) to the receiving section of the data memory of a fifth switch module through another one of the rotators. Depending on the rotation patterns of the four rotators, the four paths from the first switch module may partially or totally coincide during a given rotation phase.

Common-Memory Structure

Figure 43:
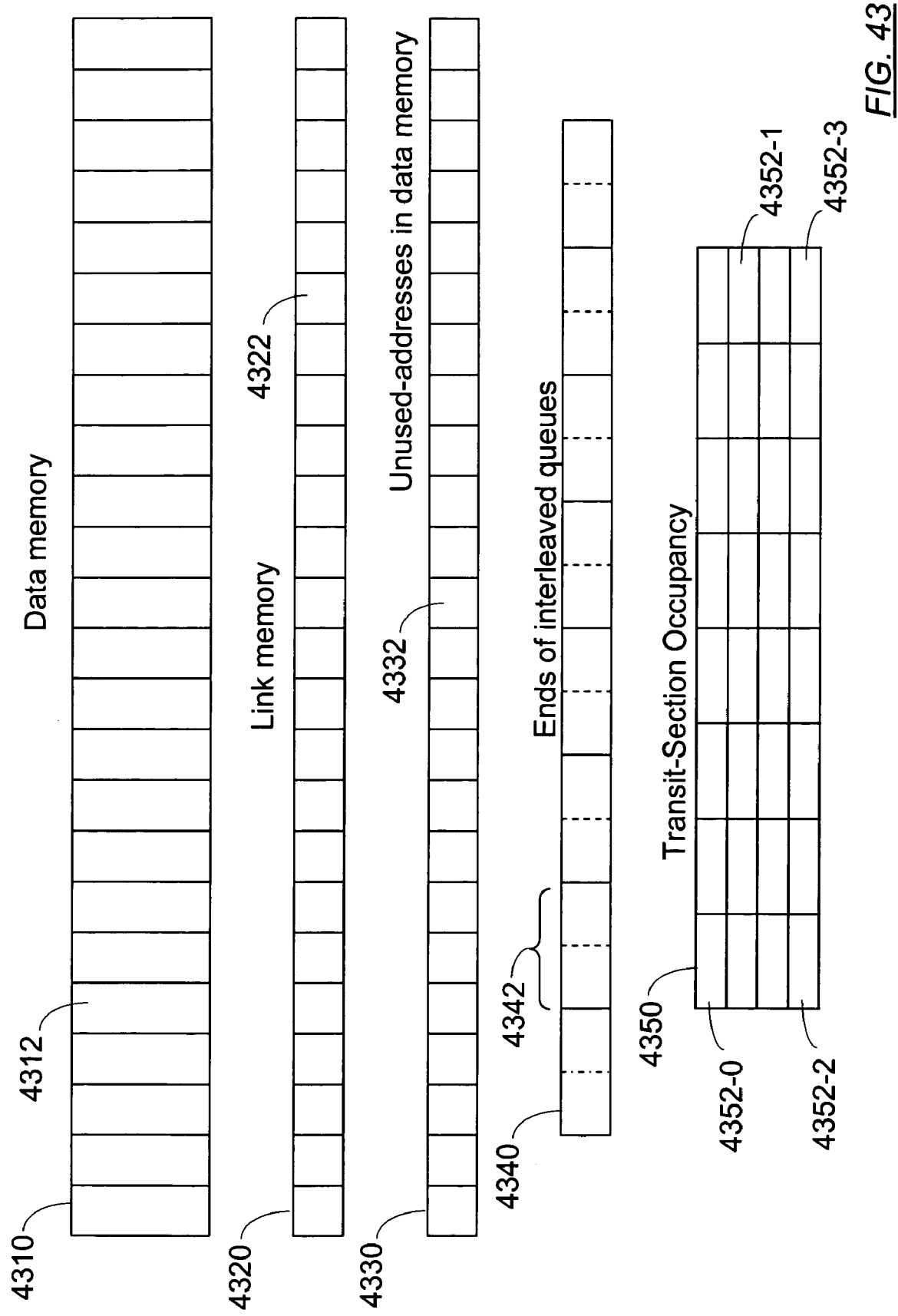
FIG. 43 Illustrates the organization of memory devices collectively forming a common memory of the switch module of FIG. 35 and having the organization described in FIG. 40 where the switch module is used in the extended circulating switch of FIG. 36 or FIG. 37, in accordance with an embodiment of the present invention.

As discussed hereinbefore, a switch module of the extended circulating switch 3600, 3700 of FIG. 36 or FIG. 37 is preferably implemented as a non-blocking switch, such as a common memory switch. A common memory switch may comprise a set of individual memory devices which may be accessed independently to perform data insertion and deletion. The common memory 3540 of FIG. 35 may comprise five memory devices, including one memory device to store the data to be switched and four associated memory devices used for the control of the switching process. FIG. 43 illustrates an exemplary organization of the common memory 3540 of the switch module 3522 of FIG. 35.

A first memory device 4310 stores data segments belonging to a plurality of data streams in memory locations an exemplary one of which is indicated as 4312. A data stream may be defined according to an originating switch module, a terminating switch module, and, optionally, a flow-rate specification. Data segments belonging to the shipping section 4012 and the receiving section 4016 of the common memory 3540 (FIG. 40) are stored in an interleaved fashion in the first memory device 4310. Data segments belonging to the transit sections 4014 are preferably stored in pre-assigned addresses in the first memory 4310. The number of pre-assigned addresses equals the number of transit divisions 4134, which, in turn, equals the number of rotators multiplied by the number of switch modules (or the number of switch modules minus one because the transit section is not used for self-connection of any switch module).

A second memory device 4320 is used to link data segments of the same data stream. There is a one-to-one correspondence between the addresses of the second memory device 4320 and the addresses of the first memory device 4310. If an address in the first memory device 4310 contains a data segment of a specified data stream, the corresponding address in the second memory device 4320 contains, in a memory location an exemplary one of which is indicated as 4322, either a null entry, if the data segment is the last in the specified data stream, or a pointer to a subsequent data segment, if the data segment is followed by another belonging to the same data stream.

A third memory device 4330 stores, in memory locations an exemplary one of which is indicated as 4332, a circular queue of unused addresses in the first memory device 4310. A circular queue occupies consecutive addresses in the third memory device 4330 and data segments are queued in consecutive memory addresses with the last address in the memory followed by the first address. Two pointers (not illustrated) are associated with the third memory device 4330; a first pointer indicates the address in the third memory device 4330 of the head of the circular queue and a second pointer indicates the address of the end of the circular queue. A received data segment is stored in the first memory at an address read from the head of the circular queue. If the circular queue is empty, indicating that all locations in memory device 4310 are in use, the received data segment is discarded. The address of a data segment that is removed from the first memory device 4310 is inserted in the third memory device 4330 following the end of the circular queue.

A fourth memory device 4340 stores, in memory locations an exemplary one of which is indicated as 4342, for each data stream, an address in the first memory device 4310 at which a received data segment belonging to the data stream is written and an address in the first memory device 4310 of the head data segment of the data stream.

A fifth memory device 4350 stores the occupancy state of each of the pre-assigned addresses in the first memory device 4310. The fifth memory device 4350 includes a row 4352-0, a row 4352-1, a row 4352-2 and a row 4352-3 (individually or collectively 4352). Each row 4352 in the fifth memory device 4350 indicates the occupancy of corresponding addresses pre-assigned to a transit sub-section 4024. Row 4352-0 corresponds to transit sub-section 4024-0, row 4352-1 corresponds to the first transit sub-section 4024-2, etc. Each row 4352 includes one entry corresponding to each switch module in the corresponding extended circulating switch.

The data segments of the shipping section 4012 at each switch module may be sorted according to their data-stream association to facilitate proper routing to the sink switch modules. The data segments of the receiving section 4016 at each switch module may be stored in a single queue. A subsequent step of sorting the data segments of the single queue into sub-queues, based on the originating switch modules or some other classification, may be further applied.

The data segments of the receiving section of the common memory may be stored in a single linked queue if the data segments are received in the proper sequential order, as in the case described above with reference to FIG. 43. A circulating switch using complementary rotators where an indirect connection is routed through a forward clockwise rotator and a terminating counterclockwise rotator, or vice versa, guarantees the delivery of data segments of the receiving section of each switch module in the proper sequential order. However, as described above with reference to FIGS. 27 to 30, when a single rotator is used in a circulating switch, data segments originating from the same source switch module and routed through different intermediate switch modules may be received in an improper temporal order at the respective sink switch module. The data memory of a switch module may be organized as indicated in FIG. 12. A simple method of storing data segments in the receiving section 1216 (FIG. 12) so that the data segments can be read in the same order in which they were transmitted from their source switch modules is described below with reference to FIGS. 45 and 46.

Figure 44:
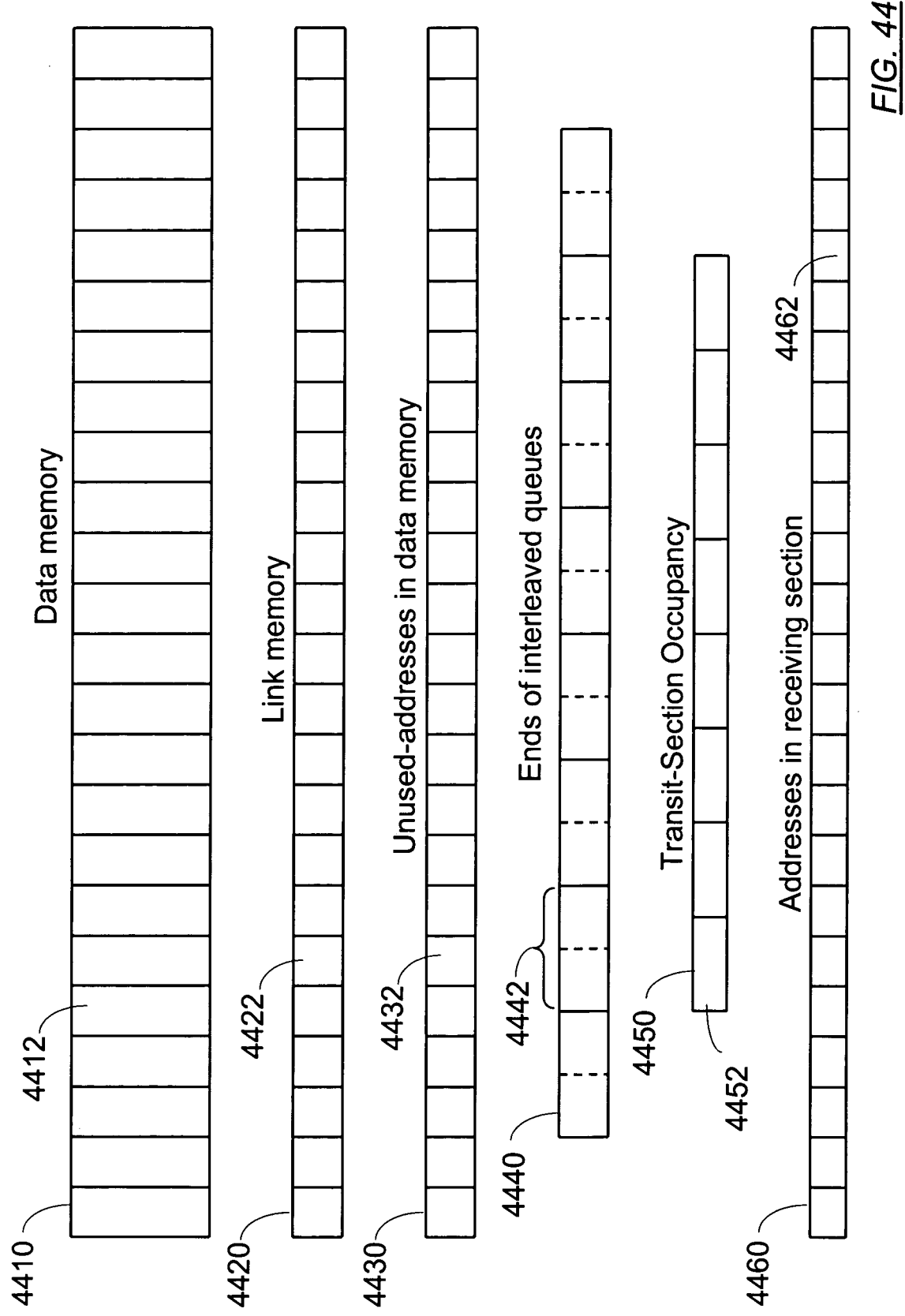
FIG. 44 illustrates the organization of memory devices collectively forming a common memory in each switch module of a circulating switch of the single-rotator type illustrated in FIG. 4, in accordance with an embodiment of the present invention.

As illustrated in FIG. 44, a common memory of a switch module used in a circulating switch of the type illustrated in FIG. 4 having a single rotator may comprise six memory devices, one memory device to store the data to be switched, and five associated memory devices used for the control of the switching process.

A first memory device 4410 stores data segments belonging to a plurality of data streams, in memory locations an exemplary one of which is indicated as 4412. The organization of first memory device 4410 differs slightly from that of the first memory device 4310 of FIG. 43. Data segments belonging to the shipping section 1212 (FIG. 12) are stored in the first memory device 4410 of FIG. 44 in an interleaved fashion. Data segments belonging to the receiving section 1216 are also stored in the first memory device 4410 in an interleaved manner. However, the dequeueing of the data segments from the receiving section is performed according to sequential-order indications in an addressing memory 4460. Data segments belonging to the transit section 1214 are preferably stored in pre-assigned addresses in the first memory device 4410. The number of pre-assigned addresses equals the number of switch modules (or the number of switch modules minus one, because self-connection through a rotator is not required).

A second memory device 4420 is used to link data segments of the same data stream in a manner similar to that of FIG. 43. That is, if an address in the first memory device 4410 contains a data segment of a specified data stream, the corresponding address in the second memory device 4420 contains, i a memory location an exemplary one of which is indicated as 4422, either a null entry, if the data segment is the last in the specified data stream, or a pointer to a subsequent data segment, if the data segment is followed by another belonging to the same data stream.

A third memory device 4430 stores, in memory locations an exemplary one of which is indicated as 4432, a circular queue of unused addresses in the first memory device 4410 in a manner similar to that of memory device 4310 of FIG. 43, with two pointers used to indicate the head and end of the circular queue. An empty circular queue indicates a fully occupied data memory 4410.

A fourth memory device 4440 is similar to fourth memory device 4340 of FIG. 43. The fourth memory device 4440 stores, in memory locations an exemplary one of which is indicated as 4442, for each data stream, an address in the first memory device 4410 at which a received data segment belonging to the data stream is to be written and an address in the first memory device 4410 of the head data segment of the data stream.

A fifth memory device 4450 stores, in memory locations an exemplary one of which is indicated as 4452, the occupancy state of each of the pre-assigned addresses in the first memory device 4410. The fifth memory device 4450 indicates the occupancy of addresses pre-assigned to the transit section 1214.

The addressing memory 4460, that includes memory locations an exemplary one of which is indicated as 4462, is used to ensure that data segments are dequeued from the receiving section 1216 in the proper sequential order. A method used for this purpose is described hereinafter.

The exchange of data segments among the switch modules takes place according to a schedule computed by the master controller of the circulating switch. The master controller determines the number of data segments, and the time at which each data segment is to be sent, for each directed switch module pair. Consequently, each switch module can be made aware of the number of data segments to send to each other switch module and the number of data segments to receive from each other switch module during each rotation cycle. Such information may be needed for quality-control purposes.

Each switch module may also associate a sequential number with each data segment it sends to a specific destination switch module. The sequential number is preferably reset to zero at the start of each rotation cycle. Alternatively, the master controller of the circulating switch may assign cyclical sequential numbers, to be reset to zero at the beginning of each rotation cycle, for all data segments destined to a switch module. The cyclical sequential numbers assigned to each switch module, are independent of the cyclical sequential numbers assigned to each other switch module. Consecutive data segments received at a given switch module may originate from different switch modules. The data segments placed in the receiving section 1216 may further be sorted according to their source switch module. This would require appending an identifier of the source switch module to each cyclic sequential number.

Thus, during each rotation cycle, each switch module may receive data segments destined to subordinate data sinks and place them in the receiving section 1216 at an address determined by a respective sequential number. The data segments may not arrive in proper sequential order. For example, a data segment numbered 9 may arrive at a switch module before a data segment numbered 2, where the two data segments belong to the same stream. In one extreme, the highest sequential number assigned to a data segment of any data stream may equal the number of switch modules minus two (i.e., the number of intermediate switch modules for any directed switch module pair). The number of data segments for any data stream attains such a high value if the source switch module of the data stream communicates exclusively with the sink switch module of the data stream. In another extreme, a source switch module may send data streams of equal spatial distribution so that, during a rotation cycle, the source switch module would send one data segment to each other switch module through direct connections and the need for indirect connections, each traversing an intermediate switch module, is eliminated. Under typical spatial traffic distribution, a source switch module may send a varying number of data segments to a sink switch module, and this varying number would typically be much smaller than the number of switch modules in a circulating switch having several switch modules.

Figure 45:
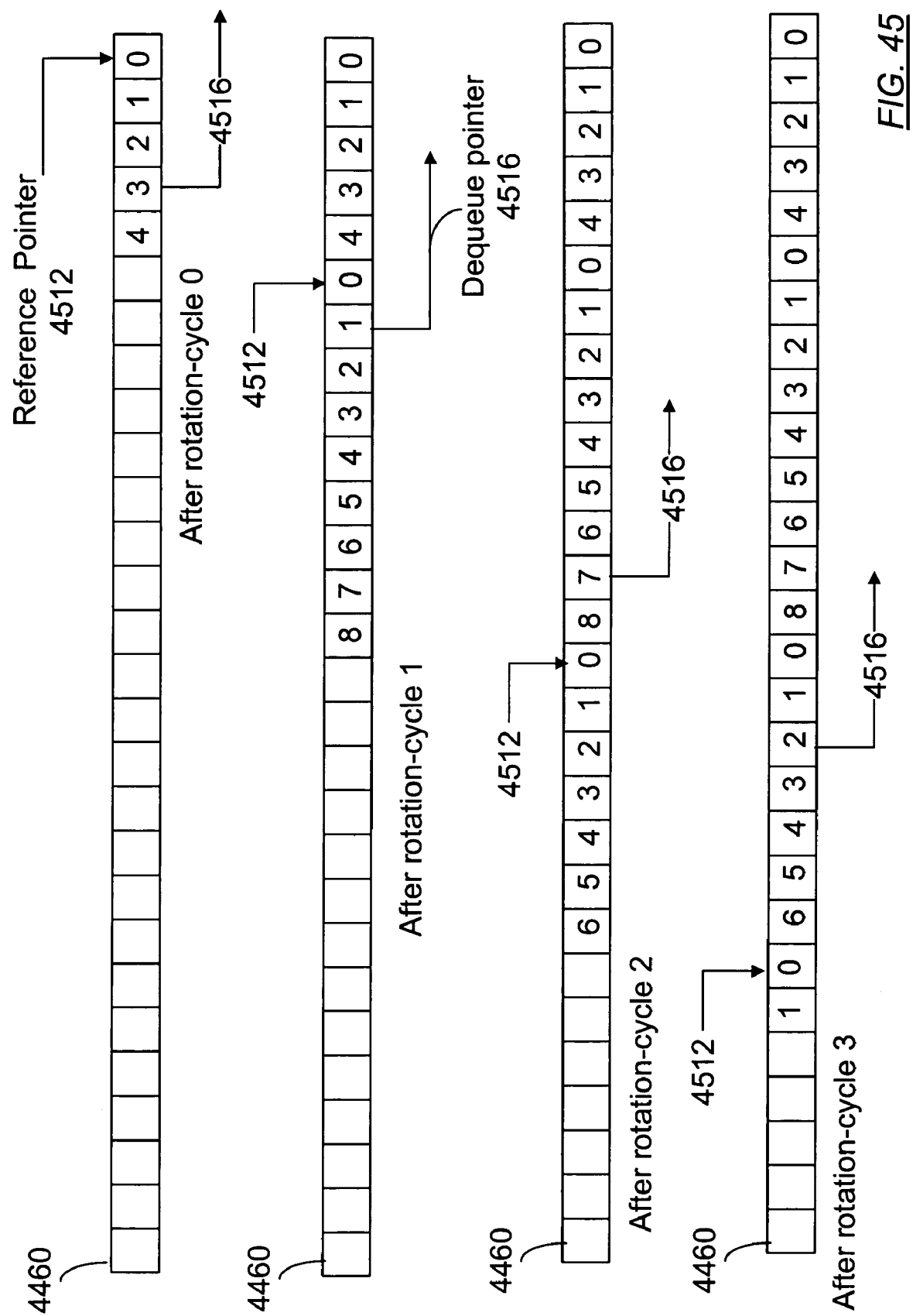
FIG. 45 illustrates a process for storing data segments in the common memory of each switch module of a circulating switch of the single-rotator type illustrated in FIG. 4 where the data segments may be received out of order, in accordance with an embodiment of the present invention.

Turning to FIG. 45, to handle any spatial traffic distribution, a reference pointer 4512, associated with the addressing memory 4460 at each switch module, is updated after each rotation cycle by adding the number of data segments that the switch module receives during the rotation cycle. The data segments are placed in the data memory (the first memory device 4410 of FIG. 44) in a linked fashion and the particular address in the first memory device 4410 is written at an address in the addressing memory 4460 corresponding to the sequential number of the data segment. The addressing memory 4460 is initialized by a null value at each entry.

A dequeue pointer 4516 associated with the addressing memory 4460 points to a current entry in the addressing memory 4460 containing an eligible address in the first memory device 4410 containing the next data segment to be dequeued for delivery to a subtending data sink. When the data segment is dequeued, a null value is written in the current entry in the addressing memory 4460. The data segments may arrive in a wrong temporal order and, hence, the current entry may contain a null value, indicating that the respective data segment has not yet been received. The dequeueing process may then be halted until the current entry contains a valid address of the data memory. Thus, data segments received in the wrong temporal order can be read from the receiving section in the proper order. The maximum delay resulting from encountering a null entry is a rotation cycle. It may be shown, however, that the maximum delay would occur with a negligible probability.

Figure 46:
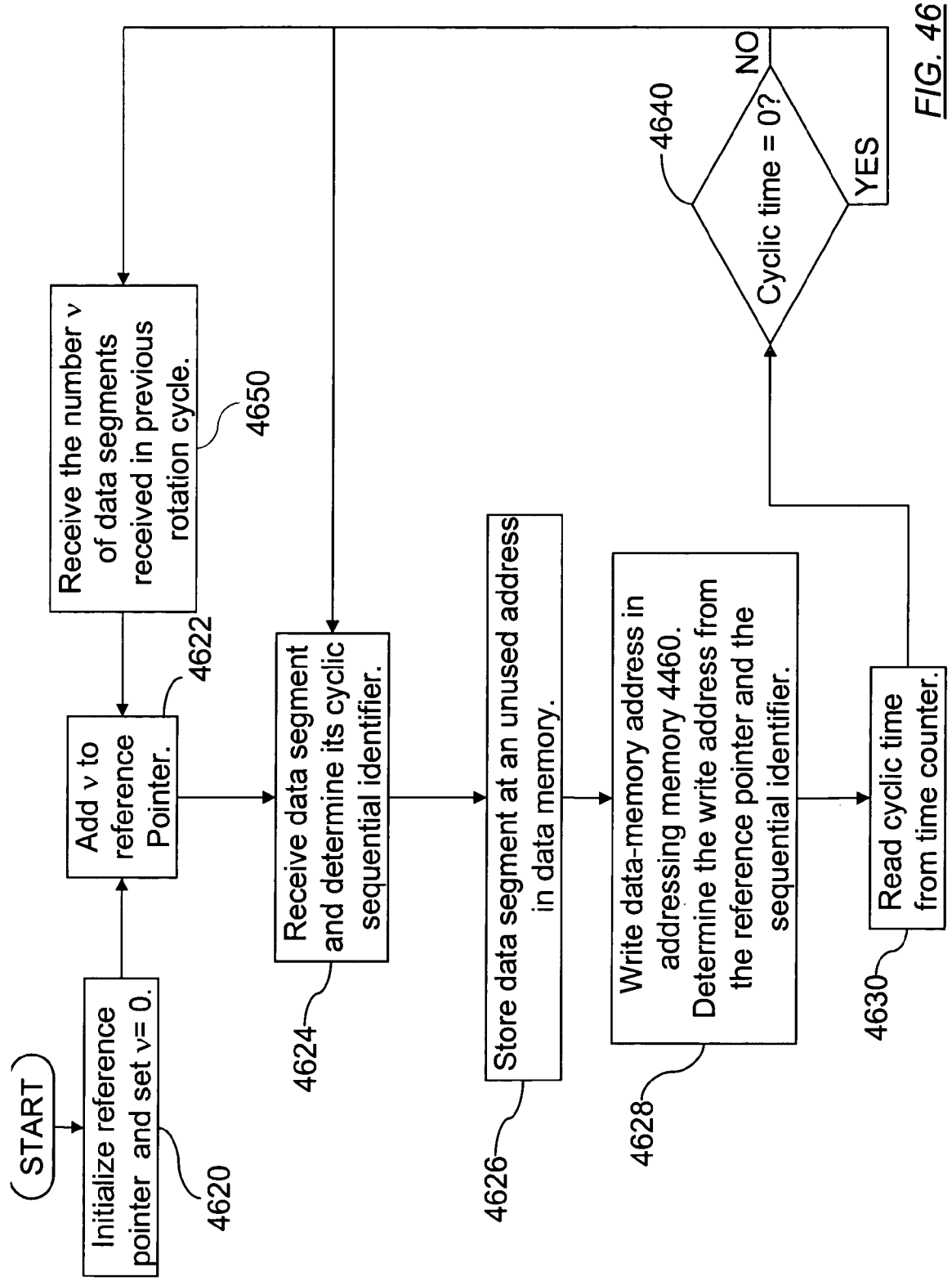
FIG. 46 is a flow chart detailing the process of FIG. 45.

FIG. 46 is a flow chart detailing the steps in a process of storing data segments, in the first memory device 4410 of FIG. 44, of a given data stream that may be received in the wrong temporal order. The reference pointer 4512 is initialized to equal a designated address in the first memory device 4410 and the number, v, of data segments received during the immediately preceding rotation cycle is set to zero (step 4620). In step 4622, the reference pointer 4512 is updated by adding the number, v, of data segments received in the immediately preceding rotation cycle. In step 4624, a data segment is received and the cyclic sequential number of the received data segment is determined. Recall that the sequential number is reset to zero at the beginning of each rotation cycle. In step 4626, the received data segment is stored at an unused address in the first memory device 4410 as described above with reference to FIG. 44. In step 4628, the address in the first memory device 4410 at which the received data segment is stored is written in the addressing memory 4460 at an address determined as the sum of the reference pointer and the cyclic sequential number of the data segment. In step 4630, the cyclic time is read from a time counter having a period equal to the period of the rotation cycle. In step 4640, it is determined whether the cyclic time is equal to zero. If the cyclic time is not equal to zero, a new data segment may be received (step 4624). Otherwise, if it is determined in step 4640 that the cyclic time equals zero, indicating the beginning of a new rotation cycle, step 4650 is executed where an indication of the number, v, of data segments allocated for the completed rotation cycle is received from the master controller. The number, v, may also be determined as the largest data-segment sequential number for the completed rotation cycle. The value of v cannot exceed the number of rotation phases per rotation cycle multiplied by the maximum number of data segments transmitted across the rotator per rotation phase.

The reference pointer 4512 is then updated in step 4622 by increasing the reference pointer by the number, v, of the received data segments.

Polyphase Rotating-Access Switch

The switching delay in the rotating-access switch 200 of FIG. 2, employing the rotator space switch 220, which is illustrated in greater detail in FIG. 3, is systematic and has a constant value for each directed switch module pair (ingress switch module 210, egress switch module 211). The delay value varies from a single rotation phase to a complete rotation cycle. For example, when the second ingress switch module 210-1 transmits to the first egress switch module 211-0 through the clockwise input rotator 327, the delay is only a single rotation phase, typically a fraction of a microsecond. However, when the first ingress switch module 210-0 transmits to the second egress switch module 211-1, the transmitted data remains in the transit memory 324-0 for (N−1) rotation phases, N being the number of transit memory devices 324. When N is large, 4096 for example, and with a rotation phase of 80 nanosecond duration, for example, a switching delay of about 328 microseconds would be experienced by certain ingress-egress switch-module pairs and a switching delay of only one rotation phase (80 nanoseconds in this example) would be experienced by other ingress-egress switch-module pairs.

Two measures may be taken to reduce the systematic switching delay. The first, and obvious, measure is to limit the number of transit memory devices 324, which implies limiting the capacity of the rotating-access switch 200. The second measure is to use parallel rotator space switches, each rotator space switch having a smaller number of transit memory devices 324, and to use higher-capacity ingress and egress switch modules, each switch module having a channel connecting to each rotator space switch. As described earlier, a rotator space switch comprises an array of transit memory devices 324 connecting an input rotator (a primary rotator) 327 to an output rotator (a secondary rotator) 337. Thus, a 4096×4096 rotating-access switch having 4096 transit-memory devices 324 may be replaced by a switch comprising four 1024×1024 rotator space switches, 1024 ingress switch modules each having one channel to each of the four rotator space switches, and 1024 egress switch modules each having one channel from each of the four rotator space switches.

The capacity of each ingress switch module may then be increased, and similarly the capacity of each egress switch module may also be increased, by a factor of four. With a typical channel capacity of 10 Gb/s, the required ingress switch module capacity would be 40 Gb/s. Likewise, the required capacity of each egress switch module would be 40 Gb/s. Preferably, ingress switch modules and egress switch modules are paired in integrated switch modules (not illustrated). The required capacity of an edge module would then be 80 Gb/s. An integrated switch module with such a capacity may be realized as a common memory switch.

The switching delay in the above described parallel-rotator-switch architecture can be further reduced by operating the rotator space switches at different phases, thus resulting in different switching delays for any directed switch module pair across the rotator space switches. A connection is preferably switched through the same rotator space switch and the rotator space switch yielding the least-delay available path is selected.

Latent Space Switches

The prior-art switching node 100 of FIG. 1 comprises ingress modules 110 and ingress modules 111 interconnected by a memoryless space switch 120. The prior-art rotating-access switch of FIG. 2 replaces the memoryless space switch 120 with a rotator space switch 220 which is further illustrated in FIG. 3. In general, the memoryless space switch 120 may be replaced by a latent space switch characterized by a deterministic switching delay for each ingress-egress module pair. The rotator space switch 220 is a realization of a latent space switch.

The switching node 100 of FIG. 1 may be extended to include several memoryless space switches, with each ingress module 110 and each egress module 111 having access to each of the memoryless space switches. Likewise, a switching node may include several latent space switches, with each ingress module and each egress module having access to each of the latent space switches. Each of the latent space switches may be adapted to provide a path from each ingress module to each egress module characterized by a constant switching delay that is specific to each latent switch and to the ingress-egress module pair. The deterministic switching delays of the latent space switch may be adjusted to offer different deterministic switching delays for each pair of ingress-egress modules.

Figure 47:
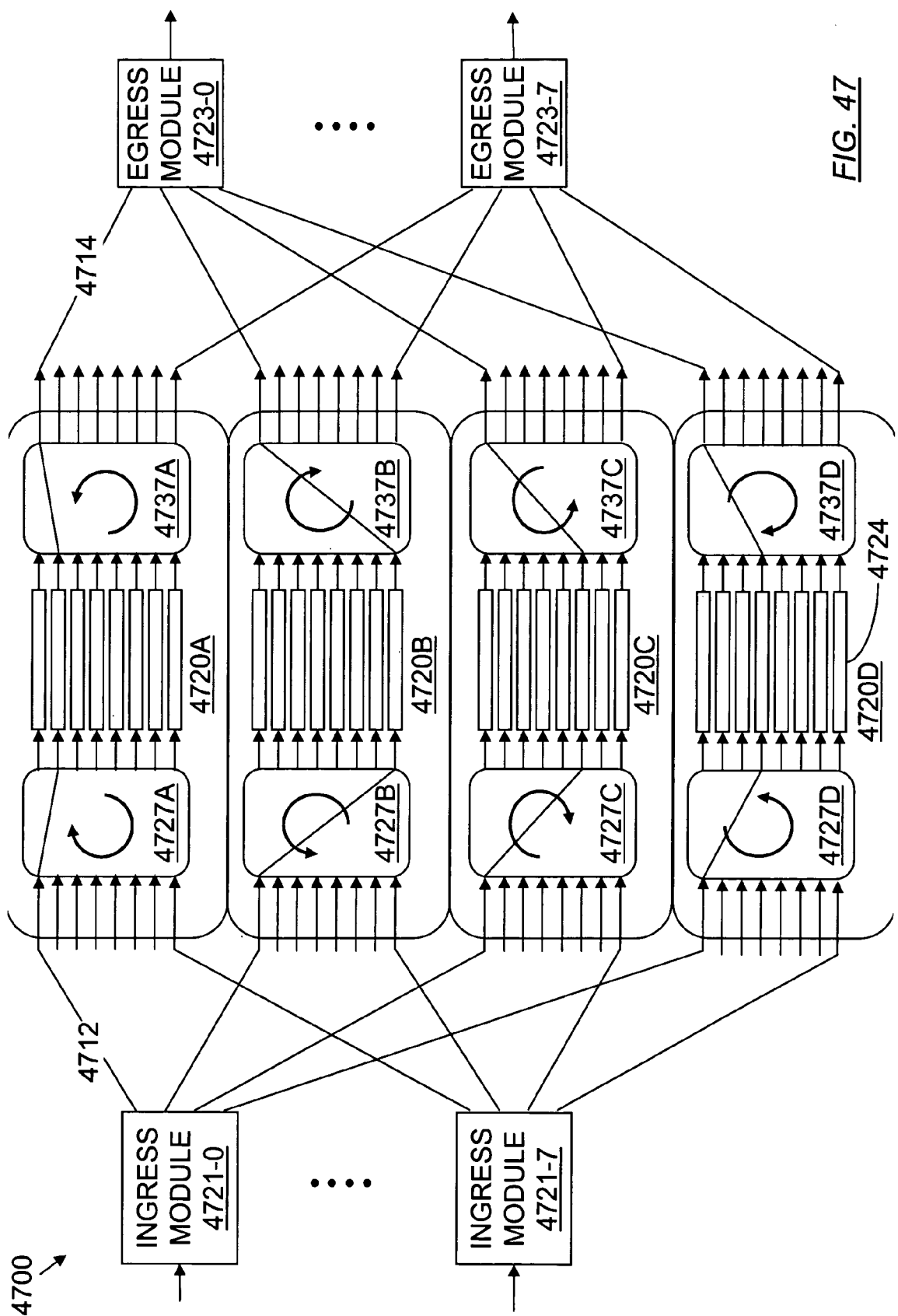
FIG. 47 illustrates a polyphase rotating-access switch having primary rotators and secondary rotators with each primary rotator connecting to a secondary rotator through a bank of transit memories where the primary rotators mutually have phase-shifted rotation cycles and the secondary rotators mutually have phase-shifted rotation cycles, in accordance with an embodiment of the present invention.

FIG. 47 illustrates an exemplary polyphase rotating-access switch 4700 in which four input rotators 4727A, 47278, 4727C, 4727D (individually or collectively 4727) operate at an offset from each other and each of four secondary rotators 4737A, 4737B, 4737C, 4737D (individually or collectively 4737) corresponding to ,each input rotator 4727 rotates in the opposite direction. In this example, two input rotators 4727A and 4737C rotate in a clockwise direction while the other two input rotators 4727B and 4737D rotate in the counterclockwise direction. The exemplary polyphase rotating-access switch 4700 comprises eight ingress modules 4721-0, . . . , 4721-7 (collectively or individually 4721), eight egress modules 4723-0, . . . , 4723-7 (collectively or individually 4723) and four rotator space switches 4720A, 4720B, 4720C, 4720D (collectively or individually 4720). Module controllers and a master controller have been omitted from FIG. 47 to simplify the illustration. Each rotator space switch 4720 comprises a bank of transit memory devices 4724, a primary rotator 4727 and a secondary rotator 4737. Each primary rotator 4727 cyclically connects eight input channels 4712 received from the eight ingress switch modules 4721 to the transit memory devices 4724 and each secondary rotator 4737 cyclically connects the transit memory devices 4724 to eight output channels 4714, each leading to one of the egress switch modules 4723. The primary rotators 4727 and the secondary rotators 4737 have the same rotation cycle and the same number of rotation phases per rotation cycle.

Data segments are written in the transit memory devices 4724 through a primary rotator 4727 and read from the transit memory devices 4724 through a secondary rotator 4737 at interleaved time intervals. The sum of the write-interval and read-interval per rotation phase is constant but the duration of a read-interval and a write interval may differ.

The rotation of each secondary rotator 4737 is a mirror image of the rotation of the corresponding primary rotator 4727 and it is sufficient, therefore, to focus on the primary rotators 4727. The connectivity of each primary rotator 4727 can take any cyclic order. For example, inlet 0 may connect consecutively to outlets 0 to 7 starting with outlet 0 during the first rotation phase of a rotation cycle. Inlet 0 may also connect to outlet 4 during the first rotation phase of the rotation cycle and proceed to outlets 5, 6, 7, 0, 1, 2 and 3 during the subsequent rotation phases of the rotation cycle. In general, input j, $0 \leq j < N$, connects to output $[j+\alpha \times t+\phi]$ modulo N, where t, $0 \leq t < N$, is a rotation phase, N is the number of transit memory devices per rotator space switch 4720, α is a rotation direction and equals 1 or −1 and φ is a fixed phase shift expressed as a number of rotation phases. The value of φ varies between 0 and (N−1). The rotation phase, t, takes a value ranging from zero to (N−1).

Figure 48:
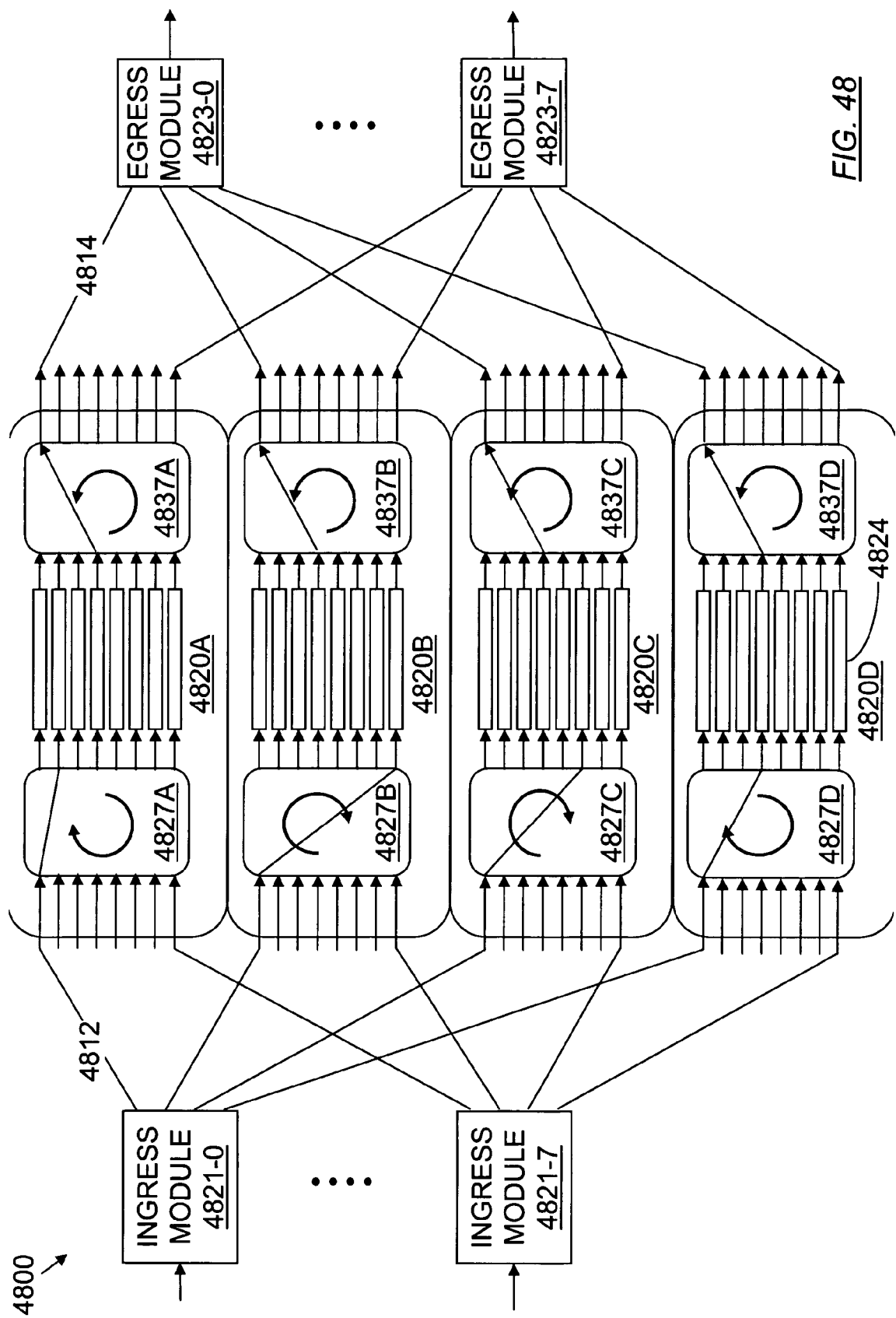
FIG. 48 illustrates a polyphase rotating-access switch having primary rotators and secondary rotators with each primary rotator connecting to a secondary rotator through a bank of transit memories where the primary rotators mutually have phase-shifted rotation cycles and the secondary rotators have identical rotation cycles, in accordance with an embodiment of the present invention.

FIG. 48 illustrates an exemplary polyphase rotating-access switch 4800 in which four primary rotators 4827A, 4827B, 4827C, 4827D (individually or collectively 4827) rotate in the clockwise direction and operate at a quarter-cycle offset from each other while four output rotators 4837A, 4837B, 4837C, 4837D (individually or collectively 4837) rotate in the counterclockwise direction and operate in step at the same phase. The exemplary polyphase rotating-access switch 4800 comprises eight ingress modules 4821-0, . . . , 4821-7 (collectively or individually 4821), eight egress modules 4823-0, . . . , 4823-7 (collectively or individually 4823) and four rotator space switches 4820A, 4820B, 4820C, 4820D (collectively or individually 4820). Module controllers and a master controller have been omitted from FIG. 48 to simplify the illustration. Each rotator space switch 4820 comprises a bank of transit memory devices 4824, a primary rotator 4827 and an output rotator 4837. Each primary rotator 4827 cyclically connects eight input channels 4812 received from the eight ingress switch modules 4821 to the transit memory devices 4824 and the output rotator 4837 cyclically connects the transit memory devices 4824 to eight output channels 4814, each leading to one of the egress switch modules 4823.

Figure 49:
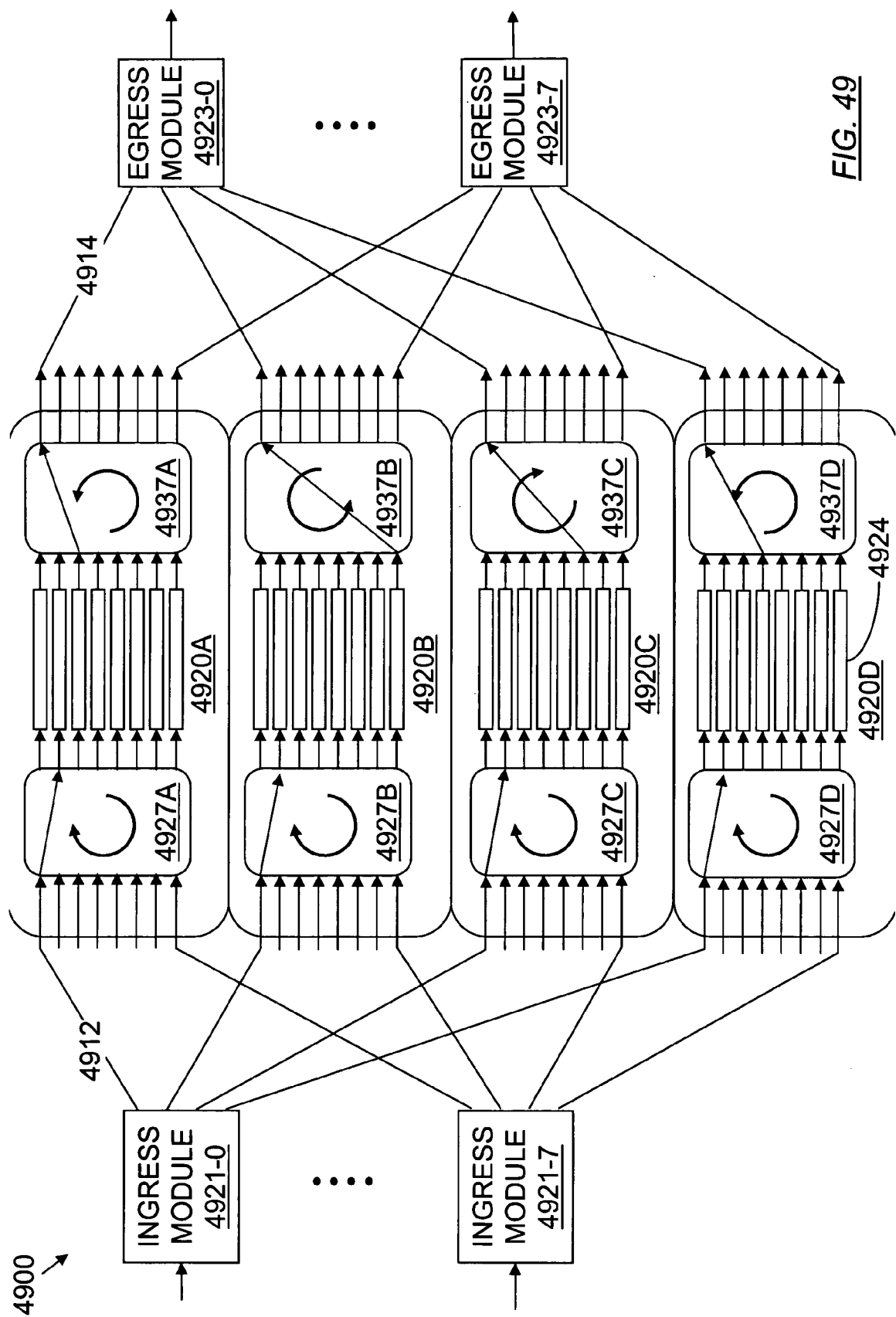
FIG. 49 illustrates a polyphase rotating-access switch having primary rotators and secondary rotators with each primary rotator connecting to a secondary rotator through a bank of transit memories where the primary rotators have identical rotation cycles and the secondary rotators mutually have phase-shifted rotation cycles, in accordance with an embodiment of the present invention.

FIG. 49 illustrates an exemplary polyphase rotating-access switch 4900 in which four primary rotators 4927A, 4927B, 4927C, 4927D (individually or collectively 4927) rotate in the clockwise direction and operate in step at the same phase while four output rotators 4937A, 4937B, 4937C, 4937D (individually or collectively 4937) rotate in the counterclockwise direction and operate at a quarter-cycle offset from each other.

The exemplary polyphase rotating-access switch 4900 comprises eight ingress modules 4921-0, . . . , 4921-7 (collectively or individually 4921), eight egress modules 4923-0, . . . , 4923-7 (collectively or individually 4923) and four rotator space switches 4920A, 4920B, 4920C, 4920D (collectively or individually 4920). Module controllers and a master controller have been omitted from FIG. 49 to simplify the illustration. Each rotator space switch 4920 comprises a bank of transit memory devices 4924, a primary rotator 4927 and a secondary rotator 4937. Each primary rotator 4927 cyclically connects eight input channels 4912 received from the eight ingress switch modules 4921 to the transit memory devices 4924 and the secondary rotator 4937 cyclically connects the transit memory devices 4924 to eight output channels 4914, each leading to one of the egress switch modules 4923.

The rotation directions of the primary rotators and secondary rotators in FIGS. 47 to 49 may be interchanged.

In summary, the polyphase rotating-access switch 4700 of FIG. 47 comprises a plurality of ingress modules 4721, a plurality of egress modules 4723, and at least two latent space switches 4720. Each latent space switch 4720 provides a path from each ingress module 4721 to each egress module 4723, the latency of the path being specific to the ingress-egress module pair and to the latent space switch.

Each latent space switch 4720 is similar to the rotator space switch 220 of FIG. 3, comprising a bank of transit memory devices 4724, a primary rotator 4727, and a secondary rotator 4737. The primary rotator 4727 has primary input ports each connecting to one of the ingress modules 4721 and primary output ports each connecting to one of the transit memory devices 4724. The secondary rotator 4737 has secondary input ports each connecting to one of the transit memory devices 4724 and secondary output ports each connecting to one of the egress modules 4723.

The primary rotator 4727 connects each primary input port to each of the transit memory devices 4724 and the secondary rotator 4737 connects each of the transit memory devices 4724 to each of the secondary output ports during a rotation cycle comprising a plurality of rotation phases. During each rotation phase, the primary rotator 4727 connects each primary input port to one of the transit memory devices 4724 according to a primary rotation configuration specific to each of the latent space switches 4720. Likewise, during each rotation phase, the secondary rotator 4737 connects each transit memory device 4724 to one of the secondary output ports according to a secondary rotation configuration specific to each of the latent space switches 4720. The primary rotation configuration and the secondary rotation configuration of each latent space switch 4720 have opposite directions so that the delay between the time at which a specific primary input port accesses each of the transit memory devices 4724 and the time at which the each of the transit memory devices 4724 accesses a specific secondary output port is constant.

Several modifications of the polyphase rotating-access switch 4700 of FIG. 47 may be devised. In a first modification, all latent space switches 4720 may have the same primary configuration and the same secondary configuration. However, each ingress module 4721 may connect to selected primary input ports, one from each latent space switch 4720 and each egress module 4723 may connect to selected secondary output ports, one from each latent space switch 4720. The selected primary input ports and the selected secondary output ports may be determined so that the switching delays from the each ingress module 4721 to each egress module 4723 are staggered over the rotation cycle.

In a second modification, the primary rotation configuration of at least one of the latent space switches 4720 may be phase shifted with respect to the primary rotation configuration of at least another one of the latent space switches 4720 while the secondary rotation configuration may be the same in all latent space switches 4720.

In a third modification, the primary rotation configuration maybe the same for each of the latent space switches 4720 while the secondary rotation configuration of at least one of the latent space switches is phase shifted with respect to the secondary rotation configuration of at least another one of the latent space switches 4720.

The primary rotator 4727 may be programmable to select the one of the transit memory devices 4724 to which each of the primary input ports connects during each of the rotation phases. Similarly, the secondary rotator 4737 maybe programmable to select the one of the secondary output ports to which each of the transit memory devices 4724 connects during each of the rotation phases.

To facilitate scheduling in a polyphase rotating-access switch 4700, 4800, 4900 a set of paths from each ingress module to each egress module is determined, each path associated with one of the latent space switches and having a corresponding switching delay. The set of paths is then sorted according to an ascending order of switching delays. Preferably, the first path that has a free capacity at least equal to a specified capacity allocation for an ingress-egress module pair is selected from the sorted list. A connection request may be rejected if none of the paths associated with an ingress module and an egress module specified in the connection request has a free capacity free capacity at least equal to the specified capacity allocation.

Polyphase Circulating Switch

In the extended circulating switch 3600 of FIG. 36 and the extended circulating switch 3700 of FIG. 37, switch modules communicate through passive rotators. In the extended circulating switch 3600 of FIG. 36, the rotators are arranged in complementary pairs and in the extended circulating switch 3700 of FIG. 37 the rotators are arranged in complementary groups as described earlier. These extended circulating switches 3600, 3700 can readily be adapted to a polyphase circulating switch by setting the phase differences of the rotation cycles to pre-calculated values as will be described hereinafter with reference to FIGS. 50 and 51.

Figure 50:
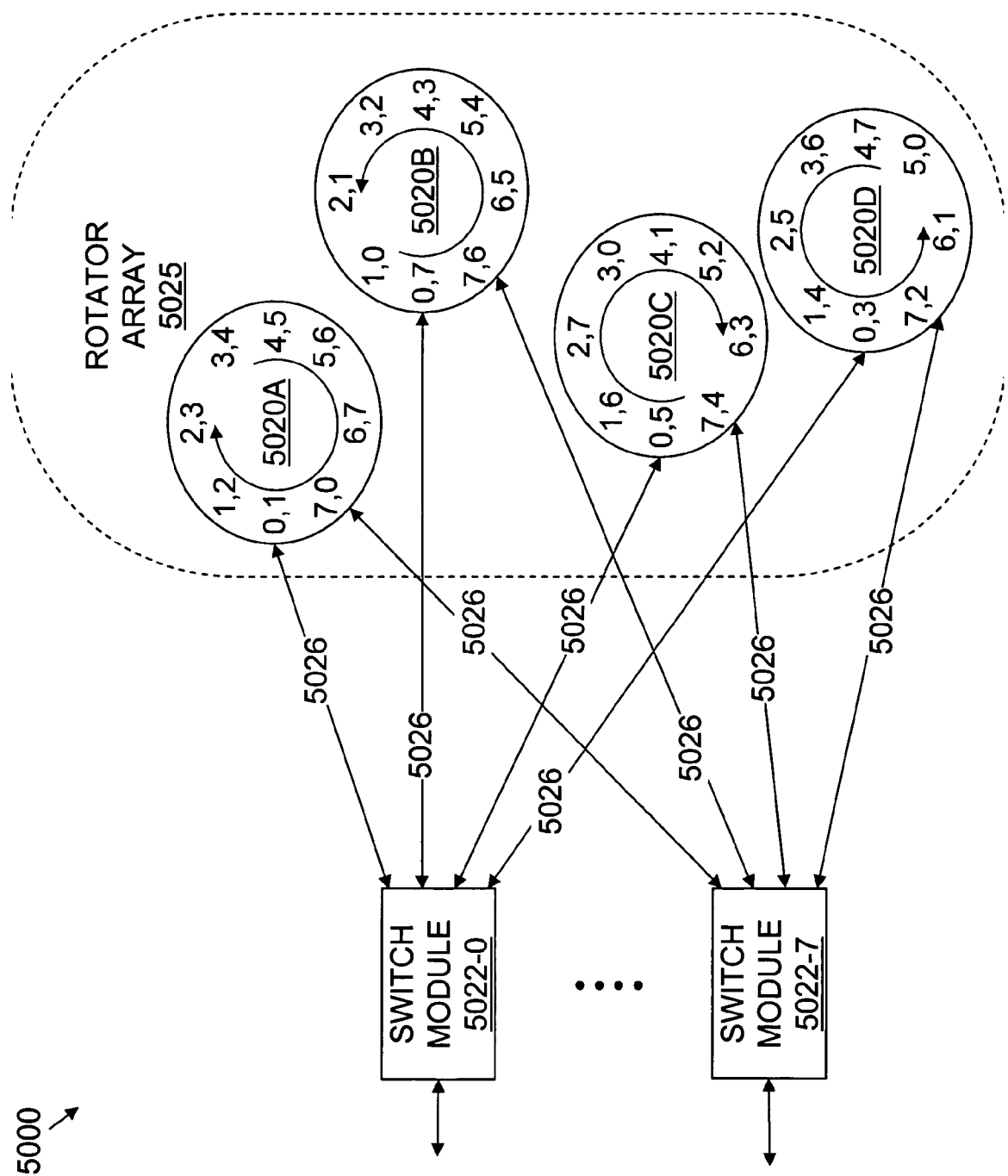
FIG. 50 illustrates a polyphase circulating switch, in accordance with an embodiment of the present invention.

FIG. 50 illustrates a polyphase circulating switch 5000. In particular, connectivity is illustrated between two of eight switch modules 5022-0, . . . , 5022-7 (collectively or individually 5022) and a first rotator 5020A, a second rotator 5020B, a third rotator 5020C and a fourth rotator 5020D (collectively or individually 5020), as part of a rotator array 5025. A set of internal dual channels 5026 extends between the switch modules 5022 and the rotators 5020. Module controllers and a master controller are omitted to simplify the illustration. The four rotators 5020 are arranged as two pairs of complementary rotators. The connectivity of each rotator 5020 at an exemplary rotation phase 1 is indicated for each dual port of each rotator 5020. For example, the inlets labeled 0 are connected to outlets labeled 1, 7, 5 and 3, as read from the connectivity indicators (0, 1), (0, 7), (0, 5) and (0, 3) of the four rotators 5020A, 5020B, 5020C, 5020D, respectively. The hereinbefore introduced parameters ($\alpha$, $\phi$) for the four rotators 5020A, 5020B, 5020C, and 5020D are (1, 0), (−1, 0), (1, 4) and (−1, 4) respectively.

Connectivity Patterns of a Polyphase Circulating Switch

In an exemplary extended circulating switch having N switch modules, the N switch modules may be numbered as 0 to N−1. The input ports of each rotator are numbered as 0 to (N−1) and the output ports of each rotator are likewise numbered. Without loss of generality, each switch module j, 0, $0 \leq j < N$, may connect to input port j of each rotator and output port j of each rotator.

Consider an extended circulating switch having eight switch modules interconnected through a rotator array having eight rotators labeled in FIGS. 51A, 51B, 51C, 51D as 5120A, 5120B, 5120C, 5120D, 5120E, 5120F, 5120G, and 5120H. As described above, it is preferable that each indirect connection from one switch module to another traverse two rotators of opposite directions in order to realize a constant switching delay independent of the intermediate switch module used or a switching delay that may differ by only one rotation phase so that data segments are received in proper temporal order. An indirect connection from a first switch module to a second switch module through a pair of rotators of opposite directions may traverse either of the rotators to an intermediate switch module. It is preferable, however, that an indirect connection requiring multiple time slots be routed to intermediate time switches through the same ordered rotator pair (clockwise then counterclockwise, or vice versa) to ensure a constant switching delay and, hence, eliminate the need for data-segment reordering at the sink switch module.

If all clockwise rotators have the same clockwise reference phase and all the counterclockwise rotators have the same counterclockwise reference phase, the switching delay (transit delay) of an indirection connection traversing any clockwise rotator and any counterclockwise rotator would be constant and dependent only on the source and sink switch modules. With such organization of the rotator array, the switching delay of an indirect connection for a directed switch module pair may be as small as one time slot (one phase duration) and an indirect connection of another directed switch module pair may be as high as one rotation cycle (N time slots). A pair of any clockwise rotator and any counterclockwise rotator provides a set of (N−2) indirect paths for each directed switch module pair. The (N−2) indirect paths from a first switch module to a second switch module through a pair of rotators may differ from the (N−2) indirect paths from the second switch module to the first switch module though the same pair of rotators. With multiple rotators, it is possible to realize sets of indirect connections, each set having (N−2) indirect connections, where the switching delay for each of the (N−2) indirect connections is constant, and the constant delays for the sets are staggered.

FIGS. 51A, 51B, 51C, 51D illustrate arrays of eight rotators, 5120A to 5120H (individually or collectively 5120), for use in an extended circulating switch as described in FIGS. 36 to 39. Four of the rotators are clockwise rotators 5120A, 5120C, 5120E, 5120G and four are counterclockwise rotators 5120B, 5120D, 5120F, 5120H. The rotators may also have different phase references. FIGS. 51A, 51B, 51C, 51D illustrate four arrangements of the rotator arrays.

In the arrangement of FIG. 51A, the eight rotators 5120 are organized in four complementary pairs {5120A-0, 5120B-0}, {5120C-0, 5120D-0}, {5120E-0, 5120F-0}, and {5120G-0, 5120H-0} having reference phases 0, 2, 4, and 6, respectively. The rotators of a complementary pair of rotators have the same connectivity at the start of a rotation cycle and the reference phase of a complementary pair is the output port number to which input port 0 connects at the start of a rotation cycle. The input ports of a rotator are numbered 0 to 7 and output ports are numbered 0 to 7 as described above.

In each of arrangements of FIGS. 51B, 51C and 51D, the eight rotators 5120 are viewed as two groups, a first group including clockwise rotators {5120A, 5120C, 5120E, 5120G} and a second group including counterclockwise rotators {5120B, 5120D, 5120F, 5120H}. The rotation directions of the two groups may, however, be reversed.

In the arrangement of FIG. 51 B, each rotator in the first group has the same phase reference where, at the start of a rotation cycle, each rotator input port 0 connects to respective output port 0. The reference phases of rotators 5120B-1, 5120D-1, 5120F-1, and 5120H-1 of the second group are 0, 2, 4, and 6, respectively, the reference phase of a rotator being defined by the output port to which input port 0 is connected at the start of a rotation cycle.

In the arrangement of FIG. 51C, each rotator in the second group has the same phase where, at the start of a rotation cycle, each rotator input port 0 connects to respective output port 0. The reference phases of rotators 5120A-2, 5120C-2, 5120E-2, and 5120G-2 of the first group are 0, 2, 4, and 6, respectively.

In the arrangement of FIG. 51D, the reference phases of rotators 5120A-3, 5120C-3, 5120E-3, and 5120G-3 of the first group are 0, 0, 4, and 6, respectively while the reference phases of the rotators 5120B-3, 5120D-3, 5120F-3 and 5120G-3 of the second group are 0, 2, 0, and 0, respectively.

As described hereinafter with reference to FIG. 67, an indirect connection is preferably routed through a pair of rotators offering the least switching delay.

Figure 52A:
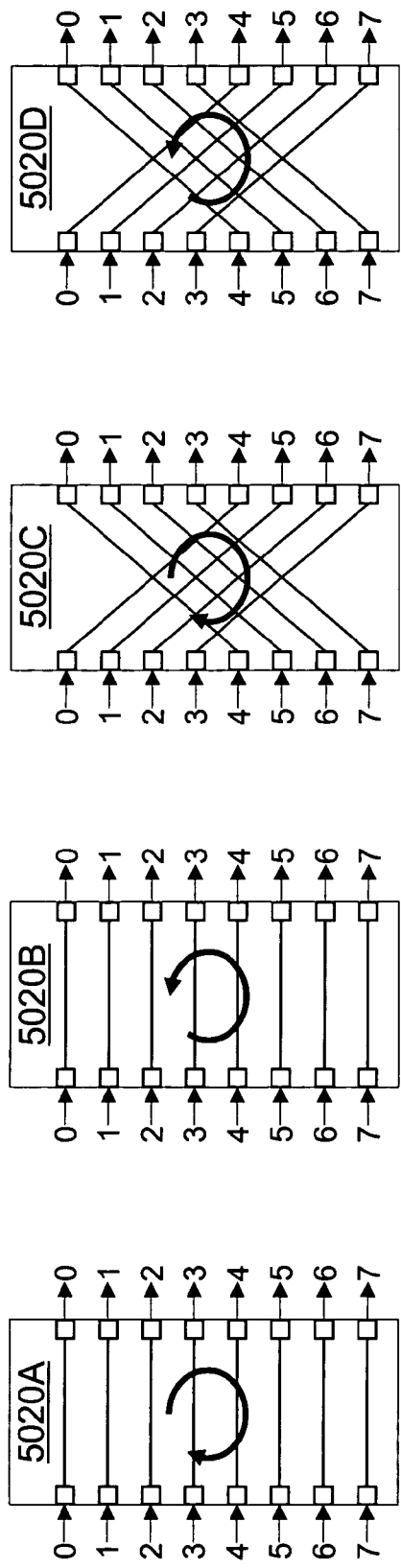
FIG. 52A illustrates a set of connectivity patterns for a first rotation phase for the four rotators of the polyphase circulating switch illustrated in FIG. 50 where each rotator provides a self-connection for each dual port.
Figure 52B:
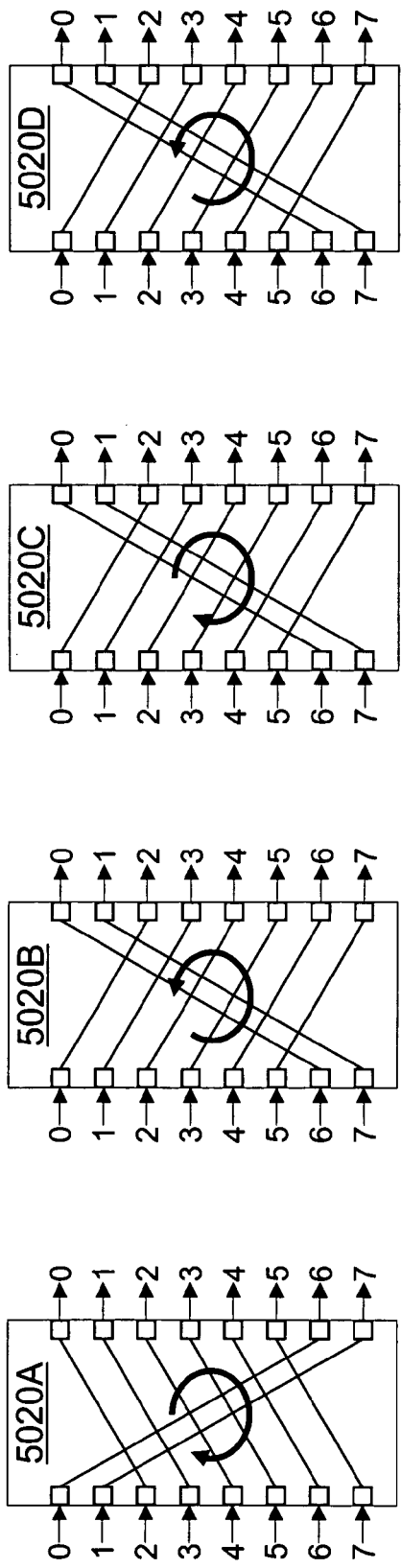
FIG. 52B illustrates a set of connectivity patterns for a second rotation phase the four rotators of the polyphase circulating switch illustrated in FIG. 50 where each rotator provides a self-connection for each dual port.

To further clarify the connectivity pattern in the polyphase circulating switch 5000 of FIG. 50, representations of the four rotators 5020 indicating connectivity patterns are illustrated for two rotation phases, t=0 and t=6, in FIGS. 52A and 52B, respectively. In particular, FIG. 52A illustrates, for rotation phase t=0, a first connectivity pattern for the first rotator 5020A, a second connectivity pattern for the second rotator 5020B, a third connectivity pattern for the third rotator 5020C and a fourth connectivity pattern for the fourth rotator 5020A. Connectivity patterns are again illustrated in FIG. 52B for rotation phase t=6. The rotation cycle comprises eight phases (T=8) and in one phase each switch module 5022 is self-connected through the rotators, i.e., each outbound port of each switch module connects to an inbound port of the same switch module through a rotator 5020.

Connectivity patterns for rotation phases t=0 and t=6 are illustrated in FIGS. 53A and 53B, respectively, for the polyphase circulating switch 5000 of FIG. 50 having a rotation cycle, comprising seven phases (T=7), that excludes a self-connection phase. In particular, FIG. 53A illustrates, for rotation phase t=0, a first connectivity pattern for the first rotator 5020A, a second connectivity pattern for the second rotator 5020B, a third connectivity pattern for the third rotator 5020C and a fourth connectivity pattern for the fourth rotator 5020A. Connectivity patterns are again illustrated in FIG. 53B for rotation phase t=6.

Switching delays 5460 across different rotator pairs of the polyphase circulating switch 5000 of FIG. 50 are illustrated in FIG. 54. There are two clockwise rotators 5020A and 5020C and two counterclockwise rotators 5020B and 5020D. Consequently, there are eight directed switch module pairs {5020A-5020B}, {5020B-5020A}, {5020A-5020D}, {5020D-5020A}, {5020C-5020B}, {5020B-5020C}, {5020C-5020D}, and {5020D-5020C}. The switching delays 5460 for the first four rotator pairs are respectively tabulated in four matrices 5400A, 5400B, 5400C, 5400D in FIG. 54. The switching delays may be measured in units of rotation-phase duration. A switching delay of a complete rotation cycle (eight rotation phases in this example) corresponds to an indirect path where a source switch module connects to an intermediate switch module and the intermediate switch module connects to the sink switch module during the same rotation phase.

For example, the switching delay 5460 from switch module 0 to switch module 6, through the first rotator pair {5020A, 5020B} is 2 (from the corresponding matrix 5400A), through the second rotator pair {5020B, 5020A} is 6 (from the corresponding matrix 5400B), through the third rotator pair {5020A, 5020D} is 6 (from the corresponding matrix 5400C) and through the fourth rotator pair {5020D, 5020A} is 2 (from the corresponding matrix 5400D).

Connectivity Matrices of a Polyphase Circulating Switch

Consider the polyphase circulating switch 5000 comprising eight switch modules interconnected by two complementary rotators pairs. The first complementary pair of rotators includes the first (clockwise) rotator 5020A and the second (counterclockwise) rotator 5020B. The second complementary pair includes the third (clockwise) rotator 5020C and the fourth (counterclockwise) rotator 5020D. The rotation cycle has eight rotation phases including a self-connection phase. The second complementary pair is phase-shifted by a half rotation cycle (four rotation phases) with respect to the first-complementary pair of rotators. The connectivity through the first complementary pair is identical to that depicted in FIGS. 33 and 34. The connectivity through the second complementary pair of rotators is illustrated in FIGS. 55 and 56.

Figure 55:
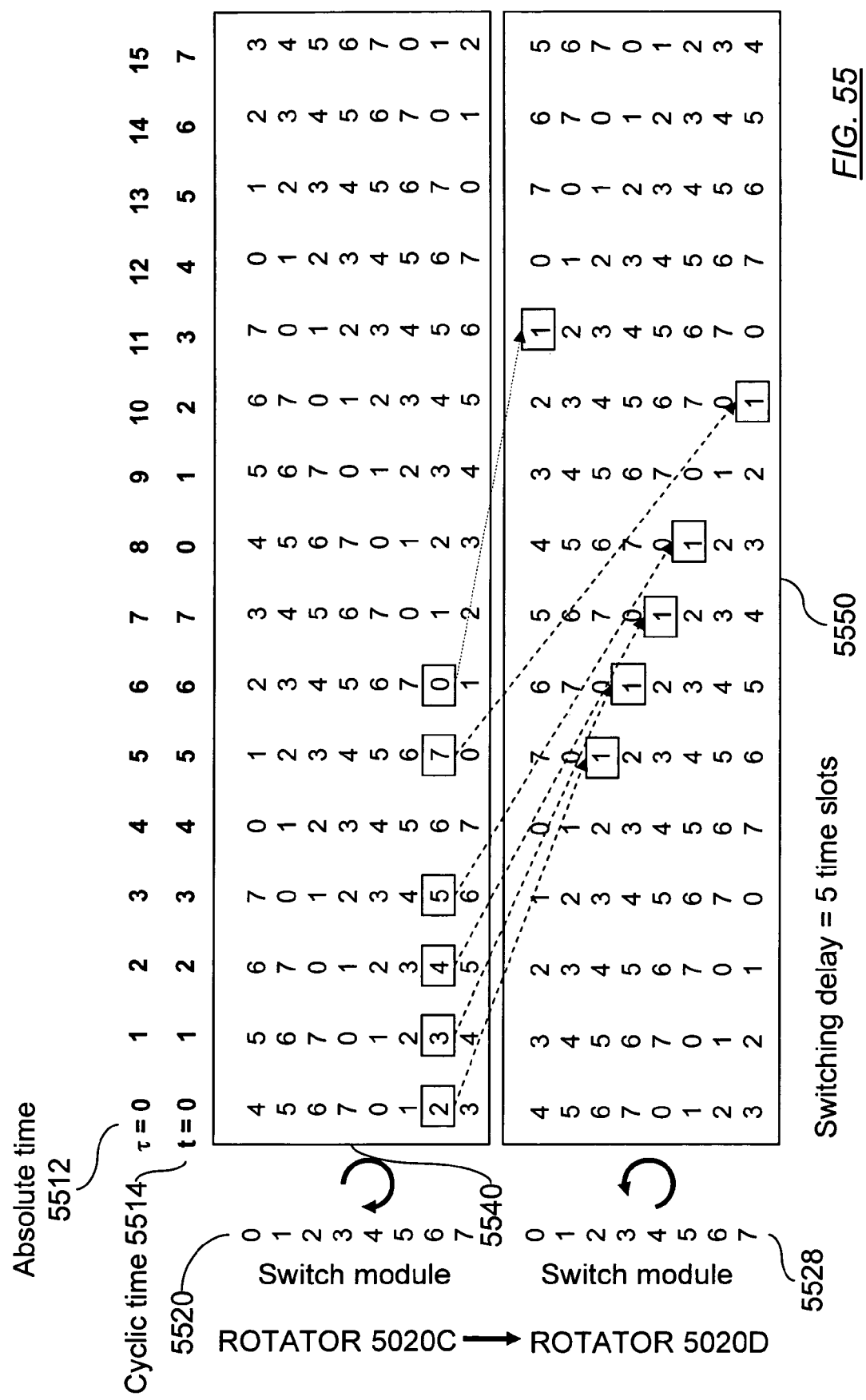
FIG. 55 illustrates the switching delay of indirect connections traversing a complementary pair of rotators in the polyphase circulating switch illustrated in FIG. 50 when the rotation cycles includes switch-module self-connection through the rotators and the forward rotator is a clockwise rotator.

FIG. 55 illustrates a first connectivity matrix 5540 and a second connectivity matrix 5550 for the circulating switch 5000 of FIG. 50. A cyclic-time row 5514 indicates a cyclic time, t, 0≦t<8, over two rotation cycles and an absolute time row 5512 indicates the absolute time, τ. A first module-identity column 5520 references the eight switch modules as 0 to 7 for the third rotator 5020C. Likewise, a second module-identity column 5528 references the eight switch modules as 0 to 7 for the fourth rotator 5020D. A switch module listed in the first module-identity column 5520 connects to switch modules identified in the first connectivity matrix 5540 during successive time slots through the third rotator 5020C. A switch module listed in the second module-identity column 5528 connects to switch modules identified in the second connectivity matrix 5550 during successive time slots through the fourth rotator 5020D. Indirect connections from source switch module 6 to sink switch module 1 through intermediate switch modules 2, 3, 4, 5, 7, and 0 are illustrated. Each indirect connection is directed from the source switch module 6 to an intermediate switch module through the third rotator 5020C and from the intermediate switch module to the sink switch module 1 through the fourth rotator 5020D. The switching delay along each of the indirect paths equals five time slots, which is the same value determined from FIG. 33.

Figure 56:
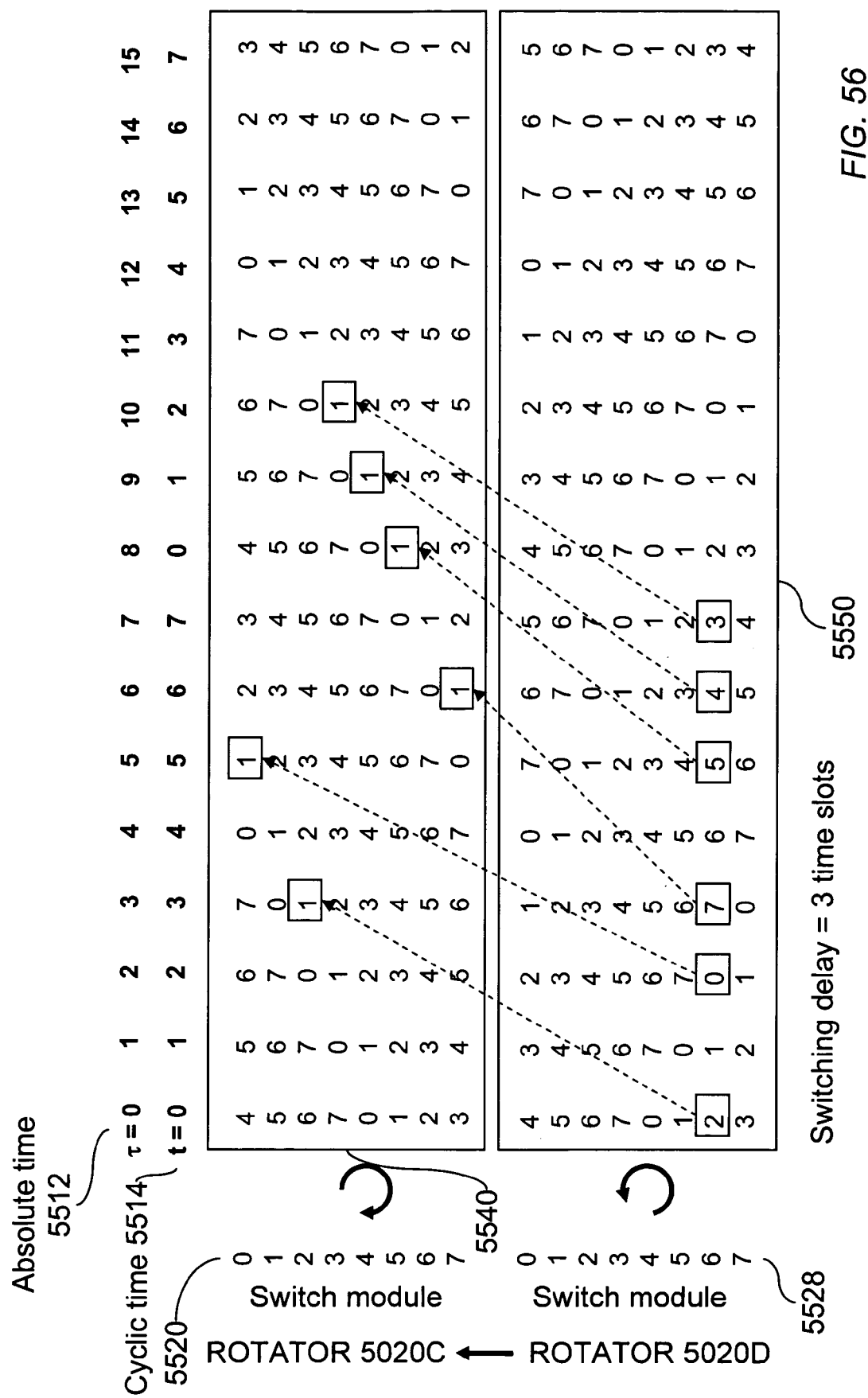
FIG. 56 illustrates the switching delay of indirect connections traversing a complementary pair of rotators in the polyphase circulating switch illustrated in FIG. 50 when the rotation cycles include switch-module self-connection through the rotators and the forward rotator is a counterclockwise rotator.

FIG. 56 illustrates the first connectivity matrix 5540 and the second connectivity matrix 5550 of FIG. 55 with the indirect connections from source switch module 6 to sink switch module 1 using the fourth rotator 5020D in the forward direction and the third rotator 5020C in the terminating direction. The switching delay for each of the indirect connections equals three time slots, which is the same value determined from FIG. 34.

Figure 57:
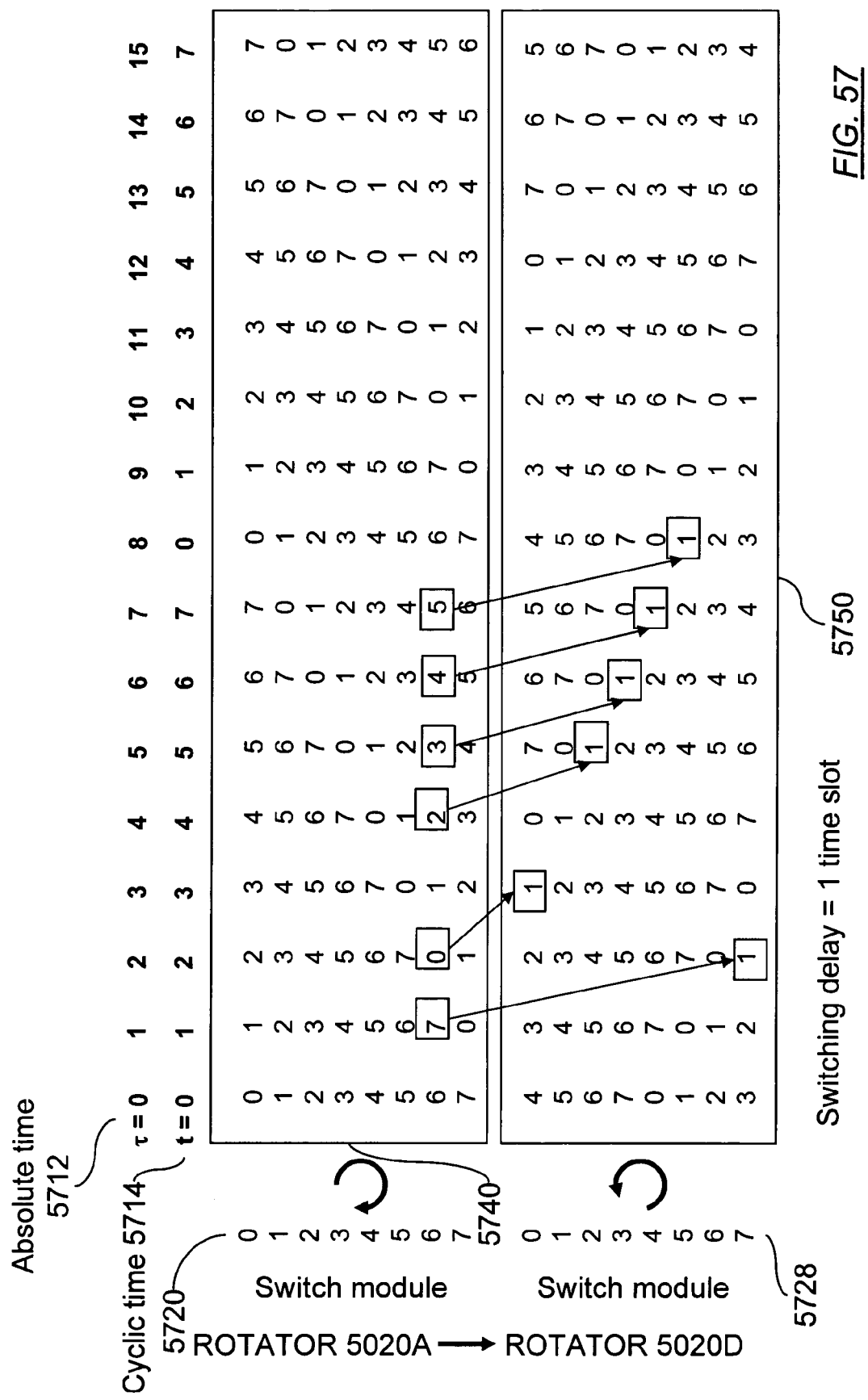
FIG. 57 illustrates the switching delay of indirect connections traversing a clockwise rotator and a phase-shifted counterclockwise rotator in the polyphase circulating switch illustrated in FIG. 50 when the rotation cycles include switch-module self-connection through the rotators and the forward rotator is the clockwise rotator.

Thus, it is illustrated that the switching delay through a complementary pair depends only on the connection direction (clockwise-counterclockwise or vice versa) and not on the phase difference between the complementary pairs. Recall that the two rotators of a complementary pair follow opposite cyclic sequential order FIG. 57 illustrates a first connectivity matrix 5740 and a second connectivity matrix 5750 for the circulating switch 5000 of FIG. 50, wherein the first rotator 5020A is the forward rotator and the fourth rotator 5020D is the terminating rotator. A cyclic-time row 5714 indicates a cyclic time, t, $0 \leq t < 8$, over two rotation cycles and an absolute time row 5712 indicates the absolute time, τ. A first module-identity column 5720 references the eight switch modules as 0 to 7 for the first rotator 5020A. Likewise, a second module-identity column 5728 references the eight switch modules as 0 to 7 for the fourth rotator 5020D. An indirect connection from switch module 6 to switch module 1 through any of intermediate switch modules 7, 0, 2, 3, 4, or 5 yields the same switching delay of only one rotation phase (one time slot).

Figure 58:
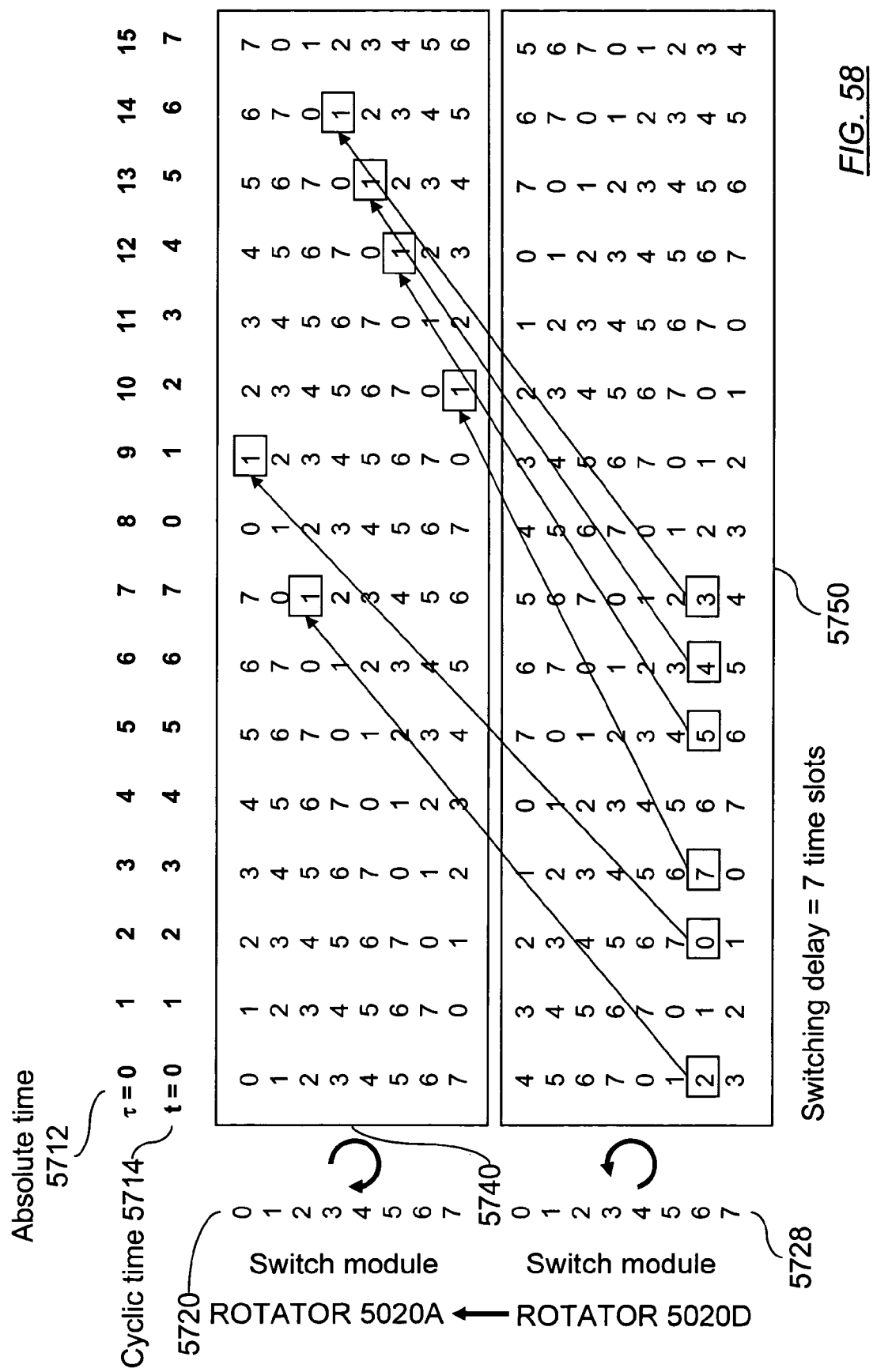
FIG. 58 illustrates the switching delay of indirect connections traversing a clockwise rotator and a phase-shifted counterclockwise rotator in the polyphase circulating switch illustrated in FIG. 50 when the rotation cycles include switch-module self-connection through the rotators and the forward rotator is the phase-shifted counterclockwise rotator.

FIG. 58 illustrates the first connectivity matrix 5740 and the second connectivity matrix 5750 of FIG. 57 with the indirect connections from source switch module 6 to sink switch module 1 using the fourth rotator 5020D in the forward direction and the first rotator 5020A in the terminating direction. The switching delay for each of the indirect connections equals seven time slots.

Figure 59:
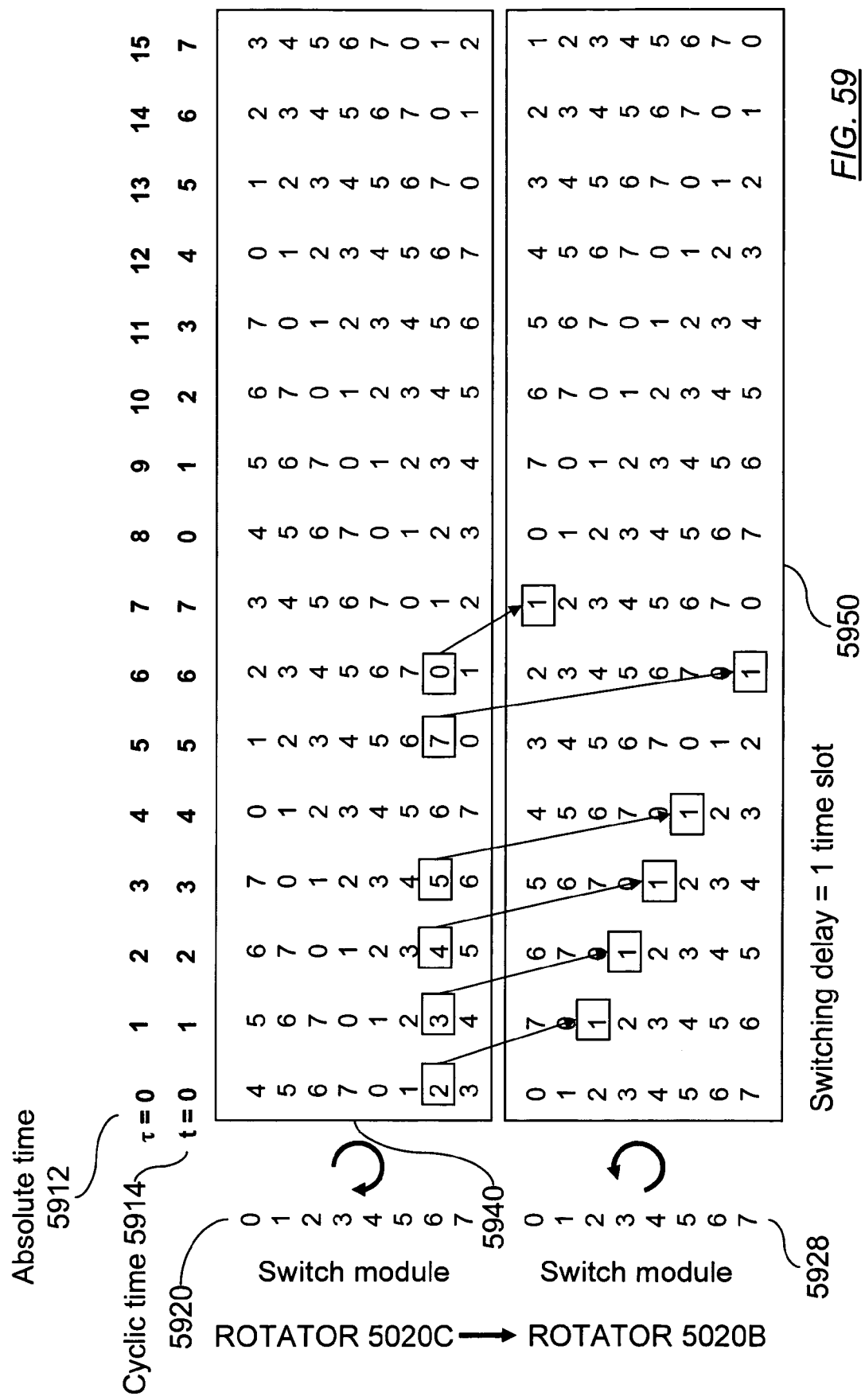
FIG. 59 illustrates the switching delay of indirect connections traversing a phase-shifted clockwise rotator and a counterclockwise rotator in the polyphase circulating switch illustrated in FIG. 50 when the rotation cycles include switch-module self-connection through the rotators and the forward rotator is the phase-shifted clockwise rotator.

FIG. 59 illustrates a first connectivity matrix 5940 and a second connectivity matrix 5950 for the circulating switch 5000 of FIG. 50, wherein the third rotator 5020C is the forward rotator and the second rotator 5020B is the terminating rotator. A cyclic-time row 5914 indicates a cyclic time, t, $0 \leq t < 8$, over two rotation cycles and an absolute time row 5912 indicates the absolute time, τ. A first module-identity column 5920 references the eight switch modules as 0 to 7 for the third rotator 5020C. Likewise, a second module-identity column 5928 references the eight switch modules as 0 to 7 for the second rotator 5020B. An indirect connection from switch module 6 to switch module 1 through any of intermediate switch modules 2, 3, 4, 5, 7, or 0 yields the same switching delay of only one rotation phase (one time slot).

Figure 60:
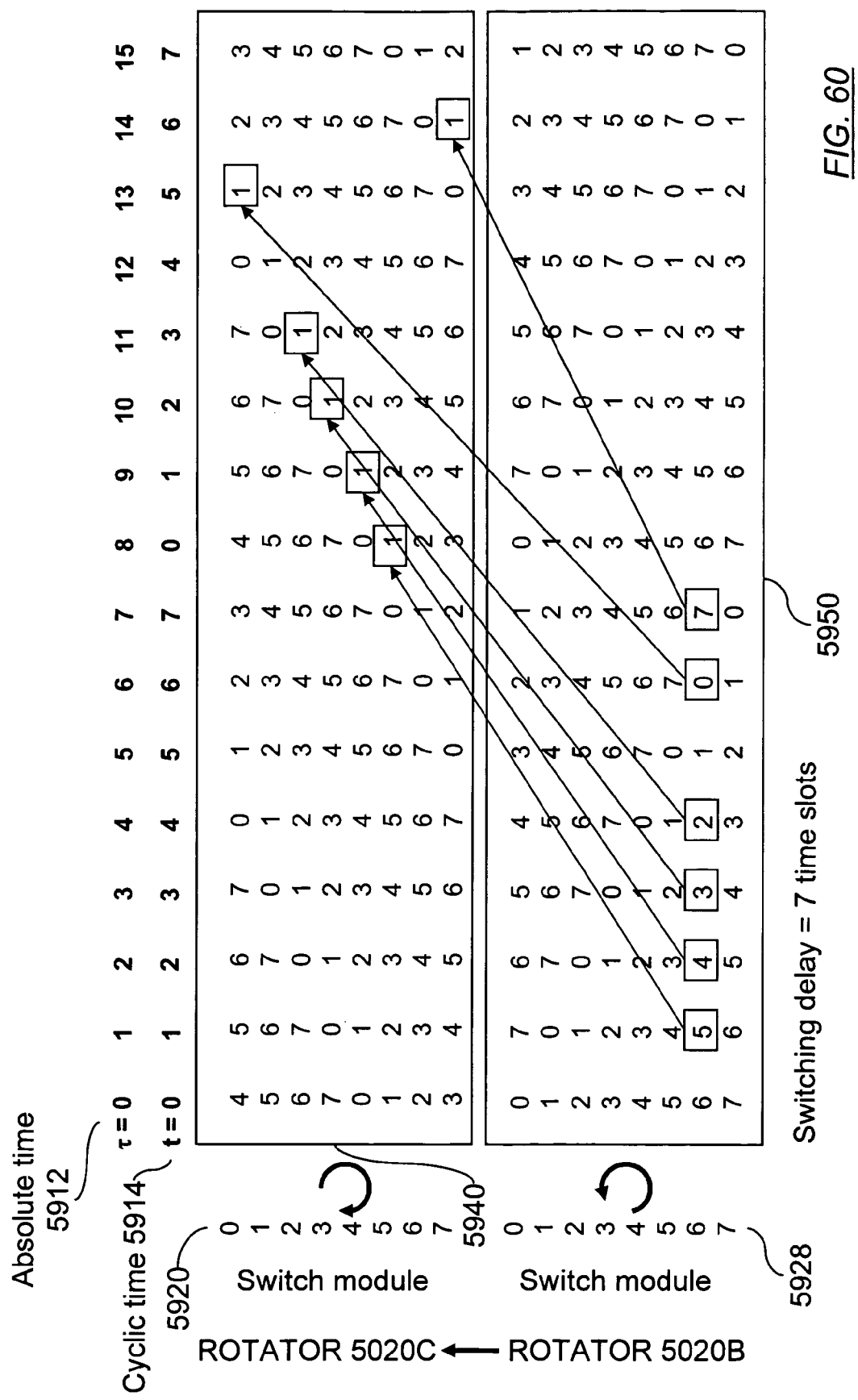
FIG. 60 illustrates the switching delay of indirect-connections traversing a phase-shifted clockwise rotator and a counterclockwise rotator in the polyphase circulating switch illustrated in FIG. 50 when the rotation cycles include switch module self-connection through the rotators and the forward rotator is the counterclockwise rotator.

FIG. 60 illustrates the first connectivity matrix 5940 and the second connectivity matrix 5950 of FIG. 59 with the indirect connections from source switch module 6 to sink switch module 1 using the second rotator 5020B in the forward direction and the third rotator 5020D in the terminating direction. The switching delay for each of the indirect connections equals seven time slots.

FIGS. 57 to 60 indicate that a connection switching delay depends on the direction of a connection (clockwise-counterclockwise or vice versa) and the phase difference between the forward rotator and the terminating rotator traversed by the connection.

FIGS. 57 to 60 described above are based on a rotation cycle that includes a self-connectivity rotation phase where each switch module connects to itself through at least one rotator. FIGS. 61 to 66 illustrate connectivity through different combinations of forward and terminating rotators with the rotation cycle excluding the self-connectivity rotation phase. In all cases, a connection is completed through rotators of opposite directions. In each of FIGS. 61 to 66, the switching delays through indirect connections may differ by at most one time slot. However, the temporal order of data segments received at a sink switch module and originating from the same source switch module is preserved as indicated in FIGS. 61 to 66.

Figure 61:
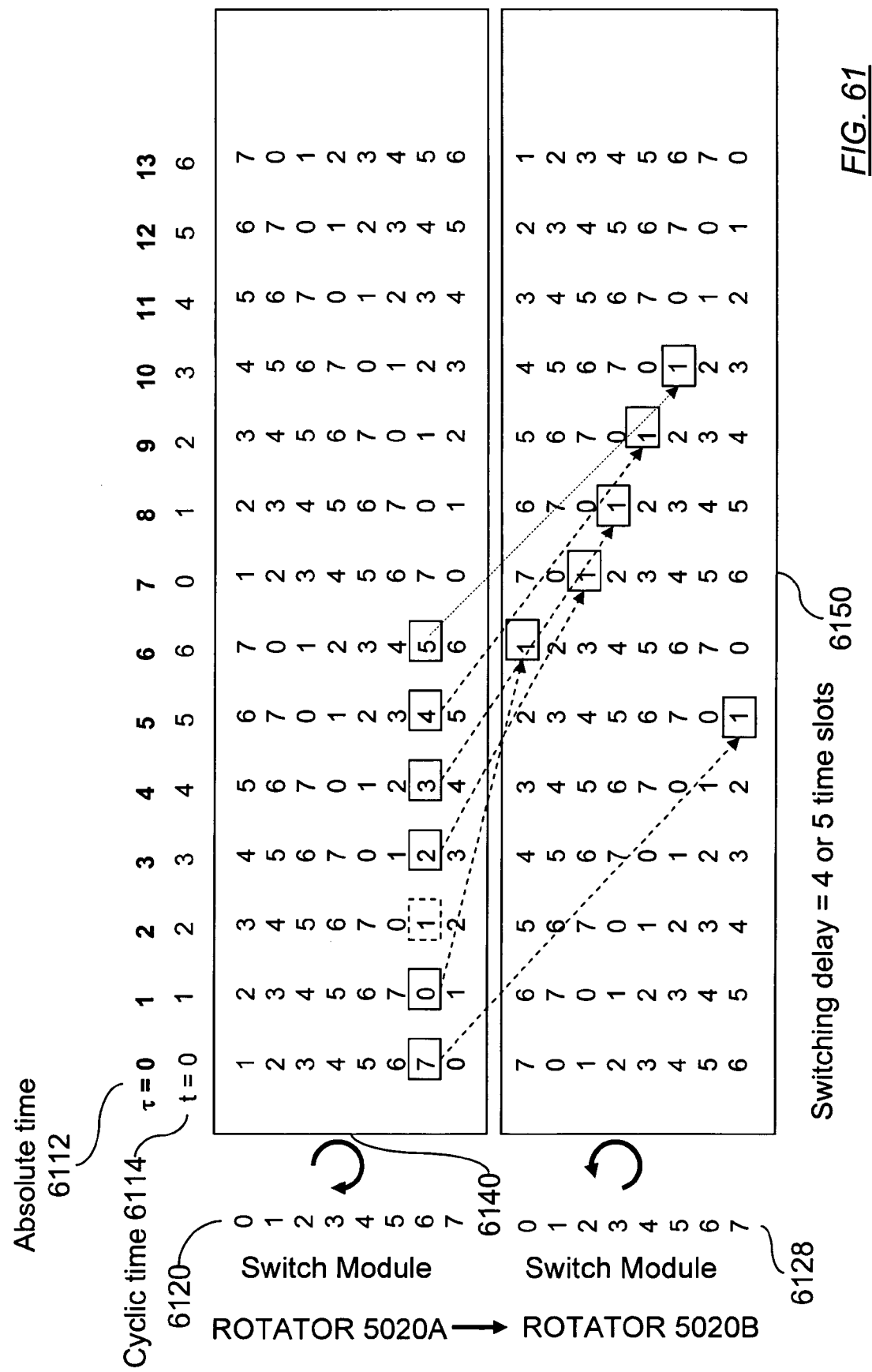
FIG. 61 illustrates the switching delay of indirect connections traversing a first complementary pair of rotators in the polyphase circulating switch illustrated in FIG. 50 when the rotation cycles exclude switch-module self-connection through the rotators and the forward rotator is a clockwise rotator.

FIG. 61 illustrates a first connectivity matrix 6140 and a second connectivity matrix 6150 for the circulating switch 5000 of FIG. 50, wherein the first rotator 5020A is the forward rotator and the second rotator 5020B is the terminating rotator. A cyclic-time row 6114 indicates a cyclic time, t, $0 \leq t < 8$, over two rotation cycles and an absolute time row 6112 indicates the absolute time, τ. A first module-identity column 6120 references the eight switch modules as 0 to 7 for the first rotator 5020A. Likewise, a second module-identity column 6128 references the eight switch modules as 0 to 7 for the second rotator 5020S. An indirect connection from switch module 6 to switch module 1 through intermediate switch module 7 or 0 yields a switching delay of five rotation phases. An indirect connection from switch module 6 to switch module 1 through any of intermediate switch modules 2, 3, 4 or 5 yields a switching delay of four rotation phases.

Figure 62:
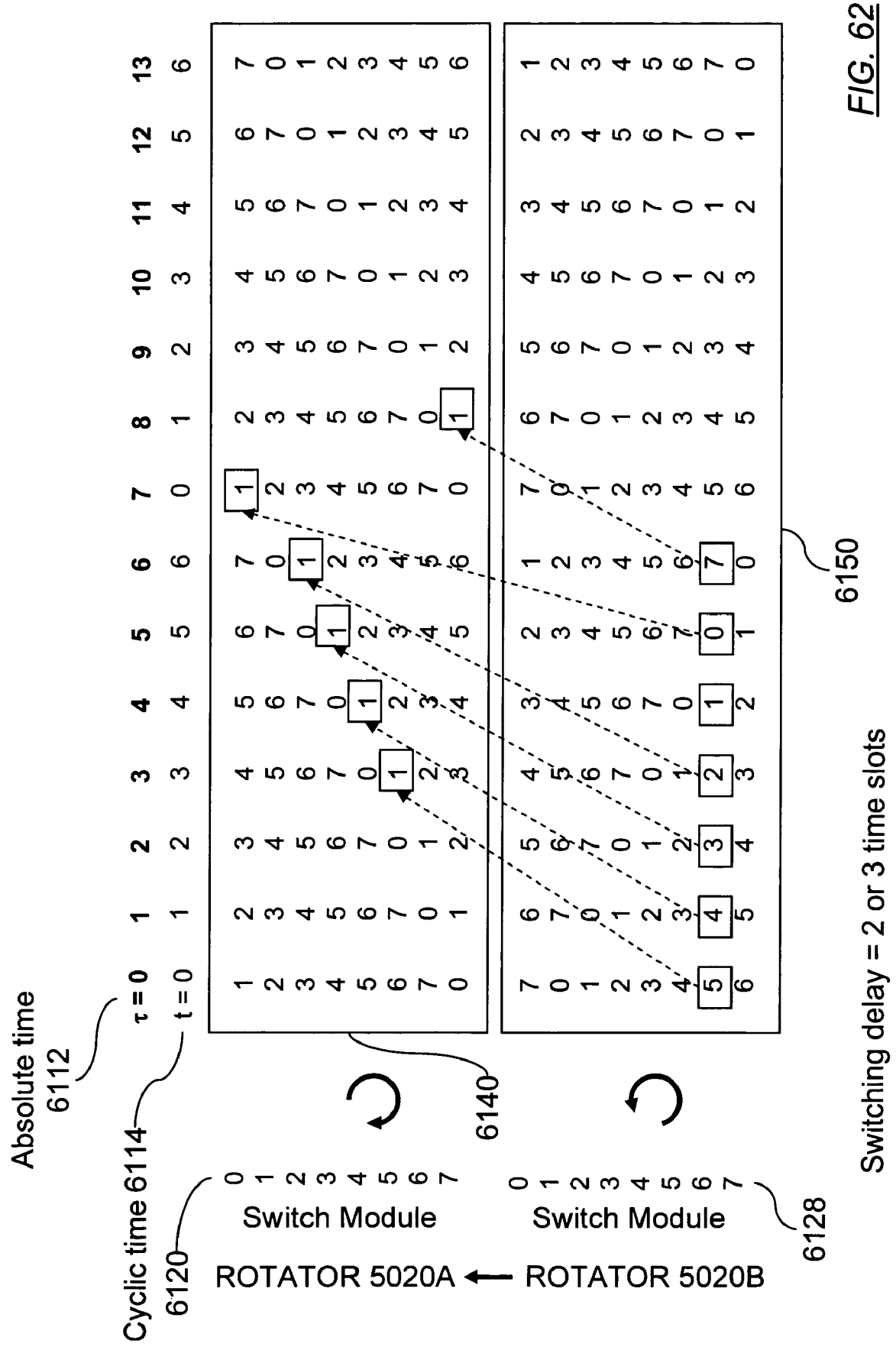
FIG. 62 illustrates the switching delay of indirect connections traversing the first complementary pair of rotators in the polyphase circulating switch illustrated in FIG. 50 when the rotation cycles exclude switch-module self-connection through the rotators and the forward rotator is a counterclockwise rotator.

FIG. 62 illustrates the first connectivity matrix 6140 and the second connectivity matrix 6150 of FIG. 61 with the indirect connections from source switch module 6 to sink switch module 1 using the second rotator 5020B in the forward direction and the first rotator 5020A in the terminating direction. An indirect connection from switch module 6 to switch module 1 through intermediate switch modules 7 or 0 yields a switching delay of two rotation phases. An indirect connection from switch module 6 to switch module 1 through any of intermediate switch modules 2, 3, 4 or 5 yields a switching delay of three rotation phases.

Figure 63:
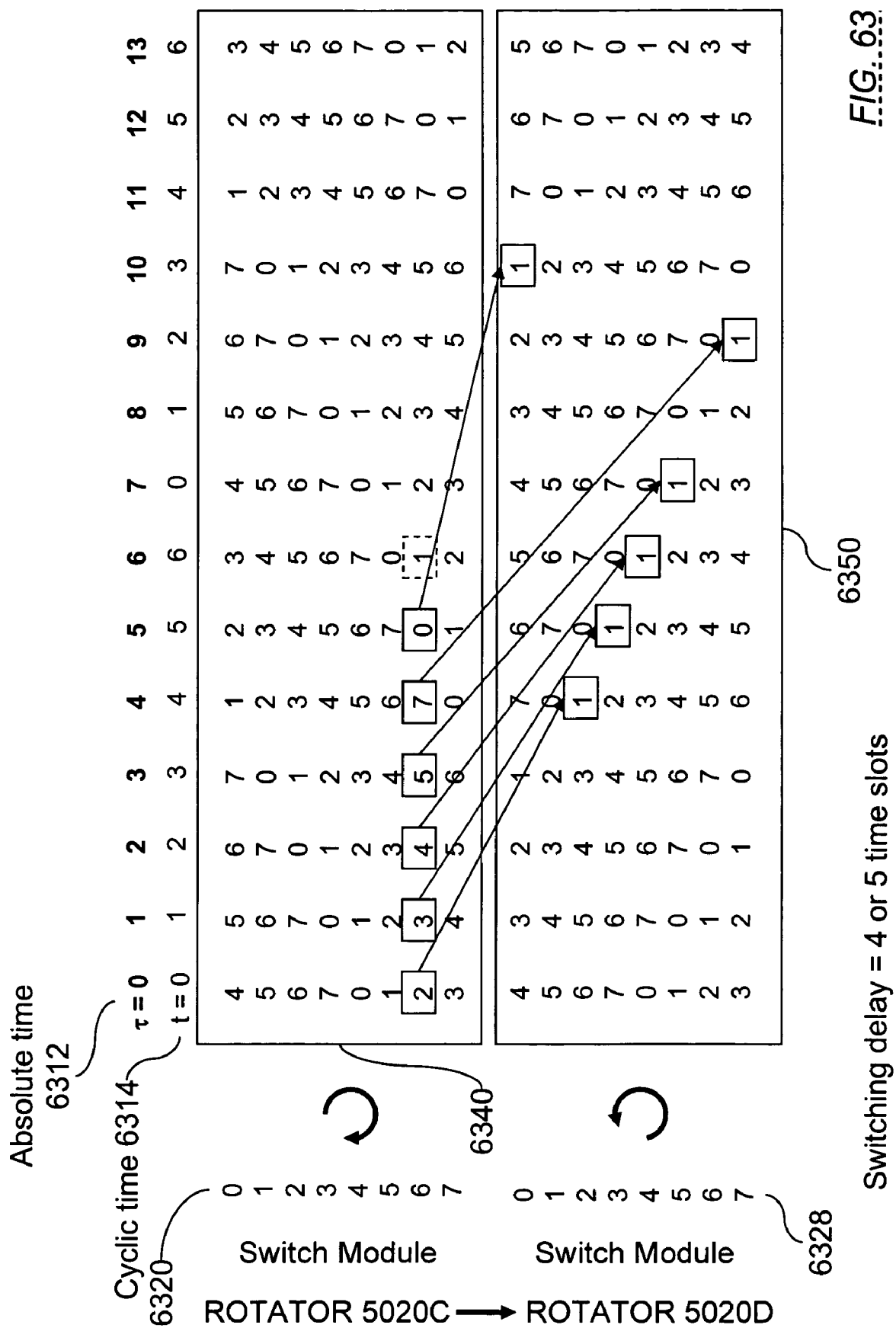
FIG. 63 illustrates the switching delay of indirect connections traversing a second complementary pair of rotators in the polyphase circulating switch illustrated in FIG. 50 when the rotation cycles exclude switch-module self-connection through the rotators and the forward rotator is a clockwise rotator.

FIG. 63 illustrates a first connectivity matrix 6340 and a second connectivity matrix 6350 for the circulating switch 5000 of FIG. 50, wherein the third rotator 5020C is the forward rotator and the fourth rotator 5020D is the terminating rotator. A cyclic-time row 6314 indicates a cyclic time, t, $0 \leq t < 8$, over two rotation cycles and an absolute time row 6312 indicates the absolute time, τ. A first module-identity column 6320 references the eight switch modules as 0 to 7 for the third rotator 5020C. Likewise, a second module-identity column 6328 references the eight switch modules as 0 to 7 for the fourth rotator 5020D. An indirect connection from switch module 6 to switch module 1 through intermediate switch module 7 or 0 yields a switching delay of five rotation phases. An indirect connection from switch module 6 to switch module 1 through any of intermediate switch modules 2, 3, 4 or 5 yields a switching delay of four rotation phases.

Figure 64:
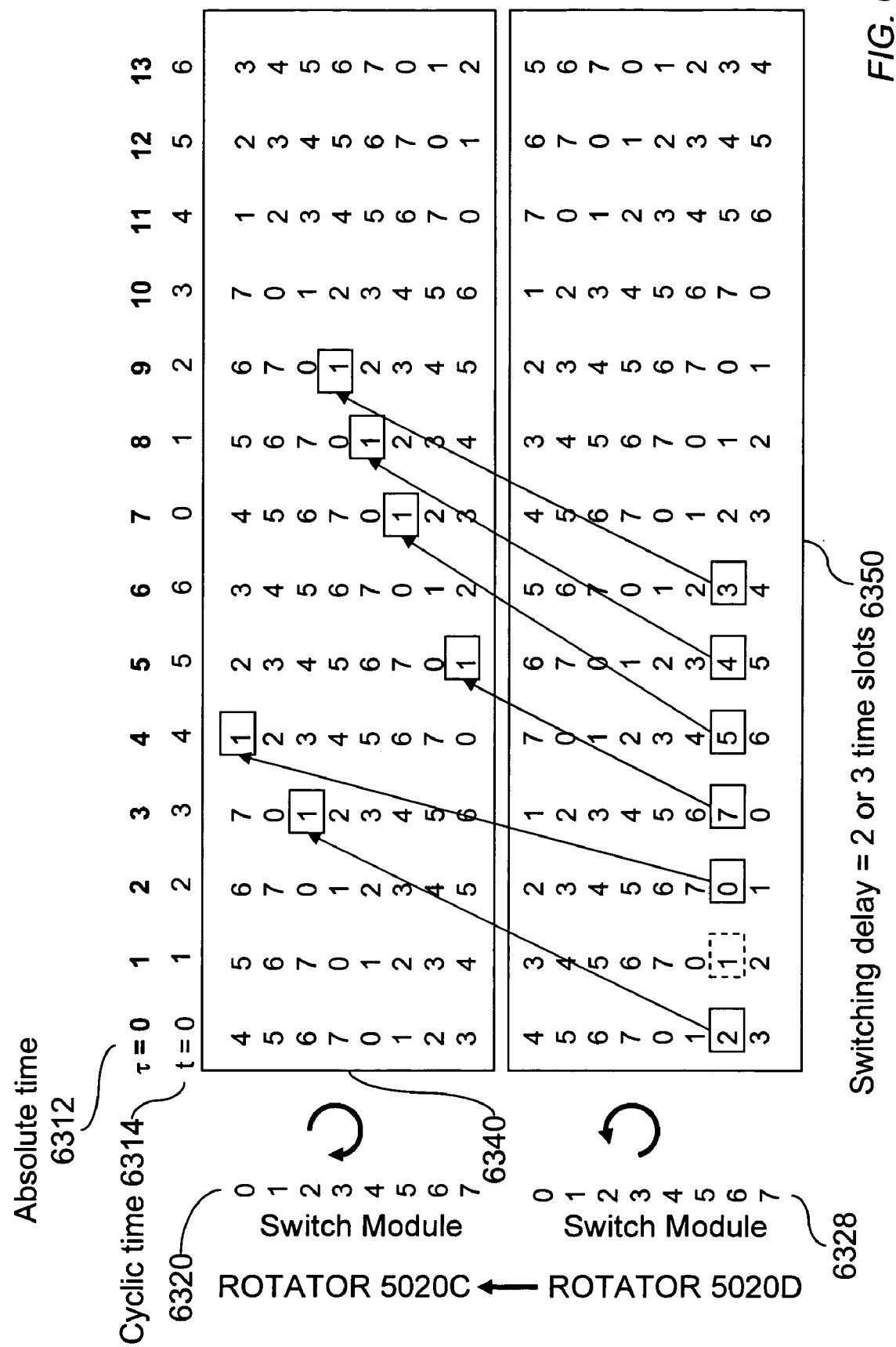
FIG. 64 illustrates the switching delay of indirect connections traversing the second complementary pair of rotators in the polyphase circulating switch illustrated in FIG. 50 when the rotation cycles exclude switch-module self-connection through the rotators and the forward rotator is a counterclockwise rotator.

FIG. 64 illustrates the first-connectivity matrix 6340 and the second connectivity matrix 6350 of FIG. 63 with the indirect connections from source switch module 6 to sink switch module 1 using the fourth rotator 5020D in the forward direction and the third rotator 5020C in the terminating direction. An indirect connection from switch module 6 to switch module 1 through intermediate switch module 7 or 0 yields a switching delay of two rotation phases. An indirect connection from switch module 6 to switch module 1 through any of intermediate switch modules 2, 3, 4 or 5 yields a switching delay of three rotation phases.

Figure 65:
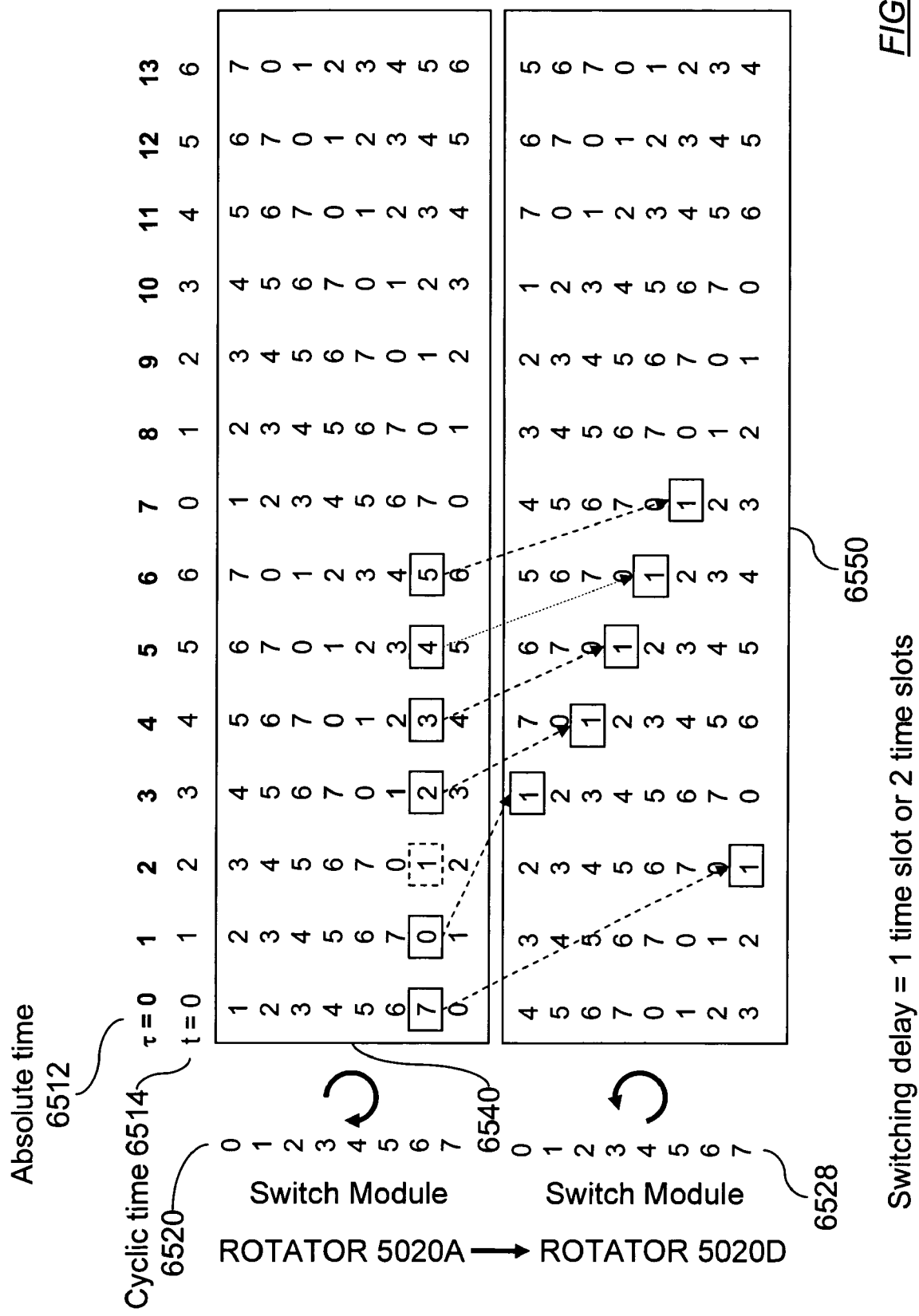
FIG. 65 illustrates the switching delay of indirect connections traversing a clockwise rotator and a phase-shifted counterclockwise rotator in the polyphase circulating switch illustrated in FIG. 50 when the rotation cycles exclude switch-module self-connection through the rotators and the forward rotator is the clockwise rotator.

FIG. 65 illustrates a first connectivity matrix 6540 and a second connectivity matrix 6550 for the circulating switch 5000 of FIG. 50, wherein the first rotator 5020A is the forward rotator and the fourth rotator 5020D is the terminating rotator. A cyclic-time row 6514 indicates a cyclic time, t, $0 \leq t < 8$, over two rotation cycles and an absolute time row 6512 indicates the absolute time, τ. A first module-identity column 6520 references the eight switch modules as 0 to 7 for the first rotator 5020A. Likewise, a second module-identity column 6528 references the eight switch modules as 0 to 7 for the fourth rotator 5020D. An indirect connection from switch module 6 to switch module 1 through intermediate switch module 7 or 0 yields a switching delay of two rotation phases. An indirect connection from switch module 6 to switch module 1 through any of intermediate switch modules 2, 3, 4 or 5 yields a switching delay of one rotation phase.

Figure 66:
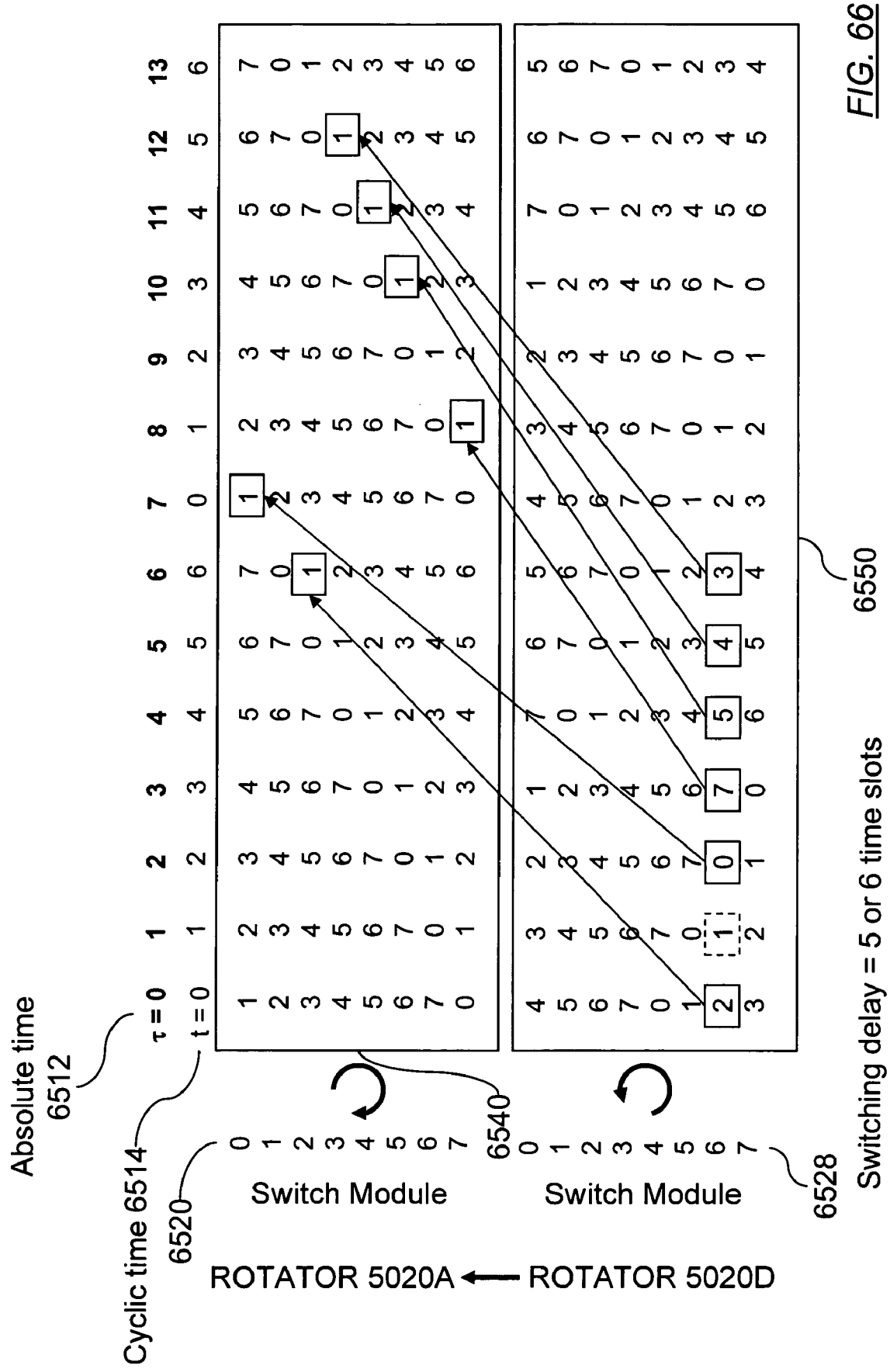
FIG. 66 illustrates the switching delay of indirect connections traversing a clockwise rotator and a phase-shifted counterclockwise rotator in the polyphase circulating switch illustrated in FIG. 50 when the rotation cycles exclude switch-module self-connection through the rotators and the forward rotator is the phase-shifted counterclockwise rotator.

FIG. 66 illustrates the first connectivity matrix 6540 and the second connectivity matrix 6550 of FIG. 65 with the indirect connections from source switch module 6 to sink switch module 1 using the fourth rotator 5020D in the forward direction and the first rotator 5020A in the terminating direction. An indirect connection from switch module 6 to switch module 1 through intermediate switch module 7 or 0 yields a switching delay of five rotation phases. An indirect connection from switch module 6 to switch module 1 through any of intermediate switch modules 2, 3, 4 or 5 yields a switching delay of six rotation phases.

Switching Delay in a Polyphase Switch

Figure 67:
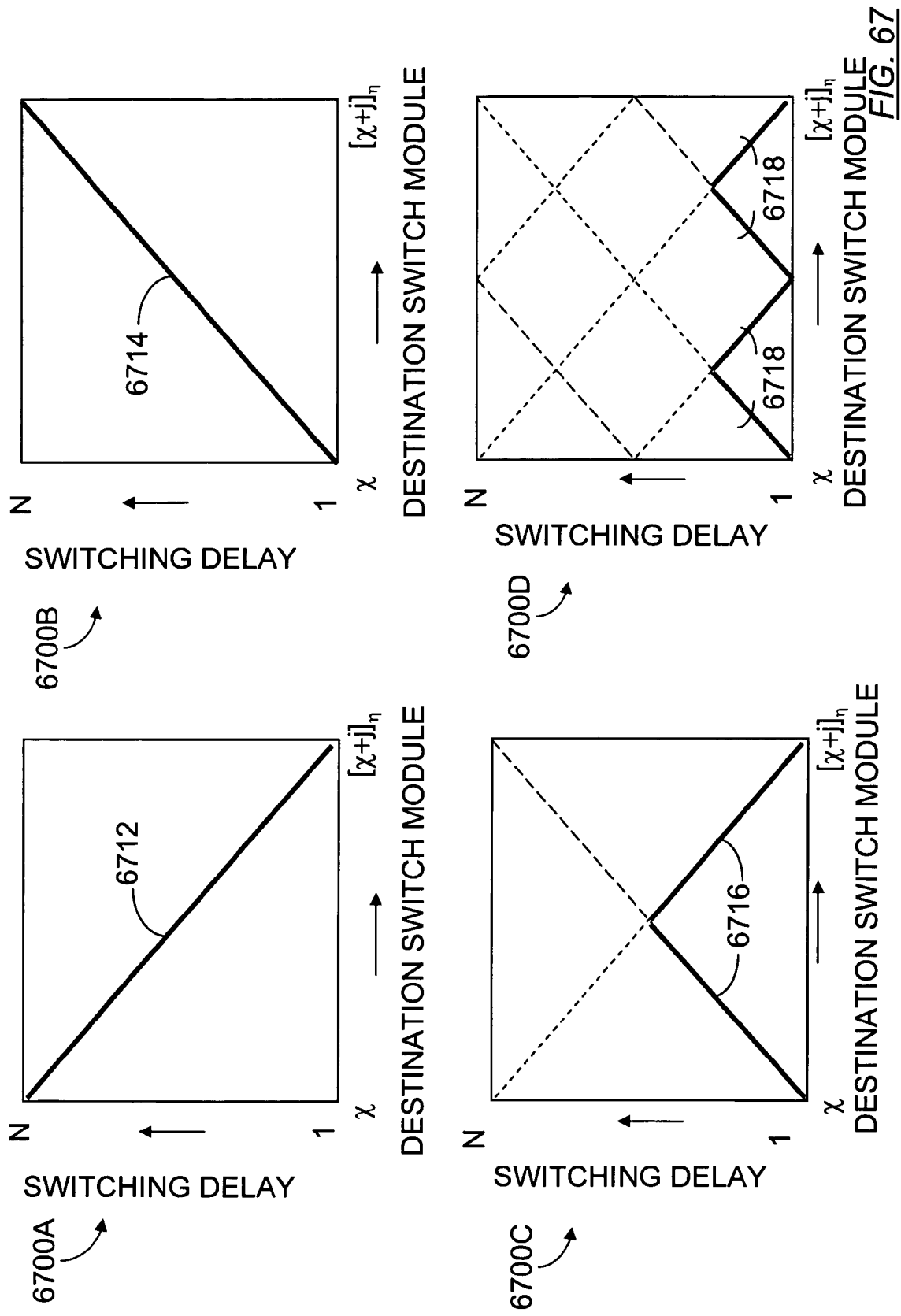
FIG. 67 graphically illustrates the switching-delay patterns in different configurations of single phase and polyphase circulating switches, according to embodiments of the present invention.

FIG. 67 graphically illustrates switching-delay patterns. For a clockwise rotator, a switching delay is illustrated in a first plot 6700A to depend on the relative positions of a directed switch module pair χ and [χ+j] modulo η, where η is the number of dual ports per rotator. The switch delay varies between 1 and N time slots (rotation phases) as illustrated by a line 6712. The line 6712 is illustrated as a continuous line even though it represents discrete values of the switch delays, each discrete value corresponding to a directed switch pair. A second plot 67008 illustrates the switching delay for each directed switch module pair for a counterclockwise rotator. The discrete value of the switching delay varies between 1 and N time slots as represented by a line 6714. For a given directed switch-module pair, the switching delay determined from the line 6714 is the $N^{th}$-complement of the switching delay determined from the line 6712 in the first plot 6700A. A third plot 6700C illustrates lower bounds of switching delay if a selection of one of two paths is made and the path offering a lower delay is available, as described earlier with reference to FIGS. 33 and 34. The lower bounds are determined from the intersection of the line 6712 in the first plot 6700A and the line 6714 in the second plot 6700B and are indicated by a set of solid lines 6716 in the third plot 6700C. The upper bound of the delay indicated by the set of solid lines 6716 is N/2 rotation phases. The delay characteristics of the third plot 6700C would be shifted if the counterclockwise rotator is phase shifted with respect to the clockwise rotator. A fourth plot 6700D illustrates the lower bounds, indicated by a set of solid lines 6718, of switching delay when a selection of one of four paths through four rotators of a polyphase circulating switch is made. The lower bounds are determined from the delay characteristics of the third plot 6700C and the delay characteristics of a phase-shifted rotator pair. The upper bound of the delay indicated by the set of solid lines 6718 is N/4 rotation phases.

Switching Method

The circulating switches illustrated in FIGS. 4, 8, 36, 37 and 50 are based on creating a temporal mesh interconnection of the switch modules providing a harmonious set of temporal paths from each switch module to each other switch module. The harmonious paths collectively function as a single path of high capacity so that any spatial distribution of traffic can be accommodated, and capacity allocation for any switch-module pair can be increased without disturbing current temporal paths. The harmonious paths preserve the temporal order of data segments transmitted from each source switch module to each sink switch module. The underlying switching method is summarized below.

Each switch module belonging to a plurality of switch modules cyclically connects to each other switch module during at most a specified number of time slots in a time frame having a predefined number of time slots. Consequently, during each time slot, each switch module connects to a subset of switch modules comprising a number of switch modules not exceeding the specified number of time slots. The time frame may, comprise 128 time slots for example, and the specified number of time slots may equal eight. Each switch module may then connect to eight other switch modules during one time slots, delivering one data segment during each of the eight time slots. Other connectivity variations may be used. For example, each switch module may connect to only one other switch module during each time slot and transmit up to eight data segments to the other switch module. A preferable connectivity pattern connects each switch module to a number of other switch modules equal to the specified number of time slots. This preferable connectivity enables the creation of paths from any source switch module to any sink switch module that are separated by a fraction of the rotation cycle; in the above example, the fraction is ⅛.

Each switch module has a memory device logically partitioned into a shipping section, a transit section, and a receiving section, as illustrated in FIG. 40. Each switch module receives data segments, each destined to another switch module. During each time slot of the time frame, each switch module sends to each other switch module a number of data segments not exceeding the above specified number.

A switch module receives data segments from subtending data sources and may receive data segments from other switch modules. A data segment received from a data source is written in a shipping section of the associated memory device. A data segment received from one of said switch modules may be written in a transit section of the associated memory device, and a data segment received from another switch module may be written in a receiving section in the associated memory device.

Each switch module addresses a data segment waiting in a shipping section to either a transit section or a receiving section of a memory device associated with a switch module in said subset of switch modules, and addresses a data segment waiting in its transit section to a receiving section of a memory device associated with a switch module in said subset of switch modules. The circulating connectivity pattern automatically ensures that the waiting time of a data segment in a transit section does not exceed the duration of said time frame.

Scheduling

A switch module in a circulating switch receives data from subtending data traffic sources and adaptively determines a required capacity to each destination switch module. A method of adaptive capacity allocation is described in U.S. Pat. No. 6,580,721 issued to Beshai on Jun. 17, 2003, and titled "Routing and Rate Control in a Universal-Transfer-Mode Network", the specification of which is incorporated herein by reference. Two methods of scheduling, well known in the art, may be used. In the first method, each switch module maintains a description of a set of paths to each other switch module. To establish a path to another switch module, the switch module selects a path, starting with a direct path, and sends a connection request message along the path. If each traversed switch module succeeds in allocating and scheduling the required capacity, the path is reserved. Otherwise, another path from the path set is selected or the connection request is rejected. In the second method, each switch module sends its capacity allocation requests to a master controller which maintains a space-time occupancy map of the inlets and outlets of all switch modules.

Scheduling Modes

A switch module may receive data segments from its subtending data sources and sort the data segments according to destination switch modules. In a first mode of scheduling, the transfer of the data segments to a destination switch module may be scheduled individually. In a second mode, data segments destined for each selected switch module in a set of switch modules may be aggregated into a "flow" and allocated a flow rate. A schedule may then be determined for each flow.

Scheduling individual data segments is performed for data segments already waiting in the shipping section of the source switch module. Scheduling data segments belonging to a given flow involves allocating, to the given flow, a number of time slots (rotation phases) per time frame (rotation cycle) whether or not data segments belonging to the given flow are waiting in the shipping section of the source switch module.

A path from a source switch module to a destination switch module may be direct, traversing only one rotator, or indirect, traversing a rotator to an intermediate switch module then traversing the same, or another, rotator from the intermediate switch module to the destination switch module.

Centralized vs. Distributed Scheduling

Two approaches may be adopted to schedule the transfer of data segments, in either mode, from any switch module to any other switch module.

In one approach, herein called centralized scheduling, each switch module communicates sufficient information about data segments already received from subtending sources and waiting in its shipping section, or information about an allocated flow rate, to the master controller. The master controller then determines a schedule for each data segment, or for each rate-controlled flow of data segments, and sends the schedules to respective switch modules.

In another approach, herein called distributed scheduling, each switch module selects, for each data segment waiting in its shipping section, or for each flow, a path, or multiple paths, through the array of rotators. A direct connection to the destination switch module may be scheduled solely by the source switch module. For an indirect connection through an intermediate switch module, the source switch module communicates a request to the intermediate switch module to gain permission for sending a data segment to be placed in the transit section of the intermediate switch module. If permission is denied, a request is communicated to another intermediate switch module for the indirect connection. In the case of a flow, the intermediate switch module determines from the request that a continuous flow is required and, if the intermediate switch module accepts the flow request, a corresponding data block in the transit section will be reserved until a request to terminate the connection is received.

Scheduling direct connections is straightforward. The number of time slots during which a source switch module connects directly to a destination switch module equals the number of rotators in the rotator array. Some of these time slots may already be reserved for the downstream parts of indirect connections originating from other switch modules. In distributed scheduling, the source switch module may select a number of free time slots for the direct connection and, if additional time slots are required, an indirect path setup process may be initiated. In centralized scheduling, the master controller allocates the required number of time slots through direct paths first, then through indirect paths, if needed. For indirect paths, each traversing an intermediate switch module, it is understood that the first part of the path, from the source switch module to the intermediate switch module, and the second part of the path, from the intermediate switch module to the destination edge module, may occur in successive rotation cycles. For example, the first part may take place during time slot 5 of a current rotation cycle while the second part takes place during time slot 2 of the immediately following rotation cycle. The delay, however, never exceeds the period of a rotation cycle. The centralized scheduling process need be aware of such crossing of the rotation cycle boundary as will be described below.

To perform centralized scheduling, the master controller may use a data structure that enables fast scheduling. The simplest structure is a matrix indicating the occupancy state of each path from each switch module to each other switch module. If the transfer of data from each switch module to each other switch module is performed under flow rate control, where a flow rate is allocated for each switch module pair, and if the flow rate allocation changes relatively slowly, every 16 rotation cycles for example, then it is sufficient to indicate the occupancy state of each direct path using a single bit as illustrated in occupancy state matrices, which will be described in detail hereinafter with reference to FIGS. 68 and 69.

However, with individual data segment scheduling, or with a mixture of individual data segment scheduling and flow-rate based scheduling, it is preferable that the scheduler be aware of indirect connections traversing a rotation cycle boundary. For example, the first part of an indirect connection from a first switch module through an intermediate switch module toward a second switch module may take place during time slot 98 in a rotation cycle of 128 phases (128 time slots) while the second part takes place during time slot 52 of the following rotation cycle. The master scheduler may also have a request to schedule a single data segment from the intermediate switch module to the second switch module, which can take place during time slot 52 of the current rotation cycle. The entry in the matrix corresponding to the intermediate switch module and the destination switch module would contain a code including a busy indication after the indirect connection is scheduled. However, the scheduling matrix described above has only spatial attributes; the source and destination switch module. As such, it cannot be used to schedule the two requests even though both can actually be accommodated.

Introducing the temporal aspect may be simplified by noting that an indirect connection never traverses more than one rotation cycle boundary. Thus, instead of using one bit to indicate occupancy state, two bits may be used as discussed hereinafter with reference to FIG. 69. The first bit may indicate the occupancy state during a current rotation cycle while the second bit indicates the occupancy state of the same path during the subsequent rotation cycle. After the current rotation cycle is completed, the subsequent rotation cycle becomes the current rotation cycle, and the first bit is reset to indicate a free state. This arrangement would apply only to individual data segment scheduling.

To accommodate a mixture of individual data segment scheduling (first mode scheduling) and flow-rate-based scheduling (second mode scheduling), a third bit would be needed to distinguish the two modes of scheduling. This leads to a three-bit occupancy state code as discussed hereinafter with reference to FIGS. 70 and 71.

In a circulating switch with a single rotator, each switch module connects to each other switch module during a rotation phase in each rotation cycle. During one rotation phase, a switch module may transmit at most two data segments to a corresponding switch module during two time slices of the rotation phase as illustrated in FIG. 14. With homogeneous flow-rate-based scheduling, the state occupancy indication may comprise two bits; one bit corresponding to the first time slice and the other bit corresponding to the second time slice. With homogeneous individual-data-segment based scheduling, the state occupancy indication may comprise four bits; two bits corresponding to the first time slice and the other two bits corresponding to the second time slice. As described above, the two bits corresponding to a time slice are needed to identify the relative rotation cycle corresponding to the second part of an indirect connection, the relative rotation cycle being a current or an immediately succeeding rotation cycle. With a mixture of individual-data-segment based scheduling and flow-rate-based scheduling, the state occupancy indication may comprise six bits. One additional bit being introduced to distinguish the two scheduling modes.

FIG. 68 illustrates an occupancy state matrix 6800 for use in a single rotator circulating switch, such as illustrated in FIGS. 4 and 9, having eight switch modules indexed 0 to 7. Self-connection through the single rotator is excluded and, therefore, the rotation cycle has seven phases. During a rotation phase (a time slot) each switch module connects to another switch module through the rotator and two data segments may be transferred over the path during two time slices of the time slot as illustrated in FIG. 14 and FIG. 20. Each entry in the occupancy state matrix 6800 includes a two-bit code to indicate the occupancy states of a corresponding path during the two time slices. A value of "0" indicates a free time slice and a value of "1" indicates a reserved or occupied time slice. Each of the diagonal entries contains an "x", indicating that self-connection is excluded. The occupancy state matrix 6800 is suitable for flow based connections where a single bit is sufficient to indicate the occupancy state. In the exemplary occupancy state matrix 6800, the path from switch module 2 to switch module 1 is occupied during the two time slices (code "11") while the path from switch module of index 2 to switch module of index 5 is occupied during the first time slice only (code "10"). Consider that a scheduled direct connection between a source switch module j and a destination switch module k may be represented as {j, k} and that a scheduled direct connection between a source switch module j and a destination switch module k through an intermediate switch module h may be represented as {j, h, k}. The occupancy states illustrated in the occupancy state matrix 6800 could arise after scheduling direct connections {2, 6}, {2, 6}, {2, 7}, {2, 7}, {5, 1}, {5, 1}, {5, 2}, and indirect connections {6, 2, 1}, {0, 4, 2}, {6, 7, 5}, {4, 5, 7}, {0, 7, 1}, {0, 7, 4}, {7, 6, 1}, {4, 2, 1}, {0, 4, 3}, {6, 7, 2}, {5, 7, 3}, {6, 1, 0}, {6, 2, 3}, {7, 3, 4} and {2, 5, 6}. Duplicate connection identifiers, such as {2, 6}, {2, 6}, indicate that two data segments are transferred from the source switch module to the destination switch module during a rotation phase (a time slot).

Figure 69:
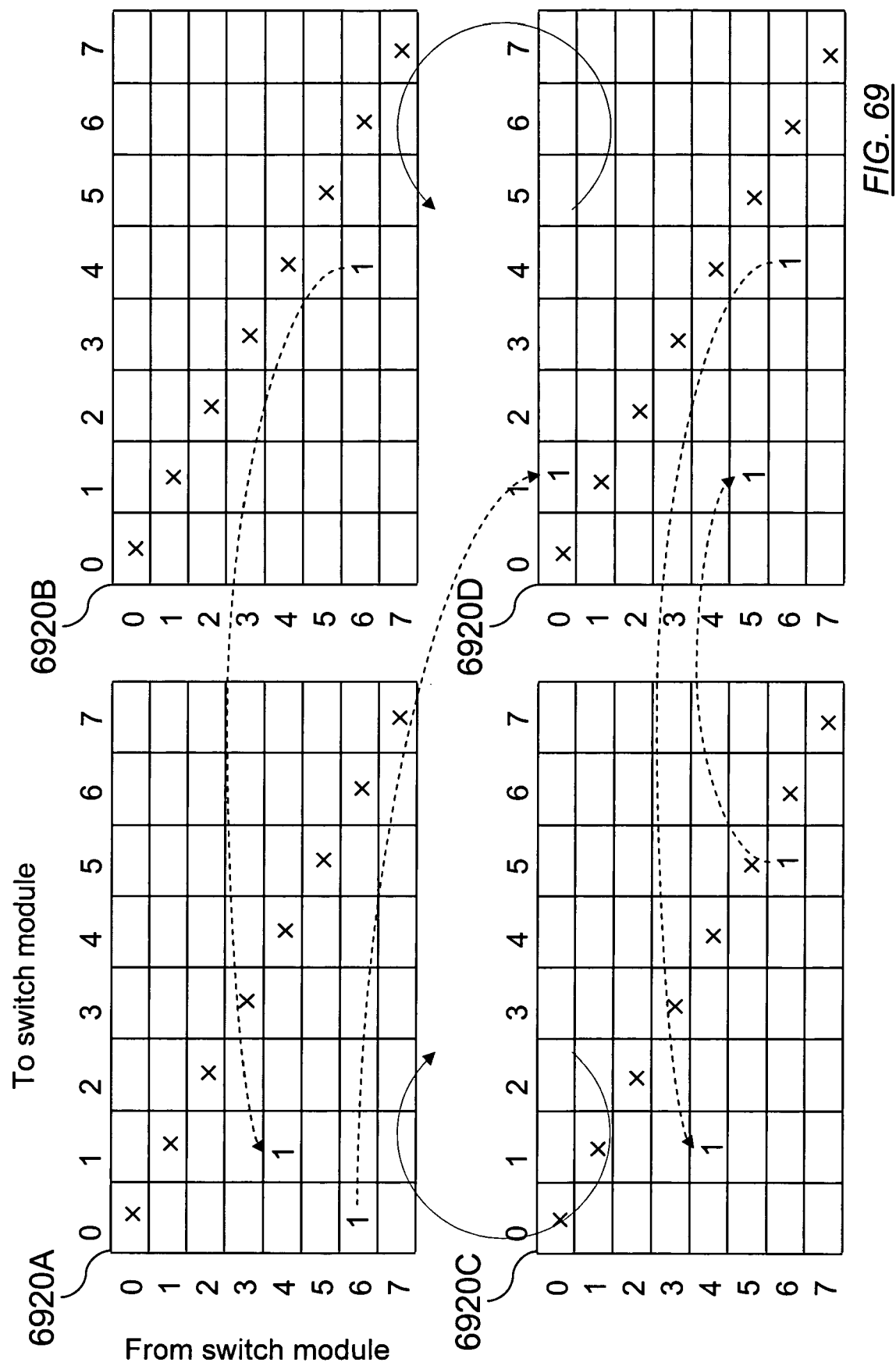
FIG. 69 illustrates four occupancy state matrices for use in the polyphase circulating switch of FIG. 50, according to an embodiment of the invention.

FIG. 69 illustrates four occupancy state matrices 6920A, 6920B, 6920C, 6920D used in the polyphase circulating switch 5000 of FIG. 50. The four occupancy state matrices 6920A, 6920B, 6920C, 6920D respectively correspond to the four rotators 5020A, 5020B, 5020C, 5020D of FIG. 50. Occupancy states are indicated for indirect connections {6, 4, 1}, {6, 5, 1}, {6 ,4, 1} and {6, 0, 1} respectively traversing rotator pairs 5020B/5020A, 5020C/5020D, 5020D/5020C and 5020A/5020D. Each of the four combinations traverses a clockwise rotator and a counter clockwise rotator. The switching delays corresponding to the four cases are illustrated in FIGS. 62, 63, 64 and 65 respectively.

Figure 70:
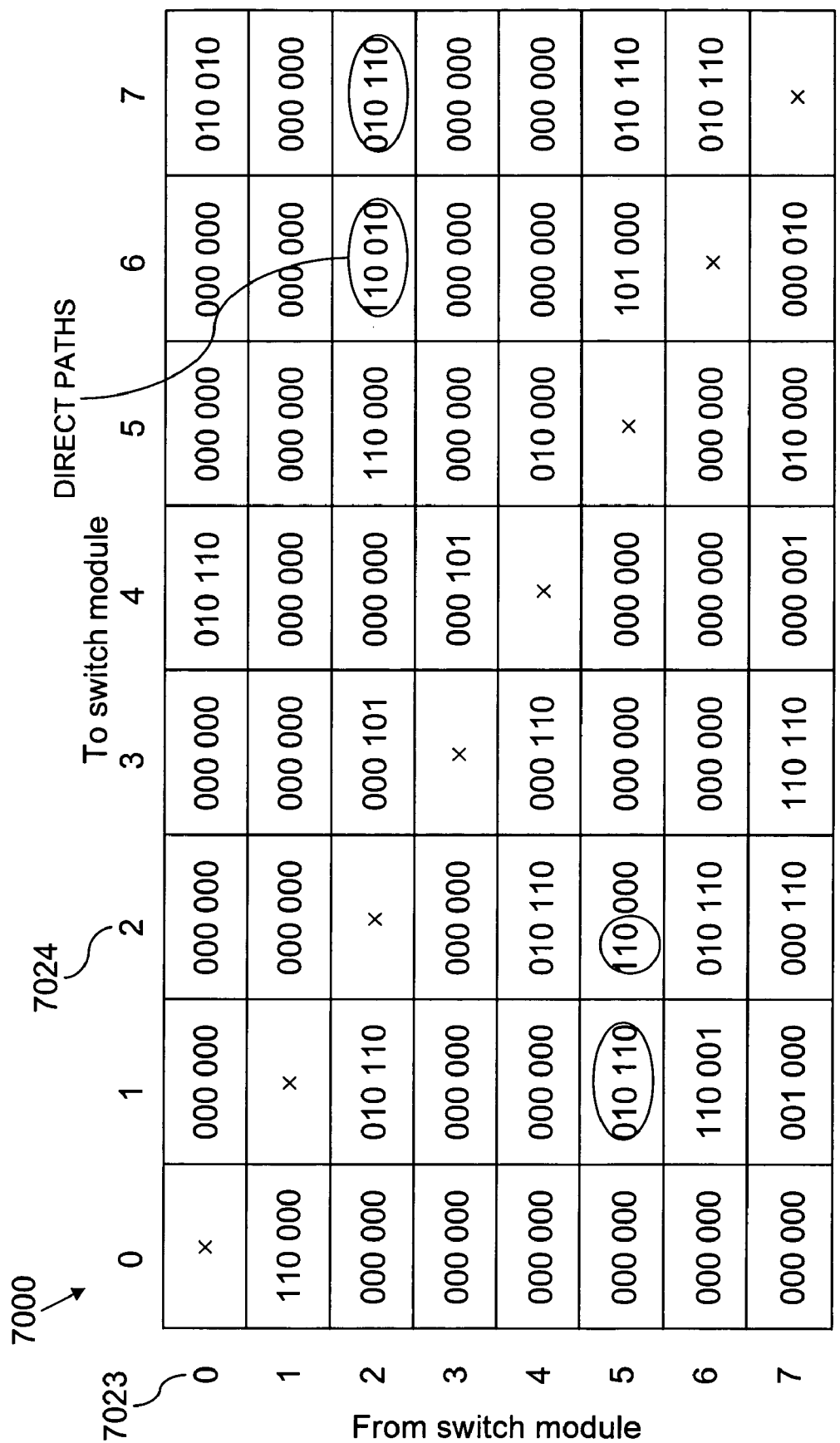
FIG. 70 illustrates an occupancy state matrix suitable for a mixture of individual data segment scheduling and flow-rate-based scheduling for use in a single rotator circulating switch of the type illustrated in FIGS. 4 and 9, according to an embodiment of the invention.

FIG. 70 illustrates an occupancy state matrix 7000 suitable for a mixture of individual-data-segment scheduling and flow-rate-based scheduling for use in a single rotator circulating switch of the type illustrated in FIGS. 4 and 9 and having eight switch modules. The occupancy states indicated correspond to those of the occupancy state matrix 6800 of FIG. 68 with the additional distinction of the scheduling mode and the rotation cycle boundary crossing for indirect connections as described above. In particular, each data segment using a direct connection {2, 6}, {2, 7}, {5, 1}, or {5, 2} occupies a time slice of a rotation phase and belongs to a flow while the remaining data segments, using connections {2, 6}, {2, 7}, and {5, 1} do not belong to any flow. Connections {6, 2, 1}, {0, 4, 2}, {6, 7, 5}, and {4, 5, 7} do not cross the rotation-cycle boundary and are scheduled individually. Connections {4, 2, 1}, {0, 4, 3}, {6, 7, 2}, {5, 7, 3}, and {6, 1, 0} are flow based and do not cross the rotation cycle boundary. Connections {0, 7, 1}, {0, 7, 4}, and {7, 6, 1} cross the rotation cycle boundary and are scheduled individually. Connections {6, 2, 3}, {7, 3, 4}, and {2, 5, 6} cross the rotation-cycle boundary and are flow based. Each of the connections occupies a time slice of a rotation phase. Each entry in the occupancy-state matrix 7000 corresponds to two time slices of a rotation phase. The two time slices may be scheduled independently.

An indirect connection {6, 2, 1} which does not cross a rotation cycle boundary is indicated by the code "010" in the entry in the occupancy state matrix 7000 corresponding to source switch module 6 and intermediate switch module 2 and a code "010" in the entry in the occupancy state matrix 7000 corresponding to intermediate switch module 2 and destination switch module 1. The leftmost bit ("0") in both codes indicates a scheduled individual data segment. The second bit ("1") in each code indicates that the data segment is scheduled for transmission during a current time slot. This indication is of course redundant in this case but used for consistency.

Additionally, an indirect connection {2, 5, 6} is indicated by the code of "110" in the entry in the occupancy state matrix 7000 corresponding to source switch module-2 and intermediate switch module 5 and a code "101" in the entry in the occupancy-state matrix 7000 corresponding to intermediate switch module 5 and destination switch module 6. The leftmost bit ("1") in both codes identifies the connection as belonging to a flow. The second bit ("1") in the code in the entry corresponding to source switch module 2 and intermediate switch module 5 is redundant as explained above. The second bit ("0") in the code in the entry corresponding to intermediate switch module 5 and destination switch module 6 indicates that a data segment is not transmitted during a rotation phase in the rotation cycle under consideration. The third bit ("1") in the code in the entry corresponding to intermediate switch module 5 and destination switch module 6 indicates that a data segment is transmitted during a rotation phase in the rotation cycle subsequent to the rotation cycle under consideration.

Figure 71:
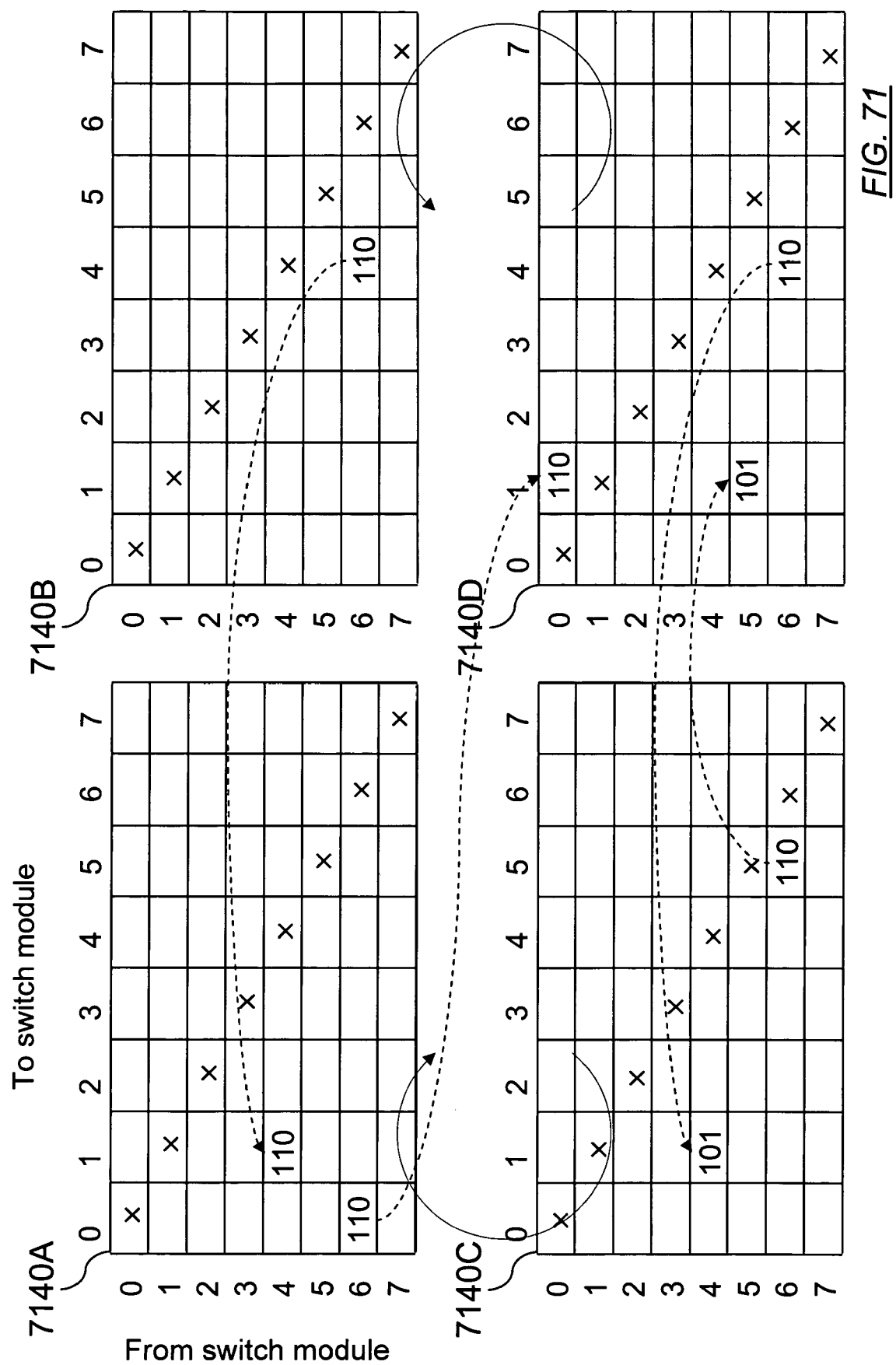
FIG. 71 illustrates four occupancy state matrices for use in conjunction with the polyphase circulating switch of FIG. 50, according to an embodiment of the invention.

FIG. 71 illustrates four occupancy state matrices 7120A, 7120B, 7120C, 7120D for use in conjunction with the polyphase circulating switch 5000 of FIG. 50, corresponding to the example of FIG. 69. The occupancy state matrices 7120A, 7120B, 7120C, 7120D respectively correspond to the rotators 5020A, 5020B, 5020C, 5020D of FIG. 50. The occupancy states are indicated by the three-bit code for the same paths illustrated in the occupancy state matrices of FIG., 69.

The connection {6, 4, 1}, which traverses the second rotator 5020B towards the intermediate switch module 4, is represented at the entry in the occupancy state matrix 7120B corresponding to source switch module 6 and intermediate switch module 4 by the code "110" and at the entry in the occupancy state matrix 7120A corresponding to intermediate switch module 4 and destination switch module 1 by the code ("110"). The leftmost bit in both codes is set to "1", indicating that the connection belongs to a flow. The second bit in each of the two codes is "1", indicating that a data segment is transferred from the source switch module 6 to the destination switch module 1 through the intermediate switch module 4 without crossing a rotation cycle boundary.

The connection {6, 5, 1}, which traverses the third rotator 5020C towards the intermediate switch module 5, is represented at the entry in the occupancy state matrix 7120C corresponding to source switch module 6 and intermediate switch module 5 by the first code "110" and at the entry in the occupancy state matrix 7120D corresponding to intermediate-switch module 5 and destination switch module 1 by the second code ("101"). The leftmost bit in both codes is set to "1" indicating that the connection belongs to a flow. The second bit in the second code is "0" indicating that a data segment is not transferred from intermediate switch module 5 to destination switch module 1 in the rotation cycle under consideration. The third bit ("1") in the second code indicates that a data segment is transmitted during a rotation phase in the rotation cycle subsequent to the rotation cycle under consideration Multicasting in a Circulating Switch In a multicast communication, a data segment is transmitted from a source switch module to several other switch modules. As described above, each switch module directly connects to each other switch module during a number if time slots equal to the number of rotators in a circulating switch. This direct connection greatly simplifies multicasting. A data segment to be multicast is preferably stored in the shipping section of the source switch module and a multicast count, equal to the number of switch modules designated to receive a copy of the data segment, is associated with the data segment. A distribution list, including an identifier of each of the designated switch modules is also provided. During each time slot, the source switch module connects to a number of other switch modules that is less than or equal to the number of rotators. Thus, during each time slot, the source switch module may transmit a copy of the data segment to one or more other switch modules, and, with each transmission, the multicast count is reduced by unity. When the multicast count reaches a value of zero, the data segment is erased from the shipping section.

Multicast data segments may be delivered through indirect paths, or a combination of direct paths and indirect paths. Delivery through direct paths reduces the occupancy of the inner ports of the switch modules and, hence, reduces the queueing delay for data segments waiting in the shipping sections of the switch modules.

Capacity Modification

To accommodate a new switch module in the extended circulating switch 800, 3600, 3700 or 5000, having N>1 current switch modules exchanging data segments through an array of temporal cyclical rotators, where each of the temporal cyclical rotators has N active dual ports (N input ports and N output ports), the following main processes would be required:

(a) provisioning an additional dual port in each rotator;
(b) adjusting the rotation cycle of each rotator to include (N+1) rotation phases per rotation cycle;
(c) connecting the new switch module to each newly provisioned rotator dual port; and
(d) scheduling new connections from the new switch module to the current N switch modules and from the current switch modules to the new switch module.

Provisioning an additional dual port for each rotator, according to step (a) may not require disturbing connections in progress. Processes (b), (c), and (d) may be implemented in stages to avoid interrupting the operation of the entire circulating switch. The processes may be implemented by reconfiguring one rotator at a time according to the following steps under control of the master controller:

(1) select a candidate rotator for reconfiguration;
(2) schedule the exchange of data segments through all the rotators excluding the selected rotator;
(3) when all connections, if any, traversing the selected rotator are terminated, extend the rotation configuration of the candidate rotator so that the rotation cycle includes (N+1) rotation phases;
(4) connect an input port and an output port of the new switch module to the candidate rotator; and
(5) repeat steps (1) to (4) until all rotators are reconfigured.

To free a candidate rotator, it may be necessary to reroute connections traversing the candidate rotator through another rotator. When all rotators are reconfigured according to steps (1) to (4) above, the master controller may schedule data exchange among all the (N+1) switch modules.

A circulating switch 400, 800, 3600, or 3700 may also be extended by including an additional rotator, necessitating the provisioning and activation of an additional dual port (an input port and an output port) of each switch module. This may be performed according to the following steps:

(a) provisioning a new input port and a new output port in each switch module;
(b) connecting the new input port and the new output port to a new temporal cyclical rotator; and
(c) scheduling data-segments exchange through all rotators including the new rotator.

Reliability

Each switch module in a circulating switch 400, 800, 3600, 3700, or 5000 is, fully shared, providing access to subordinate data sources and sinks as well as functioning as a transit facility for other switch-module pairs. In a circulating switch having a large number, N, of switch modules, the number of indirect paths from a switch module to another is (N−2) times the number of rotators. Failure of a switch module may affect its own subtending data sources and sinks, but may not significantly affect the exchange of data among the remaining switch, modules. For example, with N=128, failure of a switch module reduces the number of indirect paths by a ratio of 1/126. Typically, a significant proportion of data segments would use direct paths resulting in a reduced inner occupancy even when the outer ports of all switch modules operate at near-full occupancy. The simplicity of the architecture greatly simplifies connection setup and finding alternate indirect paths.

In a circulating switch 3600, 3700, or 5000 having numerous rotators, failure of a single rotator results in a proportionate loss of internal capacity. With 8 rotators, for example, the relative internal capacity loss is ⅛. Failure of a rotator may require redirecting some connections. A rotator is a simple device that is likely to have an infinitesimal failure probability. Additionally, a standby rotator may be provided to quickly perform the function of any other rotator. It is preferable that a standby rotator have a programmable connectivity.

Programmable Rotator Connectivity

A rotator may be a simple clock-driven device. Alternatively, a slave controller associated with a rotator may determine the number of phases per rotation cycle and an input-output pattern for each rotation phase of a rotation cycle. The slave controller may store a parameterized connectivity rule, or a connectivity-table to be changed as required. A programmable rotator facilitates reconfiguration or expansion of a rotating-access switch (FIG. 2) or a circulating switch (FIGS. 4, 8, 36, 37, 50).

Flow-Rate control

A connection request, transmitted to a master controller by a module controller associated with an origin (source) switch module, may indicate a requested number of data segments per data frame required to be transmitted to a specific destination (sink) switch module. The number of data segments requested may change frequently. The master controller attempts to determine a schedule that accommodates the requested capacity. Flow-rate control translates into a process of allocating a number of data segments per data frame or, equivalently, a number of rotation phases per rotation cycle, to a particular connection between an origin switch module and a destination switch module.

The master controller receives connection requests from each switch module, allocates a permissible transfer rate in response to each of the connection requests and communicates the permissible transfer rates to the switch modules. The master controller further determines a time-table specific to each directed switch module pair and communicates the time-tables to corresponding switch modules. A schedule determined for a circulating switch by a master controller maybe seen to comprise a set of such time-tables.

Routing in a Polyphase Switch

The polyphase switch 5000 of FIG. 50 is adapted from an extended circulating switch 3600 or 3700 by selecting the rotation phases of the rotators to yield paths over time slots that are temporally well distributed over the rotation cycle. There is a direct path from each switch module to each other switch module through each of the rotators. There may also be several sets of indirect paths from one switch module to another, each set comprising (N−2) indirect paths through (N−2) intermediate switch modules and traversing one of the clockwise rotators then one of the counterclockwise rotators, or vice versa, N being the total number of switch modules. Thus, if there are 5 clockwise rotators and 4 counterclockwise rotators, the total number of sets of indirect paths would be 40, and with 128 switch modules (N=128), each set comprises 126 indirect paths. A data stream, identified by a source switch module and a sink switch module, amongst other attributes, is preferably confined to direct paths or, if a direct path is not available, to one of the sets of indirect paths in order to guarantee that data segments arrive at the sink switch module in the proper temporal order. The sets of indirect paths may have different switching delays and the sets may be sorted accordingly to facilitate the selection of the set of least switching delay having available paths of sufficient capacity to accommodate the data stream.

Connection Scheduling in a Polyphase Circulating Switch

Figure 72:
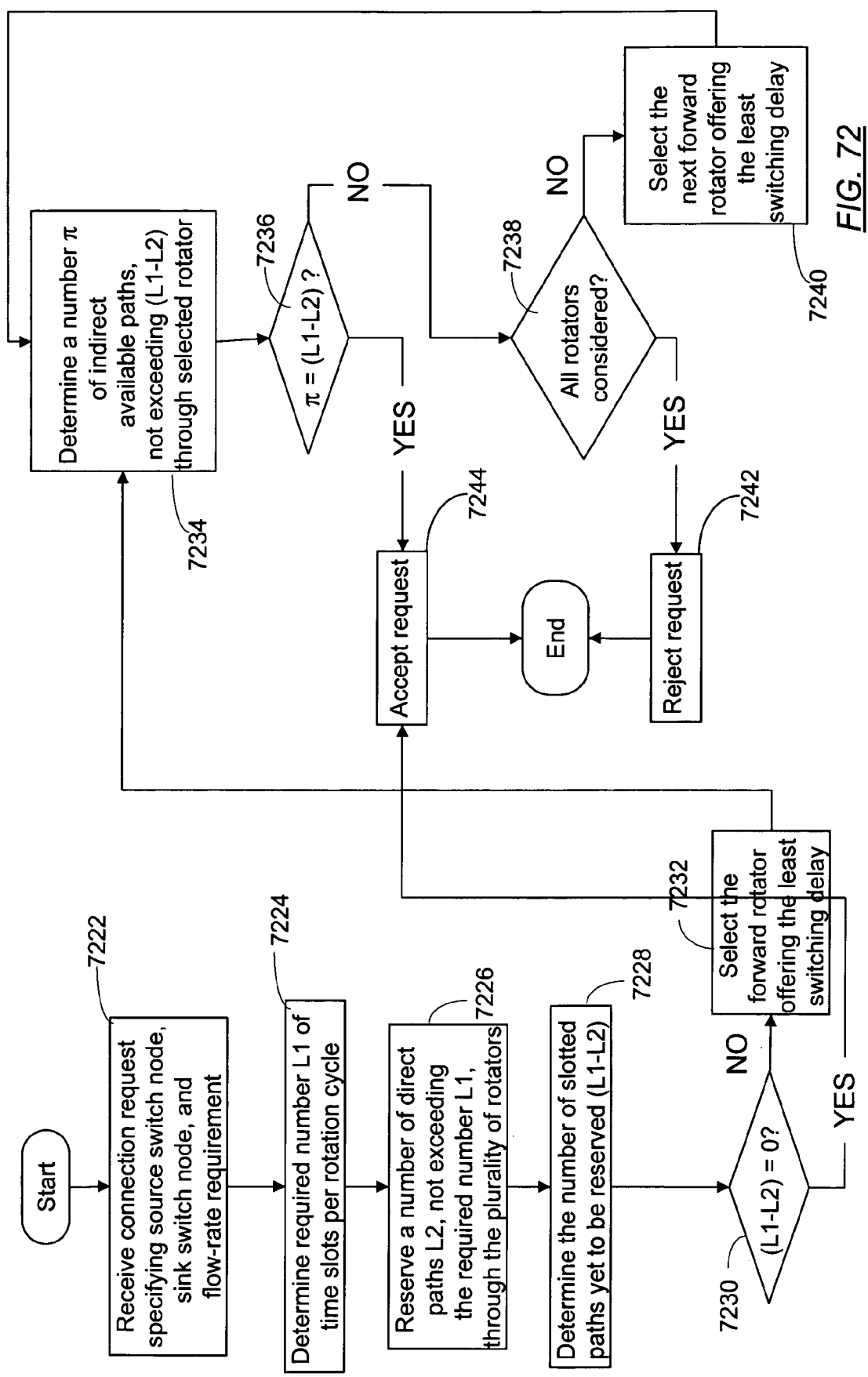
FIG. 72 illustrates steps of a scheduling process in a polyphase circulating switch having parallel paths of different delays, in accordance with an embodiment of the present invention.

FIG. 72 is a flow chart illustrating steps of a scheduling process for a polyphase circulating switch of the type described with reference to FIG. 50. Upon receiving (step 7222) a connection request specifying a source switch module, a sink switch module, and a required flow-rate requirement, the master controller determines the required number, L1, of time slots per rotation cycle (step 7224). The number L1 may vary in successive rotation cycles when the specified flow rate requires a non-integer number of time slots per rotation cycle, in which case the number L1 may vary during successive rotation cycles so that its mean value over an extended period of time approximates the required flow rate. A time slot is the duration of a rotation phase. For example, the specified flow rate for a data stream may be equivalent to 8.2 time slots in a time frame of 128 time slots. The number of time slots allocated in five successive rotation cycles may then be selected as 8, 8, 8, 8, and 9 to yield a mean value of 8.2. These allocations may be repeated over subsequent time frames until a new flow-rate is specified. If the flow-rate specification is changed frequently, every two time frames (two rotation cycles) for example, a moving mean value of the number of time slots per frame may be used in determining and updating the number of time slots to be allocated in successive time frames.

In order to reduce the occupancy of the inner ports of the switch modules, direct paths for the connection are sought first. Each switch module has a number of direct paths, of one time-slot duration each, to each other switch module, the number of path being equal to the number of rotators. In step 7226, a number of direct paths L2 not exceeding the required number of time slot is reserved. The number of indirect paths (L1-L2) that may be required is then determined (step 7228) and, in step 7230, if (L1-L2) equals zero, the connection request is accepted (step 7244). Otherwise, (L1-L2) indirect paths are sought through any complementary pair of rotators. Recall that a complementary pair of rotators includes any clockwise rotator and any counterclockwise rotator where either could be the forward rotator for the connection. A major restriction is a requirement that the remaining (L1-L2) time slots be allocated through the same complementary pair in order to ensure that the (L1-L2) data segments sent over the indirect paths arrive in the proper sequential order, hence eliminating the need for a re-sequencing process.

A circulating switch having one complementary rotator pair interconnecting N>2 switch modules, such as switch 800 of FIG. 8, provides a first set of (N2) candidate indirect paths with the clockwise rotator used as the forward rotator and a second set of (N2) candidate indirect paths with the counterclockwise rotator used as the forward rotator. The switch delay associated with the first set may differ from that associated with the second set. In a circulating switch having complementary groups of rotators, such as the extended circulating switch 3700 of FIG. 37, with one group having M1 rotators and the other having M2 rotators, there are 2×M1×M2 sets of candidate indirect paths, each set including (N2) indirect paths. The switching delay within each set of candidate indirect paths is the same for each of the corresponding indirect paths. However, the switching delay may differ among the 2×M1×M2 sets.

To reduce the mean value of the switching delay, the set offering the least switching delay is selected first (step 7232) and the number, π, not exceeding (L1-L2), of allocable time slots (free time slots) is determined (step 7234). If, in step 7236, it is determined that π=(L1-L2), the connection request is accepted (step 7244). Otherwise, the π allocable time slots are not considered and an attempt to allocate (L1-L2) time slots is repeated with another set of (N−2) indirect, paths. If at least one set of indirect routes (through one complementary pair) has not yet been considered (step 7238), i.e., if at least one rotator has not been considered, the set with the least switching delay is selected (step 7240) and the determination of a number of allocable time slots (step 7234) is repeated until either the request is accepted (step 7244) or all sets are exhausted and the connection request is rejected (steps 7242). It is noted that the deterministic switching delay (transit delay) associated with each rotator pair is determined a priori and used with each new connection request.

Data-Transfer Scheduling in a Single-Rotator Circulating Switch

Figure 73:
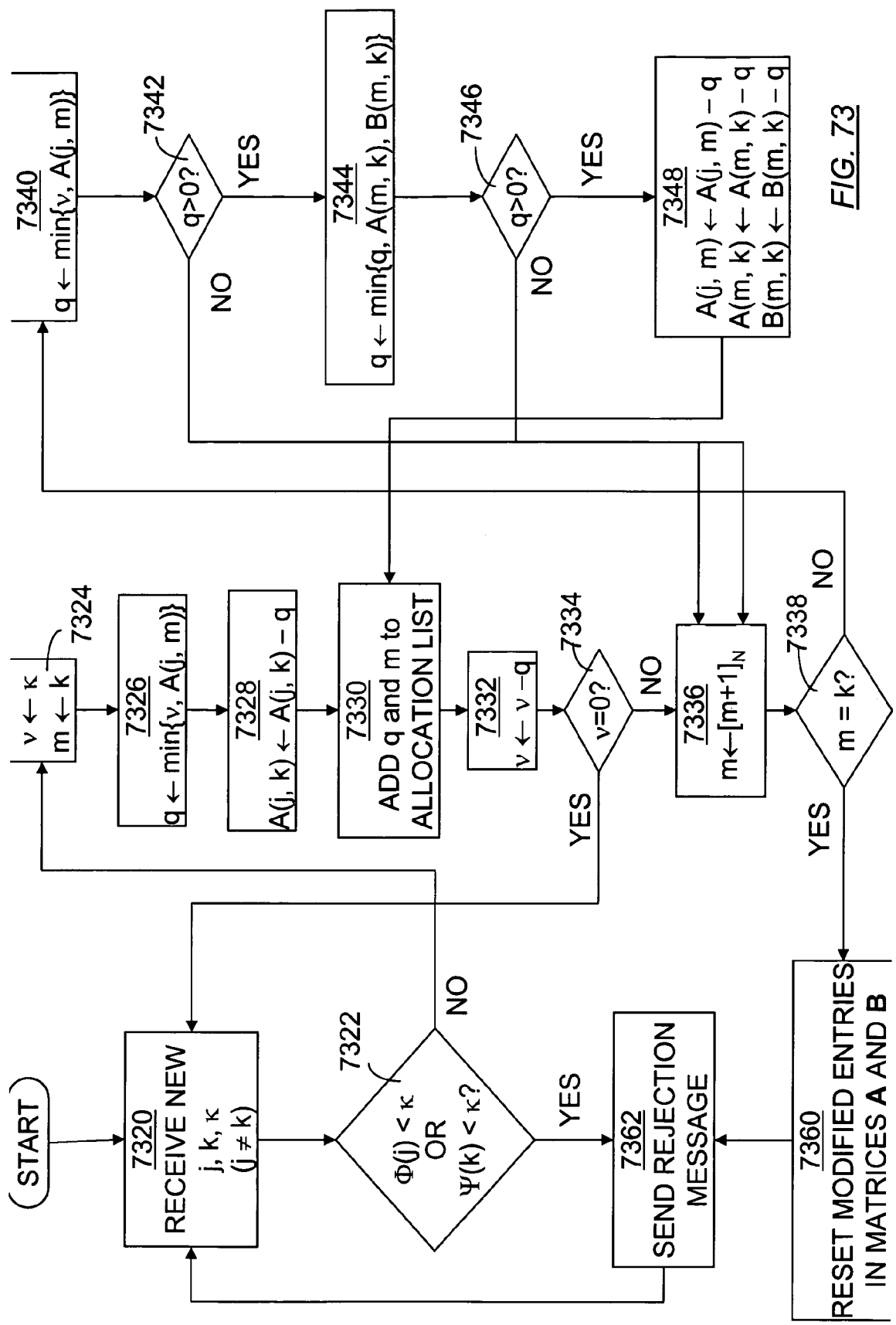
FIG. 73 illustrates steps of a scheduling process carried out in accordance with an embodiment of the present invention.

FIG. 73 provides a flow chart illustrating steps of the scheduling process in a basic circulating switch 400 (FIG. 4) having a single rotator 420. With a single rotator 420, each switch module 422 may have one ingress channel, one egress channel, an inbound channel, and an outbound channel. The capacity (in bits per second) of the ingress channel may be equal to the capacity of the egress channel and the capacity of each of the inbound channel and the outbound channel may be equal twice the capacity of the ingress channel. For example each of the ingress channel and egress channel may carry data at a rate of 10 Gb/s while each of the inbound channel and the outbound channel may carry data at a rate of 20 Gb/s. The following notation is used in the flow chart:

Φ(j): ingress vacancy, determined as the number of free time slots per time frame, where a data segment occupies one time slot, in the ingress channel of switch module j, $0 \leq j < N$;

Ψ(k): egress vacancy, determined as the number of free time slots per time frame in egress channel 1914 of switch module k, $0 \leq k < N$, where a data segment occupies one time slot;

A(j, m): element in path-vacancy matrix A corresponding to a path (j, m), determined as the number of free time intervals, during the rotation phase of the rotation cycle where switch module j connects to switch module m. The maximum value of A(j, m) is two and the minimum value is zero (as illustrated in FIG. 20, two data segments may be transferred across the single rotator during two time intervals within a rotation phase); and B(j, m): element in transit-vacancy matrix B of transit division (j, m). This equals the number of data segments that may be written in a transit section in switch module j for delivery to switch module m.

It is noted that A(j, m) represents the vacancy along the paths from switch module j to switch module k while B(j, m) represents the vacancy of a division in the transit section of switch module j corresponding to switch module m. Consequently, A(j, m)≦B(j, m). The number A(j, m) is less than B(j, m) if a data segment is transferred directly from the shipping section of switch module j to the receiving section of switch module m.

Initially, the master controller receives (step 7320) a connection request from switch module j. The connection request specifies a destination switch module k, $0 \leq k < N$, and a number, κ, of data segments per rotation cycle. The available ingress capacity (the ingress vacancy) Φ(j) of the source switch module j and the available egress capacity (the egress vacancy) Ψ(k) of destination switch module k, both expressed as a number of data segments per rotation cycle, are then considered (step 7322). If either is less than the required number, κ, of data segments, a rejection message may be sent (step 7362) to the origin of the connection request. Otherwise, the search for a free path to the destination switch module starts with consideration of a direct path from switch module j to switch module k, by setting an intermediate switch module identifier, m, equal to k and a number of data segments remaining to be scheduled, ν, equal to κ (step 7324). The intermediate switch module denoted m is initially the destination switch module denoted k. The smaller of the number ν of data segments to be transferred to destination switch module k and the vacancy A(j, m) is determined in step 7320, and herein denoted q. The value of q may vary between 0 and 2. In anticipation of a successful allocation of κ data segments per rotation cycle, the vacancy A(j, k) is reduced by the value of q. If q is greater than zero, the value of q and an identifier of the destination switch module are recorded (step 7330) in an allocation list (illustrated in FIG. 74) and the remaining number ν of data segments to be scheduled is determined in step 7332 as ν←(ν−q).

In step 7334 if it is determined that the remaining number ν is zero, the scheduling process is complete and a new request may be received (step 7320). Otherwise, if ν>0, at least one indirect path from switch module j to switch module k is sought. An indirect path traverses an intermediate switch module m that may be selected according to any arbitrary order. For example, the intermediate switch module may be selected in a cyclical fashion where a current value m is increased by 1, modulo N, where N is the number of switch modules. Recall that the initial value of m is set to equal k (step 7324), where a direct path is considered first. As m is increased (modulo N) it may return to its initial value k, indicating that all intermediate switch modules have been considered. In step 7338, if it is determined that m=k, the connection request is rejected because the remaining number ν of data segment cannot be assigned. The vacancy matrices may then be reset to their initial state prior to the scheduling attempt and a rejection message is sent to the source of the request in step 7362. A new request may then be processed (Step 7320). If it is determined in step 7338 that m is not equal to k, an indirect path through the following intermediate switch module is considered. In step 7340, the number of data segments that may be transferred from switch module j to intermediate switch module m is determined as the smaller of the remaining number ν and the current vacancy A(j, m). A value of q less than 1 (step 7342) indicates that the path from switch module j to switch module m is already reserved for two data segments and another intermediate switch module is considered in step 7336. Otherwise if q is determined to be greater than zero in step 7342, the number of data segments that may be placed in the transit section of intermediate switch module m is determined (step 7344) as the smallest of the current value of q, the vacancy A(m, k) along the path from switch module m to switch module k, and the vacancy B(m, k) in a division of the transit section of switch module m dedicated to switch module k. The value of B(m, k) may not exceed two. In step 7346, if the new value of q is zero, the path through intermediate switch module m cannot be used and a subsequent intermediate switch module may be sought (step 7336). Otherwise, if it is determined in step 7346 that q is not zero, the corresponding vacancy entries A(j, m), A(m, k), and B(m, k) are updated in step 7348. The value of q and m are then added to the allocation list in step 7330, and the remaining number v is updated in step 7334.

The scheduling process of FIG. 73 applies to a circulating switch having a single rotator (FIG. 4). The process may be modified slightly to apply to a circulating switch 3600 (FIG. 36), 3700 (FIG. 37), or 5000 (FIG. 50).

When step 7338 determines that m equals k, a connection request is rejected and any assigned time slots are released (step 7360), i.e., the changes made in steps 7328, 7336 and 7338 are negated. A rejection message is then sent to the origin of the connection request (7362) and a new connection request may be received (step 7320).

Figure 74:
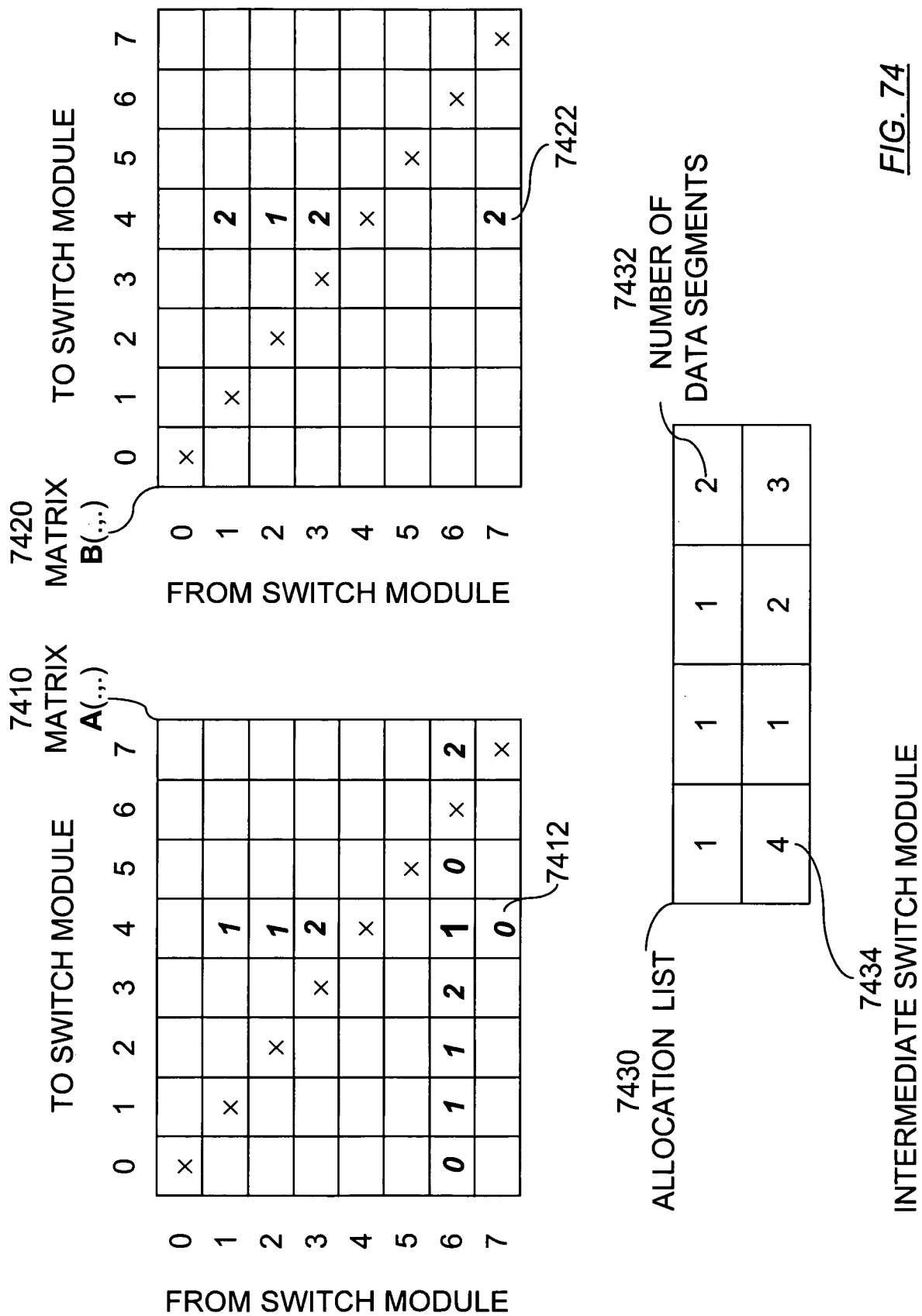
FIG. 74 illustrates a path-vacancy matrix, a transit-vacancy matrix, and an allocation list for use in the scheduling process of FIG. 73, in accordance with an embodiment of the present invention.

FIG. 74 illustrates the path-vacancy matrix 7410 (matrix A) and transit-vacancy matrix 7420 (matrix B) in a single-rotator circulating switch having eight switch modules similar to the single-rotator circulating switch 400 of FIG. 4. An entry 7412 in matrix 7410 contains a vacancy indicator, expressed as the number of data segments that may be accommodated in a corresponding path. For example, the path from switch module 6 to switch module 7 is illustrated to have a vacancy sufficient to accommodate two data segments. An entry 7422 in matrix 7420 indicates the number of data segments that may be written in a corresponding transit division. For example, the transit division in switch module 2 corresponding to switch module 4 is illustrated to have vacancy for one data segment. The rotation cycle excludes self connection and, therefore, the diagonal entries in both matrices A and B are unused and each is marked "x". Allocation list 7430 has a number of records (columns), not exceeding the number of switch modules minus one, each record indicating a number of data segments and an identifier of a corresponding intermediate switch module. The intermediate switching module for a direct path is the destination switch module.

FIG. 74 illustrates a schedule for a connection from switch module 6 to switch module 4 (j=6, k=4) requiring five data segments per rotation cycle. (κ=5). Starting with a direct connection, entry (6, 4) in matrix 7410 indicates that only one data segment may be transferred along the direct path. The number of data segments (1) and the identifier(4) of the destination switch module are written in the first record (first column) in allocation list 7430. Initially m=4 (step 7324), and the next value of m (step 7336) is 5. The entry (6, 5) in matrix 7410 is zero and, hence, another intermediate switch module is considered (steps 7342, 7336). The next value of m is 7 (m=6 is excluded because self-connection is not permitted). The entry (6, 7) in matrix 7410 is 2, the entry (7, 4) in matrix 7410 is zero, hence m=7 may not be used for an indirect path (steps 7346, 7336). The next value of m is 0 ([7+1] modulo 8). The entry (6, 0) in matrix 7410 is 0, hence the next value, m=1, is considered. Entry (6, 1) in matrix 7410 is 1, entry (1, 4) in matrix 7410 is 1, and entry (1, 4) in matrix 7420 is 1. Hence intermediate switch module 1 provides an indirect path that accommodates one data segment. The number of data segments (1) and the identifier (1) of the intermediate switch module are written in the second record (second column) in allocation list 7430. Continuing this process, an indirect path through switch module 2 accommodates one data segment (third record in allocation list 7430) and an indirect path through switch module 3 accommodates two data segments (fourth record in allocation list 7430), to a total of the required five data segments per rotation cycle.

For clarity, only the entries in matrices A and B (7410, 7420) that are relevant to the above example (where j=6, k=4, and κ=5) are illustrated.

Constellation of Switch Modules

The circulating switch illustrated in FIGS. 4, 8, 36, 37, and 50 comprises collocated switch modules where the propagation delays along the links connecting the switch modules to the rotator assembly are either negligible or equalized. Delay equalization may be difficult to realize if the switch modules are spread over wide area, in which case the indirect connections from a first switch module to a second switch module may have significant propagation-delay differences which may require that a data stream be carried over direct paths and/or a single indirect path instead of (N−2) indirect paths per rotator, N being the number of switch modules. In addition, time coordination between the switch modules and the rotator assembly becomes critical as will be described hereinafter. During each rotation cycle at least one rotation phase (one time slot) is reserved along a direct path from the master controller collocated with a rotator assembly to each switch module to convey a control data segment that may include timing and scheduling data. Likewise, at least one rotation phase is reserved along a direct path from each switch module to the master controller to convey a control data segment, that may include connection requests and timing data, from the each switch module to the master controller.

Figure 75:
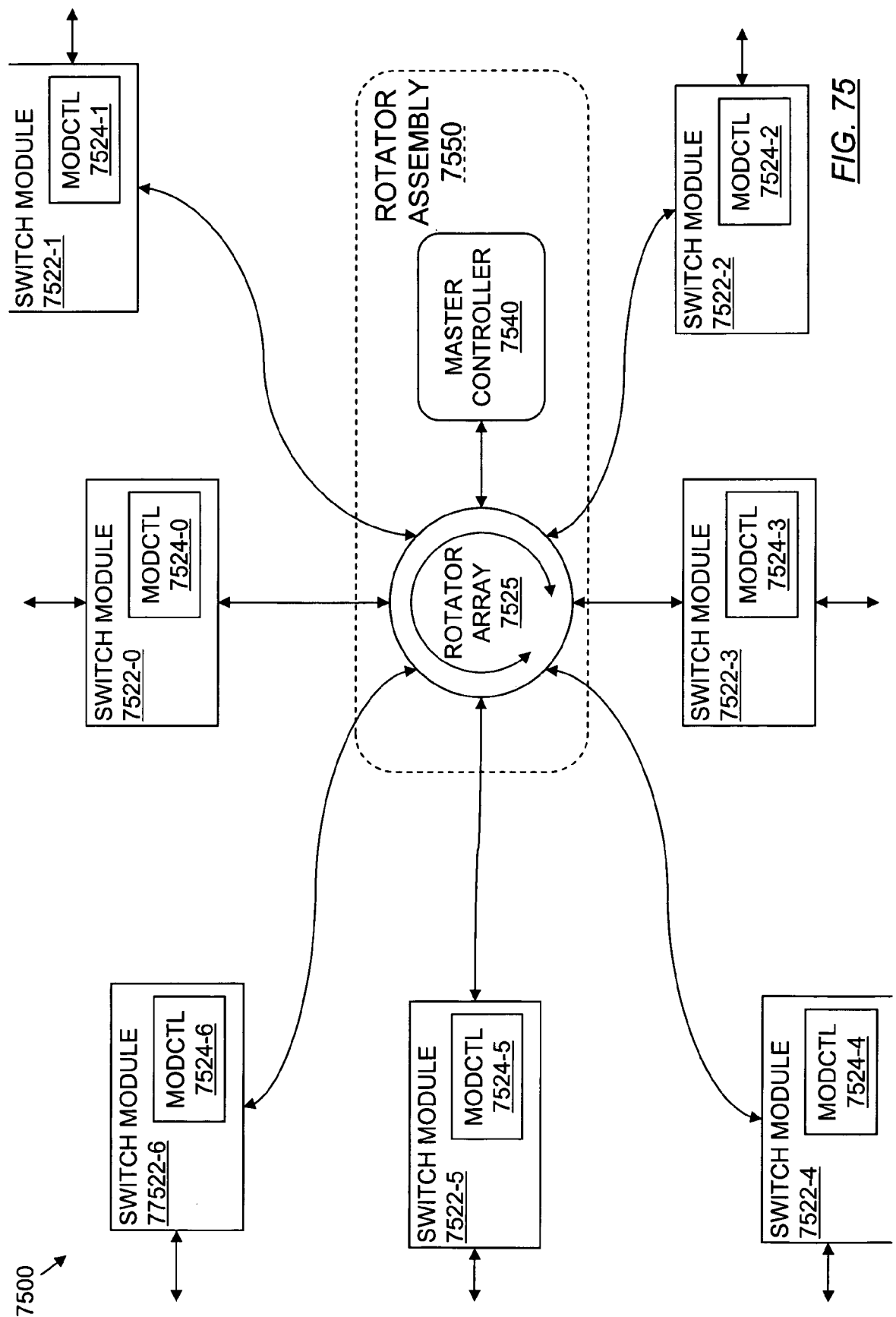
FIG. 75 illustrates a distributed circulating switch formed as a constellation of seven geographically distributed switch modules interconnected by a rotator assembly, in accordance with an embodiment of the present invention.

FIG. 75 illustrates a constellation 7500 of seven geographically distributed switch modules 7522-0, 7522-1, 7522-2, 7522-3, 7522-4, 7522-5, 7522-6 (collectively or individually 7522) interconnected through a rotator assembly 7550 as will be described hereinafter with reference to FIG. 76. The rotator assembly 7550 may comprise a single rotator or an array 7525 of rotators. Each of the switch modules 7522 is associated with a one of an equal number of module controllers 7524-0, 7524-1, 7524-2, 7524-3, 7524-4, 7524-5, 7524-6 (collectively or individually 7524). A master controller 7540, analogous to master controller 940 of FIG. 9, may be collocated with the rotator assembly 7550. The master controller 7540 may be connected directly to each of the switch modules 7522 using a dedicated wavelength channel in each of the downstream links from the rotator assembly 7550 to the switch modules 7522 in a manner similar to that of FIG. 9. However, due to the spatial distribution of the switch modules 7522, the use of dedicated wavelength channels for conveying control data segments may be considered wasteful. Preferably, the master controller 7540 may either subtend to one of the switch modules 7522 in an arrangement similar to that of masterrontroller 1040 of FIG. 10 or be connected to at least one dual port of each rotator in the rotator assembly 7550 in an arrangement similar to that of FIG. 11. If the master controller 7540 is connected directly to the rotator assembly 7550, the master controller 7540 communicates with the module controllers 7524 of the switch modules 7522 through the rotators within the rotator assembly 7550. To enable communication among the switch modules 7522, each switch module 7522 is required to time lock to a time counter collocated with the master controller 7540.

The constellation 7500 may function as a circulating switch only if the delays from the rotator assembly 7550 to the switch modules 7522 are equalized. In such a case, a given switch module 7522 may transmit consecutive data segments to consecutive switch modules 7522 and the data segments directed to any switch module 7522 can be read in the same order in which they were sent by a data traffic source. In the general case, where the differential propagation delays from the rotator assembly 7550 to the switch modules 7522 are significant, propagation-delay equalization becomes impractical and the constellation 7500 may function only as a time-multiplexed mesh network.

In summary, a particular one of the switch modules may send data to another one of the switch modules over a direct path or a path through a selected one of the switch modules. Constellation 7500 is a distributed circulating switch providing a temporal mesh interconnection of switch modules 7522. However, the temporal paths from each switch module to each other switch module do not provide a constant delay and may not collectively function as a single path of high capacity as in the case of collocated switch modules. Each temporal path is then used individually and data segments belonging to the same stream use one of the temporal paths.

Figure 76:
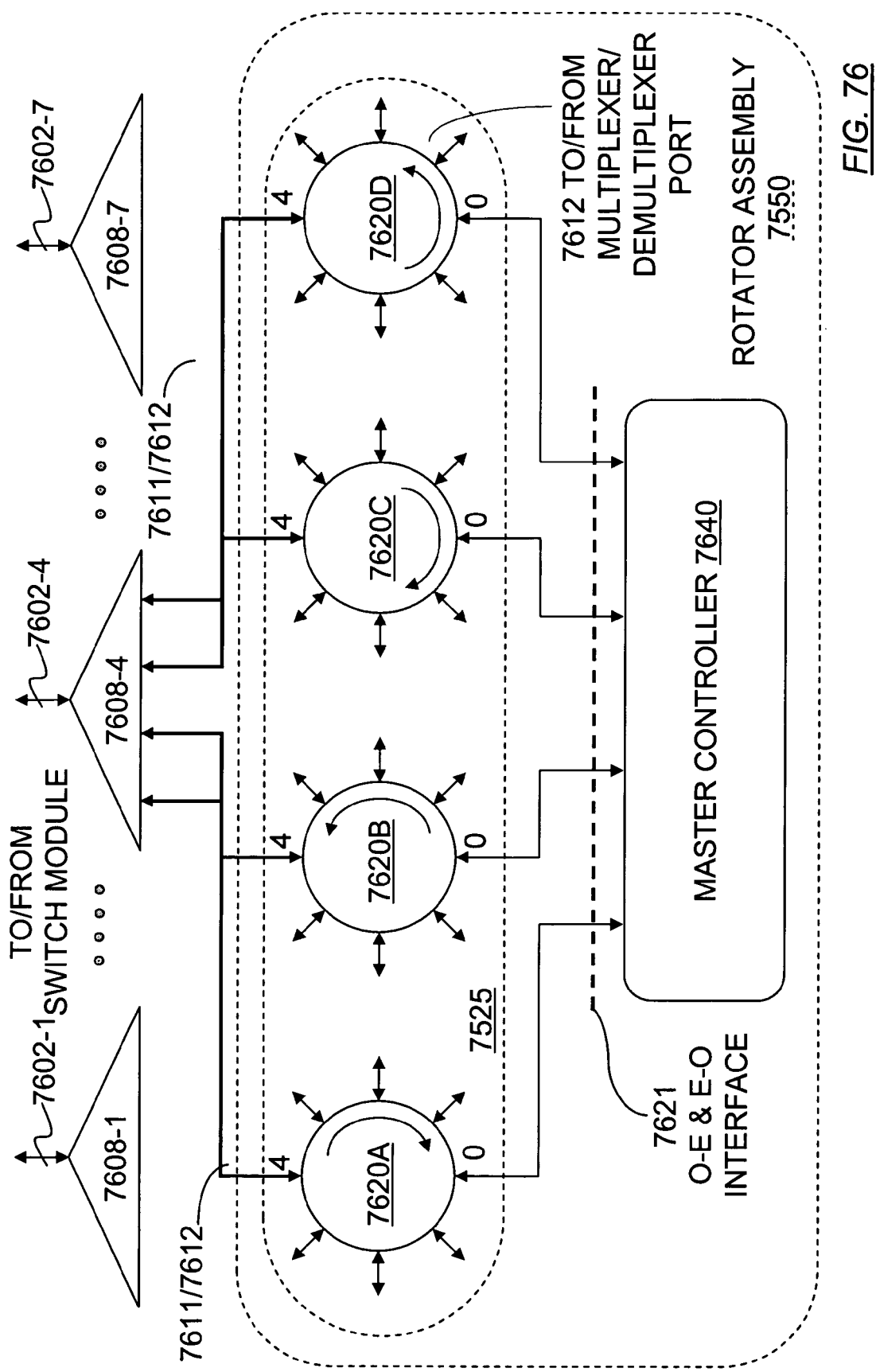
FIG. 76 illustrates a rotator assembly, for use in the constellation of FIG. 75, comprising four rotators interfacing with a master controller, in accordance with an embodiment of the present invention.

FIG. 76 illustrates the rotator assembly 7550 of the constellation 7500 of FIG. 75. The rotator assembly 7550 comprises four rotators 7620A, 7620B, 7620C, 7620D (collectively or individually 7620) interfacing with the master controller 7540 and seven wavelength multiplexers/demultiplexers, collectively or individually 7608, of which 7608-1, 7608-4, 7608-7 are illustrated. The master controller 7540 connects, if necessary, via electrical-to-optical and optical-to-electrical interfaces (not shown), to at least one dual port of one of the rotators 7620; a dual port comprises an input port and an output port as defined hereinbefore. In the arrangement of FIG. 76, the master controller 7540 is connected to a dual port in each of the four rotators 7620. Each wavelength multiplexer/demultiplexer 7608 comprises a wavelength demultiplexer and a wavelength multiplexer (not illustrated individually). The demultiplexer receives a wavelength-multiplexed signal from a switch module, demultiplexes the signal into four wavelength-bands each directed to an input port in one of the four rotators 7620 through an outbound internal fiber link 7611. The multiplexer receives signals, each occupying a wavelength band, from an output port of each of the four rotators through an inbound internal fiber link 7612 and multiplexes the four wavelength bands into a wavelength-multiplexed signal to be transmitted to a respective switch module 7522.

Two of the four rotators are clockwise rotators and the other two are complementary counterclockwise rotators. Further, the rotation cycle of one of the two clockwise rotators is phase shifted by a quarter cycle with respect to the other clockwise rotator. Thus, the four rotators 7620 provide access to each switch module 7522 during four equally-spaced time slots of the time frame corresponding to a rotation cycle.

Each rotator 7620 may be considered to have eight dual ports indexed as 0 to 7. Dual port 0 of each rotator connects to the master controller 7540. Dual port 4 of each rotator connects to the same multiplexer/demultiplexer 7608-4. Likewise, each dual port of index J, $1 \leq J \leq 7$, connects to the same multiplexer/demultiplexer 7608-J.

To summarize, the constellation 7500 of FIG. 75 comprises:
(a) a plurality of switch modules 7522, each switch module associated with a module controller 7524;
(b) a rotator array 7525 which may include several rotators 7620; and
(c) a master controller 7540 associated with at least one rotator 7620 of the rotator array 7525.

The rotator array 7525 and the master controller 7540 constitute a rotator assembly. Each switch module 7522 has two inward/outward channels to each of the four rotators 760. To enable communication among the switch modules 7522, each switch module 7522 must be time-locked to a time counter collocated with the master controller 7540 as will be described hereinafter with reference to FIGS. 77A and 77B.

When the rotator assembly 7550 includes two or more rotators 7620, the rotators 7620 are preferably mutually phase shifted in order to provide, for each switch-module pair, paths that are staggered over the rotation cycle, hence reducing waiting time fluctuations at the source switch module. The master controller 7540 includes a master timing circuit (not shown); and each module controller 7524 includes at least one timing circuit (not shown) for time-locking to the master timing circuit.

A given switch module 7522 may have a multiple-wavelength-channel link (a wavelength-division-multiplexed link) to the rotator assembly 7550 and each wavelength channel in the link may connect to a corresponding rotator 7620 in the rotator assembly 7550. A given switch module 7522 may include a timing circuit dedicated to each rotator 7620 in the rotator assembly in order to enable time locking of the given switch module 7522 to the master time counter along each of the wavelength channels. Time locking along individual wavelength channels would be needed only if the link extends over a long distance.

Figure 77:
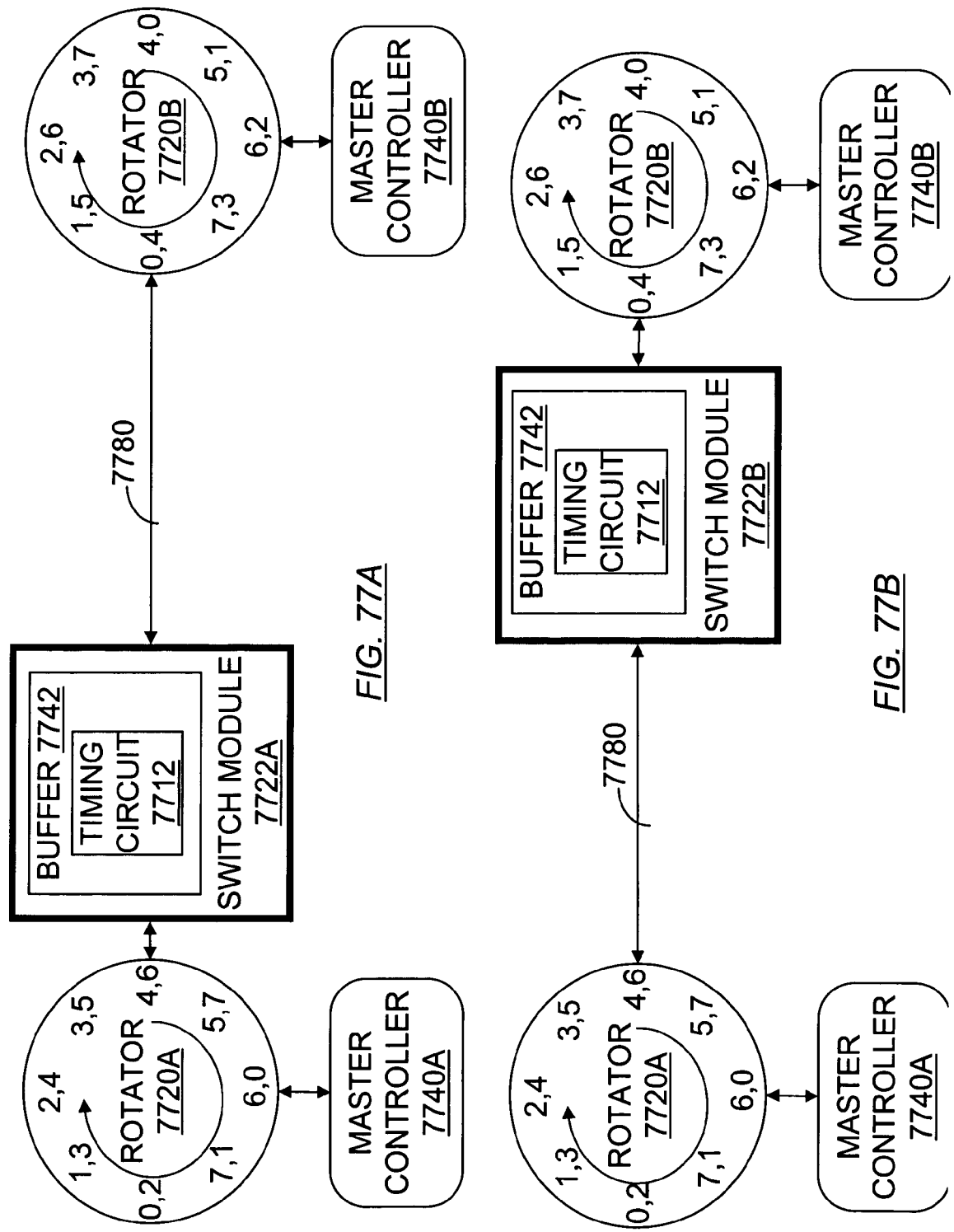
FIG. 77A illustrates a first interconnection of rotators of different constellations according to an embodiment of the present invention.
FIG. 77B illustrates a second interconnection of rotators of different constellations according to an embodiment of the present invention.

In FIG. 77A, a first rotator 7720A connects to a master controller 7740A and belongs to a rotator assembly 7550 of a first constellation of a type similar to the constellation 7500 of FIG. 75. One of the switch modules 7722A of the first constellation is also illustrated in FIG. 77A to include a buffer 7742 and a timing circuit 7712. Similarly, a second rotator 7720B with a corresponding master controller 7740B belongs to a rotator assembly 7550 of a second constellation of a type similar to the constellation 7500 of FIG. 75. FIG. 77B illustrates a switch module 7722B associated with the second constellation, which switch module includes the data buffer 7742 and the timing circuit 7712. Each of the two switch modules 7722A and 77228 is preferably a common-memory switch such as switch module 3500 of FIG. 35.

FIG. 77A further illustrates the interconnection of the first constellation to the second constellation through the switch module 7722A of the first constellation. Switch module 7722A is preferably collocated with the rotator assembly of the first constellation. Likewise, switch module 7722B is preferably collocated with the rotator assembly of the second constellation. Switch module 7722A may, therefore, have the same time reference of the master controller 7740A of the first constellation. Similarly, switch module 7722B (see FIG. 77B) may have the same time reference of the collocated master controller 7740B of the second constellation. Each of the distant switch modules 7722 (not illustrated) of the first constellation is time locked to rotator 7520A of the first constellation. Likewise, each of the distant switch modules 7722 (not illustrated) of the second constellation is time locked to rotator 7520B of the second constellation. Each of rotators 7720A and 7720B has eight dual ports one of which may be used to connect to a respective master controller.

An inter-constellation link 7780 from the switch module 7722A associated with the first rotator 7720A to the second rotator 7720B, where the propagation delay along the inter-constellation link is significant, does not allow for a time-shared interconnection of the two constellations because a switch module 7722X (not illustrated) associated with the first rotator 7720A cannot have a timed-locked path traversing the two rotators 7720A and 7720B. Switch module 7722X can independently time lock to several rotators, of the same rotator assembly 7750 or of different rotator assemblies 7750 assemblies. However, switch module 7722X cannot, except by coincidence, time lock to two rotators in series, unless the two rotators are collocated. Likewise, a switch module 7722Y (not illustrated) associated with the second rotator 7720B cannot have a time-locked path traversing rotators 7720B and 7720A. It is therefore necessary to have the data buffer 7742 along any link between the two rotators 7720A, 7720B. The data buffer 7742 may be provided as a separate network element. Preferably, however, as shown in FIG. 77A, the switch module 7722A associated with the first constellation, which switch module includes the data buffer 7742, may be placed along the inter-constellation link, thus eliminating the need for a separate data buffer. Equally, the switch module 7722B associated with the second constellation, which switch module includes the data buffer 7742, may be placed along the inter-constellation link.

The switch module 7722A is associated with both the first rotator 7720A and the second rotator 7720A and may, independently, time-lock to the two rotators. Switch module 7722A may then hold data received from other switch modules of the first constellation that is destined for the second constellation and transmit the data at instants of time dictated by a time-locking process coordinated through the use of the timing circuit 7712. Likewise, switch module 7722B may hold data received from other switch modules of the second constellation and transmit the data through a time-locked path to rotator 7720A.

Constellation Network

FIG. 78 illustrates a network 7800 comprising several constellations of switch modules 7822, each constellation of switch modules 7822 interconnected through a rotator assembly 7850. The rotator assembly 7850 may comprise a single rotator or an array 7825 of rotators and a master controller 7840. The rotator assembly of each constellation of switch modules 7822 has a master controller 7840 connecting to at least one rotator through at least one dual link. The master controller 7840 communicates with a module controller (not shown) associated with each of the switch modules 7822 in the corresponding constellation during designated rotation phases in a rotation cycle. Control data segments are transmitted from the master control to the controllers of the switch modules during successive flotation phases and the master controller receives control data segments from the switch modules during different rotation phases of the rotation cycle. Each constellation thus constitutes a distributed switch as described with reference to FIG. 75. When a constellation covers a wide geographic area where propagation delays between the switch modules 7822 and the rotator assembly 7850 are appreciably different, each switch module 7822 must time-lock to the rotator assembly 7850, i.e., to the master controller 7840 associated with the rotator assembly 7850. Thus, data sources subtending to a switch module 7822 can communicate with data sinks subtending to any switch module 7822 in the same constellation. Each constellation has a dual inter-constellation link 7880 to each other constellation. An inter-constellation link 7880 need only traverse a single switch module 7822. The switch modules 7822 that are traversed by an inter-constellation link are highlighted in bold in FIG. 78.

A switch module 7822 may connect to a rotator assembly 7850 through a WDM fiber link as described with reference to FIG. 76. Using 32 wavelength channels per link, each modulated at 10 Gb/s, the access capacity of a single constellation having a rotator assembly 7850 of 32 rotators with each rotator having 1,024 dual ports would be 320 Terabits per second. Several constellations may be interconnected in a mesh structure. Using 1,024-dual-port rotators and allocating, for example, 400 dual ports of each rotator for interfacing with switch modules 7822 and the remaining 624 dual ports of each rotator to connect to other constellations, a network of 625 constellations each constellation having an access capacity of 128 Tb/s (40 times 320 Gb/s) can be constructed. The capacity of such a network would be of the order of 80 Petabits per second. Initially, each constellation may have only two complementary rotators and fewer dual ports may be provided at each rotator resulting in a corresponding multiple-constellation network having a relatively-small access capacity; of the order of hundreds of Terabits per second for example. A person skilled in the art realizes that the expansion of 624:400 in each constellation is provided to offset the effect of indirect connections each of which traversing an intermediate switch module. The expansion ratio, however, may differ from one constellation to another. For example, a constellation that has a high proportion of intra-constellation traffic may require a smaller expansion ratio.

Options of Locating Inter-Constellation Switch Modules

Consider a link from a first rotator assembly of a first constellation to a second rotator assembly of a second constellation in the network 7800 of FIG. 78. An inter-rotator switch module 7822 may be used according to one of two arrangements. In the first arrangement, the inter-rotator switch module 7822 is collocated with, and connected to an output port of, the first rotator. In the second option, the inter-rotator switch module is collocated with, and connected to an input port of, the second rotator. The first arrangement may require that the inter-rotator (inter-constellation) switch module have two or more time counters for time-locking along the inter-rotator link. The second arrangement may require that received data segments at the switch module be delayed to align them with other signals received at the input ports of the second rotator.

To summarize, the network 7800 of FIG. 78 comprises at least two constellations, each constellation including a plurality of switch modules 7822 interconnected by a rotator array 7825 of a rotator assembly 7850. The rotator assembly 7850 has an associated master controller 7840. Each switch module 7822 has a module controller as described with reference to FIG. 75. Any two constellations may be interconnected through an inter-constellation switch module 7822 connecting to the rotator assemblies 7850 of the two constellations and preferably collocated with the rotator assembly 7850 of one of the two constellations. Each master controller 7840 includes a master timing circuit and each module controller 7840 includes at least one timing circuit for time-locking to one of the master timing circuits.

Figure 79:
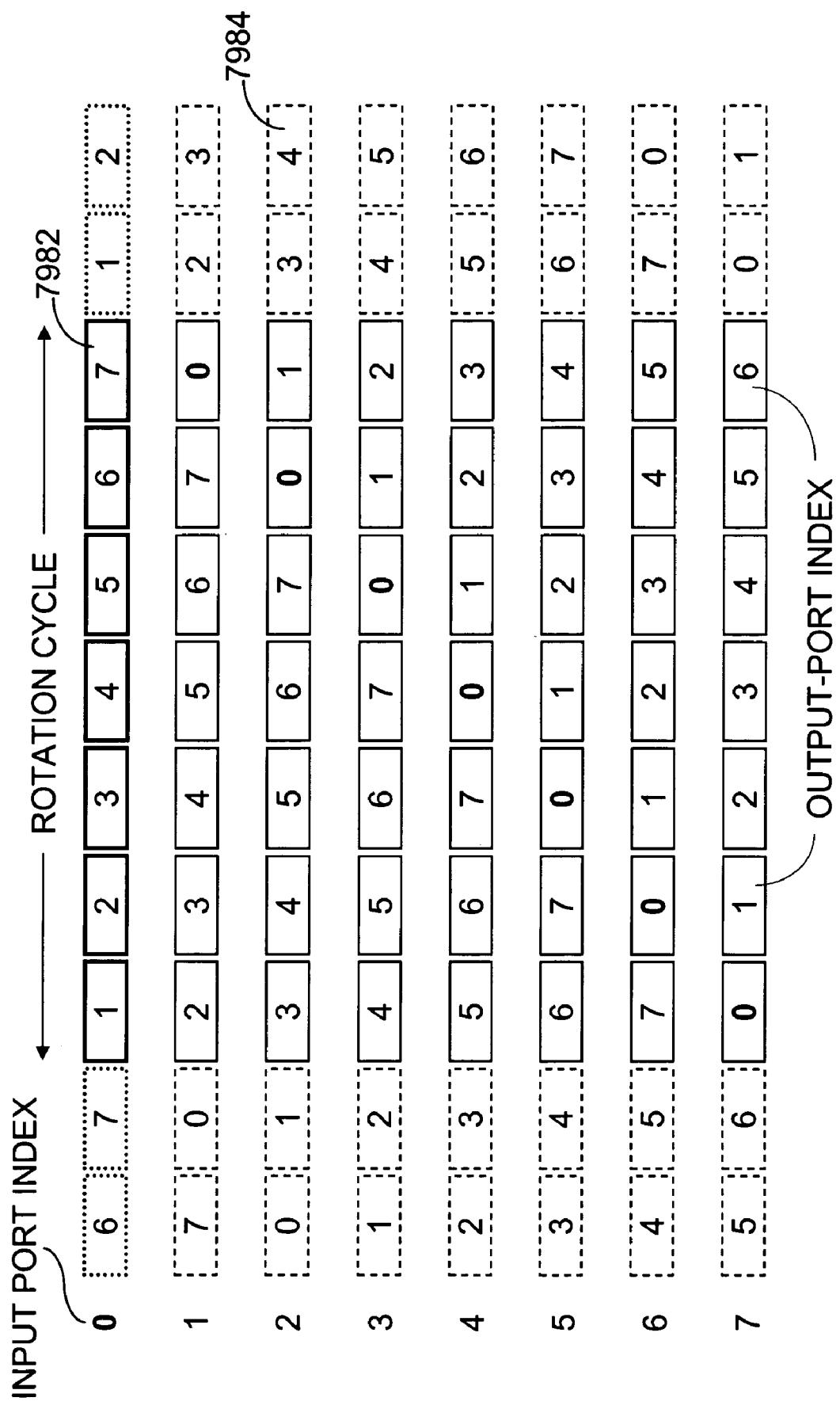
FIG. 79 illustrates time-aligned signals received at input ports of a rotator in the constellation of FIG. 75 or the interconnected constellations of FIG. 78 for use with an embodiment of the present invention.

FIG. 79 illustrates the organization of a signal received at each input port of a rotator 7620 in the rotator assembly 7550 of FIG. 76, where the signal is viewed during successive time frames. The rotator 7620 has eight input ports and eight output ports arranged in eight dual ports, each dual port comprising an input port and an output port, as described above with reference to FIG. 76. An input port and an output port of the same dual port are likewise indexed. An input port of index j, 023 j≦7, need not connect to an output port of the same index j, i.e., an input port and an output port of the same dual port need not connect through a rotator. Thus, the rotation cycle comprises seven phases (i.e., the time frame comprises seven time slots). FIG. 79 illustrates a complete rotation cycle (a complete time frame). During each rotation phase (each time slot), the input ports of the rotator 7620 connect to different output ports identified by indices 7982. Indices 7984 of output ports to which the input ports of the rotator 7620 during a part of a subsequent rotation cycle are also illustrated. Input port 0 (of dual port 0) connects to the output ports indexed 1 to 7 during the seven time slots of the rotation cycle excluding a connection to output port 0, input port 1 connects consecutively to output ports indexed 2, 3, 4, 5, 6, 7, and 0, excluding a connection to output port 1, and similarly for the remaining input ports 2 to 7. The signals received at the eight input ports are time aligned as indicated.

Input ports 1 to 7 of the rotator connect to respective remote switch modules 7522, each of which executes a time-locking process. The master controller 7540 is collocated with the rotator assembly 7550 and controls the timing process. The seven switch modules 7522 time lock to the master time counter of the master controller.

Figure 80:
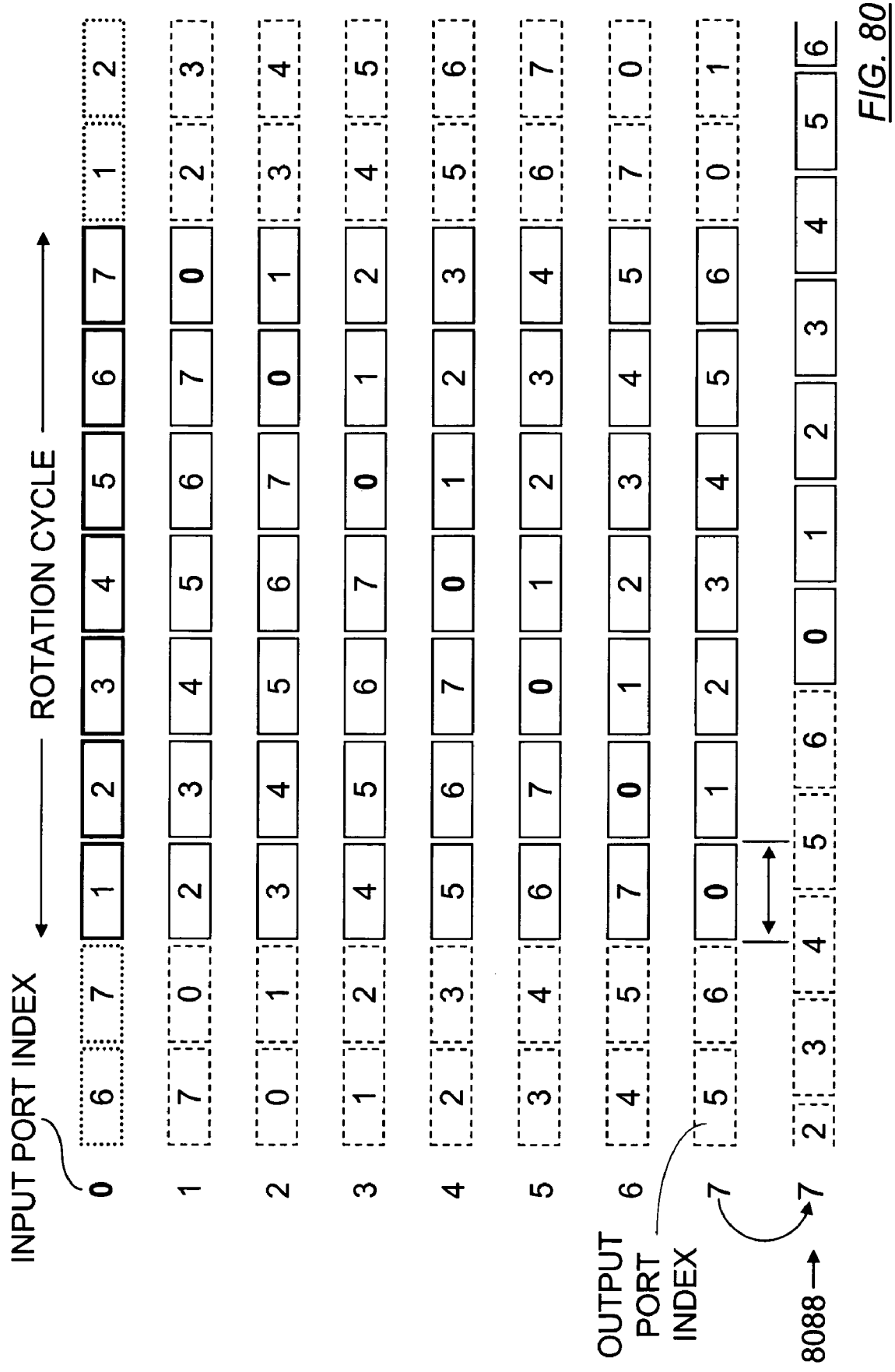
FIG. 80 illustrates an incidence of misalignment of a signal received at an input port of a rotator, for use in describing corrective steps in accordance with an embodiment of the present invention.

FIG. 80 repeats the illustration of the time-aligned signals of FIG. 79, received at the eight input ports of the rotator in rotator array 7525, and additionally illustrates a case wherein a signal 8088 received from one of the switch modules 7522, specifically the switch module 7522 connecting to dual port 7, is not time-locked to the master time counter. The signal received at port 7 is misaligned and, during time slot 0 where input port 0 connects to the master controller, data segments intended for output ports 4 and 5 overlap the first time slot (time-slot 0) of the time rare and are interpreted by the master control as a control data segment sent by the switch module 7522 connecting to dual port 7. The master controller 7540 then fails to recognize the data received during time-slot 0 as a control data segment and initiates a time-locking recovery process as described below.

Time-Locking Process

In a constellation 7500, if the switch modules 7522 and the rotator assembly 7540 are collocated in a relatively small area, the propagation delay between any switch module and the rotator assembly can be substantially equalized, for example, by equalizing the lengths of fiber links.

If a constellation covers a wide geographic area, the transfer of data segments from switch modules to other switch modules through a rotator requires precise time coordination so that data segments transmitted from distant switch modules are aligned along time-slot boundaries when they arrive at the rotator assembly.

To realize time coordination, the module controller of each switch module may be provided with at least one time counter corresponding to each rotator to which the switch module is connected. A time counter is a clock-driven counter of a predefined word length; 28 bits for example. When the link from switch module to the rotator has multiple wavelength channels, and if the link is sufficiently long (several-hundred kilometers, for example) to result in a significant propagation delay differential along different wavelength channels, then it is preferable that the switch module assign at least two time counters, where each time counter covers a wavelength-channel band. In a constellation 7500, the links from the switch modules to the rotator assembly may be short enough to render the propagation-delay difference over the used wavelength band negligible. A single time counter may then be used at a switch module for time locking all the wavelength channels in a link. As described above with reference to FIGS. 77A and 77B, a link 7780 connecting a first constellation to a second constellation connects to a switch module collocated with the rotator assembly of either of the two constellations. If the switch module is collocated with the rotator assembly of the first constellation, the switch module need be time locked to the rotator assembly of the second constellation, and vice versa.

A process of time locking is described in U.S. Pat. No. 6,570,872, issued to Beshai et al. on May 27, 2003 and titled "Self-Configuring Distributed Switch". The time-locking process is further detailed in Applicant's U.S. patent application Ser. No. 10/054,509, filed on Nov. 13, 2001 and titled "Time Coordination in a Burst-Switching Network", and Applicant's U.S. patent application Ser. No. 10/107,332, filed on Mar. 28, 2002 and titled "Multi-Phase Adaptive Network Configuration", the specifications of which are incorporated herein by reference. A switch module is said to be time locked to a rotator along a given path if, at any instant of time, the reading of a timecunter at the switch module equals the sum of a reading of an identical time counter at the rotator and the propagation time, normalized to the time-counter period, along the given path from the switch module to the rotator. The time counters at the switch module and the rotator have the same period. There may be several paths connecting the switch module to the rotator and the paths may be defined by individual wavelengths in a fiber link or several fiber links. If the difference in propagation delays of different paths connecting the same node pair is significant, time locking would be required for the different paths individually. When a switch module is time locked to a rotator along a given path, the given path is said to be time-locked.

Within a network of constellations as described herein in conjunction with FIG. 78, all time counters have the same period and time-coordination can be realized through an exchange of time-counter readings between each switch module and each rotator assembly to which the switch module connects. The time-counter readings maybe carried in-band, alongside payload data segments destined to switch modules, and sending each time-counter reading must be timed to arrive at a corresponding rotator during a designated time interval.

Consider a rotator having several subtending and distant switch modules. To secure time-locking of one of the switch modules (not illustrated) to the rotator, two mutually-dependent processes are required. The first process is implemented at subtending switch module. A reading of a time counter at the switch module, which may be included within a control data segment, is sent by a controller of the switch module to a master controller collocated with the rotator to be compared with a reading of the master time counter. The controller of the switch module then receives a result of the comparison and resets its time counter accordingly. In the second process, the master controller receives the time-counter reading from the controller of the switch module during a designated interval of time, compares the received reading with a reading of the master time counter, and sends a result of the comparison back to the controller of the switch module. The second process requires that the switch module be time-locked to the rotator, and the first process needs the result of the second process to realize the required time locking.

The mutual dependence of the two processes requires that a secondary mechanism be provided for directing upstream signals from the controller of the switch module to the master controller in order to initiate time locking, or to restore time locking in case of disruption for any reason.

According to one mechanism, adapted from a prior-art mechanism disclosed in the aforementioned U.S. patent application Ser. No. 10/054,509, a master controller receives control data segments from subtending switch modules during consecutive time slots, each time slot being designated to a respective switch module. When the master controller fails to detect a time-counter-reading of a switch module, the master controller sends a command to the controller of the switch module instructing it to send a continuous stream of its time-counter readings. The command may be included in a control data segment sent during the time slot designated to transmit a control data segment from the rotator to the switch module. The switch module then transmits a sequence of its time-counter readings over all the time slots of the time frame with each time-counter reading occupying a time interval not exceeding half a time slot. The master controller is able to receive control data segments from the switch module during only one designated time slot per time frame. However, because the switch module is sending a continuous stream of control data slots, each of which having a duration of at most half a time slot, the master controller can capture at least one of the time-counter readings sent by the switch module. The master controller selects a captured time-counter reading then associates a contemporaneous reading of the master time counter with the captured time-counter reading and includes the two readings in a control data segment to be sent back to the controller of the switch module during the time slot designated for downstream communication with the switch module.

Maintaining time locking to offset a potential slow variation of propagation delay is ensured by a continuous exchange of time-counter readings between the master controller and each of the sub-tending switch modules.

Other modifications will be apparent to those skilled in the art and, therefore, the invention is defined in the claims.

I claim:

1. A switch for switching data stream segments between network links comprising:
   a rotator; and
   a plurality of switch modules, each switch module having a memory and being for:
      receiving new data stream segments from at least one external data source through an ingress network link;
      storing said new data stream segments in said memory;
      transmitting said new data stream segments to other switch modules from among said plurality of switch modules through said rotator;
      receiving other data stream segments from said other switch modules through said rotator;
      storing said other data stream segments in said memory; and
      transmitting at least a portion of said other data stream segments out on an egress network link;
   said rotator for cyclically directly connecting said each switch module to each other switch module of said other switch modules during a rotation cycle comprising a number of phases, where, during each phase, said rotator directly connects said each switch module to one of said other switch modules.

2. The switch of claim 1 wherein said new data-stream segments are transferred along at least one indirect connection from said each switch module to a destination switch module from among said plurality of switch modules, where an indirect connection traverses a transit switch module, where said transit switch module is selected from among said plurality of switch modules excluding said each switch module and said destination switch module.

3. The switch of claim 2 further comprising a plurality of rotators, each rotator of said plurality of rotators for temporarily providing a direct connection between said each switch module and said each other switch module to allow for data stream segments to be directly transferred from said each switch module to said each other switch module.

4. The switch of claim 3 wherein at least two rotators of said plurality of rotators rotate in opposite directions.

5. The switch of claim 4 wherein said indirect connection traverses two rotators rotating in opposite directions.

6. A circulating switch comprising a plurality of switch modules containing N switch modules, N>2, wherein:
   each switch module of said plurality of switch modules is configured to cyclically connect to each other switch module of said plurality of switch modules through m parallel rotators arranged into a first group of $m_1$ clockwise rotators and a second group of $m_2$ counterclockwise rotators, m>1, $m_1 \geq 1$, $m_2 \geq 1$; and
   said each switch module is configured to transfer data to said each other switch module of said plurality of switch modules through:
      m direct paths, each said direct path traversing only one of said m parallel rotators; and
      a plurality of sets of indirect paths comprising $2 \times m_1 \times m_2$ sets of indirect paths, each set of indirect paths of said plurality of sets of indirect paths including N−2 indirect paths traversing a respective sub-set of said rotators such that said N−2 indirect paths are associated with an alike transfer delay, said alike transfer delay being specific to said each set of indirect paths.

7. The circulating switch of claim 6 wherein at least one of said switch modules is configured to receive data from external sources through at least one input channel and at least one of said switch modules is configured to transmit data on at least one output channel to external sinks.

8. The circulating switch of claim 6 wherein each indirect path in said each set of indirect paths traverses one of said $m_1$ clockwise rotators, one transit switch module from among said plurality of switch modules, and one of said $m_2$ counterclockwise rotators.

9. The circulating switch of claim 6 wherein said alike transfer delay is specific to a pairing of said each switch module with said each other switch module and said respective sub-set of said rotators.

10. The circulating switch of claim 6 further including a plurality of module controllers, each module controller of said plurality of module controllers associated with one of said switch modules, said each module controller for selecting a direct path from among said m direct paths.

11. The circulating switch of claim 10 wherein said each module controller selects a set of indirect paths from among said sets of indirect paths.

12. The circulating switch of claim 10 further including a master controller for receiving connection requests from said module controllers.

13. The circulating switch of claim 12 wherein said master controller is directly connected to each of said module controllers.

14. The circulating switch of claim 12 wherein said master controller connects to one of said switch modules and communicates with said switch modules through said one of said switch modules.

15. The circulating switch of claim 11 wherein said each module controller associates an ordered pair of said switch modules selected from among said plurality of switch modules with a preferred set of indirect paths selected from said plurality of sets of indirect paths.

16. The circulating switch of claim 6 wherein each direct path of said m direct paths is established during a time slot of a predetermined duration.

17. A circulating switch comprising:
    a set of m switch modules, m>2, said m switch modules interconnected in a temporal mesh wherein each switch module of said set of switch modules directly connects to each other switch module of said set of switch modules during a corresponding set of n time slots, $n \geq 1$, in a predefined time frame, said predefined time frame having a number of time slots at least equal to m; and
    said temporal mesh defining, in conjunction with said predefined time frame, a set of indirect temporal paths from said each switch module to said each other switch module, each indirect temporal path from an origin switch module to a destination switch module directly connecting said origin switch module to an intermediate switch module during a first selected time slot among a first corresponding set of n time slots and directly connecting said intermediate switch module to said destination switch module during a second selected time slot among a second corresponding set of n time slots, said first switch module, second switch module, and intermediate switch module belonging to said set of m switch modules.

18. The circulating switch of claim 17 wherein said first selected time slot and second selected time slot are determined so that said each indirect temporal path guarantees temporal order of data segments transmitted from said origin switch module to said destination switch module.

19. The circulating switch of claim 17 wherein said each switch module is for receiving and sending data segments, each data segment having a same predefined size, and said each switch module has a memory device logically partitioned into:

a shipping section for storing new data segments received from data sources;

a transit section for storing transit data segments received from a first switch module among said plurality of switch modules and directed to a second switch module among said m switch modules, where said second switch module is other than said each switch module; and a receiving section for storing received data segments for delivery to data sinks associated with said each switch module.

20. The circulating switch of claim 19 wherein a storage capacity of said transit section is limited to:

m times a predefined number of transit data segments per switch module times said predefined size.

* * * * *